United States Patent [19]
Davis et al.

[11] Patent Number: 5,754,764
[45] Date of Patent: May 19, 1998

[54] COMBINATION OF INPUT OUTPUT CIRCUITRY AND LOCAL AREA NETWORK SYSTEMS

[75] Inventors: Timothy D. Davis, Arlington, Tex.; Roman Baker, Sunnyvale, Calif.; Dan E. Daugherty, Burleson, Tex.; Martin S. Michael, Los Gatos, Calif.; Ahmed Masood, Austin, Tex.; Kent Bruce Waterson, Everman, Tex.; Hon C. Fung, Arlington, Tex.; Mark Douglas Koether, Grand Prairie, Tex.; J. Scott Johnson, Fort Worth, Tex.

[73] Assignee: National Semiconductor Corp., Santa Clara, Calif.

[21] Appl. No.: 200,097

[22] Filed: Feb. 22, 1994

[51] Int. Cl.$^6$ .............................. G06F 13/00; H04L 12/00
[52] U.S. Cl. .................. 395/200.01; 305/800; 305/412; 305/497.01; 305/876; 305/821; 305/555
[58] Field of Search .................. 395/800, 200, 395/250, 275; 364/DIG. 1; 375/62

[56] References Cited

U.S. PATENT DOCUMENTS

| | | | |
|---|---|---|---|
| 4,757,443 | 7/1988 | Hecket et al. | 364/DIG. 1 |
| 4,908,874 | 3/1990 | Gabriel | 382/41 |
| 5,016,221 | 5/1991 | Hamstra | 365/221 |
| 5,187,721 | 2/1993 | Wong | 375/62 |
| 5,199,105 | 3/1993 | Michael | 395/275 |
| 5,297,276 | 3/1994 | Millar et al. | 395/550 |
| 5,299,313 | 3/1994 | Petersen et al. | 395/200 |
| 5,307,459 | 4/1994 | Petersen et al. | 395/200 |
| 5,379,289 | 1/1995 | Desouza et al. | 370/85.13 |
| 5,412,782 | 5/1995 | Hausman et al. | 395/250 |
| 5,432,823 | 7/1995 | Gasbarro et al. | 375/356 |

OTHER PUBLICATIONS

Novellino, "IC Puts Ethernet and SCSI on a Motherboard", *Electronic Design*, Jan. 24, 1994, pp. 59–60, 62, 66.

*Primary Examiner*—Alyssa H. Bowler
*Assistant Examiner*—Walter D. Davis
*Attorney, Agent, or Firm*—R. Darryl Burke; H. Donald Nelson; Stephen R. Robinson

[57] ABSTRACT

Input/output and local area network functions are combined into a single integrated circuit on a single semiconductor (e.g., a single piece of silicon). Preferred system embodiments on a single integrated circuit are typically placed inside a host system (e.g., a personal computer based on Intel®'s 286, 386, 486, and Pentium microprocessors) and interrelate with standard operating systems (e.g., Microsoft®'s DOS, IBM®'s OS/2) on traditional, commonly used bus architectures (e.g., Industry Standard Architecture and Enhanced Industry Standard). Local area network circuitry and input and output circuitry are both coupled to at least one host system (and indirectly to potentially any number of host systems tied together via the local area network system) via a common data bus. The input and output circuitry couples the host system to at least one input/output channels. Examples of the types of input/output channels are a first serial interface, a second serial interface, a parallel port, a hard drive, a floppy drive, and/or any combination thereof.

58 Claims, 65 Drawing Sheets

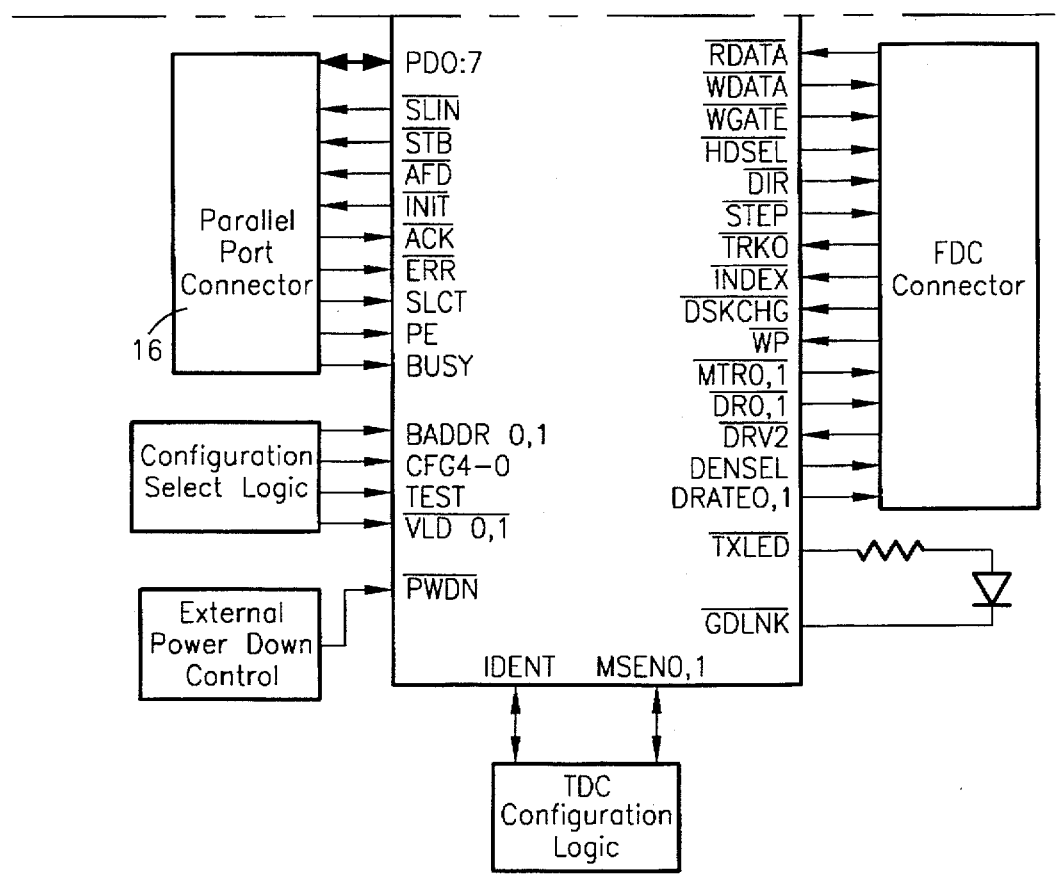
FIG. 1BB
Key to Figure 1B
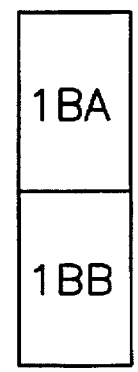

Key to Figure 1C

| 1CA | 1CB |
|---|---|
| 1CC | 1CD |

Note 1: The resistor R1 may be required in order to minimize frequency drift due to changes in the Vcc.

Crystal Connection to Preferred System Embodiment

Connection for Oscillator Module

Type 4 Integrated Phase Detector

Leading Phase Waveforms

Present Art of Phase Pulse Generator

Present Art of Phase Pulse Generator

SPICE Simulation of Fig. 1H Circuit

SPICE Simulation of Fig. 1I Circuit

Note: Values after reset are shown for each register. C indicates that these bits are set by hardware jumpers
Note: Index locations 0SH, 06H, 0AH-13H are reserved.

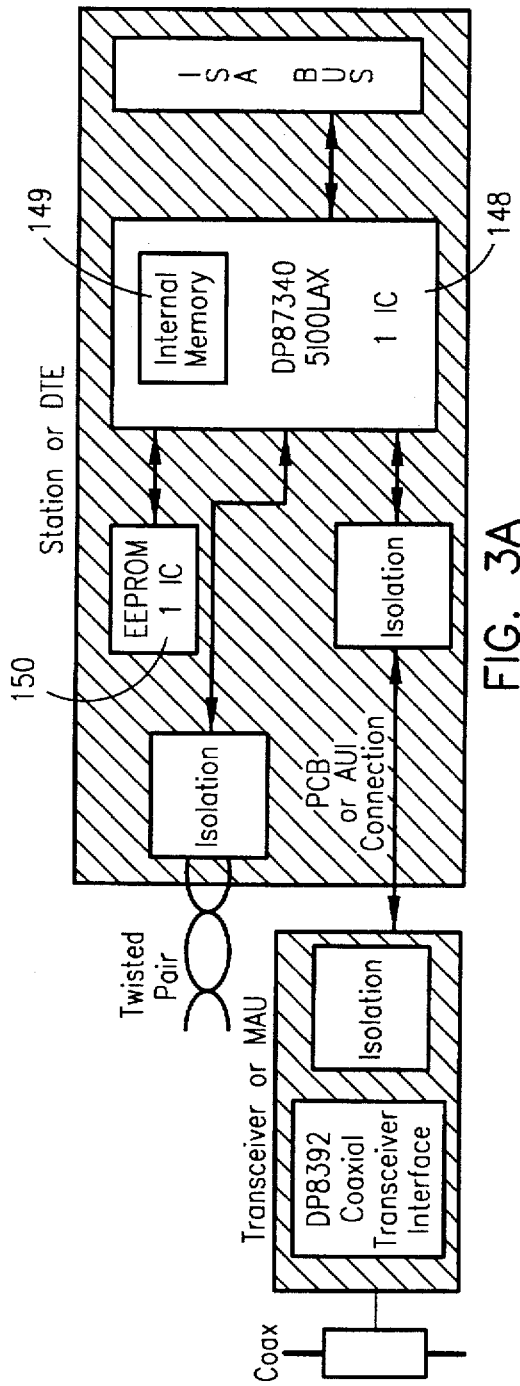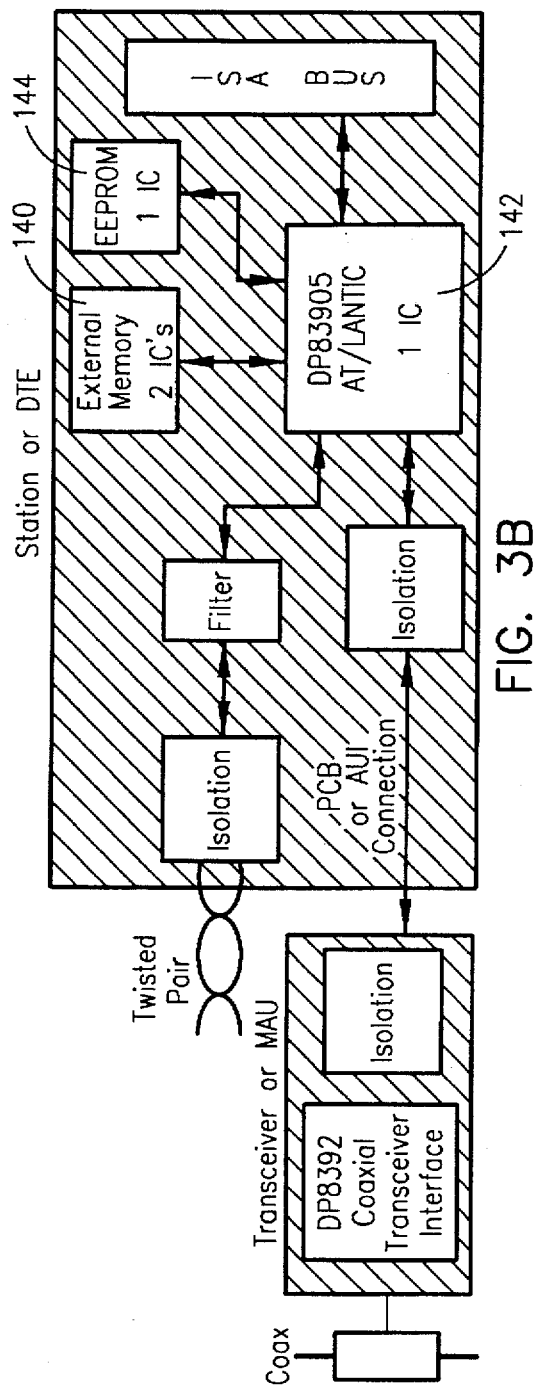

Block Diagram of Ethernet Controller

Note: I/O Ports from Base + 18H to Base + 1DH function as normal reset ports unless the E PROM option (EORS = 1) and the Early Interrupt Option (ECRS =1) is chosen in the Configuration Registers.

I/O Port Mode Register I/O Map

RESET Operation

Register Address Mapping

Method of Implementation for Early Interrupt
in an NE2000 Compatible Network Controller Interrupt is generated when the early interrupt mask bit is set high and eis[6] is pending.

Early interrupt is cleared by writing a one (1) to eis[6].

When unmasked, generation of interrupt occurs when {eis[2:0],eit} = rbyte_count [11:0].

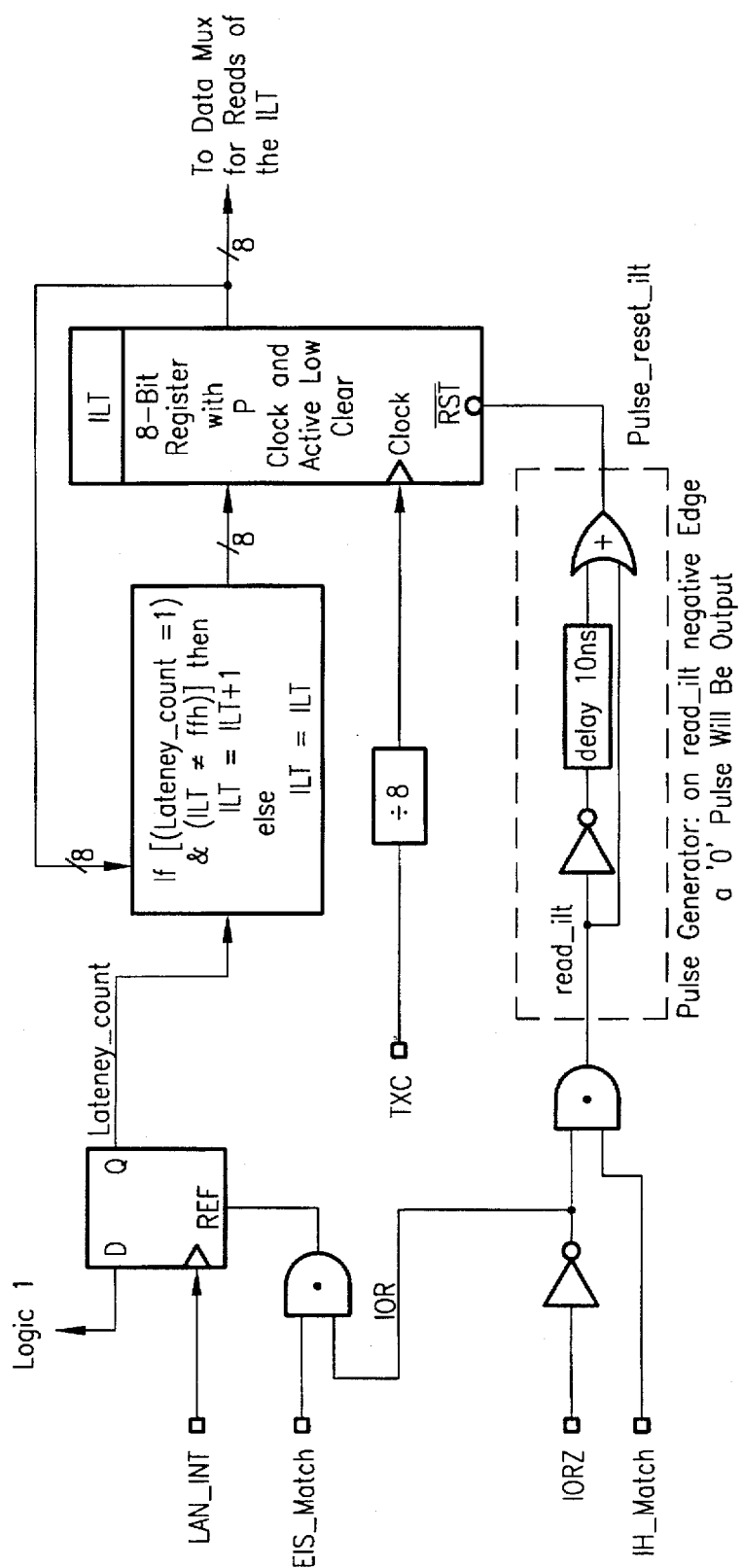

FIG. 3-6G

Interrupt Latency Timer Implementation For An NE2000 Compatible Network Controller IOR_Z = System Read Signal; Active Low
LAN−INT = Local Area Network Interrupt; Active High
EIS_Match = Active High Indication Of An Address Match for the Early Interrupt Status (EIS) Register
ILT_Match = Active High Indication Of An Address Match for the Interrupt Latency Timer (ILT) Register
TXC = Ethernet Transmit Clock; Normally 10MHz The Interrupt Latency Timer increments from the generation of the interrupt until the Early Interrupt Status register is read.

End Of Packet Processing:
8390D Compatible Mode

End Of Packet Processing:
Exact Burst Mode Beginning of Transmit

DMA Registers

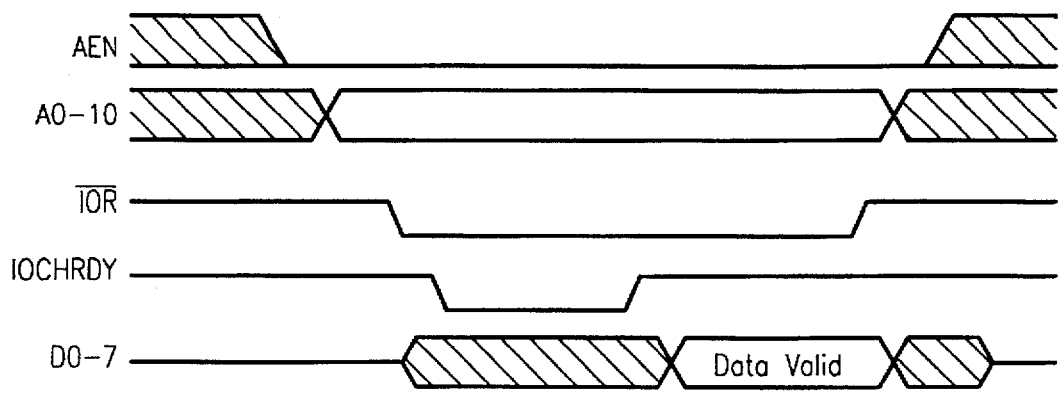

This is the type of cycle used to read from a register or, in 8 bit I/O mode, from a data transfer port. These accesses are entirely asynchronous, with the Ethernet Controller responding when the Preferred Embodiment decodes the correct address on SA0-10 and an IOR is asserted. If AEN is high the cycle will be ignored. IOCHRDY is deasserted if the Ethernet Controller is not ready to respond and asserted when ready. If it is ready immediately IOCHRDY is not deasserted. The data will always appear on SDQ-7.

FIG. 3-11
Bit I/O Mode Slave Read

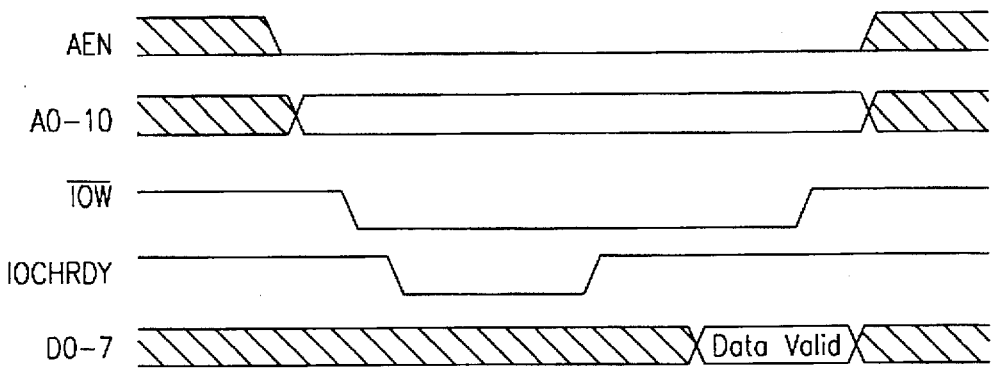

FIG. 3-12
8 Bit I/O Mode Slave Write

This is the type of cycle used to write a register or, in 8-bit I/O mode, to a data transfer port. These accesses are entirely asynchrnous with the Ethernet Controller responding when the The Preferred Embodiment decodes the correct address on SA0-10 and an IOW is asserted. If AEN is high the cycle will be ignored. IORCHRDY is deasserted if the Ethernet Controller is not ready to respond and asserted when ready. If it is ready immediately IOCHRDY is not deasserted. The data will always be taken from SD0-7.

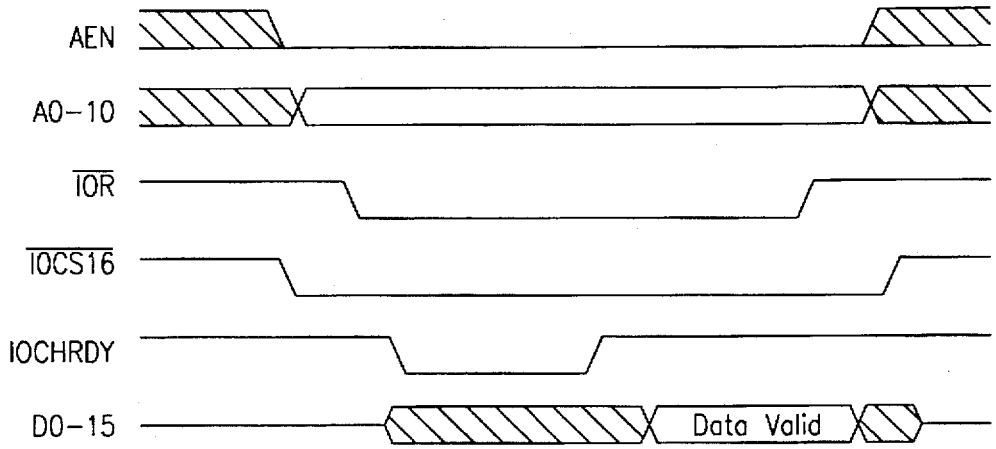

FIG. 3-13
16 Bit I/O Mode Slave Read

This is the type of cycle used to read from a data transfer port in 16 bit I/O These accesses are entirely asynchrnous with the Ethernet Controller responding when it decodes the correct address on SA0-10 and an IOR is asserted. If AEN is high the cycle will be ignored. IOCHRDY is deasserted if the Ethernet Controller is not ready to respond and asserted when ready. If it is ready immediately IOCHRDY is not deasserted, IOCS16 is generated when an address within the Ethernet Controller's data transfer port is decoded. to indicate to the system that this is a 16 bit transfer. If the IOCS16 bit in the EOR is low then it will be a straight decode of the SA0-10 lines. If that bit is high the IOCS16 output will be generated after IOR goes active.

16 Bit I/O Mode Slave Write 16-8 Bit I/O Cycle with IOCHRDY Fix

DP8390 Controller Core Simplified Block Diagram

Twisted Pair Interface Module Block Diagram

Twisted Pair Squelch Waveform

Typical Summed Transmit Waveform

The signal with pre-emphasis shown above is generated by resistively combining TX0+ and TX0d-. This signal along with its compliment is passed to the transmit filter.

Twisted Pair Interface Module Block Diagram

LED Connection

Block Diagram of the Encoder/Decoder (ENDEC)

Manchester Encoded Data Stream

Filtering Power Supply Noise

Block Diagram of the Encoder/Decoder (ENDEC)

Transmit/Receive Operations

Receive Buffer Ring at Initialization

Receive Packet Enters Buffer Ring

Receive Buffer Ring at Initialization

Linking Receive Buffer Pages

Received Packet Aborted if it Hits Boundary Pointer

Termination of Received Packet – Packet Accepted

Termination of Received Packet - Packet Rejected

DP8390 Core Bus Status

The original address space (logical buffer) is mapped into a smaller physical address space (physical buffer). The Tx buffer doesn't have address translation. The Rx buffer address is translated through the Address Translation Table.

Packets in the physical buffer can start at any word boundary. Utilization of the memory is because packets are stored contiguously in the memory.

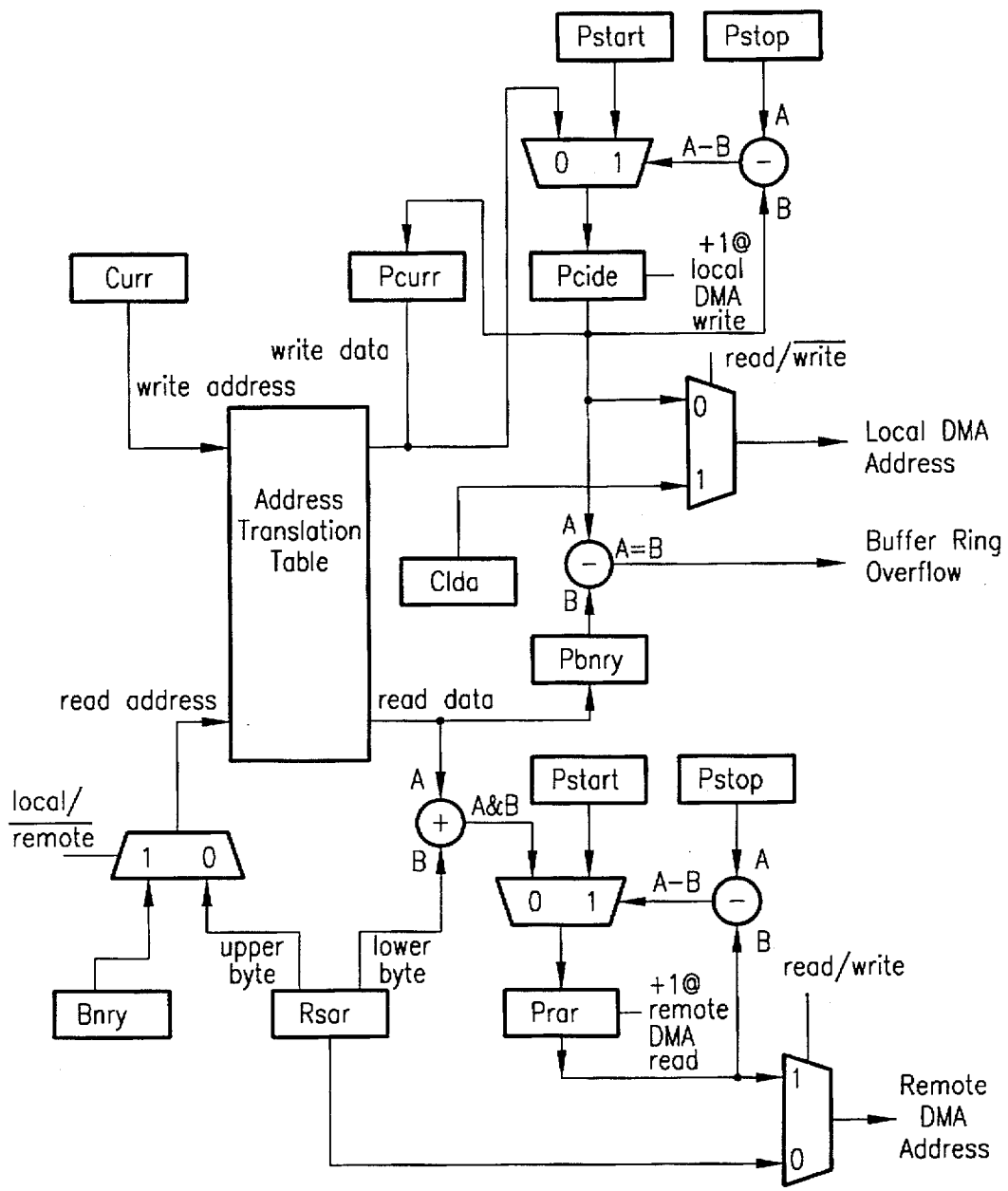

FIG. 3-35D
The block diagram of one implementation of the buffer memory mapping. NIC Registers are registers associated with the original network interface Legends:

NIC registers:
Curr — Current Page Address Register
Clda — Current Local DMA Address Register
Bnry — Boundary Register
Rsar — Remote DMA Address Register Memory Mapper Registers:
Pcurr — Physical Current Page Address Register
Pclda — Physical Current Local DMA Address Register
Pbnry — Physical Boundary Register
Prar — Physical Remote DMA Address Register
Pstart — Physical Buffer Start Address Register
Pstop — Physical Buffer Stop Address Register Address mapping operation when packet is being received and stored into the buffer memory.

Address mapping operation when packet is being read from the buffer memory by the host CPU.

I/O Operation: All Data Transfers and Arbitration is Controlled by the NIC Core

1st Received Packet Removed by Remote DMA

Remote DMA Auto-initialization from Buffer Ring

Shared Memory Mode the ISA Bus Directly
Access the RAM

Functional Block Diagram

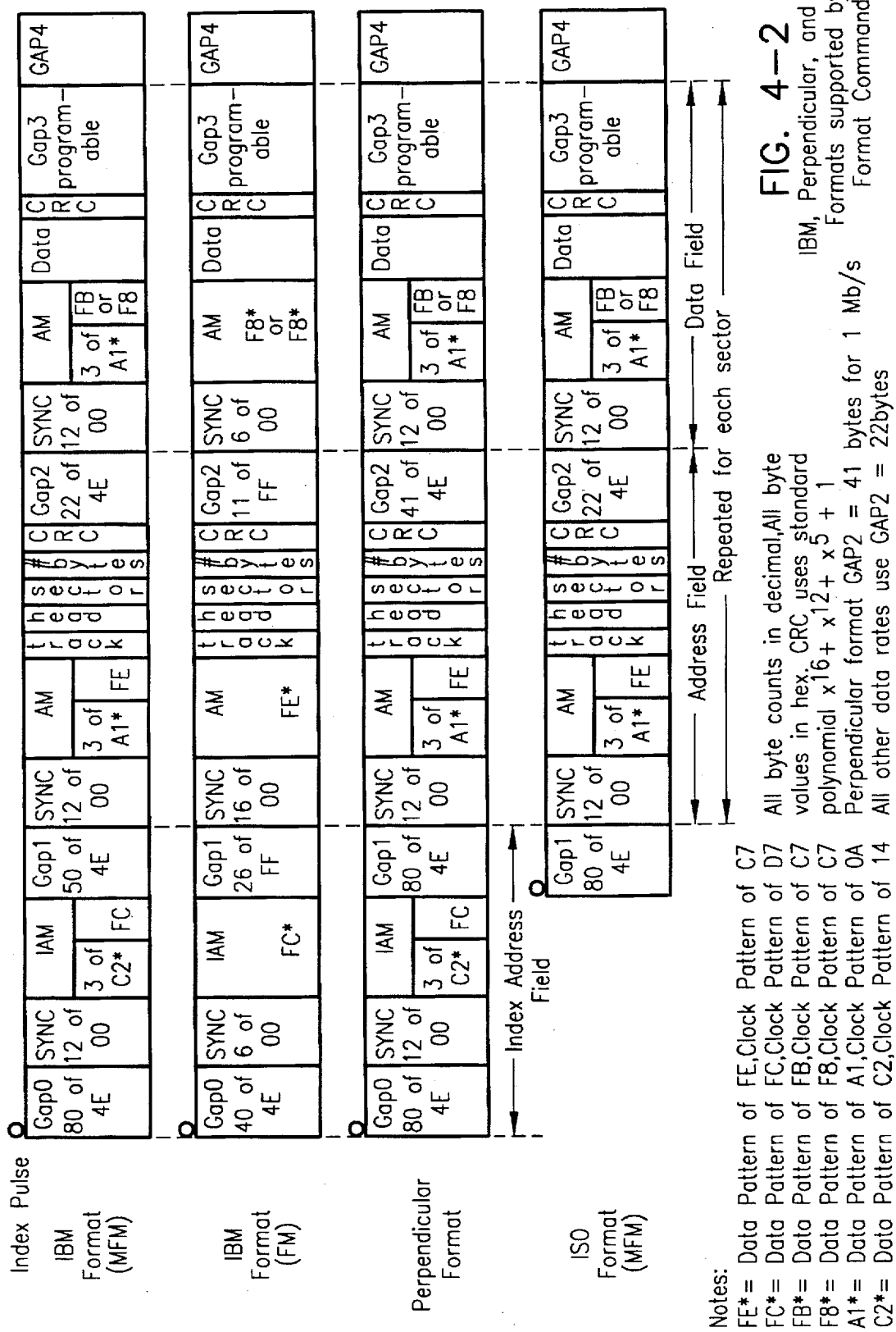

FDC Data Separator Block Diagram

PC37340 Dynamic Window Margin Performance
(Typical performance at VCC = 5.0V, 25°C)

Read Data Algorithm - State Diagram

Received Packet Aborted if it Hits Boundary Pointer

Preferred Embodiment Composite Serial Data

Address Write

Address Read

EPP Write with ZWS

EPP 1.9 Address Write

EPP 1.9 Address Read

ECP Forward Write Cycle

ECP (Backward) Read Cycle

COMBINATION OF INPUT OUTPUT CIRCUITRY AND LOCAL AREA NETWORK SYSTEMS

PARTIAL WAIVER OF COPYRIGHT PURSUANT TO 1077 O.G. 22(Mar. 20, 1987)

© Copyright, National Semiconductor Corporation 1994. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

This application hereby incorporates by reference the following coassigned issued patents and patent applications:

| U.S. PAT. NO./ U.S. SER. NO. | Issue Date/ Filing Date | Title |
| --- | --- | --- |
| 4,823,312 | 04/18/89// 10/30/86 | Asynchronous Communications Element |
| 5,241,660 | 08/31/93// 05/17/91 | Buffered Asynchronous Communications Element with Receive/Transmit Control and Status Reporting |
| 4,797,652 | 01/10/89// 03/17/87 | Status Register Bit and Delta |

Please incorporate the Preliminary Data Sheet for February, 1994 entitled "PC87340VUL (Super I/O+LAN®) Ethernet controller module, Floppy Disk Controller, Dual UARTs, IEEE 1284 Parallel Port, and IDE Interface."

FIELD OF INVENTION

The present invention relates generally to input output circuitry and local area network systems and methods and, more particularly, but not by way of limitation, relates to improved early interrupt schemes, high speed phase detector, interrupt latency timers, memory mapping schemes, and oscillator coordinating circuitry.

SUMMARY OF THE INVENTIONS

The disclosed systems and methods combine input/output and local area network functions into a single integrated circuit on a single semiconductor (e.g., a single piece of silicon). Preferred system embodiments on a single integrated circuit are typically placed inside a host system (e.g., a personal computer based on Intel®'s 286, 386, 486, and Pentium microprocessors) and interrelate with standard operating systems (e.g., Microsoft®'s DOS, IBM®'s OS/2) on traditional, commonly used bus architectures (e.g., Industry Standard Architecture (hereafter referred to as "ISA") and Enhanced Industry Standard Architecture (hereafter referred to as "EISA") peripherals). In general, preferred systems are generally comprised of local area network circuitry and input and output circuitry that are both coupled to at least one host system (and indirectly to potentially any number of host systems tied together via the local area network system) via a common data bus. The input and output circuitry couples the host system to at least one input/output channels. Examples of the types of input/output channels are a first serial interface, a second serial interface, a parallel port, a hard drive, a floppy drive, and/or any combination thereof. There are a number of individual inventions that have made the resulting combination possible. The detailed description hereinabove describes the hardware interfaces first and then the Configuration Register Set functions which includes power management features. After these two sections, each major function is described individually in a section of its own. Finally, the DC and AC Electrical Requirements and limitations are presented as well. In particular, the present invention generally provides improved input output circuitry and/or local area network systems and methods and, more particularly, but not by way of limitation, improved early interrupt schemes, high speed phase detector, interrupt latency timers, memory mapping schemes, and oscillator coordinating circuitry. All are preferably incorporated in a single integrated circuit, but may also be incorporated separately on a multitude of independent integrated circuits.

Regarding improved early interrupt schemes, the preferred early interrupt processes and system architectures, the early and interrupt system for a local area network, comprises receiving circuitry to receive a data packet(s) from a network driver. The data packet(s) generally have a plurality of data bits. The interrupt logic circuitry receives an interrupt signal from the network driver to interrupt a transmission of the data packet(s) at a bit position. The receiving circuitry transfers data bits of the data packet(s) already received up to the particular, preselected bit position to be processed and continues to receive the plurality of data bits the data packet(s). The bit position is programmable and is generally calculated by subtracting the latency interrupt time from the specified number of bytes. The network driver is preferably an Ethernet driver. Preferred systems enable the early interrupt system via a bit in an network control register. The interrupt signal is transmitted to the receiving circuitry via at least one system data bus. Please note that the bit position can be programmed by changing said specified number of bytes with software tools. In fact, the interrupt threshold can be reprogrammed while the overall system is operating. As noted above, the interrupt system is incorporated into an integrated circuit on a single semiconductor substrate. Data packet is exactly 1500 bytes in length.

Regarding preferred latency interrupt processes and system architectures, the preferred latency interrupt system comprises: receiving circuitry to receive an interrupt signal generated by interrupt logic circuitry, where the interrupt signal corresponds to an interrupt operation, and timing circuitry that starts incrementing when the interrupt signal is received by the receiving circuitry to determine when the interrupt operation is complete. The timing circuitry stops incrementing when a register is read by a network driver. The timing circuitry is reset after the register is read by the network driver. As with the early interrupt systems and processes described above, the network driver is a Ethernet driver. The interrupt system is enabled via a bit in an network control register. The timing circuitry increments to a preselected value and stops.

Regarding memory mapping schemes, the preferred memory mapping system architectures generally comprise a transmit buffer to hold at least one data packet to hold data transmitted to a host system; and a receive buffer to hold at least one data packet received from a host system. The first transmit buffer is a single block buffer that holds one data packet while the data packet is assembled. A beginning of the first transmit buffer is defined by a Transmit Page Start Register and an end is defined by a Page Stop Register. The receive buffer is a circulating buffer ring, which has a beginning and an end with the beginning defined by a page start register and the end defined by a page stop register. The data packet(s) received from a network are stored into the buffer ring, the data packet(s) pointed by a first (current) pointer and the data packet(s) are transmitted to a host system are pointed to a second (boundary) pointer. The receive buffer is organized in a plurality of 256-byte pages. Each data packet(s) received by the receive buffer fills up one or more of the 256 byte pages. The receive buffer has an in-use block, the in-use block having a size that corresponds to an amount of data communicated by the interface controller system. The receive buffer is positioned in a physical memory, which has a size, that is reduced by a memory mapping subsystem. The memory mapping subsystem maps the receive buffer ("original—logical") into a physical buffer ring. The memory mapping subsystem has a set of physical address registers and pointers. The pointers control data read and data write operations to the physical buffer. In addition, the memory mapping subsystem comprises a memory array ("address translation table") to correlate the physical address to an address in the receive buffer. The memory array holds at least one physical address. The physical address(es) are selected from the group consisting of beginning location of the data packet(s), current packet pointer, and boundary packet pointer. The memory mapping subsystem is preferably a circuit and operates automatically when the receive buffer is utilized. The receive and transmit buffers have a variable size. The data packet(s) are stored in the receive buffer immediately after one another. The memory mapping subsystem translates at least one address referencing data in the physical memory to an at least one address in a logical memory. In addition, the preferred memory mapping system comprises a network interface controller system. The network interface controller system comprises a physical remote address register to remote dma read from a first buffer only, the first buffer having a beginning and an end, a physical current local DMA Address register to local dma write to the first buffer only, a physical current address register to point to the beginning of the first buffer corresponding to a physical address, a physical boundary register to point to the beginning of the first buffer not yet unloaded by the remote dma; and an address translation table to hold the physical address and a logical address to which the physical address is mapped. In addition, the network interface controller system further comprises PSAR wrap around logic to handle wrapping of a physical page stop value back to physical page start when it hits physical page stop, PCLDA wrap around logic to handle wrapping of physical page stop values back to physical page start when it hits physical page stop, physical buffer overflow logic to generate a buffer overflow signal if they are equal. The buffer overflow signal is combined with the logical buffer overflow signal so that a status bit in a status register will be set if the physical buffer overflows, the status bit corresponding to the logical overflow signal and the buffer overflow signal. The translation occurs in multiple clock cycles. The address translation table is stored in a RAM array and preferably has a number of entries equal to a number of logical pages (e.g., 64 pages for 16K bytes logical buffer) and has at least one entry. The entry(ies) having a bit width equal to bit width of the physical address. The translation table has at least one entry, the entry(ies) having a bit width equal to 12 bits and the buffer has a size equal to 6K bytes.

Regarding high speed phase detector (and phase pulse generator) and the overall, resulting improved oscillator coordinating circuitry, when local area network circuitry and the input and output circuitry operate at a first oscillation frequency and a second oscillation frequency respectively, the preferred system embodiments clock generating circuitry to adjust the ocillations on a clock (preferrably part of the circuit) to generate the appropriate oscillation frequencies for the modules described abvoe. In particular, the clock generating circuitry comprises a phase lock loop to generate the first and second clock speeds. In addition, the phase lock loop circuit comprises phase pulse generator coupled to the local area network circuitry and the input and output circuitry, the phase pulse generator detects a phase associated with the natural oscillations, charge pump coupled the phase pulse generator, the charge pump adjusts a corresponding voltage associated with the natural oscillations; and a filter coupled to the charge pump to select the appropriate oscillations to output to the local area network circuitry and the input and output circuitry described above. The preferred phase detector operates in a linear fashion over a wide range of input values and comprises a phase lock loop that generates oscillations that operate at very high speeds. The clock generating circuitry comprises a feedback loop to correct errors and to adjust output generated by the clock generating circuitry. More specifically, the improved phase pulse generator comprises: a first D-flip flop having a clock input, a D input, a Q output, and a clear input, the clock input electrically coupled to a first clock signal, the input coupled to a system input; a second D-flip flop having a clock input, a D input, a Q output, and a clear input, said clock input electrically coupled to a second clock signal, said input coupled to said system input; a NAND gate having first and second inputs and an output, the first and second inputs electrically coupled to the outputs of the first and second D-flip flops respectively; and a multiplexor having first and second inputs, S, an output, an an S input, the second input electrically coupled to the system input, the first input electrically coupled to the output of the NAND gate, the output coupled to the clear inputs of the first and second D-flip flops, the S input electrically coupled to the output of said NAND gate. In addition, a delay line is preferably coupled between the output of the NAND gate and the first input of the multiplexor.

This disclosed invention has the following advantages. In general, preferred system embodiments provide a single chip solution for all of the standard peripherals found on the ISA bus of a typical PC and an NE2000 Ethernet controller module, which is a functional combination of National Semiconductor's NE2000 Ethernet controller module NIC integrated circuits and National Semiconductor's Super I/O® integrated circuits. The proven compatibility of these predecessor integrated circuits ensures the compatibility of the disclosed, preferred system embodiments. All of these functions are implemented in a 160-pin PQFP. The hardware and software interfaces to the chip are designed for easy implementation in a PC system. All hardware interfaces are either standard buses (e.g., ISA) or directly drive standard headers or connectors (e.g., FDC, IDE, parallel port), which are driven by standard BIOS or software routines. There is a set of configuration registers that control the enabling/ disabling of the functions, assignment of addresses and interrupts, mode selection, and power down. All on-chip functions are treated independently of each other to provide maximum flexibility. Appropriate safeguards for powering down and up different chip functions are provided as well. As noted, all chip options can be configured by software and there are over 30 configurations that can be selected by hardware jumper options during reset. As a result, preferred embodiments provide an efficient operation of all the functions identified above by increasing device integration, reducing data buffer access time, increasing data buffer bandwidth available to the host, reducing the overall pin count, and reducing power consumption of the combined functions.

In particular, preferred system embodiments incorporate an Ethernet controller module, Floppy Disk Controller (hereafter referred to as "FDC"), two Universal, Asynchronous, Receive, Transmit port (hereafter referred to as "UARTs"), parallel ports (that are compatible with IEEE 1284) and Integrated Disk Electronics interface (hereafter referred to as "IDE") with Direct Memory Access (hereafter referred to as "DMA") control logic in a single integrated circuit. In addition, preferred system embodiments include standard IBM® compatible AT personal computer address decoding for on-chip functions and a Configuration Register set, offering a single chip solution for the most commonly used ISA and EISA. In particular, the on-chip Ethernet controller module is completely compatible with the NE2000 specification, which has become a common industry standard, and, as described above, includes on-chip buffer RAM. The NE2000 specification describes a collection of standards implemented by Novell and well known by those skilled in the art, and is herein incorporated by reference. The preferred embodiment requires only 1 external $E^2PROM$. The physical media interfaces for 10BASE-T and Auxiliary User Interface (hereafter referred to as "AUI") are incorporated into this single integrated circuit as well. The on-chip FDC utilizes software that is compatible with the PC8477, which is also a rather prevalent industry standard, which contains a superset of the µDP8473 and NEC µPD765 and the N82077 floppy disk controller functions, so that programmers and designers familiar with previous parts, which were identified above, will not have to relearn and/or rewrite software programs. In addition, the FDC allows for perpendicular recording drive support and high performance internal analog data separator (no external filter components required). Preferred embodiments also have automatic media sense support. The on-chip analog data separator requires no external components and supports the 4 MB drive format as well as the other standard 5.25" and 3.5" media.

Preferred UARTs are equivalent to two NS16450s or PC16550s, which have become quite prevalent in the industry and constitute the core functions of families of semiconductor products manufactured by National Semiconductor Corporation. The preferred Parallel Port is fully compatible with the IEEE 1284 mode standard, which are commonly known standards propagated by IEEE, and EEP version 1.7. In addition, preferred system maintains complete compatibility with the ISA, EISA and Micro Channel parallel ports, and the EPP mode supports both version 1.7 and 1.9 of the specification. Preferred IDE control logic provides a complete IDE interface with DMA support (except for optional buffers). Preferred Configuration Registers 2 consist of 9 byte-wide registers that are pointed to by an Index Register and accessed through a Data Register. The Index and Data Register pair can be relocated within the ISA I/O address space. Individual software and hardware power down modes for each function incorporated are provided as well. The preferred address decoder provides the selection of all primary and secondary ISA addresses including COM1-4 and all NE2000 addresses. The preferred system embodiments are embedded in a 160-pin PQFP package to optimize space and size constraints on motherboards and the like. Finally, preferred on-chip phase lock loop clock all functions are generated from 1 low-cost 24 MHz crystal.

BRIEF DESCRIPTION OF THE DRAWINGS

Further features and advantages will become apparent from the following and more particular description of the various embodiments of the invention, as illustrated in the accompanying drawings, wherein:

FIGS. 3A and 3B are block diagrams of preferred system embodiments in a standard NE2000 Architecture;

FIG. 3-1 is a block diagram of Ethernet controller module 6 (in FIG. 1A);

FIG. 3-2 is a block diagram of the preferred Input/Output Port;

FIG. 3-3 is a Input/Output Port Mode Register Input/Output Map;

FIG. 3-4 is a timing diagram for the RESET Operation;

FIG. 3-5 is a block diagram showing the preferred register address mapping scheme;

FIG. 3-6A is a diagram showing the preferred implementation for Early Interrupt in an NE2000 Compatible Network Controller;

FIGS. 3-6B to 3-6F are timing diagrams showing simulations of the operation of the early interrupt operations;

FIG. 3-6G is a diagram showing the preferred implmentation of the interrupt latency timer for a NE2000 Compatible Network Controller;

FIGS. 3-6H to 3-6J are timing diagram showing simulations of the operation of the latency interrupt operation;

FIG. 3-7 is a timing diagram accompanying the end of packet processing, when preferred system configurations are in 8390D Compatible Mode;

FIG. 3-8 is a timing diagram accompanying the end of packet processing for the exact burst mode beginning of transmit;

FIG. 3-9 is a block diagram showing DMA Registers;

FIG. 3-10 is a block diagram of Network Tally Counters;

FIG. 3-11 is a timing diagram for the transmit of 8 Bit I/O Mode Slave Read Operation;

FIG. 3-12 is a timing diagram for the 8 Bit I/O Mode Slave Write Operation;

FIG. 3-13 is a timing diagram for the 16 Bit I/O Mode Slave Read Operation;

FIG. 3-14 is a timing diagram for the 16 Bit I/O Mode Slave Write Operation;

FIG. 3-15 is a timing diagram for the 16-Bsit I/O Cycle with IOCHRDY Fix;

FIG. 3-16 is a simplified block diagram of DP8390 Controller Core;

FIG. 3-17 is a block diagram of Twisted Pair Interface Module;

FIG. 3-18 is a diagram of a twisted pair squelch waveform;

FIG. 3-19 is a diagram depicting a Typical Summed Transmit Waveform;

FIG. 3-20 shows External Circuitry to Connect Ethernet controller module to Twisted Pair Cable;

FIG. 3-21 shows a circuit diagram illustrating an LED Connection;

FIG. 3-22 is a block diagram of the Encoder/Decoder (ENDEC);

FIG. 3-23 is a diagram illustrating a Manchester Encoded Data Stream;

FIG. 3-24 is a Block Diagram of the Encoder/Decoder (ENDEC);

FIG. 3-25 is a block diagram of circuitry used to filter Power Supply Noise;

FIG. 3-26 is a diagram showing data fields for transmit/receive operations in preferred embodiments;

FIG. 3-27 is a diagram showing the receive buffer ring at initialization;

FIG. 3-28 is a diagram showing the buffer ring when the received packet enters the buffer ring;

FIG. 3-29 is a diagram showing the ACNIC receive buffer ring;

FIG. 3-30 is a diagram showing the buffer ring when received buffer pages are linked, if the length of the packet;

FIG. 3-31 is a diagram showing the received packet aborted if it hits boundary pointer;

FIG. 3-32 is a diagram showing the termination of received packet—if accepted;

FIG. 3-33 is a diagram showing the termination of received packet—if rejected;

FIG. 3-34 is a diagram showing the DP8390 Core Bus States;

FIGS. 3-35A and 3-35B and 3-35C are a diagrams showing the buffer memory address mapping in network interface controller;

FIG. 3-35D is a block diagram of the preferred implementation;

FIG. 3-35E is flow chart showing the address mapping operation when packet is being received into the buffer memory;

FIG. 3-35F is a flow chart showing the address mapping operation when the packet is being read from the buffer memory by the host CPU;

FIG. 3-36 is a diagram showing the I/O Operation for All Data Transfers and Arbitration is Controlled by the NIC Core;

FIG. 3-37 is a diagram showing autoinitialization from Buffer Ring Remote DMA;

FIG. 3-38 is a diagram showing the first Received Packet Removed by Remote DMA;

FIG. 3-39 is a graph showing how the Shared Memory Mode the ISA Bus Directly Accesses the RAM;

FIG. 3-40 is a logic diagram showing how the interupt signal is generated;

FIG. 4-1 is a functional block diagram of floppy disk controller 6 (in FIG. 1A);

FIG. 4-2 is a diagram showing IBM, perpendicular, and ISO Formats supported by Format Command;

FIG. 4-3 is a block diagram of the data separator block diagram of a floppy disk controller;

FIGS. 4-4A, 4B, 4C, and 4D are graphs showing the dynamic window margin performance;

FIG. 4-5 is a state diagram of the read data algorithm;

FIG. 4-6 is a diagram showing the data field associated with the perpendicular recording drive R/W Head and Pre-Erase Head;

FIG. 5-1 is timing diagram of Preferred Composite Serial Data;

FIG. 6-1 is timing diagram of EPP 1.7 Address Write operation;

FIG. 6-2 is a timing diagram showing EPP 1.7 Address Read operation;

FIG. 6-3 is a timing diagram showing EPP Write with ZWS operation;

FIG. 6-4 is a timing diagram showing EPP 1.9 Address Write operation;

FIG. 6-5 is a timing diagram showing EPP 1.9 Address Read operation;

FIG. 6-6 is a timing diagram showing ECP Forward Write Cycle operation; and

FIG. 6-7 is a timing diagram showing ECP (Backward) Read Cycle operation.

DETAILED DESCRIPTION OF THE PREFERRED EMBODIMENTS

SECTION 1.0 GENERAL SYSTEM OVERVIEW

Figure 1A:
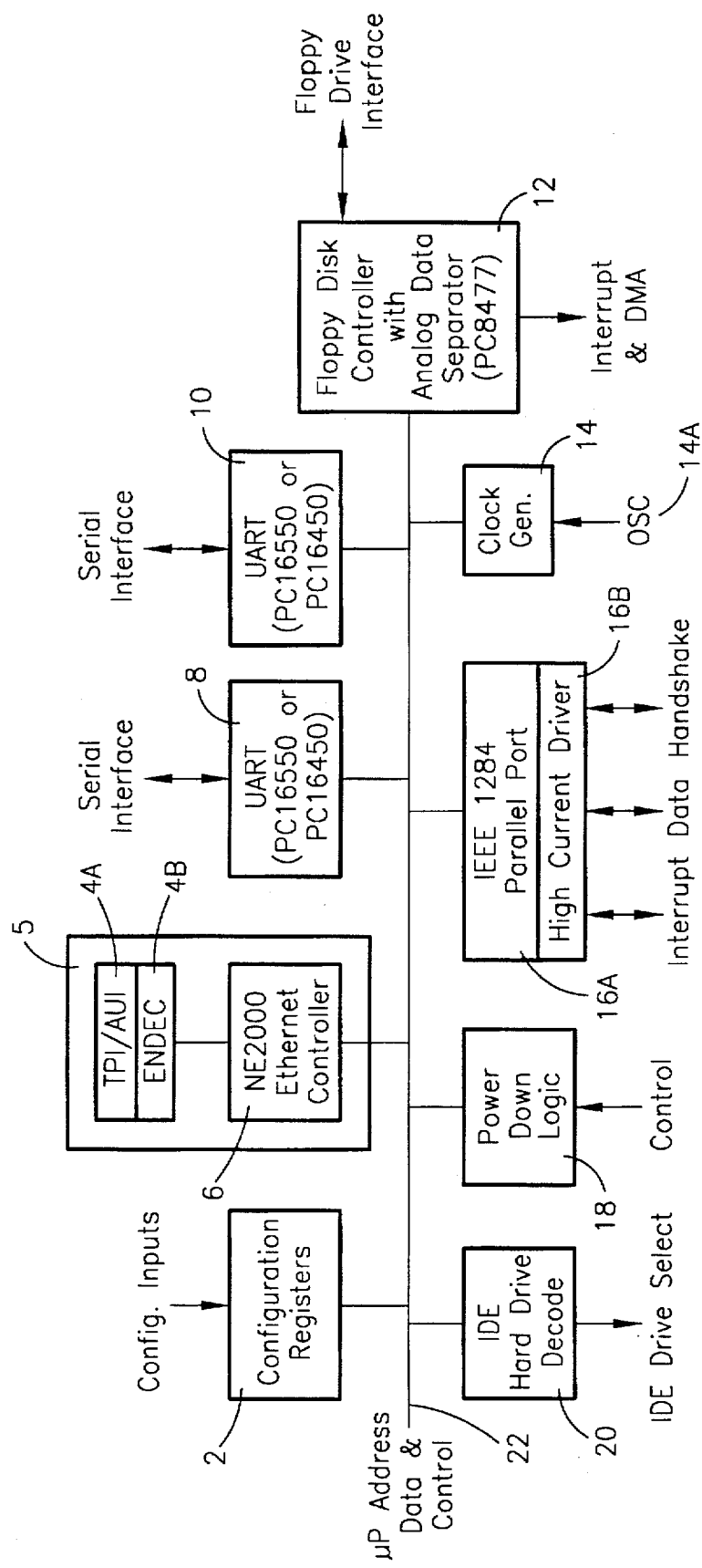
FIG. 1A is a block diagram of a preferred embodiment of the overall system of cell core.

FIG. 1A is a block diagram of a preferred embodiment of the overall system of cell core. The preferred embodiment implements all input/output plus local area network functions. In particular, Configuration registers module 2, the first UART module 8, the second UART module 10, the FDC with Analog Data Separator module 12, clock generator module 14, IEEE 1284 Parallel Port 16A along with high current driver 16B, power down logic module 18, and IDE Hard Drive Decode module 20 are preferably directly coupled to a Microprocessor Address an Data & Control Bus 22. TPI/AUI module 4A and ENDEC 4B are coupled to Bus 22 via NE2000 Ethernet controller module 6. NE2000 Ethernet controller module 6 is preferably coupled to bus 22 as well. Significant operational features and characteristics of modules shown in FIG. 1A will be described in more detail in the corresponding text. Other significant detail is shown in FIG. 1A itself. Local Area Network circuitry 5 is generally comprised of TPI/AUI module 4A, ENDEC module 4B, and NE2000 Ethernet controller module 6. Input/output circuitry is generally comprised of first UART module 8, second UART module 10, floppy disk controller 12, IDE Hard Drive Decode 20, and Parallel Port Driver 16A along with High Current Driver 16B. Configuration registers 2 and clock generation circuitry 14 are needed to combine local area network circuitry and input/output circuitry into a single system that preferably resides in a single integrated circuit on a single semiconductor substrate. Generator module 14 receives an OSC input from oscillator module 3 (not shown).

Figure 1B:
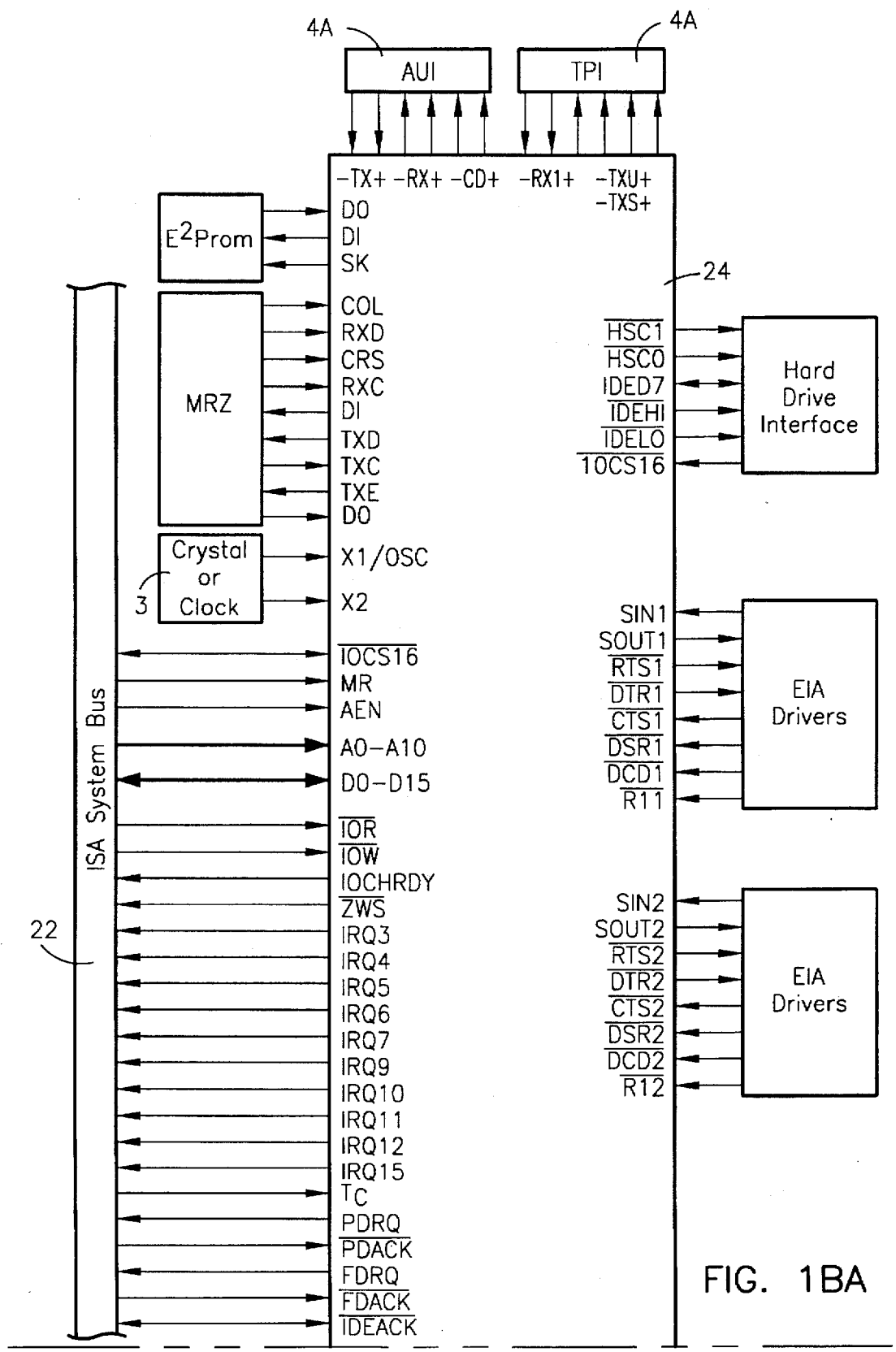
FIGS. 1BA and 1BB are a diagram of a preferred system configuration of the disclosed systems and methods along with associated modules that provided an overview of functions preferably embodied into a single integrated circuit (not shown) in a single package.

FIGS. 1BA and 1BB are a diagram of a preferred system configuration of the disclosed systems and methods along with associated modules that provided an overview of functions preferably embodied into a single integrated circuit (not shown) in a single package 24.

Figure 1C:
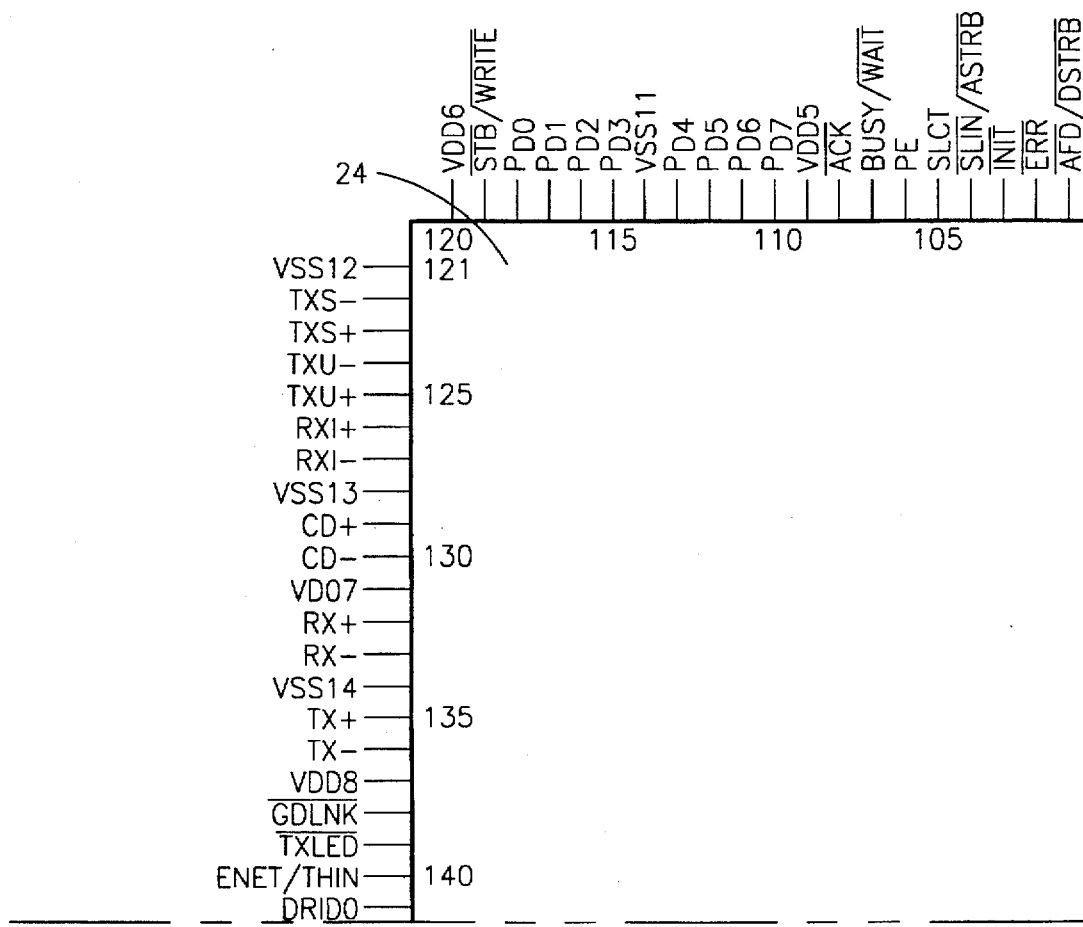
FIGS. 1 CA, 1CB, 1CC, and 1CD are a diagram of preferred pinout of package 24.
FIG. 1D is diagram showing the crystal connection to the package 24 shown in FIG. 1C.
FIG. 1E is the Connection for the Oscillator Module of preferred package 24 shown in FIG. 1C.
FIG. 1F is a block diagram of a Type 4 Integrated Phase Detector.
FIG. 1G are timing diagrams of leading phase waveforms.
FIG. 1H is a circuit diagram showing the typical phase pulse generator that could be incorporated into preferred embodiments.
FIG. 1I is a circuit diagram showing an improved phase pulse generator that is preferrably incorporated into preferred embodiments.
FIG. 1J is a SPICE simulation of the circuit shown in FIG. 1H.
FIG. 1K is a SPICE simulation of the circuit shown in FIG. 6 of the circuit shown in FIG. 1I.
Figure 1C:
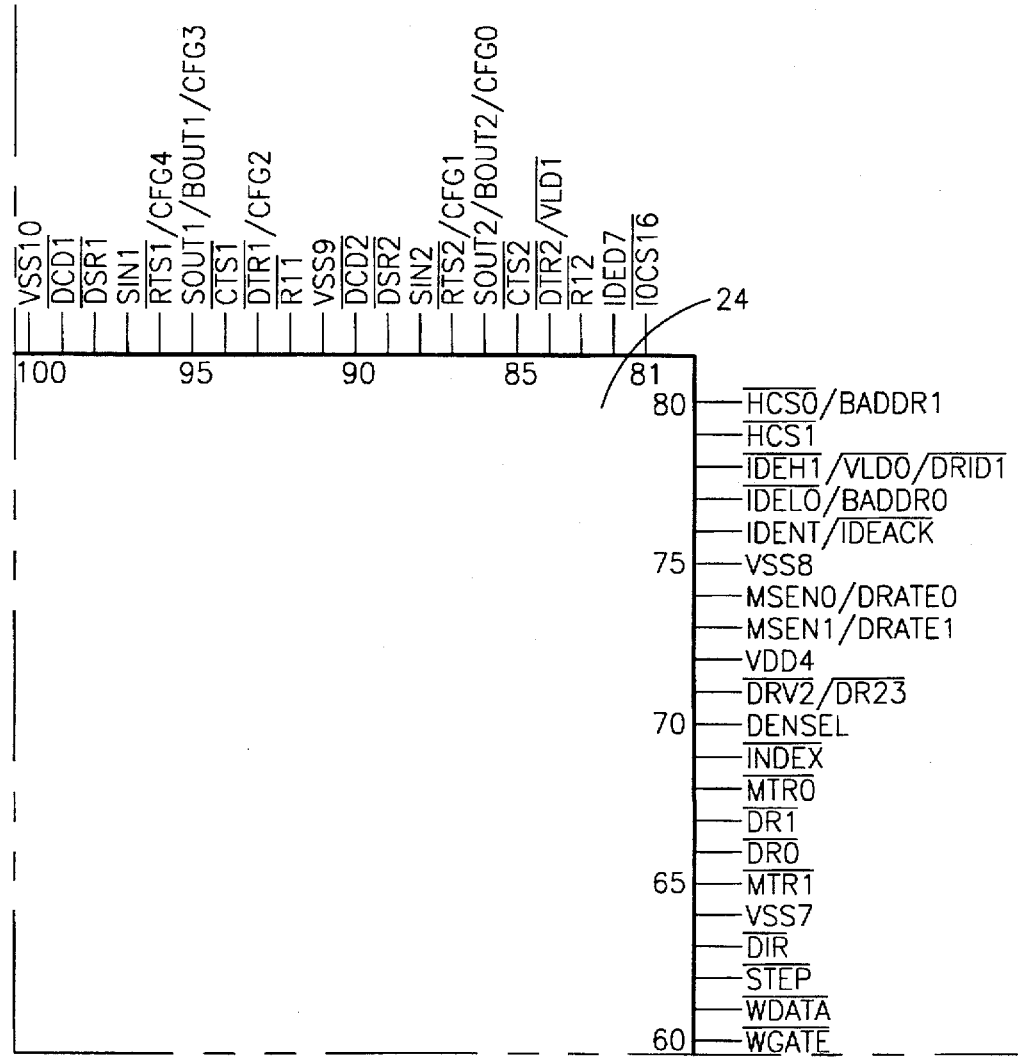
Figure 1C:
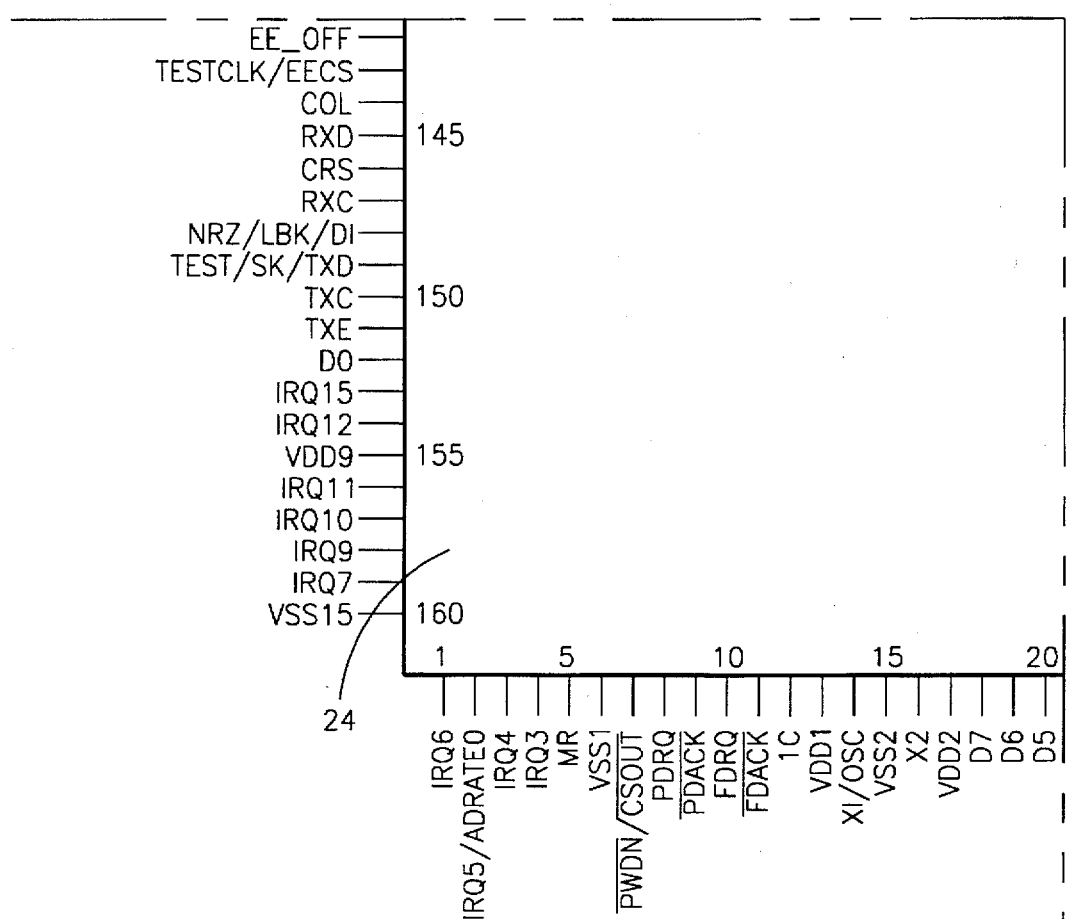
Figure 1C:
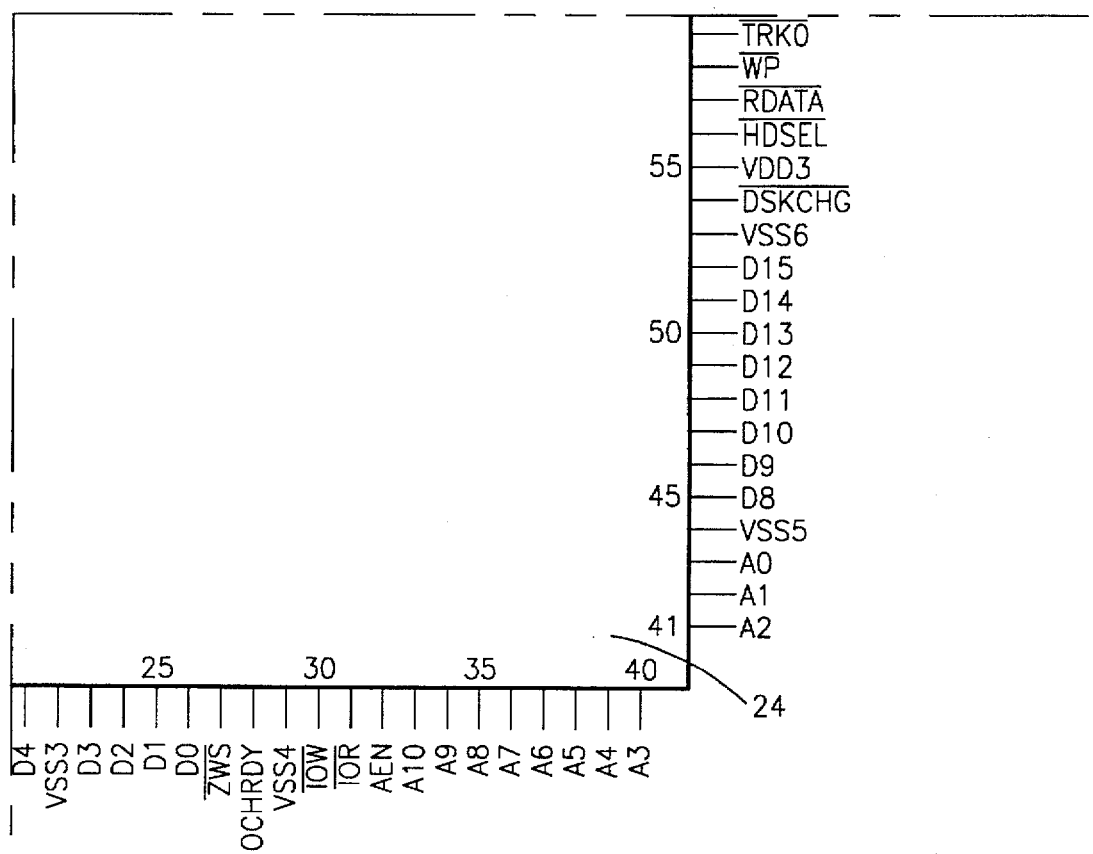

FIGS. 1CA, 1CB, 1CC, and 1CD are a diagram of preferred pinout of package 24 embodiment of the disclosed systems and methods. The definitions of the abbreviations shown in FIG. 1C and general description of the functionality and purpose of each pin shown in FIG. 1C is included in TABLE 1, which is in the Appendix A. Please note that references to preferred system embodiments have the reference number PC87340VUL. Other reference numbers refer to other parts manufactured or standards propagated by National Semiconductor Corporation.

Section 1.1 OSCILLATOR

The oscillator module 3 is controlled by a 24 MHz parallel resonant crystal 30 connected between X1 and X2 or by an external clock on X1. The oscillator provides a clock signal to the on-chip clock generator and non-network peripherals. If a crystal is connected to the preferred system embodiment, it is recommended that the circuit shown in FIG. 1C be used and that the components used meet the following criteria:

Crystal XT1:
  AT cut parallel resonant crystal
  Series Resistance less than or equal to 10 ohms
  Specified Load Capacitance equals 13.5 pico-farads
  Accuracy equals 0.01% (100 ppm)
C15, C27:
  Load Capacitor equals 27 pF.

Figure 1D:
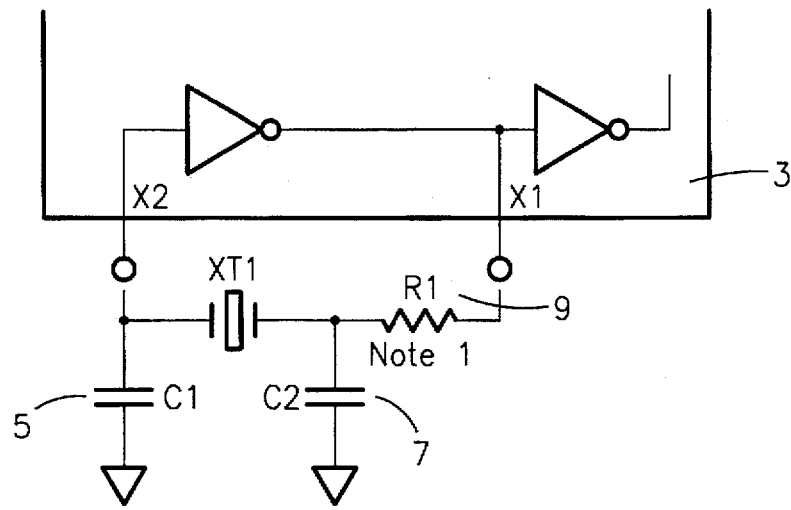
Figure 1E:
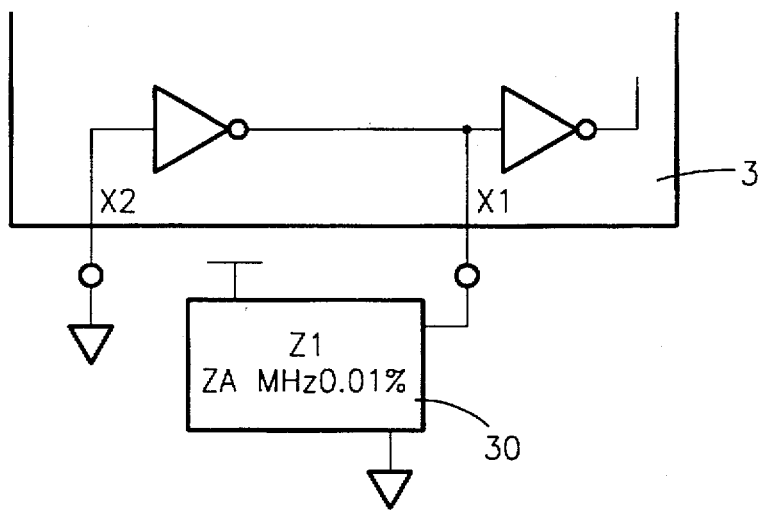

The resistor R19 in FIG. 1D may be required in order to minimize frequency drift due to changes in the $V_{CC}$ supply voltage. If R19 is required, it's value must be carefully selected. R19 decreases the loop gain. Thus, if R19 is made too large, the loop gain will be greatly reduced and the crystal will not oscillate. If R19 is made too small, normal variations in the $V_{CC}$, normal variations in the Vcc may cause the oscillation frequency to drift out of specification. As the first rule of thumb, the value of R19 should be made equal to five times the motional resistance of the crystal. The motional resistance of 24 MHz crystals is usually in the range of 10–30 ohms. This implies that a reasonable value for R19 should be in the range of 50 ohms to 150 ohms. The decision of whether or not to include R19 should be based upon measured variations of crystal frequency as each of the circuit parameters is varied. According to the IEEE 802.3 standard, the entire oscillator circuit (crystal and amplifier) must be accurate to 0.01%. when using a crystal 30, the X1 pin is not guaranteed to provide a TTL compatible logic output, and should not be used to drive external standard logic. If additional logic needs to be driven, then an external oscillator should be used as described in the following text.

Section 1.2 Oscillator Module Operation

If the designer wishes to use a crystal clock oscillator, one that provides the following should be employed:

1. TTL or CMOS output with a 0.01% frequency tolerance.
2. 40–60% duty cycle.
3. Greater than or less than 2 TTL load output drive ($I_{OL}$=3.2 mA)

The circuit is shown in FIG. 1D (Please note additional output drive may be necessary if the oscillator must also drive other components.) When using a clock oscillator, it is still recommended that the designer connect the oscillator output to the X1 pin and tie the X2 pin to ground.

Section 1.3 High Speed Phase Dectector— Improved Phase Lock Loops

Figure 1F:
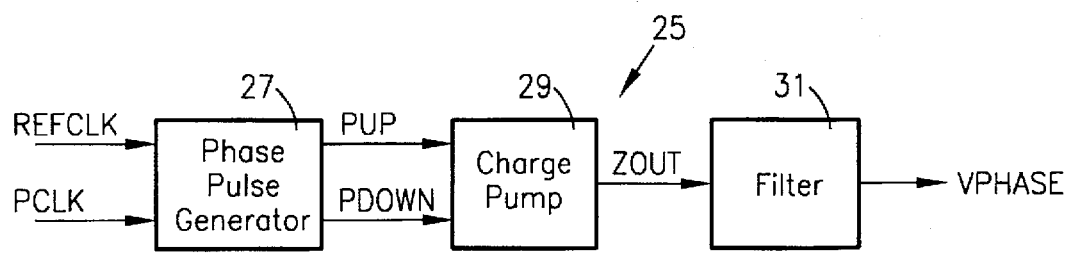

An essential component of the architecture for oscillation module 3 described above is a phase-locked loop. And, similarly, an essential component of any phase-locked loop is a phase detector 25, such as shown in FIG. 1F. A phase detector 25 produces an output signal proportional to the difference in time or phase of two input signals. It is beneficial for the circuit to maintain linear behavior over the widest possible input phase range.

Figure 1G:
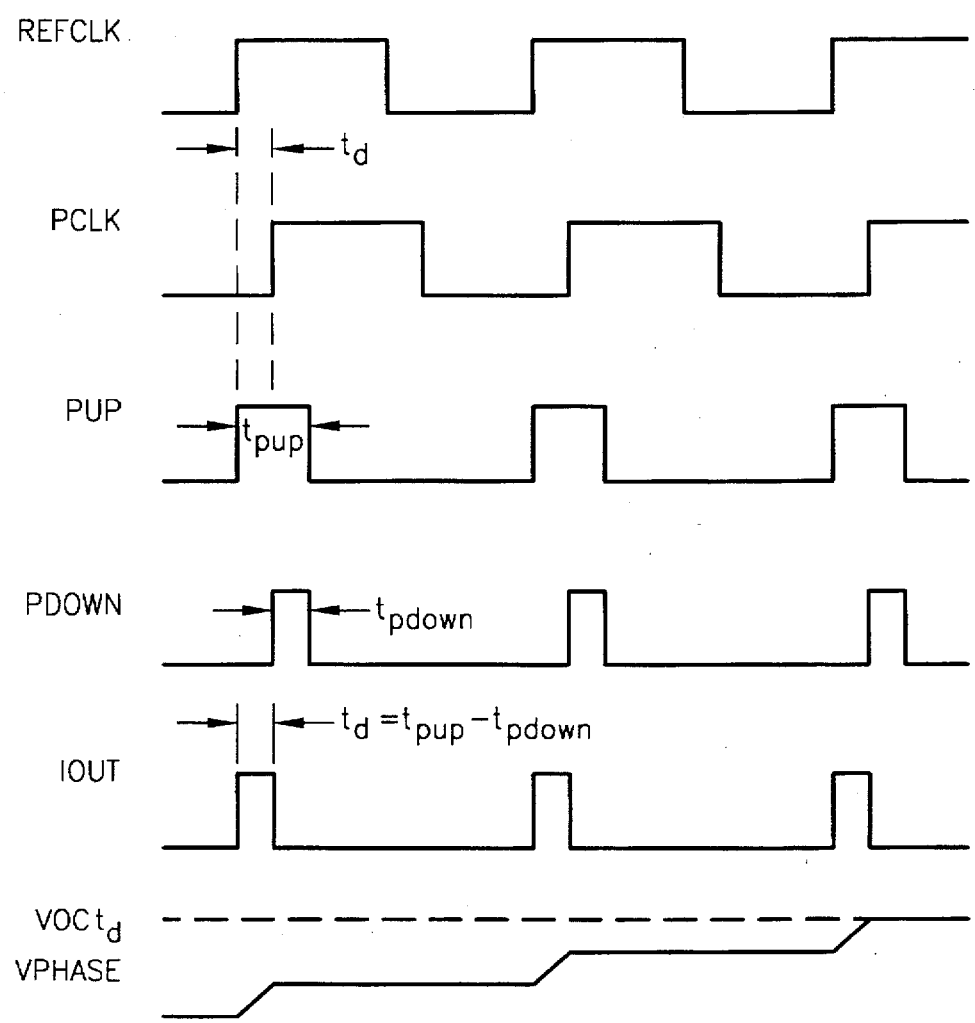

Implementation of integrated circuit phase detectors may take the form of FIG. 1F. Phase Pulse Generator 29 creates pulses that have a pulse-width time difference of the time difference between the input clocks. These pulses drive a Charge Pump 29 which sources and/or sinks a fixed current. Charge Pump 29 provides the difference function between its input pulses, producing a positive or negative current pulse of width $t_d$. The current pulse is integrated by Filter 31 to produce a voltage proportional to the input clock time difference. Timing waveforms for a leading phase difference are shown in FIG. 1G.

Figure 1H:
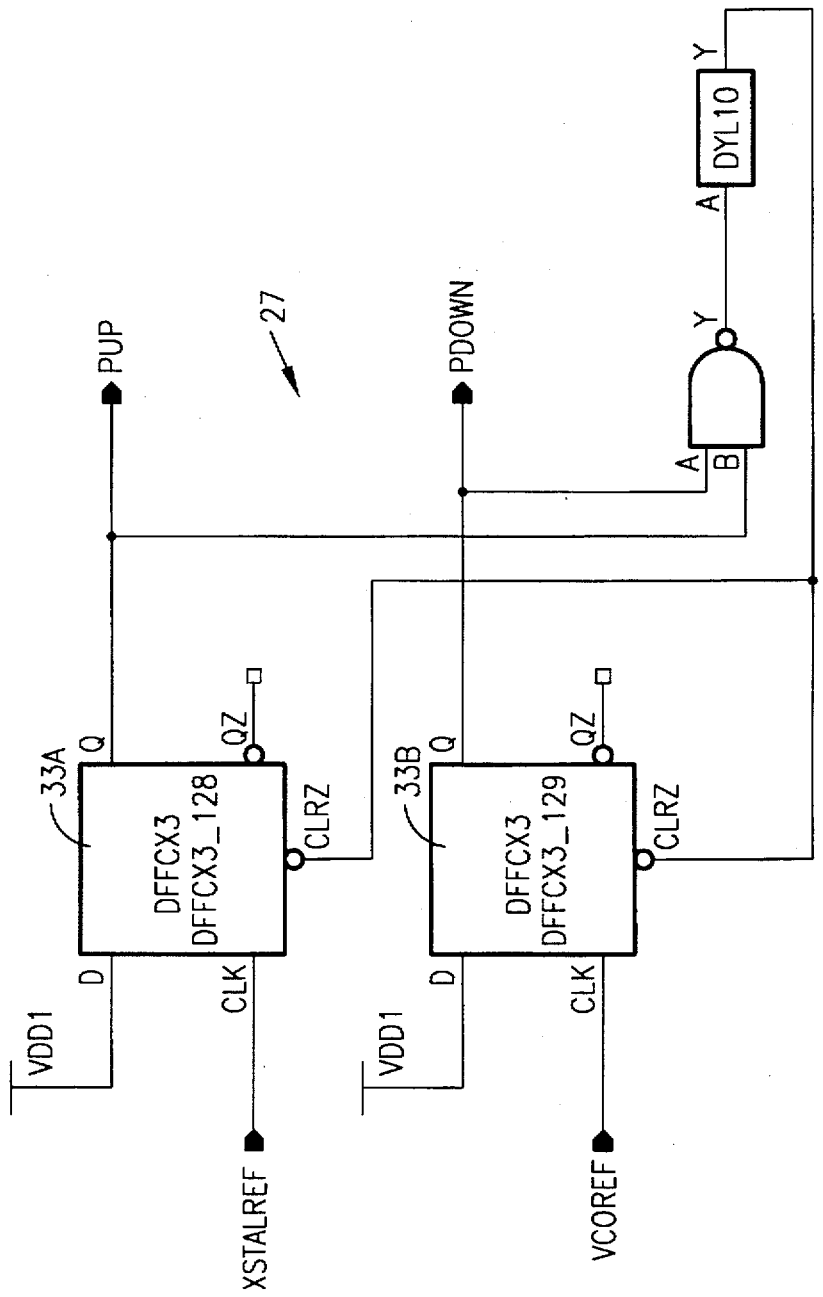
Figure 11:
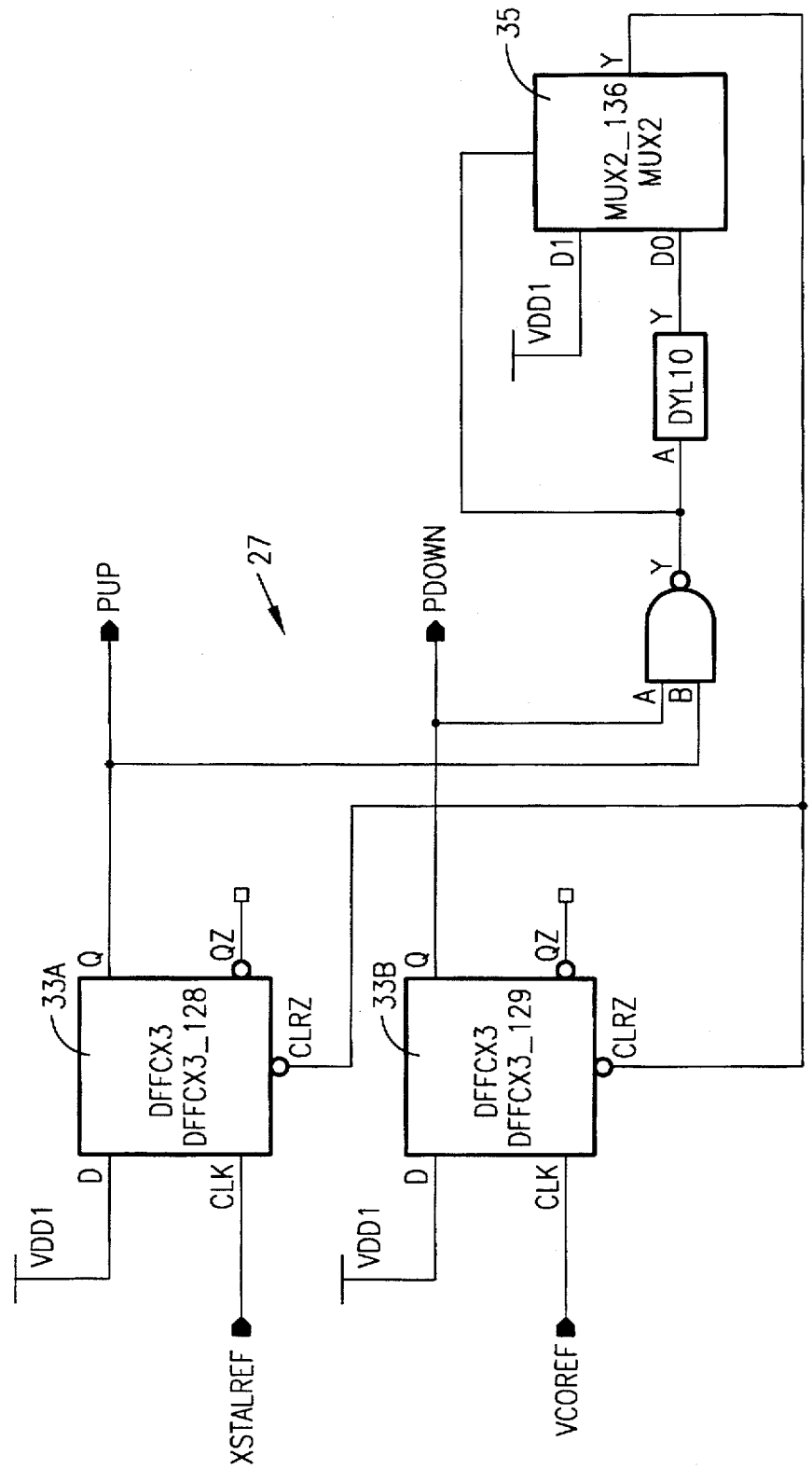

A form of the Phase Pulse Generator shown in FIG. 1H exemplifies the present art. Each flip flop 33A and 33B senses the rising edge of its control clock. One flip flop's output goes high until the other flip flop's output goes high. This condition produces a clear pulse through the delay cell that resets the flip flops in preparation for the next cycle. The delay cell is present to provide the minimum pulse acceptable to the Charge Pump. In the example of FIG. 1G, $t_{pup}$, the current source pulse, was of pulse width:

$$t_{pup}=t_d+t_{dly}$$

where tdly is the delay cell time. The current sink pulse width, tpdown, was of pulse width:

$$t_{down}=t_{dly}$$

Such a configuration is sufficient until the phase difference of the signals is too great to allow the circuit to reset before the beginning cycle of one of the clocks. The circuit then fails to operate as a linear phase detector. This determines the input phase range of the phase detector.

An improved version of the Phase Pulse Generator 27 is shown in FIG. 1I. It is often the case that turning a current source/sink off from a precise current value is much quicker than turning the source/sink on to a precise current value. FIG. 1I uses this fact to provide separate delay paths for the pulse high and pulse low conditions of the Phase Pulse Generator 27. The high minimum pulse width is limited by the delay cell and provides sufficient turn on time for the Charge Pump 29 current sources/sinks. The mux 35 provides a much quicker reset path for the circuit because the delay cell is bypassed. This allows the flip flops to recover more quickly because the reset state time is not limited by the delay cell.

Figure 1J:
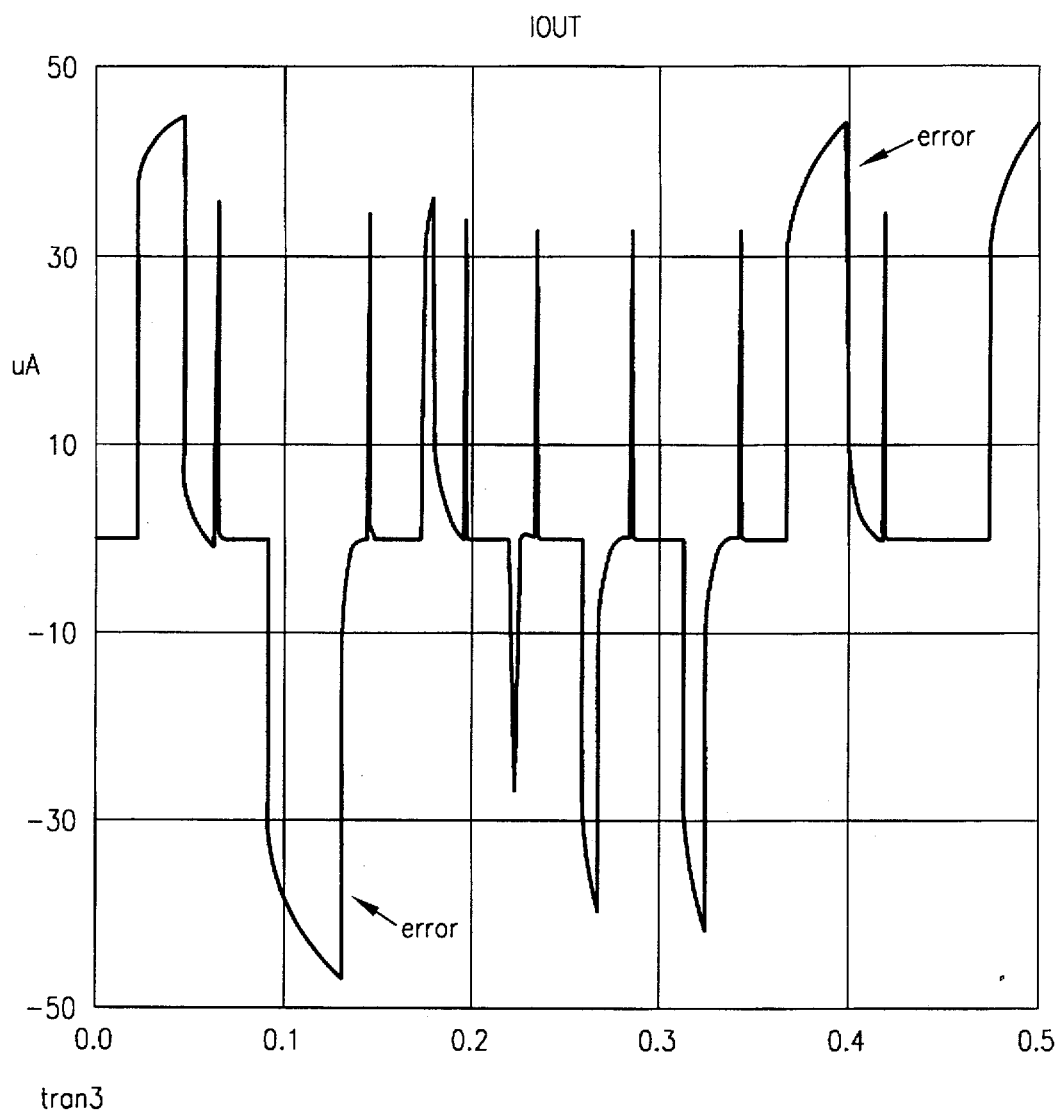
Figure 1K:
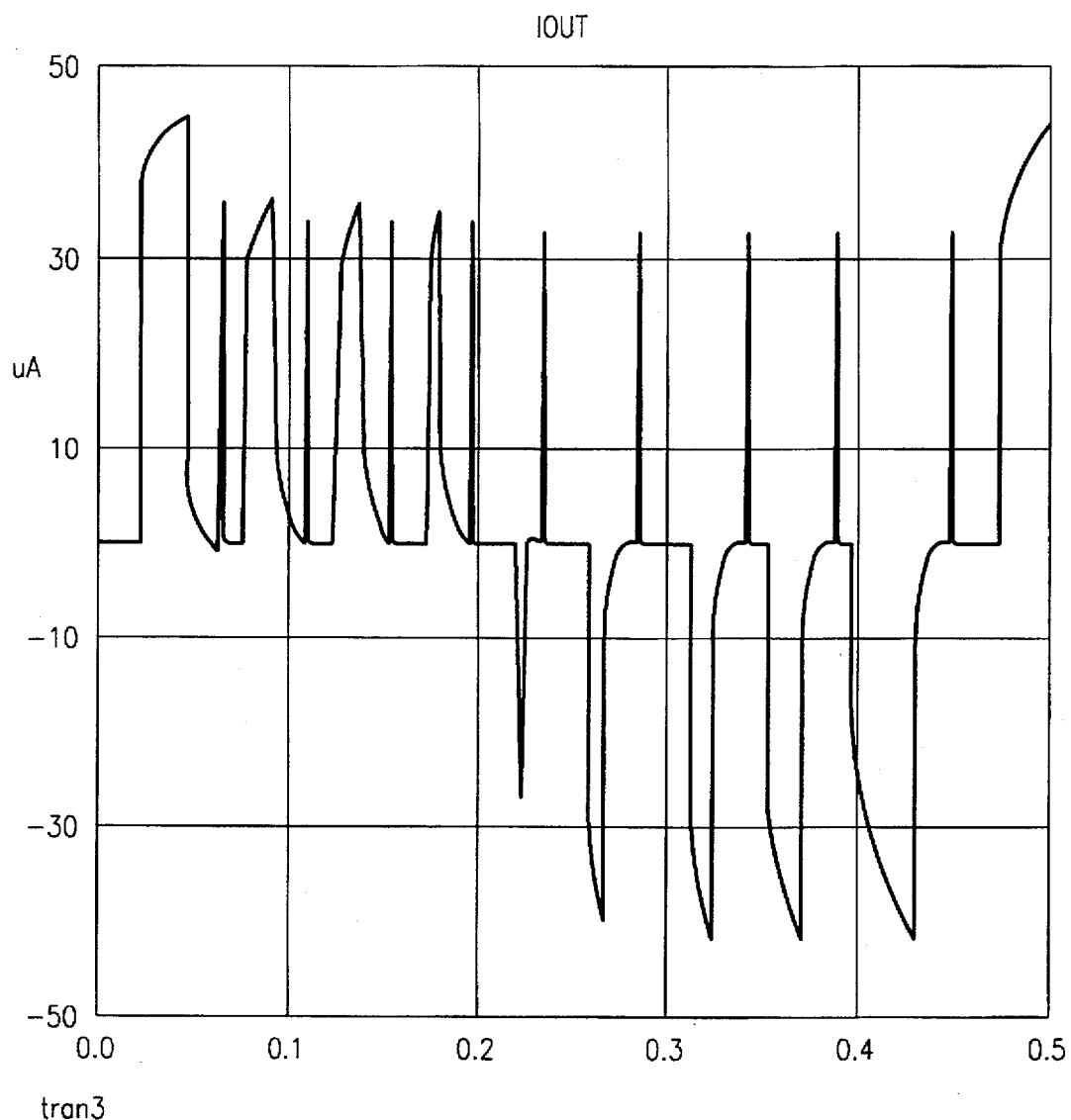

SPICE simulations of the circuits are shown in FIGS. 1J and 1K. The stimulus consists of two clocks with varying phase differences for each cycle. The signals begin with a large phase lead decreasing gradually to z zero phase difference, and decreasing further to a large phase lag. One would expect the output current pulses to start with large pulse widths and decrease to narrow pulse widths. Then, the pulses should go negative and increase in pulse width. FIG. 1J shows the anomalous errors that occur as clock signals arrive before the circuit resets from the previous cycle FIG. 1K shows a wider range of operation with the same stimulus.

The improved version of the Phase Pulse Generator is thus preferred over previous versions, increasing the effective operation frequency and input phase range by almost a 2X factor.

SECTION 2.0 CONFIGURATION REGISTERS MODULE 2 (in FIG. 1A)

Section 2.1 General overview

Figure 2A:
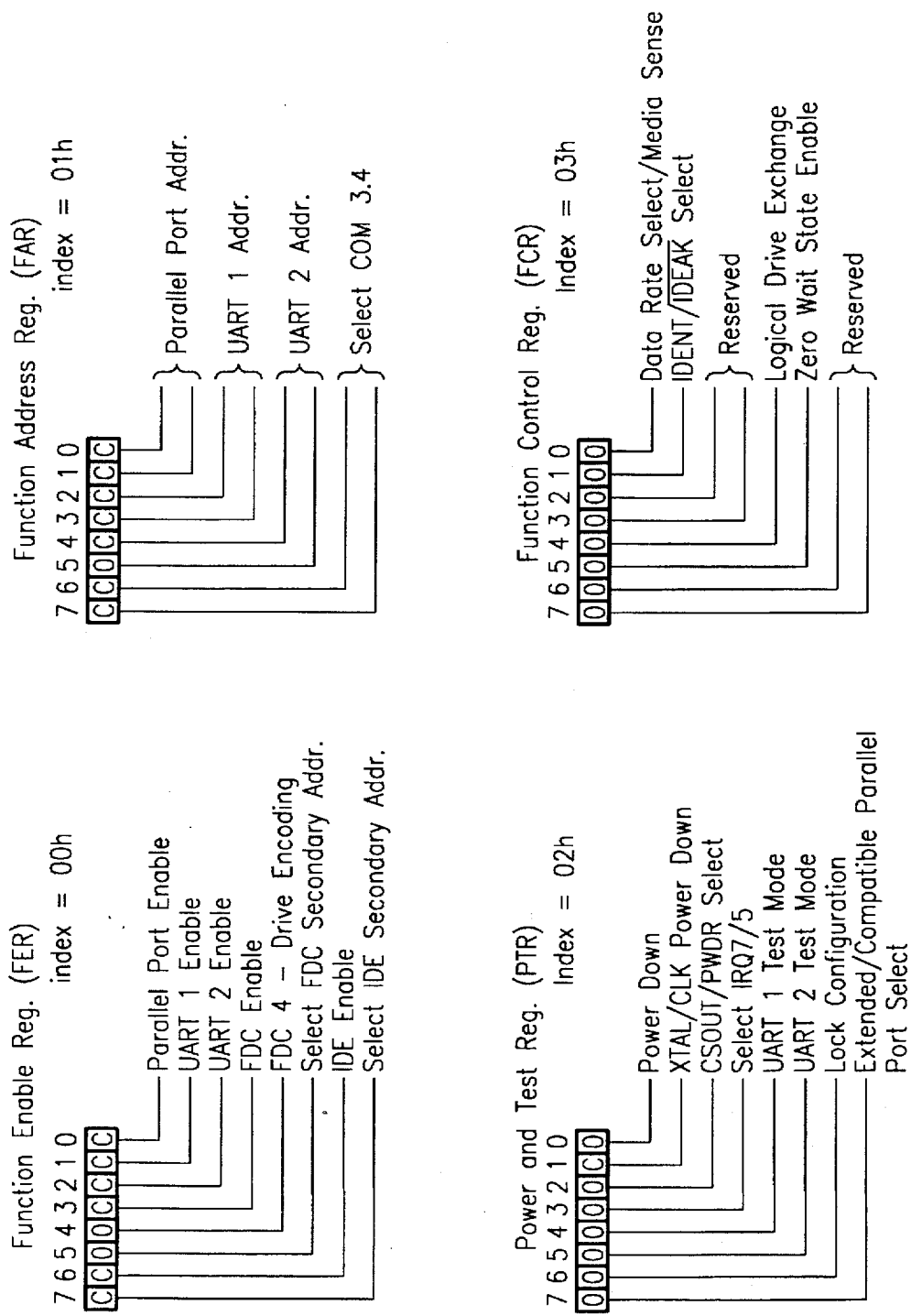
FIGS. 2A, 2B, and 2C are a diagram showing the preferred configuration registers 2.
Figure 2B:
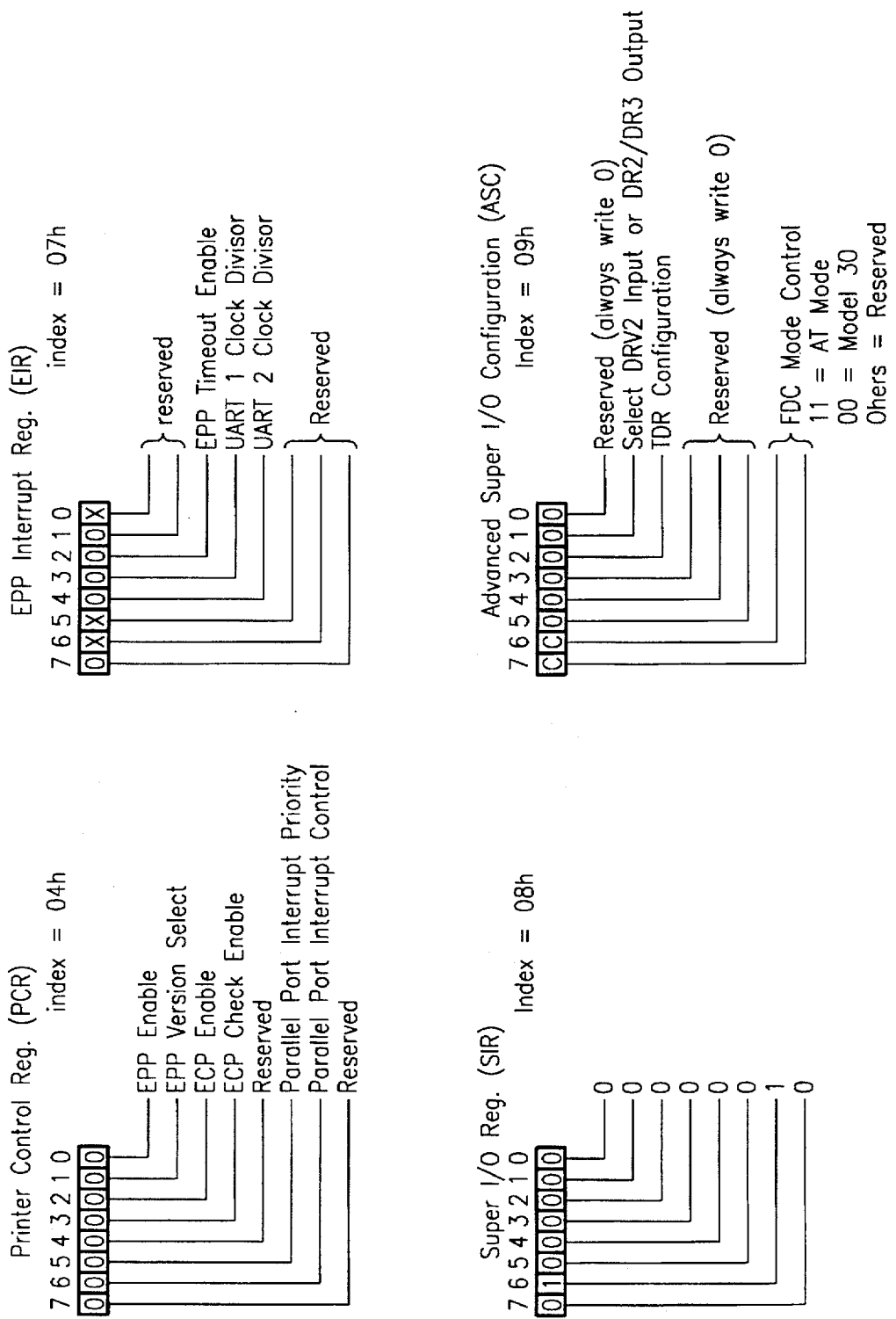
Figure 2C:
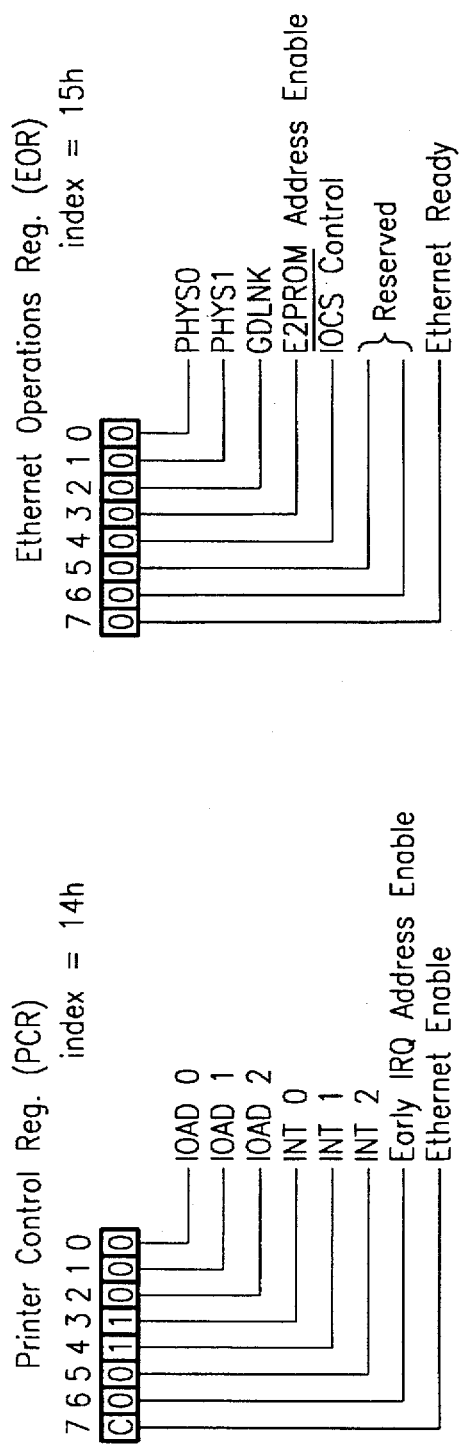

Referring to FIGS. 2A, 2B and 2C which shows the preferred configuration registers 2, nine registers constitute the preferred base configuration register set (nine registers) (which corresponds to configuration register module 2 in FIG. 1A) and control the preferred system configuration set-up. In general, these registers control the enabling of major functions (Ethernet controller module 6, FDC 12, first and second UARTs 8 and 10, parallel port 16A, pin functions (see FIGS. 1CA, 1CB, 1CC, and 1CD), etc.), the I/O addresses of these functions, and whether they power down via hardware control or not. These registers are the Function Enable Register (hereafter referred to as "FER"), Function Address Register (hereafter referred to as "FAR"), Power and Test Register (hereafter referred to as "PTR"), Function Control Register (hereafter referred to as "FCR"), Printer Control Register (hereafter referred to as "PCR"), Take, UART, and Parallel Port Register (hereafter referred to as "TUP"), Super I/O ID (hereafter referred to as "SIR"), Advanced Super I/O Configuration Register (hereafter referred to as "ASC"), Ethernet Configuration Register (hereafter referred to as "ECR"), and the Ethernet Operation Register (hereafter referred to as "EOR"). All of these configuration registers are shown in FIG. 2.

FER, FAR, ECR and ASC can be accessed via hardware or software. FCR and PCR in preferred embodiments can only be accessed by software, but alternative embodiments may access FCR, PCR, TUP and EDR via hardware circuitry. Both of their default values are 00. During reset, the preferred system configuration loads a set of default values selected by hardware strapping options into FER, FAR, and PTR. Immediately thereafter reset ECR and EOR are loaded with information automatically read from an external serial E²PROM.

An index and data register pair are used to read and write these registers. Each configuration register is pointed to by the value loaded into the index registers. Each configuration register is pointed to by the value loaded into the index register. The data to be written into the configuration register is transferred via the data register. A Configuration register is read in a similar way (i.e., by pointing to it via the index register and then reading its contents via the data register).

Accessing the configuration registers 2 in this way requires only two system I/O addresses. Since that I/O space is shared by other devices the index and data registers can still be inadvertently accessed, even though, there are only two registers in this I/O address space. To reduce the chances of an inadvertent access, a simple procedure (see Section 2.2) has been developed.

Section 2.2 Software Configuration

If the system requires access to the configuration registers 2 after reset, the following procedure is used to change data in the registers.

1. Determine the preferred system configuration index register's default location.
    A. Check the four possible default locations (see TABLE 2-2) by reading them twice. The first byte is the ID byte 98H. The second byte read is always 00H. Compare the data read with the ID byte and then 00h. A match occurs at the correct location. Note that the ID byte is only issued from the index register during the first read after a reset. Subsequent reads return the value loaded into the index register. Bits 5–7 are reserved and always read 0.
2. Load the configuration registers 2.
    A. Disable CPU interrupts.
    B. Write the index of the configuration register (00h–15h) to the Index Register one time.
    C. Write the correct data for the configuration register in two consecutive write accesses to the data register.
    D. Enable CPU interrupts.
3. Load the configuration registers 2 (read-modify-write)
    A. Disable CPU interrupts.
    B. Write the index of the configuration register (00h–15h) to the index register one time.
    C. Read the configuration data in that register via the Data Register.
    D. Modify the configuration data.
    E. Write the changed data for the configuration register in two consecutive writes to the data register. The register updates on the second consecutive write.
    F. Enable CPU interrupts.

A single read access to the index and data registers can be done at any time without disabling CPU interrupts. When the index register is read, the last value loaded into the index register is returned.

Section 2.3 Hardware Configuration

During reset, 1 of 32 possible sets of default values are loaded into the first three configuration registers 2. A strapping option on five pins (CFG0–4) selects the set of values that is loaded. This allows for automatic configuration without software intervention. TABLE 2-1, which is located in the Appendix B, shows the default configurations controlled by hardware, all 32 possible default configurations. The default configuration can be modified by software at any time after reset by using the access procedure described in the Software Configuration Section.

TABLE 2-1 is organized as follows. The logic values of the five external configuration pins are associated with the resulting configuration register Data and the activated functions. The activated functions are grouped into seven categories based on the data in the FER. In some cases the data in the FER is given as one of two options. This is because the two IDE address (primary or secondary) are chosen via the FER.

The PTR has one value associated with the active functions in the FER. This value allows the power down of all clocks when the PWDN pin goes active. In the last category where no functions are active after reset, activating the PWDN also stops the crystal.

Most of the variety available is through the FAR. Addresses controlled by the FAR are coded as follows:

PRI is the PRImary floppy or IDE. address (i.e., 3F0-7h or 1F0-7,3F6,7h)
SEC is the SECondary IDE address (170-7, 376,7h)
COM1 is the UART address at 3F8-Fh
COM2 is the UART address at 2F8-Fh
COM3 is the UART address at 3E8-Fh
COM4 is the UART address at 2E8-Fh
LPT1 is the parallel port (II PORT) address at 3BC-3BEh
LPT2 is the II PORT address at 378-37Fh The chosen addresses are given under active functions and are in the same order as the active functions they are associated with. In other words if the active functions are given as FDC 12, IDE, UART1 8, UART2 10, II PORT and the addresses are given as PRI, PRI, COM1, COM2, LPT2; then the functions and the addresses are associated as follows: FDC=PRI, IDE=PRI, UART1=COM1, UART2=COM2, II PORT=LPT2.

Section 2.4 Index and Data Registers

Another more general aspect of configuration registers 2 (in FIG. 1A) is that the Index and the data register pair can be relocated to one of four locations. This is controlled through a hardware strapping option on two pins (BADDR0, 1) and it allows the registers to avoid conflicts with other adapters in the I/O address space. Table 2-2 shows the address options.

TABLE 2-2

Index and Data Register Optional Locations.

| BADDR1 | BADDR0 | INDEX ADDR. | DATA ADDR. |
|---|---|---|---|
| 0 | 0 | 398h | 399h |
| 0 | 1 | 26Eh | 26Fh |
| 1 | 0 | 15Ch | 15Dh |
| 1 | 1 | 02Eh | 02Fh |

Section 2.5 Base configuration registers 2

Section 2.5.1 Function Enable Register (FER, Index 00H)

This register enables and disables major chip functions. Disabled functions have their clocks automatically stopped, but the data in their registers remains intact. It also selects whether the FDC 12 and the IDE controller is located at their primary or secondary address.

Bit 0 When this bit is one the parallel port can be accessed at the address specified in the FAR.
Bit 1 When this bit is one, UART1 8 can be accessed at the address specified in the FAR. When this bit is zero, access to UART1 is blocked and it is in power down mode. The UART1 registers retain all data in power down mode.

Caution: Any UART1 8 interrupt that is enabled and active or becomes active after UART1 8 is disabled asserts the associated IRQ pin when UART1 8 is disabled. If disabling UART1 8 via software, clear the IRQ Enable bit (MCR3) to zero before clearing FER 1. This is not an issue after reset because MCR3 is zero until it is written.

Bit 2 When this bit is one, UART2 10 can be accessed at the address specified in the FAR. When this bit is zero, access to UART2 10 is blocked and it is in power down mode. The UART2 10 registers retain all data in power down mode.

Caution: Any UART2 10 interrupt that is enabled and active or becomes active after UART2 10 is disabled asserts the associated IRQ pin when UART1 8 is disabled. If disabling UART2 10 via software, clear the IRQ Enable bit (MCR3) to zero before clearing FER 1. This is not an issue after reset because MCR3 is zero until it is written.

Bit 3 When this bit is one, the FDC 12 can be accessed at the address specified in the FER bits. When this bit is zero access to the FDC 12 is blocked and it is in power down mode. The FDC 12 registers retain all data in power down mode.

Bit 4 When this bit is zero the preferred system configuration can control two floppy disk drives directly without an external decoder. When this bit is one the two drive select signals and two motor enable signals from the FDC 12 are encoded so that four floppy disk drives can be controlled (See TABLE 2-3). Controlling four FDDs requires an external decoder. The pin states shown in TABLE 2-3 are a direct result of the bit patterns shown. All other bit patterns produce pin states that should not be decoded to enable any drive or motor.

Bit 5 This bit selects the primary or secondary FDC 12 address.

Bit 6 When this bit is a one the IDE drive interface can be accessed at the address specified by FER bit 7. When it is zero, access to the IDE interface is blocked, the IDE control signals (i.e., RCS0, RCS1, IDEL0, IDEH1 are held in the inactive state, and the IDED7 signal is in TRI-STATE.

Bit 7 This bit selects the primary or secondary IDE address. (See TABLE 2-4.)

TABLE 2-3 shows an Encoded Drive and Motor Pin Information (FER 4=1) and is placed in the Appendix C.

TABLE 2-4

Primary and Secondary Drive Address Selection

| Bit 5 | Bit 7 | Drive | AT Primary | AT Secondary |
|---|---|---|---|---|
| 0 | X | FDC | 3F-7h | — |
| 1 | X | FDC | — | 370-7h |
| X | 0 | IDE | 1F0-7 3F6 3F7h | — |
| X | 1 | IDE | — | 170-7 376 7h |

Function Address Register (FAR, Index=1)

This register selects the ISA I/O address range to which each peripheral function responds.

Bits 0,1 These bits select the parallel port address as shown in TABLE 2-5:

TABLE 2-5

Parallel Port Addresses

| BIT1 | BIT0 | PARALLEL PORT ADDRESS | AT INTERRUPT |
|---|---|---|---|
| 0 | 0 | LPT2 (378-37F) | IRQ5 (Note) |
| 0 | 1 | LPT1 (3BC-3BE) | IRQ7 |
| 1 | 0 | LPT3 (278-27F) | IRQ5 |
| 1 | 1 | RESERVED | TRI-STATE (CTR4 = 0) |

Note interrupt assigned to this address can be changed to IRQ7 by setting Bit 3 of the Power and Test Register Bits 2–5 These bits determine which ISA I/O address range is associated with each UART (see TABLE 2-6 and TABLE 2-7).

TABLE 2-6

COM Port Selection for UART1 8 (in FIG. 1A)

| FAR | | UART1 |
|---|---|---|
| BIT 3 | BIT 2 | COM# |
| 0 | 0 | 1 (3F8-F) |
| 0 | 1 | 2 (2F8-F) |
| 1 | 0 | 3 (Table 2-8) |
| 1 | 1 | 4 (TABLE 2-8) |

TABLE 2-7

COM Port Selection for UART2 10 (in FIG. 1A)

| FAR | | UART2 |
|---|---|---|
| BIT 3 | BIT 2 | COM# |
| 0 | 0 | 1 (3F8-F) |
| 0 | 1 | 2 (2F8-F) |
| 1 | 0 | 3 (TABLE 2-8) |
| 1 | 1 | 4 (TABLE 2-8) |

NOTE COM3 and COM4 addresses are determined by Bits 6 and 7.

Bits 6, 7 These bits select the addresses that are used for COM3 and COM4 (see TABLE 2-8)

TABLE 2-8

Address Selection for COM3 and COM4

| BIT7 | BIT6 | COM3 IRQ4 | COM4 IRQ3 |
|---|---|---|---|
| 0 | 0 | 3E8-Fh | IRQ5 (Note) |
| 0 | 1 | 338-Fh | 238-Fh |
| 1 | 0 | 2E8-Fh | 2E0-7h |
| 1 | 1 | 220-7h | 228-Fh |

Section 2.5.3 Power and Test Register (PTR, Index=02H)

This register determines several power down features: the power down method used when the power down pin (PWDN) is asserted (crystal and clocks vs. clocks only), whether hardware power down is enabled, and provides a bit for software power down of all enabled functions. It selects whether IRQ7 or IRQ5 is associated with LPT2. It puts the enabled first and second UART modules 8 and 10 (in FIG. 1A) to their test mode and determines whether the parallel port is in compatible or extended mode. Independent of this register the floppy disk controller can enter low power mode via the Mode Command or the Data Rate Select Register.

Bit 0 Setting this bit causes all enabled functions to be powered down. If the crystal power down option is selected (see Bit 1) the crystal is also powered down. All register data is retained when the crystal or clocks are stopped.

Bit 1 When the Power Down pin or Bit 0 is asserted this bit determines whether the enabled functions have their internal clocks stopped (Bit 1=0) or the external crystal (Bit 1=1) is stopped. Stopping the crystal is the lowest power consumption state of the part. However, if the crystal is stopped, a finite amount of time (8 ms) is required for crystal stabilization once the Power Down pin (PWDN) or Bit 0 is deasserted. If all internal clocks are stopped, but the crystal continues to oscillate, no stabilization period is required after the Power Down pin or Bit 0 is deasserted.

Bit 2 Setting this bit enables the chip select function of the PWDN/CSOUT pin. Resetting this bit enables the power down function of this pin.

Bit 3 Setting this bit associates the parallel port with IRQ 7 when the address for the parallel port is 378-37Fh (LPT2). This bit is a "don't care" when the parallel port address is 3BC - 3BEh (LPT1) or 278-27Fh (LPT3).

Bit 4 Setting this bit puts UART1 into a test mode, which causes its Baudout clock to be present on its SOUT1 pin if the Line Control Register bit 7 is set to 1.

Bit 5 Setting this bit puts UART2 10 into a test mode, which causes its Baudout clock to be present on its SOUT2 pin if the Line Control Register bit 7 is set to 1.

Bit 6 Setting this bit to 1 prevents all further write accesses to the Configuration registers 2. Once it is set by software it can only be cleared by a hardware reset. After the initial hardware reset it is 0.

Bit 7 Setting this bit to 1 puts the parallel port into extended mode. Writing 0 to this bit puts the parallel port into compatible mode. This bit is only valid in Compatible or Extended mode.

Section 2.5.4 Function Control Register (FCR, Index=03H)

This register determines several pin options:

It selects between Data Rate output and automatic media sense inputs, and between IDENT or IDEACR inputs for DMA control of IDE. For Enhanced Parallel Port it enables the ZWS option. On reset the FCR 1:7 bits are cleared to 0.

Bit 0 Data Rate/Media Sense select bit. When this bit is 0, the MSEN0-1 pins are Media Sense inputs. When this bit is 1, the DRATE0–1 pins are Data Rate outputs. VLD0 pin is sampled during reset and loaded to this bit.

Bit 1 IDENT/IDEACK select bit. When this bit is 0, the IDENT pin is used, and the IDE DMA is disabled. When this bit is 1, the IDE DMA is enabled, and the IDENT input is assumed to be 1.

Bit 2–4 Reserved.

Bit 5 Zero Wait State enable bit. If this bit is 1, ZWS is driven low when the Enhanced Parallel Port (EPP) can accept a short host write-cycle, otherwise the ZWS open drain output is not driven. EPP ZWS write operation should be configured when the system's device is fast enough to support it.

Bit 6–7 Reserved.

Section 2.5.5 Printer Control Register (PCR, Index=04H)

This register enables the EPP and ECP version modes, and interrupt options. On reset the PCR bits are cleared to 0.

Bit 0 EPP enable bit. When this bit is 0, the EPP is disabled, and the EPP registers are not accessible (access ignored). When this bit is 1, the EPP is enabled. Note that the EPP should not be configured with base address 3BCh.

Bit 1 EPP version select bit. When this bit is 0, Version 1.7 is supported. When this bit is 1, Version 1.9 is supported (IEEE 1284).

Bit 2 ECP enable bit. When this bit is 0 the ECP is disabled and in power-down mode. The ECP registers are not accessible (access ignored) and the ECP interrupt and DMA are inactive. When this bit is 1 the ECP is enabled. The software should change this bit to 1 only when bits 0, 1, and 3 of the existing CTR are 0 and bit 2 of the CTR is 1. Note: When this bit is 1, bit 0 of PCR is ignored.

Bit 3 ECP clock freeze control bit. When this bit is 0, the ECP does not affect the stopping of the 24 MHz crystal (entering power-down mode 3). When this bit is 1, and the ECP is enabled (bit 2 of PCR is 1), the 24 MHz crystal is not stopped (power-down mode 3 is not entered), and the ECP clock is not stopped.

Bit 4 Reserved.

Bit 5 Parallel port interrupt (IRQ5 or IRQ7) polarity control bit. When this bit is 0 the interrupt polarity is level high or negative pulse. When this bit is 1 the interrupt polarity is inverted.

Bit 6 Parallel port interrupt (IRQ5 or IRQ7) open drain control bit. When this bit is 0 the configured interrupt line (IRQ5 or IRQ7) has a totem-pole output. When this bit is 1 the configured interrupt line has an open drain output (drive low, no drive high, no internal pullup).

Bit 7 Reserved.

Section 2.5.6 Configuration registers 2 (Index=05H-06H, 0AH-13H)

These registers are reserved.

Section 2.5.7 Tape, UARTS, and Parallel Port Configuration Register (TUP, Index=07H)

This register controls the EEP Timeout interrupt enable option. I also enables the UARTs to be used as MIDI ports.

Bit 0,1 Reserved. Always write a 0 to these bits.

Bit 2 EEP Timeout Interrupt enable bit. When this bit is 0 to EPP timeout interrupt is masked. When this bit is 1, the EPP timeout interrupt is generated on the selected IRQ line (IRQ5 or IRQ7), according to bits (4:6) of the PCR (Index=04H).

Bits 3,4 Reserved. Always write a 0 to these bits.

Bits 5–7 Reserved. Always write a 0 to these bits.

Section 2.5.8 Super I/O Identification Register (SIR, Index=08H)

This register contains a identification number for the revision of this part. This is a read only register.

Section 2.5.9 Advanced Super I/O Configuration register (ASC, Index-09h)

This register determines a variety of FDC operations. These include the mode of operation, the type of media sense, drive exchange capabilities, and the function of a drive pin.

Bit 0 This bit determines the function of pin 2 (IRQ5/ADRATE0). If this bit is 0, then pin 2 will be output IRQ5. If this bit is 1, then pin 2 will be the output ADRATE0. In this case IRQ7 is used for the parallel port interrupt. ADRATE0 has the same polarity and function as DRATE0.

Bit 1 This bit determines the function of pin 71 (DRV2/DR23). If this bit is 0, then pin 71 will be an input that is used by the FDC during Model 30 mode to detect the presence of a second floppy drive (/DRV2). If it is a 1, then this pin is activated when either the drive 2 or drive 3 (DR23) functions are selected in the DOR register of the FDC. When this bit is 1, the DRV2 bit in the FDC SRB register is cleared to its active state. Setting this bit assumes that the 2 drive option selected via bit 4 of the FER is active. If the 4 drive option is selected via FER 4, then pin 71 is always (/DRV2).

Bit 2 This bit determines the operation of the Tape Drive Register (TDR) in the FDC. If this bit is 0, then the RDR will operate as it has in the DP8477, 82077, and PC87312, which are all parts currently and previously manufactured by National Semiconductor Corporation. If this bit is a 1, then the TDR will function in a compatible mode to the 82078 as described for that register in the FDC section. Bit 0 of the FCR will determine the function of the multiplexed DRATE and Media Sense pins.

Bit 3 Reserved. Always write a 0 to this bit. Reads of this bit are undefined.

Bit 4 Reserved. Always write a 0 to this bit.

Bit 5 This bit directly sets or clear bit 3 of ECP CNFG register A. This bit and therefore bit 3 of ECP CNFG register A is initialized to a 0 during reset.

Bit 6 Reserved. Always write bit 6 and 7 with the same value.

Bit 7 This bit chooses the FDC operating mode. If it is a 0, then the FDC is operating the Model 30 Mode. If it is a one then the FDC is operating in AT Mode. This bit is initialized during reset by the IDENT pin.

Section 2.5.10 Ethernet Control Register (Index=14h)

This register selects the I/O address and interrupt pin that will be used by Ethernet controller module 6 (in FIG. 1A). It also enables Ethernet controller module 6 and the Early IRQ option.

Bit 0–2 I/O Address Used: These bits determine the base I/O address of Ethernet controller module 6, within the ISA I/O map. Ethernet controller module 6 occupies 20H bytes of the ISA I/O space.

| Bit 2 | Bit 1 | Bit 0 | I/O Address |
|---|---|---|---|
| 0 | 0 | 0 | 0300H |
| 0 | 0 | 1 | Software Select (Note 1) |
| 0 | 1 | 0 | 0240H |

| Bit 2 | Bit 1 | Bit 0 | I/O Address |
|---|---|---|---|
| 0 | 1 | 1 | 0280H |
| 1 | 0 | 0 | 02C0H |
| 1 | 0 | 1 | 0320H |
| 1 | 1 | 0 | 0340H |
| 1 | 1 | 1 | 0360H |

Note when 001 is selected Ethernet controller module 6 will not respond to any I/O addresses, but will require 4 consecutive writes to 0278H to write these 3 bits of this register. This sequence will only operate once after a power-on reset. This mode allows Ethernet controller module 6 to be configured via software without conflicting with other peripherals.

Bits 3-5 Interrupt Line Used: There are eight interrupt pins that can be selected by setting these 3 bits according to the table shown below

| Bit 5 | Bit 4 | Bit 3 | Interrupt |
|---|---|---|---|
| 0 | 0 | 0 | IRQ3 |
| 0 | 0 | 1 | IRQ4 |
| 0 | 1 | 0 | IRQ5 |
| 0 | 1 | 1 | IRQ9 |
| 1 | 0 | 0 | IRQ10 |
| 1 | 0 | 1 | IRQ11 |
| 1 | 1 | 0 | IRQ12 |
| 1 | 1 | 1 | IRQ15 |

Bit 6 Early Interrupt Address Enable: When a 1 is written to this bit access to the 2 registers that control the Early IRQ function is allowed. These two registers are located at the Ethernet base I/O address (see bits 0–2)+1CH and 1DH.

Bit 7 Ethernet Enable: When this bit is one, Ethernet controller module 6 can be accessed at the address specified by the IOAD bits. When this bit is zero access to the Ethernet controller module 6 is blocked and it is in power down mode. Registers in Ethernet controller module 6 retain all data in power down mode. This bit is not affected by the $E^2PROM$ load.

Section 2.5.11 Ethernet operations Register (Index= 15h)

This register determines the physical media interface that Ethernet controller module 6 will use, it enables the GDLNK function, the loading of the $E^2PROM$, and IOCS16 control.

Bits 0,1 Physical Layer Interface: These 2 bits determine which type of physical media interfaces Ethernet controller module 6 is using. The 2 TPI interface use twisted pair outputs and inputs, while the other 2 interfaces use AUI outputs and inputs. In 10BASE5 mode the THIN output pin is driven low, in 10BASE 2 mode it is driven high and can enable an external DC to DC converter required by the 10BASE2 specification to provide isolation. The non-spec TPI mode is a twisted pair mode with reduced squelch levels. This allows the use of longer cable lengths than specified by the twisted pair specification or to use cables with higher losses.

| Bit 1 | Bit 0 | |
|---|---|---|
| 0 | 0 | TPI (10BASE-T Compatible Squelch) |
| 0 | 1 | Thin Ethernet (10BASE2) |
| 1 | 0 | Thick Ethernet (10BASE5) (AUI Port) |
| 1 | 1 | TPI (Reduced Squelch) |

Bit 2 Good Link: Writing a 0 to this bit enables the linktest pulse generation and integrity checking. When this bit is read it will indicate the link status, which corresponds to the LED. It is 0, if Ethernet controller module 6 is in AUI mode or if the link testing is enabled and the link integrity is bad (i.e. the twisted pair link has been broken). It is 1, if Ethernet controller module 6 is in TPI mode, the link integrity checking is enabled and the link integrity is good (i.e. the twisted pair link has not been broken). It is also a 1 in the TPI Mode, if the link testing is disabled.

Bit 3 $E^2PROM$ Address Enable When a 1 is written to this bit access to the 2 register that control the EPROM Interface function is allowed. These two registers are located at the Ethernet base I/O address (see bits 0–2)+1AH and 18H.

Bit 4 IOCS16 CONTROL: When this bit is set high Ethernet controller module 6 generates IOCS16 after 1OR or IOW go active. If low, IOCS16 is generated as soon as the address is decoded.

Bits 5–6 Reserved

Bit 7 Ethernet Ready When set, this bit indicates that software can access the Ethernet controller module 6 section of the PC87340. It is set when the phase locked-loops in both the crystal and the ENDEC sections have stabilized which requires approximately XXXX ms after power-on reset when a crystal is used. It is cleared when either of the phase locked-loops have been stopped and/or the crystal has been stopped (see power-down modes).

Section 2.6 Power Down Options

There are various methods for entering the power down modes. All methods result in one of three possible modes.

Mode 1: Clocks stopped to specific functions

Mode 2: All Clocks stopped to all functions

Mode 3: All clocks stopped and the crystal is stopped

This section associates the methods of entering power down with the resulting mode.

Mode 1: The internal clocks stopped for a specific function (i.e., first UART module 8 (UART1) and/or second UART module 10 (UART2) and/or FDC 12 and/or ECP and/or Ethernet controller module 6)

This mode is entered by any of the following:

1. Clear the bit for the specific function that is to be powered down. See Section 2.5.1 FER bits 0–3, PCR bit 2, and/or ECR bit 7.

2. During reset, set certain CFG 0–4 pins (See TABLE 2-1) to disable clocked functions and/or set the ENET pin.

3. Execute the FDC 12 Mode Command with PTR bit 1=0 (XTAL/CLK). See Section 4.14.6 LOW PWR.

4. Set Data Rate Select Register bit 6, in the FDC 12, high, with PTR bit 1=0. See Section 4.7 Bit 6.

Mode 2: The internal clocks are stopped for all enabled functions.

Note that Clocks to disabled functions are always inactive.

This mode is entered by any of the following:
1. Clear all FER bits, PCR bit 2, or ECR bit 7 for any enabled function. See Section 2.5.1 FER bits 1–3.
2. Clear PTR bit 1 and then set PTR bit 0 (Power Down) high. See Section 2.5.3 PTR bits 0 and 1.
3. Clear PTR bits 1 (XTAL/CLK) and 2 (CSOUT/PWDN select). Then assert the PWDN signal low. See Section 2.5.3 PTR bits 1,2 and section 1.0 PRDS pin.

Mode 3: The external crystal is stopped and internal clocks are stopped for all enabled functions.

This mode is entered by any of the following:
1. Clear FER bits 1–3, PCR bits 2, and ECR bit 7.
2. Set PTR bit 1 (XTAL/CLK), clear PTR bit 2 (CSOUT/PWDN select). Then assert the PWDN signal low. See Section 2.5.3 PTR bits 1, 2 and section 1.0 PWDN pin.
3. Set PTR bit 1 and then set PTR bit 0 high. See Section 2.5.3 PTR bits 0 and 1.
4. During reset, pull CFG 0–4 pins and the ENET pin high.
5. Execute the FDC Mode Command with PTR bit 1=1. See Section 4.14.6 LOW PWR.
6. Set Data Rate Select Register bit 6 high in the FDC 12 with PTR bit 1=1. See Section 4.7 Bit 6.

Section 2.7 Power-Up Procedure and Considerations

Section 2.7.1 Crystal Stabilization

If the crystal is stopped when the preferred system embodiments go into low power mode, then a finite amount of time (8 ms) must be allowed for crystal stabilization during subsequent power-up. The stabilization period can be sensed by reading the Main Status Register in the FDC 12, if the FDC 12 is being powered up. (The Request for Master bit will be set 8 ms after the crystal starts). If either one of the UARTs 8 and 10 are being powered up, but the FDC 12 is not, then the software must determine the 8 ms crystal stabilization period. Stabilization of the crystal can also be sensed by putting the first and second UART modules 8 and 10 into local loopback mode and sending bytes until they are received correctly.

If Ethernet controller module 6 is being powered up and the crystal has been stopped, the software must determine the 8 ms crystal stabilization period plus a 10–12 ms stabilization period for the ENDEC phase lock loop.

Section 2.7.2 First and Second UART Modules 8 and 10 Power-Up

The clock signal to the first and second UART modules 8 and 10 is controlled through the Configuration registers 2(FER, PTR). In order to restore the clock signal to one or both first and second UART modules 8 and 10 the following conditions must exist:
1. The appropriate enable bit (FER 1,2) for the UART(s) 8 and 10 must be set
2. and the Power Down bit (PTR 0) must not be set
3. and if the PWDN pin option (PTR 2) is used the CSOUT/PDWN pin must be inactive.

If the crystal has been stopped follow the guidelines in Crystal Stabilization Section before sending data or signalling that the receiver channel is ready.

Section 2.7.3 FDC 12 Power-Up

The clock signal to the FDC 12 is controlled through the configuration registers 2, the FDC 12 Mode Command and the Data rate select register. In order to restore the clock signal to the FDC 12 the following conditions must exist:
1. The appropriate enable bit (FER 3) must be set
2. and the Power Down bit (PTR 0) must not be set
3. and if the PWDN pin option (PTR 2) is used the CSOUT/PDWN pin must be inactive.

In addition to these conditions, one of the following must be done to initiate the recovery from Power Down mode:
1. Read the Main Status Register until the RQM bit (MSR7) is set
2. or write to the Data Rate Select Register and set the Software Reset bit (DSR7)
3. or write to the Digital Output Register and set, and then the clear Reset bit (DOR2)
4. or read the Data Register and the Main Status Register until the RQM bit is set.

If the crystal has been stopped, read the RQM bit in the Main Status Register until it is set. The RQM bit is not set until the crystal has stabilized.

Section 2.7.4 Ethernet Power-Up

The clock signal to Ethernet controller module 6 is controlled through the configuration registers module 2 (ECR, PTR). In order to restore the clock signal to Ethernet controller module 6 the following conditions must exist.
1. The appropriate enable bit (ECR 7) for Ethernet controller module 6 must be set
2. and the Power Down bit (PTR 0) must not be set
3. and if the PWDN pin option (PTR 2) is used the CSOUT/PDWN pin must be inactive.

If the Ethernet clock has been stopped, there is a stabilization period of 10–12 ms that must occur when the clock is restored before Ethernet controller module 6 can be used.

If the crystal has been stopped follow the guidelines in Crystal Stabilization Section before sending data.

SECTION 3.0 ETHERNET CONTROLLER MODULE 6 (in FIG. 1A)

Section 3.01 Improved Memory Mapping Architecture in Conjunction with General System Designs Referring to FIGS. 3A and 3B, which is a block diagram of preferred system embodiments in a standard NE2000 Archetecture and more standard implementations respectively, software for Ethernet controller module 6 is compatible with the NE2000 architecture. While both could be used in a preferred implementation of the disclosed system, the embodiment shown in FIG. 3A, as explained below, is preferred for a variety of reasons. Traditional network interface controllers, such as National's Ethernet controller module, DP8390, and its derivatives, generally require a data buffer to accommodate the difference between the network data rate and the controller-to-host data throughput speed. The traditional architecture of such a system requires one or more RAM chips to be connected to the controller to provide the data buffer.

The architecture shown in FIG. 3A and the corresponding implementation of integrating a data buffer memory 149 (which will be described in more detail below) with a network interface controller in a single integrated circuit on a single substrate has the following advantages over the traditional architecture that uses separate external buffer memory: higher device integration, lower data buffer access time, increased data buffer bandwidth available to the host, reduced pin count of the device, & reduced overall power consumption for the system.

Regarding increased integration, the preferred archetecure reduces the overall memory requirements as well as the potential number of integrated circuits. In particular, as shown in FIG. 3B, external memory 140 (e.g., usually two separated integrated circuits), EEPROM ITC 144, and the AT/Lantic integrated circuit 142 constitute approximately four integrated circuits and perhaps more, whereas, as shown in FIG. 3A, the preferred system only uses two integrated circuits: EEPROM 150 integrated circuit and the SIO+LAN 148 integrated circuit. The total number of integrated circuits. All control and most media interface logic are integrated to reduce board cost and area.

Regarding the the reduced data buffer access time, since the buffer is on-chip, the buffer address and data buses run locally inside the chip. This reduces the data propagation delay and hence reduce the access time. For example, one implementation of this architecture (DP87340) achieves 100 ns buffer access time at 40 MHz without wait-states. It is 100% faster than its predecessor (DP8390/DP83905).

Regarding the increased data buffer bandwidth available to the host follows from the reduced buffer access time, the buffer utilization time by the network controller is reduced and hence the buffer bandwidth available to the host is increased. With more bandwidth, the network interface can tolerate higher host (system) bus latency and therefore allow more flexibility in the system and driver software design.

Regarding the reduction of the pin count of the device. Comparing to the DP83905, a device based on the new architecture can save 33 memory address, data, and control pins.

Regarding the reduction in power consumption of the overall system, power consumption is reduced because memory address and data I/O buffers are eliminated. The on-chip RAM also consumes less power than external RAM chips.

Numerous preferred embodiments utilize varying architectural schemes to efficiently use the local RAM buffer. For instance, one preferred embodiment uses ONE SRAM or using internal RAM (ZERO external RAM). In particular, using an 8-bit local DMA and 16-bit remote DMA, on SRAM could be used. In I/O mode, the remote DMA will fetch two bytes sequentially and fill up a 16-bit latch, then the host reads 16-bits at a time. In shared memory mode (we need to take care the shared memory mode because the latest NE2000+architecture supported by Netware 4.0 is capable of doing shared memory), a bus cycle translator is needed to translate 16-bit cycle, 8-bit old-address cycle and 8-bit even-address cycle into appropriate local RAM cycles. All this extra logic should be pretty straightforward. To maintain 100% NE2000 compatibility it needs a 16KX8 SRAM which seems unavailable.

Another preferred embodiment involves using an internal SRAM, which the ultimate solution for a low cost Ethernet solution. The saving in local RAM address and data bus buffers and pins justify the additional dedicated circuitry needed for the RAM as the feature size reduces. However, at this time, 16KX8 RAM is still a big block comparing to the size of the ACENIC. A reduced size internal RAM may be acceptable by modifying the software driver, but that would undermine NE2000 compatibility. As a result, preferred system embodiments utilize an improved memory mapping architecture that effectively reduces the memory requirements of an internal memory. As will be explained below, in general, the original NIC receive buffer management scheme divides the receive buffer into fix size 256-byte pages. The fact is that many control packets in the Ethernet traffic are smaller than 256-bytes (many are just minimum 64-bytes packets). Therefore, the receive buffer is not efficiently utilized. By packing all received packets together without leaving space in between, preferred system embodiments achieve the same logical memory space by using a smaller physical memory. Preferred system embodiments use an address translation table to map each logical page into anywhere inside the physical memory (see FIGS. 3-35A, 3-35B and 3-35C, 3-35D, 3-35E, and 3-35F). For a 16K buffer, there are 64 pages. It page has a 16-bit physical memory pointer. So the table is 64×16=128 bytes. The translation can be done in multiple bus clock cycles, hence, it doesn't require super-fast RAM and logic.

In short, the way it works is that we keep a physical local DMA address counter. It points to a section of the physical memory that form a physical receive buffer ring. Transmit buffer requires no translation. Everytime the local dma starts receiving packet, the physical local DMA address is written inside the translation table (this is the physical start address of the packet). When doing the remote DMA, the page no. (RSAR1) is used to index through the translation table to get the physical start address, then it is added with the offset within the page (RSAR0) to form the physical remote address. All the read and write to the translation table will be automatic. The user is still looking at the same Pstart, Pstop, Curr, Bnry and Rsar registers. Therefore, it is completely transparent to the software.

Section 3.0 Overview

The Ethernet controller module software is compatible with the NE2000 architecture. All control and most media interface logic are integrated to reduce board cost and area.

Supported network interfaces include 10BASE5 or 10BASE2 Ethernet via an external transceiver connected to its AUI port, and Twisted-pair Ethernet (10BASE-T) using the on-board transceiver. Ethernet controller module 6 provides the Ethernet Media Access Control (MAC), Encode-Decode (ENDEC) with an AUI interface, and 10BASE-T transceiver that function in accordance with the IEEE 802.3 standards.

The 10BASE-T transceiver incorporates the receiver, transmitter, collision, heartbeat, loopback, jabber, and link integrity blocks as defined in the standard. The transceiver when combined with equalization resistors, and pulse transformers provides a complete physical interface from Ethernet controller module 6 Controller's ENDEC module and the twisted pair isolation transformer.

The integrated ENDEC module allows Manchester encoding and decoding via a differential transceiver and phase lock loop decoder at 10Mbit/sec. Also included are a collision detect translator and diagnostic loopback capability.

The ENDEC module interfaces directly to the transceiver module, and also provides a fully IEEE compliant AUI (Attachment Unit Interface) for connection to other media transceivers. The Media Access Control function which is provided by the Network Interface Control module (NIC) provides simple and efficient packet transmission and reception control by means of on-chip memory.

Ethernet controller module 6 provides a comprehensive solution for 10BASE-T IEEE 802.3 networks. Due to the inherent constraints of CMOS processing, isolation is required at the signal interface for 10BASE5, 10BASE2 and 10BASE-T applications.

Section 3.1 Ethernet Controller Module Block Diagram

Figures 1, 3:
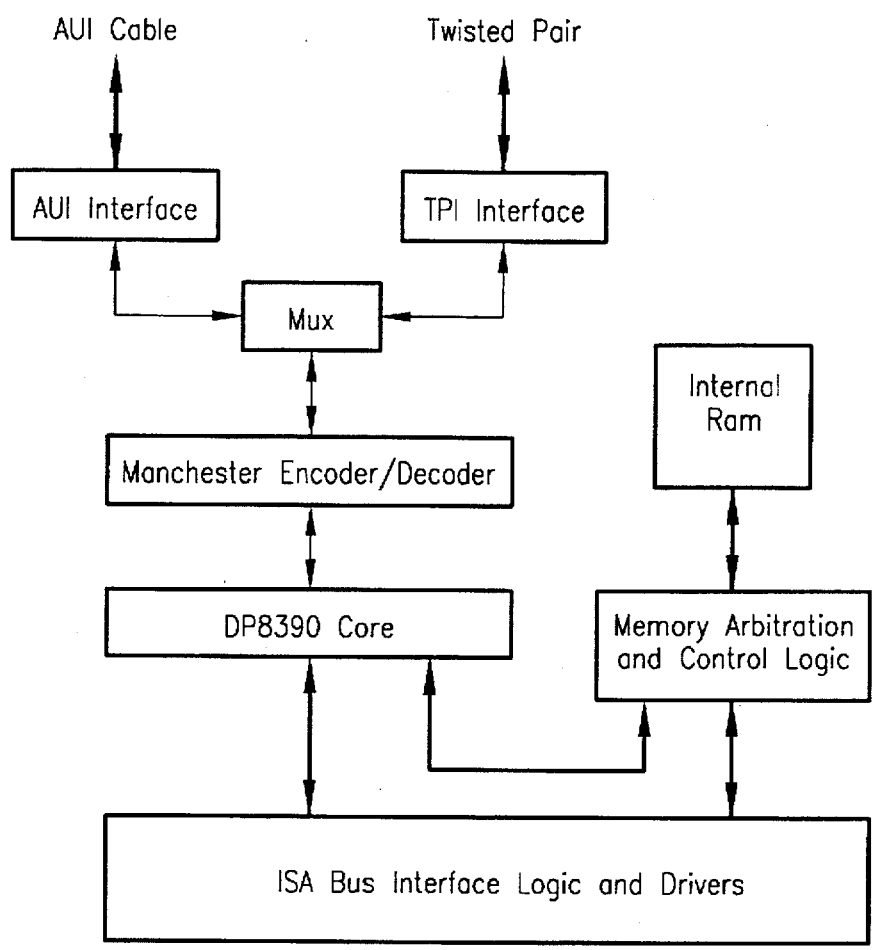
Figures 2, 3:
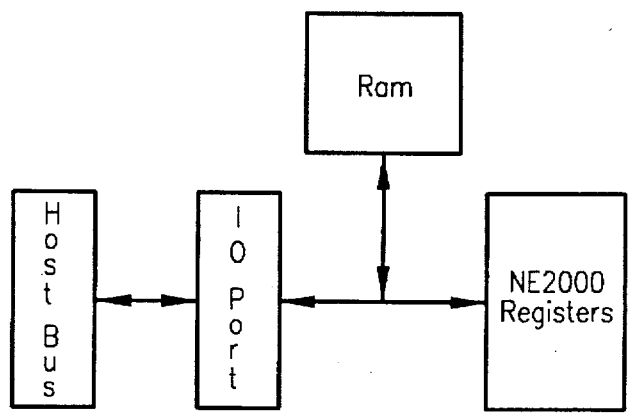
Figure 3:
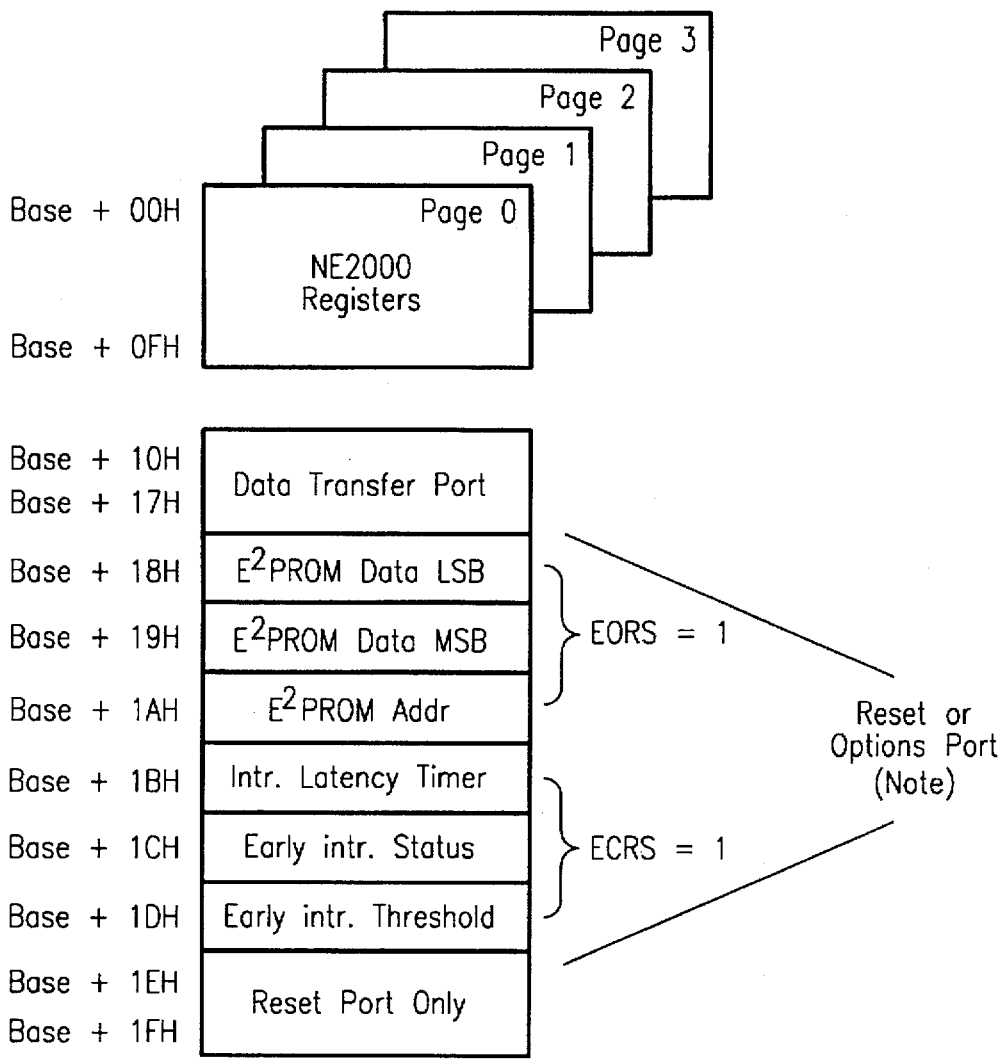

As shown in FIG. 3-1, which is a block diagram of Ethernet controller module 6 (in FIG. 1A), Ethernet controller module 6 is highly integrated and configurable making it suitable for most Ethernet applications. Ethernet controller module 6 integrates the functions of the following blocks.

Section 3.2.1 16 Bit I/O Port Compatible Mode I/O Address Mapping

Referring to FIG. 3-2 is a block diagram of the preferred Intput/Output Port, which is the architecture used by Novell's NE2000. The internatl memory map of Ethernet controller module 6 is accessed a word at a time, via a port within the systems I/O space. Ethernet controller module is programmed by the user to control the transfers between its internal memory and the I/O port.

The base I/O address of Ethernet controller module 6 is configured by the PC87340 Ethernet Control Register (ECR). This occurs either upon power up or by software writing to this register. At that base address the following structure appears.

FIG. 3-3 is a Input/Output Port Mode Register Input/Output Map. The registers within this area are 8 bits wide, but the Ethernet data transfer port and the $E^2PROM$ data port are 16 bits wide. Ethernet controller module 6 registers can be programmed to control the passing of data between its terminal memory and the data transfer port. By accessing the data transfer port (using I/O instructions) the user can transfer data to or from Ethernet controller module 6 internal memory. Ethernet controller module 6 internal memory map is as shown below in TABLE 3-4A and 3-4B.

TABLE 3-4a

| D15 | D0 |
|---|---|
| 0000H | PROM |
| 001FH | Aliased PROM |
| 4000H | 8K × 16 |
| 7FFFH | Logical Buffer RAM |
| 8000H | Aliased PROM |
| C000H | Aliased |
| FFFFH | Buffer RAM |

TABLE 3-4b

| PROM Location | Location Contents |
|---|---|
| 00h | ETHERNET ADDRESS 0 (most significant byte) |
| 01h | ETHERNET ADDRESS 1 |
| 02h | ETHERNET ADDRESS 2 |
| 03h | ETHERNET ADDRESS 3 |
| 04h | ETHERNET ADDRESS 4 |
| 05h | ETHERNET ADDRESS 5 |
| 06h–0Dh | 00h |
| 0Eh, 0Fh | 57h |
| 10h–15h | ETHERNET ADDRESS 0 thru 5 |
| 16h–1Dh | reserved |
| 1Eh, 1Fh | 57h |

TABLE 3-4A shows NIC Core's Memory Map and TABLE 3-4B shows Details of PROM Map.

Ethernet controller module 6 actually has a 64K address range but only does partial decoding on these devices. The PROM data is mirrored at all decodes up to 4000H and the entire map is repeated at 8000H. To access either the PROM or the RAM the user must initiate a Remote DMA transfer between the I/O port and memory.

On a remote read, Ethernet controller module 6 moves data from its internal memory map to the I/O port and the host system reads it by using an 'INW' or 'INSW' instruction from the I/O address of the data transfer port. If the system attempts to read the port before Ethernet controller module 6 has written the next word of data to it Ethernet controller module 6 will insert wait states into the system cycle, using the IOCHRDY line. Ethernet controller module 6 will not begin the next memory read until the previous word of data has been read.

On a remote write, the system writes data to the I/O port, using an 'OUTW' or 'OUTSW' instruction, and Ethernet controller module 6 moves it to its buffer memory. If the system attempts to write to the port before Ethernet controller module 6 has moved the data to memory Ethernet controller module 6 will insert wait states into the system cycle, using the IOCHRDY line. Ethernet controller module 6 will not begin the next memory write until a new word has been written to the I/O port.

Addresses 00H to 1FH are specified as the PROM space for compatibility with the NE2000. This is actually an array of 8 bit registers which are loaded from an external $E^2PROM$ after Ethernet controller module 6 is initialized by an ISA RESET. They should contain the same data as the PROM did in the NE2000 and in the same format. As can be seen the PROM registers are only 8 bits wide. To transfer the data out the user must initiate a 16 bit DMA read transfer and discard the most significant byte of data on each transfer.

At address 00H of the PROM is a six byte Ethernet address for this node. The upper two addresses of the PROM store contain bytes which identify that Ethernet controller module 6 is in 16 bit mode. For 16 bit mode these bytes both contain the value 57H.

Section 3.3 Power on RESET Operation

Figures 3, 4:
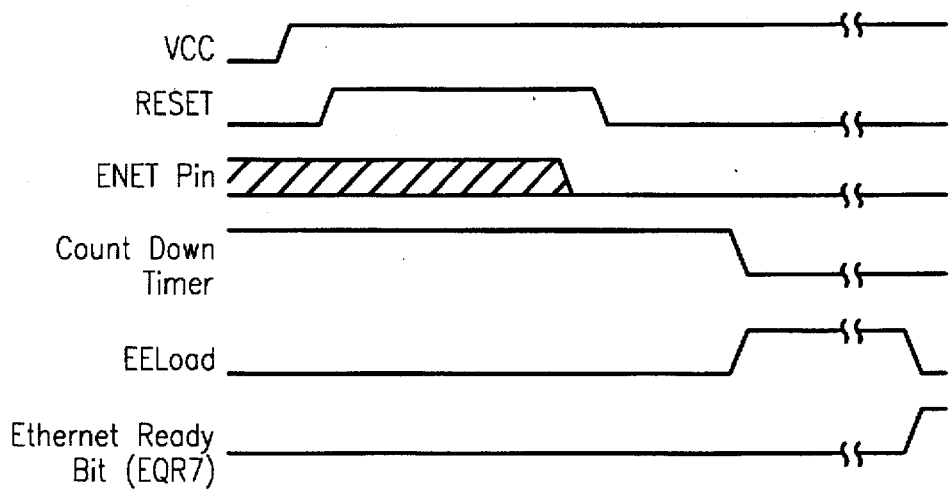

FIG. 3-4 is a timing diagram for the RESET Operation. Ethernet controller module 6 configures itself after a Reset signal is applied. FIG. 3-4 shows how the RESET circuitry operates. FIG. 3-4 is a timing diagram for the RESET Operation A hardware reset (assert/deassert MR) causes the Ethernet Control (ECR) and Ethernet Operations Registers (EOR) from the $E^2PROM$. As shown in FIG. 3-4, if the ENET pin is low during reset then the countdown timer is activated and driven until the clock/crystal input stabilizes. When the countdown timer reaches its trigger point the $E^2PROM$ data is loaded into Ethernet controller module 6. This will take approximately 300 µs. When the countdown timer reaches 0 (approx. XXXX ms). The Ethernet Ready bit (EOR bit 7) will be set. Ethernet controller module 6 can be accessed by software after this time.

If the ENET pin is high during reset then the $E^2PROM$ contents will not be loaded into Ethernet controller module 6 and the Ethernet Ready bit (EOR7) will not be set. In order to access Ethernet controller module 6 software must set the Ethernet Enable bit (ECR7). Once the Ethernet Enable bit is set by software the $E^2PROM$ data will be loaded into Ethernet controller module 6 (Approx. 300 µs), the countdown timer will count down to 0, and set the Ethernet Ready bit. Ethernet controller module 6 should not be accessed if the Ethernet Ready bit is not set.

Ethernet controller module 6 uses an NMC93C06, or $E^2PROM$ with compatible timings. The NMC93C06 is a 256 bit device, arranged as 16 words each 16 bits wide. The programmed contents of the E²PROM is shown in the following TABLE 3-6.

|     | D15           | D0            |
| --- | ------------- | ------------- |
| 0FH | Lock Out      | Not Used      |
| 0EH | EOR           | ECR           |
|     | •             | •             |
|     | •             | •             |
|     | •             | •             |
| 09H |               |               |
| 08H | 57H           | 57H           |
|     | •             | •             |
|     | •             | •             |
|     | •             | •             |
| 03H | Reserved      | Reserved      |
| 02H | E'net Address 5 | E'et Address 4 |
| 01H | E'net Address 3 | E'net Address 2 |
| 00H | E'net Address 1 | E'net Address 0 |

Section 3.4 Mapping E²PROM Into PROM Space

Data is read from the E²PROM at boot time and stored in registers within Ethernet controller module 6. While this operation takes place Ethernet controller module 6 can not be accessed by the system. These registers are mapped into the space traditionally occupied by the PROM in the NE2000.

Section 3.4.1 I/O Port

The user should program the E2PROM to contain the Ethernet address in the first six bytes and whatever is required by the driver in the next 8 bytes. The user should then program 5757H into location 08H. This determines the 16-bit operation of the controller.

Note that Ethernet controller module 6 in the PC87340 is not capable of transferring data in 8-bit mode.

Ethernet controller module 6 reads the first 8 words from the E²PROM and maps them into the memory map at the appropriate address.

Section 3.4.2 Loading Configuration from E²PROM

After reset Ethernet controller module 6 Controller's configuration is read from the E²PROM. The configuration data is stored within the word at location 0EH of the E²PROM's address space. EOR and ECR are located in this word, as shown in TABLE 3-6.

Section 3.4.5 Writing the E²PROM

It is possible to reprogram the whole E²PROM or any part of it via accesses through the PC87340. The steps listed below describe the procedure.

Note: Writes to the E²PROM are only allowed to address 0EH if the Lock Out code of 73H has been programmed to address 0FH. Address 0EH contains the Configuration register data for the PC87340 Ethernet Control (ECR) and Ethernet Operations Registers (EOR).

1. Set bit 3 of the EOR to enable access to the E²PROM program registers.
2. Program the E2PROM address register in the Ethernet Controller in preferred system. This register is at address base+1AH into this register load the address (00H–0FH) of the word to be written into the E²PROM.

Note: Base is the base I/O address of Ethernet controller module 6 programmed into bits 0–2 of the ECR (e.g. 0300H)

3. Write the word to be programmed to the E²PROM data port in the Ethernet controller module in preferred system embodiments. This register is base+18H. On the trailing edge of the write strobe Ethernet controller module 6 will check the upper word of the E²PROM set the EEBUSY bit and compare it to 73H. If this word is NOT 73H or the address to be written is 0EH, the EEBUSY bit in the E²PROM Address Register will be set and the data will be written to the E²PROM. The EE_BUSY bit will be automatically reset after the write finishes. If this word is 73H and the E²PROM address to be written is NOT 0EH then no write will take place and EEBUSY bit will be deasserted.
4. Poll the EE_BUSY bit until it is 0. This indicates that the data has been read from the E²PROM and is in the data port (base+18H).
5. Repeat steps 2 and 3 until all writes are complete.

Section 3.4.4 Reading the E²PROM

1. Set bit 3 of the EOR to enable access to the E²PROM program registers.
2. Program the E²PROM address register in the PC87340 Ethernet controller module. This register is at address base+1AH. Into this register load the address (00H–0FH) of the word to be read from the E²PROM.

Note Base is the base I/O address of Ethernet controller module 6 programmed into bits 0–2 of the ECR (e.g. 0300H).

3. Set the EE_READ bit in the EPROM Address Register. This sets the EE BUSY bit to 1.
4. Poll the EE_BUSY bit until it is 0. This indicates that the data has been read from the E²PROM and is in the data port (base+18H).
5. Read the word from the data port (base+18H). The read causes the EE BUSY bit to be set, the address pointer to be incremented and the next read from the E²PROM to begin.
6. Repeat steps 3 and 4 until all desired words are read.
7. Clear the EE_READ bit to 0. The EE_BUSY bit will return to 0 when the E2PROM control interface returns to idle.

Section 3.4.5 Loading the Configuration from the System EPROM

The default mode that loads the Ethernet Configuration and Port ID uses the E²PROM. However, as a cost savings, this information can be loaded from the System EPROM by pulling the pin EE_OFF hight during reset.

When EE_OFF is sensed high during reset, the E²PROM interface is disabled and the system is given direct access to the preferred system embodiment shadow PROM array, as described above and hereinabove, through I/O reads or writes. Loading the information from the System EPROM is done as follows:

1. Enable access to the E²PROM Address and Data Registers (1AH, 18H) by setting bit 3 in Ethernet Operations REgister (EOR) in the Configuration register Set.
2. Bits 2-0 in the E²PROM Address Register (EAR, 1AH) are used to select the address of the shadwo PROM array word (The upper bits of the EAR are not used in this mode).
3. once the address has been programmed via EAR (2:0), a read or write can be performed through E²PROM Data REgister (EDR, 18H).

4. The address must be set for each read or write operation.

This parallel read/write access invention implements a single, coherent system access to the E²PROM device. The operation of reading the lower either words of E²PROM data on hardware reset remains the same. Writing the data back to the E²PROM is improvied by creating a 16-bit bi-directional dat port and an 8-bit address and control port. Whether programming the configuration locations or the lower word locations, teh programmer's interface is consistent. The advantages described herein will be better appreciated upon review of the Application Note 338 by Masood Alavi of National Semiconductor entitled Designing with the NM93C06 A Versatile Simple to Use E²PROM" and the Datasheet for NM93C06, which are both herein incorporated by reference.

Section 3.5 Ethernet Option and Reset Registers

Section 3.5.1 Overview

In addition to the standard NIC Registers described in the following sections, two new register groups have been added. These are described here and pertain to the Early Interrupt option used when receiving packets and the in-system E²PROM read and write feature. These registers occupy the standard NE2000 I/O Port Reset Addresses from Base+18H to Base+1DH. These options are selected via when the Configuration registers in the preferred system embodiments 2 ECR bit 6 and /or EOR bit 3 are set. The NE2000 Reset Port function is also described here.

Section 3.5.2 Reset Port Registers

During standard NE2000 operation (ECR bit 6 and EOR bit 3 are cleared) performing the following functions to any register between Base+18H and Base+1FH will reset the NIC:

1. Read the register
2. Wait at least the required hardware reset pulse duration
3. Write a any value to the register location.

When enabled the E2PROM and the Early Interrupt options described below use some of these reset registers. Registers at those locations are unavailable for resetting the part during those time. However, the registers at 1EH and 1FH are always available for reset regardless of the options that may be enabled.

Section 3.5.5 Early Interrupt Operation

The Early Interrupt capability works during reception of a packet when the function is enabled via the EOR and ECR Configuration registers as described above. It allows some of the steps carried out durig the beginning of packet reception to be done in parallel. This is done by programming the controller to interrupt the hsot before the end of the packet has been received. The interrupt is activated when the number of bytes containing the packet's protocol-specific description have been received.

This information is then passed to the protocol stack by the driver in response to the interupt and a decision to accept or reject the packet is made. If it is to be accepted, then the driver can either move some portin of the received packet and then wait for the packet reception to compleete or the driver can set the controller to interupt near the end of the packet and move the rest of the packet at that point. In either case, some short time after packet reception completes, the packet data will be completely moved to its final location.

In order to optimize the packet reception time relative to the host system's interrupt latency resonse a programmable interrupt latency counter (ILC) is available. This latency counter is used to adjust the byte threshold which determines when the controller asserts the Early Interrupt.

Initially, the driver chooses a reasonable byte count for the Early Interrupt threshold. Whenever an Early Interrupt is asserted the ILC is enabled and incremented after each 800 ns period (1 received byte timeon the network). This continues until the driver reads the Interrupt Status REgister (ISR) which freezes the ILC (The ISR is the first register read by the interupt service routine). The driver reads the ILC and averages this number with previous ILC results and then adjusts the EArly Interupt threshold. The threshold is adjusted so that the interupt will be asserted before the protocol-specific description is completely received, but due to the system interrupt latency, the interrupt service routine wil not get to access the controller until the remainder of the protocol-specific description has been received.

When dynamically changing the threshold level the following should be done.

1. Mask the Early Interrupt by clearing bit 7 of the Early Interupt Status Register (EIS).
2. Change the threshold to the new value.
3. Clear the Entry Interrupt, bit 6 of the EIS register by wiritng a 1 to it.
4. Unmask the Early Interrupt by setting bit 7 of teh EIS register.

FIG. 3-7A is a diagram showing the preferred implementation for Early Interrupt in an NE2000 Compatible Network Controller. FIGS. 3-7B and 3-7F are timing diagrams showing the operation of the early interrupt operations.

In addition, please note the following alternate preferred embodiment, wherin the threshold is relative for a variable number of bits, as shown in the following TABLE 3-7A.

TABLE 3-7A

| EIS [2:0] | Threshold |
|---|---|
| 0 0 0 | 8-bit relative |
| 0 0 1 | 9-bit relative |
| 0 1 X | 10-bit relative |
| 1 X X | 11-bit relative (which is absolute for ethernet) | wherein Ethernet Max Packet=15118 bytes <2".

Section 3.5.4 Early Interrupt Registers

These three registers contain the status and control information needed to implement an interrupt service routine which allows the host to get advanced notice that data from a receive packet is being accepted by the NIC. These three registers can only be accessed if the Early Interrupt Address Enable bit of the Ethernet Control Register ECR6 (bit 6) is set.

These registers are called the Interrupt Latency Timer (ILT), Early Interrupt Status (EIS) and the Early Interrupt Threshold (EIT) and are located at the base I/O address+ IBH, 1CH, and 1DH, respectively. The normal range of reset registers for the NE2000 NIC (base+18H to 1FH) includes these and they can still be used to reset the part if ECR6 is NOT set. If ECR6 is set, then only 18H–1AH, IEH, and 1FH can be used as reset. Note the base I/O address is set in the ECR Register bits 0–2.

Section 3.5.4.1 Interrupt Latency Timer (ILT)

IBH (Read)

This register indicates the duration of time between the Receive Packet interrupt and the subsequent read of the interrupt Service register (ISR). This register will increment every 800 ns (1 Ethernet byte time) as soon as the Receive packet interrupt occurs. It will stop a soon as the ISR is read. The ILT clears automatically after it is read. This counter is "sticky" and will not pass FFH.

In particular, in a system using an NE2000 compatible network controller, system performance is based on both the data rate of teh controller and teh interrupt response time fo the software device driver. Preferred system embodiments implement a timer, which begins counting when a network interupt occrus. This timer, the interrupt latency timer, increments once very eight (8) transmit clock cycles. This time corresponds to an ethernet byte time. The timer stops incrementing when the interupt status is read by the network driver. The timer clears to zero after being read. When used with an early interrupt capable network controller, the ILT can be used to achieve optimum driver operation. The ILT is read after every network interrupt and the software driver keeps a running average of response time. Once, the current packet length has beenraed from the buffer, the driver programs the early interrupt thrshold to interrupt prior to the end of packet by the number of bytes indicated in teh smallest ILT value.

Early Interrupt Threshold=No. of bytes–ILT min

The software wil begin processing the apcket at the time the packet reception completes, saving the interrupt latency time and increasing the overall system performance.

Section 3.5.4.2 Early Interrupt Status Register (EIS)

1CH (Read/Write)

This register contains the status and control information for the Early Interrupt Feature. It also contains the 3 most significant bits of the interrupt threshold in the following TABLE 3-5-3-2

TABLE 3-5-3-2

| 7 | 6 | 5 | 4 | 3 | 2 | 1 | 0 |
|---|---|---|---|---|---|---|---|
| EIM | EI | PRX | OVW | RXE | T10 | T9 | T8 |

- D2-0 T10-8 Most Significant Threshold bits: These are the upper 3 bits of the threshold that when combined with the lower 8 bits (in the Early Interrupt Threshold Register) form the Early Interrupt Threshold. When received data reaches this level an Early Interrupt will be issued, if it is enabled. If the threshold is all 0s then the Early Interrupt function and bit EIS6 are disabled.
- D3 RXE Receive Error: Indicates that a packet was received with one or more of the following errors: CRC error, Frame Alignment Error, FIFO Overrun, and/or Missed Packet. This bit is identical to bit 2 in the Interrupt Status Register of the NE2000 NIC.
- D4 OVW Overwrite warning: Set when receive buffer resources have been exhausted (Local DMA has reached the boundary pointer). This bit is identical to bit 4 in the Interrupt Status Register of the NE2000 NIC.
- D5 PRX Packet Received: Indicates a packet has been received with no errors. This bit is identical to bit 0 in the Interrupt Status Register of the NE2000 NIC.
- D6 EI Early Interrupt: This bit is set when the received byte count has equaled the programmed Early Interrupt Threshold. This bit is cleared by writing a one to it.
- D7 EIM Early Interrupt Mask: This bit will stop the Early Interrupt from being issued to the system if it is a 0. If it is a 1, it will allow an active Early Interrupt to be issued to the system. This bit does not affect bit 6 of this register.

Section 3.5.4.3 Early Interrupt Threshold Register (EIT)

1DH (Read/Write)

As shown in the following TABLE 3-5-3-3, This register contains the lower 8 bits of the programmed threshold which are combined with the EIS bits 0–2 to form the Early Interrupt Threshold Limit. When received data reaches this threshold an Early Interrupt will be issued, if it is enabled.

TABLE 3.5.3.3

| 7 | 6 | 5 | 4 | 3 | 2 | 1 | 0 |
|---|---|---|---|---|---|---|---|
| T7 | T6 | T5 | T4 | T3 | T2 | T1 | T0 |

Section 3.5.5 E²PROM Interface Registers

These registers are called the E²PROM Address Register (EAR)and the E2PROM Data Register (EDR)18H (Read/Write). They contain control, address, and data information for accessing and programming the E²PROM. These two registers can only be accessed if the E²PROM Address Enable bit of the Ethernet Operations Register EOR3 (bit 3) is set.

The E²PROM Address Register (EAR) and the E2PROM Data Register (EDR) are located at the base I/O address+ 1AH and 18H, respectively. The normal range of reset registers for the NE2000 NIC (base+18H to 1FH) includes these and they can still be used to reset the part if EOR3 is NOT set. If EOR3 is set, then only IBH–IFH can be used as reset.

NOTE: The base I/O address is set in the ECR Register bits 0–2.

Section 3.5.5.1 E²PROM Address Register (EAR)

1AH (Read/Write)

As shown in the following TABLE 3-5-4-1, This register contains the status and control information for the E²PROM Address Register. It also contains the 5 address bits of the E2PROM space.

TABLE 3-5-4-1

| 7 | 6 | 5 | 4 | 3 | 2 | 1 | 0 |
|---|---|---|---|---|---|---|---|
| EE_BUSY | EE_READ | A5 | A4 | A3 | A2 | A1 | A0 |

- D5-0 A5-0 E²PROM Address: These bits select the address of the E2PROM that will be accessed. A5 is the MSB and A0 is the LSB. When using the NMC93C06 only A3-0 are valid.
- D6 EE_READ E²PROM Read: Setting this bit causes the PC87340 to read the E PROM location currently pointed to by bits A5–0.
- D7 EE_BUSY E²PROM Busy: When this bit is set the PC87340 is accessing the E²PROM. This bit is automatically cleared when the access is completed.

Section 3.5.5.2 E²PROM Data Register (EDR)

18H (Read/Write)

As shown in TABLE 3-5-4-2, this register contains the 16 bits of the data which have been read from or will be written to the E2PROM.

TABLE 3-5-4-2

| E²PROM Data Bits | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| D15 | D14 | D13 | D12 | D11 | D10 | D9 | D8 | D7 | D6 | D5 | D4 | D3 | D2 | D1 | D0 |

Section 3.6 NE2000 Registers

Section 3.6.1 OVERVIEW

Figures 3, 4, 5:
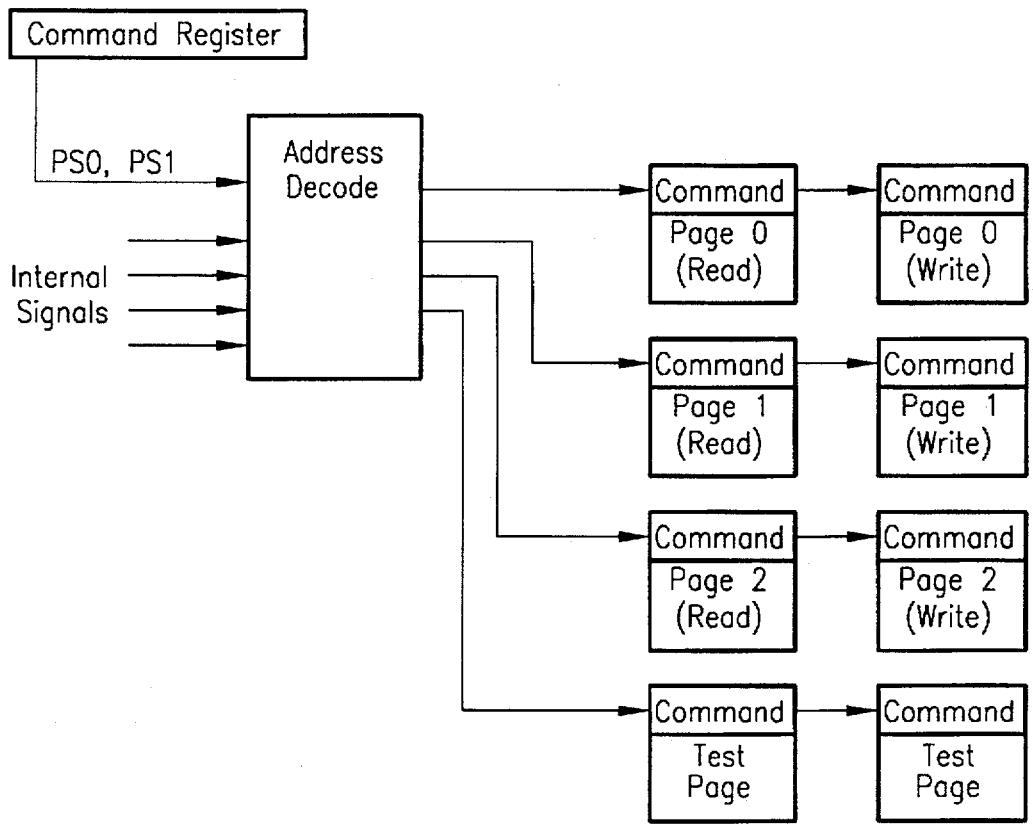

FIG. 3-5 is a block diagram showing the preferred register address mapping scheme. All Network Interface Controller registers are 8 bits wide and mapped into three pages which are selected in the Command Register (PS0, PS1). Pins A0–A3 are used to address registers within each page. Page 0 registers are those registers which are commonly addressed during Ethernet controller module operation, while page 1 registers are used primarily for initialization. The registers are partitioned to avoid having to perform two write/read cycles to access commonly used registers. Page 3 registers are special purpose test registers which should never be accessed by the user. Setting PS0, PS1 to point to page 3 will not have an adverse affect on Ethernet controller module 6, but I/O reads and writes are strictly prohibited while Ethernet controller module 6 is in operation.

Section 3.6.2 Register Map

The following TABLE 3-6-2 shows the preferred register map.

| A0–A3 | RD | | WR | |
|---|---|---|---|---|
| Page 0 Address Assignments (PS1 = 0, PS0 = 0) | | | | |
| 00H | CR | Command | CR | Command |
| 01H | CLDA0 | Current Local DMA Address 0 | PSTART | Page Start Register |
| 02H | CLDA1 | Current Local DMA Address 1 | PSTOP | Page Stop Register |
| 03H | BNRY | Boundary Pointer | BNRY | Boundary Pointer |
| 04H | TSR | Transmit Status Register | TPSR | Transmit Page Start Address |
| 05H | NCR | Number of Collisions Register | TBCR0 | Transmit Byte Count Register 0 |
| 06H | FIFO | FIFO | TBCR1 | Transmit Byte Count Register 1 |
| 07H | ISR | Interrupt Status Register | ISR | Interrupt Status Register |
| 08H | CRDA0 | Current Remote DMA Address 0 | RSAR0 | Remote Start Address Register 0 |
| 09H | CRDA1 | Current Remote DMA Address 1 | RSAR1 | Remote Start Address Register 1 |
| 0AH | | Reserved | RBCR0 | Remote Byte Count Register 0 |
| 0BH | | Reserved | RBCR1 | Remote Byte Count Register 1 |
| 0CH | RSR | Receive Status Register | RCR | Receive Configuration register |
| 0DH | CNTR0 | Tally Counter 0 (Frame Alignment Errors) | TCR | Transmit Configuration register |
| 0EH | CNTR1 | Tally Counter 1 (CRC Errors) | DCR | Data Configuration register |
| 0FH | CNTR2 | Tally Counter 2 (Missed Packet Errors) | IMR | Interrupt Mask Register |
| Page 1 Address Assignments (PS1 = 0, PS0 = 1) | | | | |
| 00H | CR | Command | CR | Command |
| 01H | PAR0 | Physical Address Register 0 | PAR0 | Physical Address Register 0 |
| 02H | PAR1 | Physical Address Register 1 | PAR1 | Physical Address Register 1 |
| 03H | PAR2 | Physical Address Register 2 | PAR0 | Physical Address Register 2 |
| 04H | PAR3 | Physical Address Register 3 | PAR0 | Physical Address Register 3 |
| 05H | PAR4 | Physical Address Register 4 | PAR0 | Physical Address Register 4 |
| 06H | PAR5 | Physical Address Register 5 | PAR0 | Physical Address Register 5 |
| 07H | CURR | Current Page Register | CURR | Current Page Register |
| 08H | MAR0 | Multicast Address Register 0 | MAR0 | Multicast Address Register 0 |
| 09H | MAR1 | Multicast Address Register 1 | MAR1 | Multicast Address Register 1 |
| 0AH | MAR2 | Multicast Address Register 2 | MAR2 | Multicast Address Register 2 |
| 0BH | MAR3 | Multicast Address Register 3 | MAR3 | Multicast Address Register 3 |
| 0CH | MAR4 | Multicast Address Register 4 | MAR4 | Multicast Address Register 4 |
| 0DH | MAR5 | Multicast Address Register 5 | MAR5 | Multicast Address Register 5 |
| 0EH | MAR6 | Multicast Address Register 6 | MAR6 | Multicast Address Register 6 |
| 0FH | MAR7 | Multicast Address Register 7 | MAR7 | Multicast Address Register 7 |
| Page 2 Address Assignments (PS1 = 1, PS0 = 0) | | | | |
| 00H | CR | Command | CR | Command |
| 01H | PSTART | Page Start Register | CLDA0 | Current Local DMA Address 0 |
| 02H | PSTOP | Page Stop Register | CLDA1 | Current Local DMA Address 1 |
| 03H | RNPP | Remote Next Packet Pointer | RNPP | Remote Next Packet Pointer |
| 04H | TPSR | Transmit Page Start Address | | Reserved |
| 05H | LNPP | Local Next Packet Pointer | LNPP | Local Next Packet Pointer |
| 06H | AC1 | Upper Address Counter | AC1 | Upper Address Counter |
| 07H | AC0 | Lower Address Counter | AC0 | Lower Address Counter |
| 08H | CMSR | Compatibility Mode Select Register | CMSR | Compatibility Mode Select |

-continued

| A0–A3 | | RD | WR |
|---|---|---|---|
| 09H | | Reserved | Register Reserved |
| 0AH | RIR | Revision ID Register | Reserved |
| 0BH | | Reserved | Reserved |
| 0CH | RCR | Receive Configuration register | Reserved |
| 0DH | TCR | Transmit Configuration register | Reserved |
| 0EH | DCR | Data Configuration register | Reserved |
| 0FH | IMR | Interrupt Mask Register | Reserved |

Section 3.7 Register Descriptions

Section 3.7.1 Command Register (CR)

TABLE 3-7-1

| 00H Page 0,1, or 2 (Read/Write) | | | | | | | |
|---|---|---|---|---|---|---|---|
| 7 | 6 | 5 | 4 | 3 | 2 | 1 | 0 |
| PS1 | PS0 | RD2 | RD1 | RD0 | TXP | STA | STP |

The Command Register shown in TABLE 3-7-1, shown above, is used to initiate transmissions, enable or disable Remote DMA operations, and to select register pages. To issue a command the microprocessor sets the corresponding bit(s) (RD2, RD1, RD0, TXP). Further commands may be overlapped, but with the following rules:

1. If a transmit command overlaps with a remote DMA operation, bits RD0, RD1, and RD2 must be maintained for the remote DMA command when setting the TXP bit. Note that if a remote DMA command is reissued when giving the transmit command, the DMA will complete immediately if the remote byte count register has not been reinitialized.

2. If a remote DMA operation overlaps a transmission, RD0, RD1 and RD2 may be written with the desired values and a "0" written to the TXP bit. Writing a "0" to this bit has no effect.

3. A remote write DMA may not overlap remote read operation or vice versa. Either of these operations must either complete or be aborted before the other operation may start. Bits PS1, PS0, RD2 and STP may be set any time.

D0 STP - Stop: MAC offline command: When set to 1 this takes the ethernet Media Access Controller off-line. Receive packets in progress will be aborted and buffer resources reclaimed. Transmit packets currently transmitting (TXE high) will continue until normal completion. Transmit packets currently deferred (TXP=1, TXE low) will be aborted with the TXP bit remaining set. Remote DMA functions remain active when STP is high. STP POWERS UP HIGH. Please note that if Ethernet controller module 6 has previously been in start mode and the STP is set, both the STP and STA bits will remain set.

D1 STA - Start: When set to a 1 this bit is used to activate Ethernet controller module 6 after either power up, or when Ethernet controller module 6 Tx and Rx state machines have been reset by setting STP=1 or an error occurred. STA POWERS UP LOW.

D2 TXP - Transmit Packet: This bit must be set to initiate transmission of a packet. TXP is internally reset after the transmission is completed or aborted. This bit should be set only after the Transmit Byte Count and Transmit Page Start registers have been programmed.

D3–D5 RD0–RD2 - Remote DMA Command: These three encoded bits control operation of the Remote DMA channel. RD2 can be set to abort any Remote DMA command in progress. The Remote Byte Count Registers should be cleared when a Remote DMA has been aborted. The Remote Start Addresses are not restored to the starting address if the Remote DMA is aborted.

| RD2 | RD1 | RD0 | |
|---|---|---|---|
| 0 | 0 | 0 | Not Allowed |
| 0 | 0 | 1 | Remote Read |
| 0 | 1 | 0 | Remote Write |
| 0 | 1 | 1 | Send Packet |
| 1 | X | X | Abort/Complete |

D6, D7 PS0, PS1 - Page Select: These two encoded bits select which register page is to be accessed with address A0–3.

| PS1 | PS0 | |
|---|---|---|
| 0 | 0 | Register Page 0 |
| 0 | 1 | Register Page 1 |
| 1 | 0 | Register Page 2 |
| 1 | 1 | Page 3 Test Registers (Page 3 should not be accessed) |

Section 3.7.2 INTERRUPT STATUS REGISTER (ISR)

TABLE 3-7-2

| 07H Page 0 (Read/Write) | | | | | | | |
|---|---|---|---|---|---|---|---|
| 7 | 6 | 5 | 4 | 3 | 2 | 1 | 0 |
| RST | RDC | CNT | OVW | TXE | RXE | PTX | PRX |

As shown in TABLE 3-7-2, this register is accessed by the host processor to determine the cause of an interrupt. Any interrupt can be masked in the Interrupt Mask Register (IMR). Individual interrupt bits are cleared by writing a "1" into the corresponding bit of the ISR. The INT signal is active as long as any unmasked signal is set, and will not go low until all unmasked active bits in this register have been cleared. The ISR must be cleared after power up by writing it with all 1's.

- D0 PRX - Packet Received: Indicates packet received with no errors.
- D1 PTX - Packet Transmitted: Indicates packet transmitted with no errors.
- D2 RXE - Receive Error: Indicates that a packet was received with one or more of the following errors: CRC Error, Frame Alignment Error, FIFO Overrun, and/or Missed Packet.
- D3 TXE - Transmit Error: Set when a packet is transmitted with one or more of the following errors: Excessive Collisions and/or FIFO Underrun.
- D4 OVW - Overwrite Warning: Set when the receive buffer ring storage resources have been exhausted (Local DMA has reached Boundary Pointer).
- D5 CNT - Counter Overflow: Set when MSB of one or more of the Network Tally Counters has been set.
- D6 RDC - Remote DMA Complete: Set when Remote DMA operation has been completed.
- D7 RST - Reset Status: Set when Ethernet controller module 6 enters the reset state and cleared when a Start Command is issued to the CR. Writing to this bit has no effect. Note that this bit does not generate an interrupt, it is merely a status indicator.

Section 3.7.3 Interrupt Mask Register (IMR)

is set, an interrupt will be issued whenever the corresponding bit in the ISR is set. If any bit in the IMR is set low, an interrupt will not occur when the corresponding bit in the ISR is set. The IMR powers up all zeros.

- D0 PRXE - Packet Received Interrupt Enable
  - 0: Interrupt disabled.
  - 1: Enables interrupt when packet received.
- D1 PTXE - Packet Transmitted Interrupt Enable
  - 0: Interrupt disabled.
  - 1: Enables interrupt when packet is transmitted.
- D2 RXEE - Receive Error Interrupt Enable
  - 0: Interrupt disabled.
  - 1: Enables interrupt when packet received with error.
- D3 TXEE - Transmit Error Interrupt Enable
  - 0: Interrupt disabled.
  - 1: Enables interrupt when packet transmission results in error.
- D4 OVWE - overwrite warning Interrupt Enable
  - 0: Interrupt disabled.
  - 1: Enables interrupt when Buffer Management Logic lacks sufficient buffers to store incoming packet.
- D5 CNTE - Counter Overflow Interrupt Enable
  - 0: Interrupt disabled.
  - 1: Enables Interrupt when MSB of one or more of the Network Statistics counters has been set.
- D6 RDCE - DMA Complete Interrupt Enable
  - 0: Interrupt disabled.
  - 1: Enables Interrupt when Remote DMA transfer has been completed.
- D7 reserved: reserved. Powers up high.

TABLE 3-7-3

| 0FH Page 0 (Write); 0FH Page 2 (Read) | | | | | | | |
|---|---|---|---|---|---|---|---|
| 7 | 6 | 5 | 4 | 3 | 2 | 1 | 0 |
| RSV | RDCE | CNTE | OVWE | TXEE | RXEE | PTXE | PRXE |

TABLE 3-7-3 is the Interrupt Mask Register is used to mask interrupts. Each interrupt mask bit corresponds to a bit in the Interrupt Status Register (ISR). If an interrupt mask bit Section 3.7.4 Date Configuration register (DCR)

TABLE 3-7-4A

| 0EH Page 0 (Write); 0EH Page 2 (Read) | | | | | | | |
|---|---|---|---|---|---|---|---|
| 7 | 6 | 5 | 4 | 3 | 2 | 1 | 0 |
| – | FT1 | FT0 | AR | LS | – | – | – |

This register is used to select Loopback Mode, autoinitialize Remote DMA, and to establish FIFO thresholds. The DCR must be initialized prior to loading the Remote Byte Count Registers.

D0 Reserved

Setting 1 or 0 has no effect on the NIC.
Note word-wide mode is permanently selected.

D1 Reserved

Setting 1 or 0 has no effect on the NIC.
Note the MS byte is permanently placed on AD15–AD8 and the LS byte is on AD7–AD0.

D2 Reserved

Setting 1 or 0 has no effect on the NIC.

D3 LS Loopback Select

0: Loopback mode selected. Bits D1 and D2 of the TCR must also be programmed for Loopback operation.
1: Normal Operation D4 AR - Autoinitialize Remote 0: Send Command not executed. All packets are removed from Buffer Ring under program control.
1: Send Command executed. Remote DMA auto-initialized to remove packets from Buffer Ring.

D5, D6 FT0, FT1 - FIFO Threshold Select Encoded FIFO threshold. Establishes point at which bus requested when filling or emptying the FIFO. During reception, the FIFO threshold indicates the number of bytes (or words) the FIFO has filled serially from the network before the transfer into on-chip memory starts. Note: FIFO threshold setting determines the Local DMA burst length.

TABLE 3-7-4B

| RECEIVE THRESHOLDS | | | |
|---|---|---|---|
| FT1 | FT0 | Word Wide | Byte Wide |
| 0 | 0 | 1 Word | 2 Bytes |
| 0 | 1 | 2 Words | 4 Bytes |
| 1 | 0 | 4 Words | 8 Bytes |
| 1 | 1 | 6 Words | 12 Bytes |

During transmission, the FIFO threshold indicates the number of bytes (or words) removed from the FIFO by the MAC before transfer from the memory starts. Thus, the transmission threshold is 16 bytes less than the receive threshold.

D7 Reserved - Powers up 1.

Section 3.7.5 Transmit Configuration register (TCR)

TABLE 3-7-5A

| 0DH Page 0 (Write); 0DH Page 2 (Read) | | | | | | | |
|---|---|---|---|---|---|---|---|
| 7 | 6 | 5 | 4 | 3 | 2 | 1 | 0 |
| – | – | – | OFST | ATD | LB1 | LB0 | CRC |

The Transmit Configuration register shown in TABLE 3-7-5 establishes the actions of the transmitter section of Ethernet controller module 6 during transmission of a packet on the network. LB1 AND LB0, WHICH SELECT LOOPBACK MODE, POWER UP AS 0.

D0 CRC - Inhibit CRC

0: CRC appended by transmitter.
1: CRC inhibited by transmitter.

In loopback mode CRC can be enabled or disabled to test the CRC logic.

D1, D2 LB0, LB1 - Encoded Loopback Control: These encoded configuration bits set the type of loopback that is to be performed. This places the SNI in loopback mode and D3 of the DCR must be set to zero for loopback operation.

TABLE 3-7-5B

| | LB1 | LB0 | |
|---|---|---|---|
| Mode 0 | 0 | 0 | Normal Operation |
| Mode 1 | 0 | 1 | NIC Loopback |
| Mode 2 | 1 | 0 | ENDEC Loopback |
| Mode 3 | 1 | 1 | External Loopback |

D3 ATD - Auto Transmit Disable: This bit allows another station to disable Ethernet controller module 6's transmitter by transmission of a particular multicast packet. The transmitter can be re-enabled by resetting this bit or by reception of a second particular multicast packet.

0: Normal operation.
1: Reception of multicast address hashing to bit 62 disables the transmitter. Reception of multicast address hashing to bit 63 enables the transmitter.

D4 OFST - Collision Offset Enable: This bit modifies the backoff algorithm to allow prioritization of nodes.

0: Backoff Logic implements normal algorithm.
1: Forces Backoff algorithm modification to 0 to $2^{min(3+n, 10)}$ slot times for first three collisions, then follows standard backoff. (For first three collisions, the station has higher average backoff delay making a low priority mode).

D5 Unused

Setting 1 or 0 has no effect.

D6 reserved: 0

D7 reserved: 1

3.7.6 Transmit Status Register (TSR)

TABLE 3-7-6

| 04H Page 0 (Read) | | | | | | | |
|---|---|---|---|---|---|---|---|
| 7 | 6 | 5 | 4 | 3 | 2 | 1 | 0 |
| OWC | CDH | FU | CRS | ABT | COL | DFR | PTX |

This register shown in TABLE 3-7-6 records events that occur on the media during transmission of a packet. It is cleared when the next transmission is initiated by the host. All bits remain low unless the event that corresponds to a particular bit occurs during transmission. Each transmission should be followed by a read of this register. The contents of this register are not specified until after the first transmission.

D0 PTX - Packet Transmitted: Indicates transmission without error (No excessive collisions or FIFO underrun) (ABT="0", FU="0".)

D1 DFR - Defer to Network: Indicates that the network was active when a transmit command was issued. Ethernet controller module 6 has to defer to the network prior to transmission.

D2 COL - Transmit Collided: Indicates that the transmission collided at least once with another station on the network. The number of collisions is recorded in the Number of Collisions Registers (NCR).

D3 ABT - Transmit Aborted: Indicates Ethernet controller module 6 aborted transmission because of excessive collisions. (Total number of transmissions including original transmission attempt equals 16).

D4 CRS - Carrier Sense Lost: This bit is set when carrier is lost during transmission of the packet. Carrier Sense is monitored from the end of Preamble/Synch until TXEN is dropped. Transmission of the packet will not be aborted if the carrier is lost.

D5 FU - FIFO Underrun: If Ethernet controller module 6 cannot gain access of the bus before the FIFO empties, this bit is set. Transmission of the packet will be aborted.

D6 CDH - CD Heartbeat: Failure of the transceiver to transmit a collision signal after transmission of a packet will set this bit. The Collision Detect (CD) heartbeat signal must commence during the first 6.4 µs of the Interframe Gap following a transmission. In certain collisions, the CD Heartbeat bit will be set even though the transceiver is not performing the CD heartbeat test.

D7 OWC - Out of Window Collision: Indicates that a collision occurred after a slot time (51.2 µs). Transmissions rescheduled as in normal collisions.

3.7.7 Receive Configuration register (RCR)

This register as shown in TABLE 3-7-7 determines operation of Ethernet controller module 6 during reception of a packet and is used to program what types of packets to accept.

D0 SEP - Save Errored Packets
  0: Packets with receive errors are rejected.
  1: Packets with receive errors are accepted. Receive errors are CRC and Frame Alignment errors.

D1 AR - Accept Runt Packets: This bit allows the receiver to accept packets that are smaller than 64 bytes. The packet must be at least 8 bytes long to be accepted as a runt.
  0: Packets with fewer than 64 bytes rejected.
  1: Packets with fewer than 64 bytes accepted.

D2 AB - Accept Broadcast: Enables the receiver to accept a packet with an all 1's destination address.
  0: Packets with broadcast destination address rejected.
  1: Packets with broadcast destination address accepted.

D3 AM - Accept Multicast: Enables the receiver to accept a packet with a multicast address. All multicast addresses must pass the hashing array.
  0: Packets with multicast destination address not checked.
  1: Packets with multicast destination address checked.

D4 PRO - Promiscuous Physical: Enables the receiver to accept all packets with a physical address.
  0: Physical address of node must match the station address programmed in PAE0-PAR5.
  1: All packets with physical addresses accepted.

D5 MON - Monitor Mode: Enables the receiver to check addresses and CRC on incoming packets without buffering to memory. The Missed Packet Tally counter will be incremented for each recognized packet.
  0: Packets buffered to memory.
  1: Packets checked for address match, good CRC and Frame Alignment, but not buffered to memory.

D6 reserved: 0

D7 reserved: 1

Note D2 and D3 are "OR'd" together, i.e. if D2 and D3 are set, Ethernet controller module 6 will accept broadcast and multicast addresses as well as its own physical address. To establish full promiscuous mode, bits D2, D3 and D4 should be set. In addition, the multicast hashing array must be set to all 1's in order to accept all multicast addresses.

TABLE 3-7-7

| 0CH Page 0 (Write); 0CH Page2 (Read) | | | | | | | |
|---|---|---|---|---|---|---|---|
| 7 | 6 | 5 | 4 | 3 | 2 | 1 | 0 |
| – | – | MON | PRO | AM | AB | AR | SEP |

3.7.8 Receive Status Register (RSR)

TABLE 3-7-8

| OCH Page 0 (Read) | | | | | | | |
|---|---|---|---|---|---|---|---|
| 7 | 6 | 5 | 4 | 3 | 2 | 1 | 0 |
| DFR | DIS | PHY | MPA | FO | FAE | CRC | PRX |

This register shown in TABLE 3-7-8 records the status of the received packet, including information on errors and the type of address match, either physical or multicast. The contents of this register are written to buffer memory by the DMA after reception of a good packet. If packets with errors are to be saved, the receive status is written to memory at the head of the erroneous packet. If packets with errors are to be rejected, the RSR will not be written to memory. The contents will be cleared when the next packet arrives. CRC errors, Frame Alignment errors, and missed packets are counted internally by Ethernet controller module 6 which relinquishes the Host from reading the RSR in real time to record errors for Network Management Functions. The contents of this register are not specified until after the first reception.

- D0 PRX - Packet Received Intact: Indicates packet received without error. (Bits CRC, FAE, FO and MPA are zero for the received packet.)
- D1 CRC - CRC Error: Indicates packet received with CRC error. Increments Tally Counter (CNTR1). This bit will also be set for Frame Alignment errors.
- D2 FAE - Frame Alignment Error: Indicates that the incoming packet did not end on a byte boundary and the CRC did not match at the last byte boundary. Increments Tally Counter (CNTR0).

Note the following encoding applies to CRC and FAE bits:

FAE: 0, CRC: 0, Type of Error: No error (Good CRC and <6 Dribble Bits)
FAE: 0, CRC: 1, Type of Error: CRC Error
FAE: 1, CRC: 0, Type of Error: will not occur
FAE: 1, CRC: 1, Type of Error: Frame Alignment Error and CRC Error

- D3 FIFO Overrun: This bit is set when the FIFO is not serviced, causing overflow during reception. Reception of the packet will be aborted.
- D4 MPA - Missed Packet: Set when packet intended for node cannot be accepted by Ethernet controller module 6 because of a lack of receive buffers or if the controller is in monitor mode and did not buffer the packet to memory. Increments Tally Counter (CNTR2).
- D5 PHY - Physical/Multicast Address: Indicates whether received packet had a physical or multicast address type.
  - 0: Physical Address Match.
  - 1: Multicast/Broadcast Address Match.
- D6 DIS - Receiver Disabled: Set when receiver disabled by entering Monitor mode. Reset when receiver is re-enabled when exiting Monitor mode.
- D7 DPR - Deferring: Set when CRS or COL inputs are active. If the transceiver has asserted the CD line as a result of the jabber, this bit will stay set indicating the jabber condition.

Section 3.7.9 Compatibility Mode Select Register (CMSR)

TABLE 3-7-9

| 08H Page 2 (Read/Write) | | | | | | | |
|---|---|---|---|---|---|---|---|
| 7 | 6 | 5 | 4 | 3 | 2 | 1 | 0 |
| — | — | — | — | — | — | E/F | EXBst |

Power up condition=00h, 8390D fully compatible mode. This register should be written only if the DMA controllers are not active. This register should be programmed only during initialization or after issuance and completion of the Stop command.

- D0 EXBst -Exact Burst Mode
  - 0: compatible; hold Local DMA on last received packet until all post packet processing is complete.
  - 1: exact burst mode; release Local DMA after normal burst, regain bus to empty FIFO, calculate next page location and write packet header.
- D1 E/F - FIFO Empty/Full Mode
  - 0: compatible; only threshold sized bursts to and from the FIFO will be used for receive/transmit operations.
  - 1: FIFO empty/full mode; each DMA burst will empty (receive) or fill (transmit) the FIFO; allows variable sized local memory bursts.
- D2-7 RSV-Reserved: 0.

FIG. 3-7 is a timing diagram accompanying the end of packet processing, when preferred system configurations are in 8390D Compatible Mode.

Section 3.7.10 FIFO Operation at the End of Receive: Exact Burst Mode

When the Compatibility Select Mode Register is programmed for Exact Burst Mode, preferred system embodiments will finish the current local DMA burst and release the bus. Preferred system embodiments will reissue a request and, after receiving BACK, it will empty the FIFO, calculate the next page location, and will write the packet header. This mode eliminates a problem in the DP8390 which causes the 8390 to maintain control of the bus for an exceptionally long time at the end of a packet reception. FIG. 3-9 is a timing diagram accompanying the end of packet processing for the exact burst mode beginning of transmit.

Before transmitting, Ethernet controller module 6 performs a prefetch from memory to load the FIFO. The number of bytes prefetched is the programmed FIFO threshold. The next request to the buffer RAM is not issued until after Ethernet controller module 6 actually begins transmitting data, i.e., after SFD D2-7 Reserved.

Section 3.7.11 DMA Registers

The DMA Registers are partitioned into three groups: Transmit, Receive and Remote DMA Registers. The Transmit Registers are used to initialize the Local DMA Channel for transmission of packets while the Receive Registers are used to initialize the Local DMA Channel for packet reception. The Page Stop, Page Start, Current and Boundary Registers are used by the Buffer Management Logic to supervise the Receive Buffer Ring. The Remote DMA Registers are used to initialize the Remote DMA.

Figures 3, 4, 5, 6, 6A:
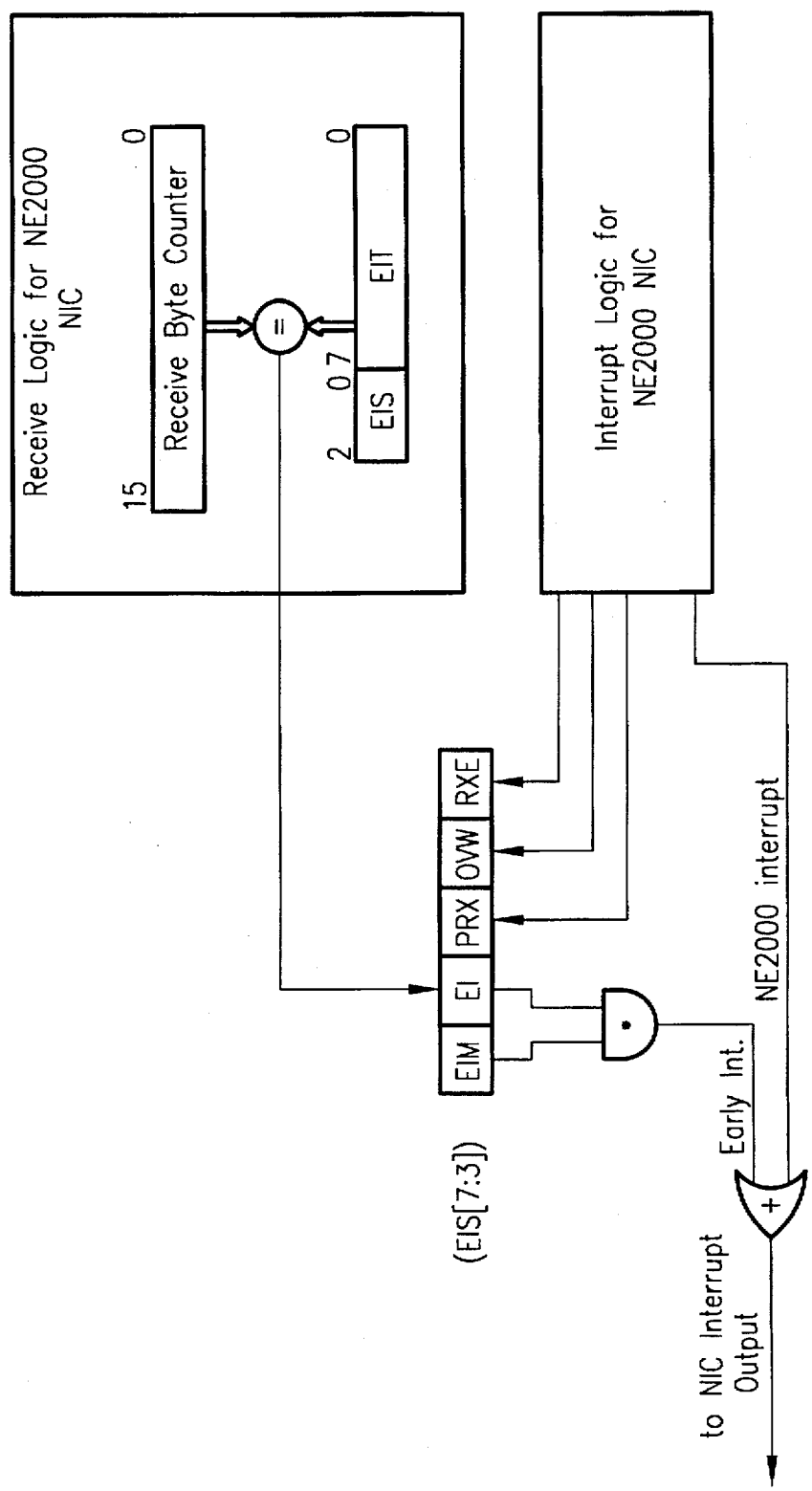
Figures 3, 4, 5, 6, 6B:
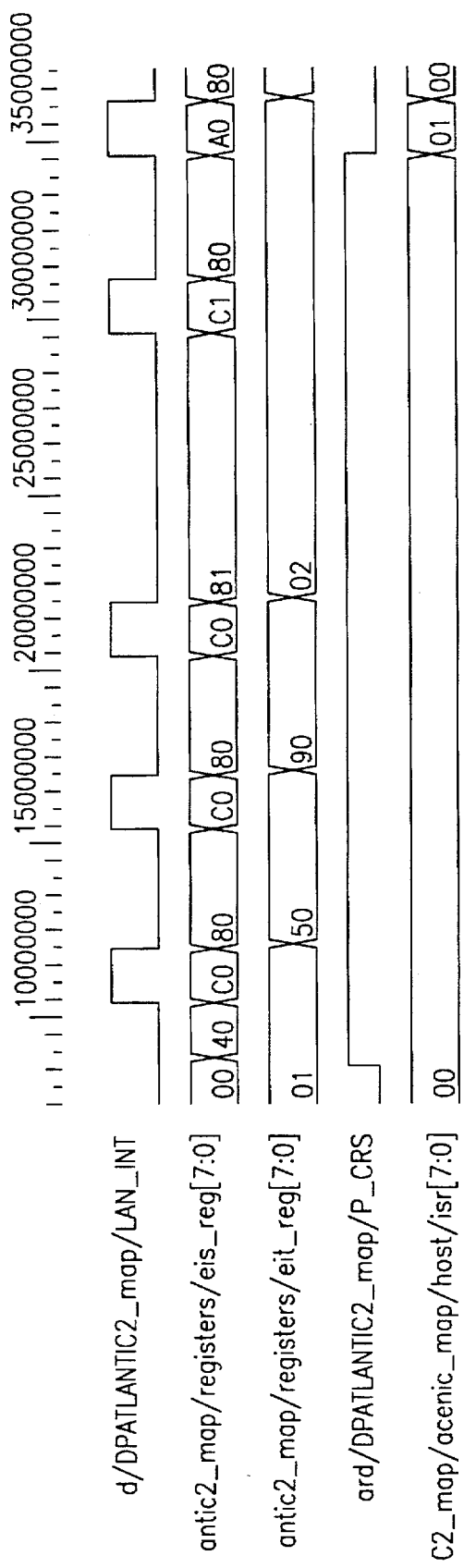
Figures 3, 4, 5, 6, 6C:
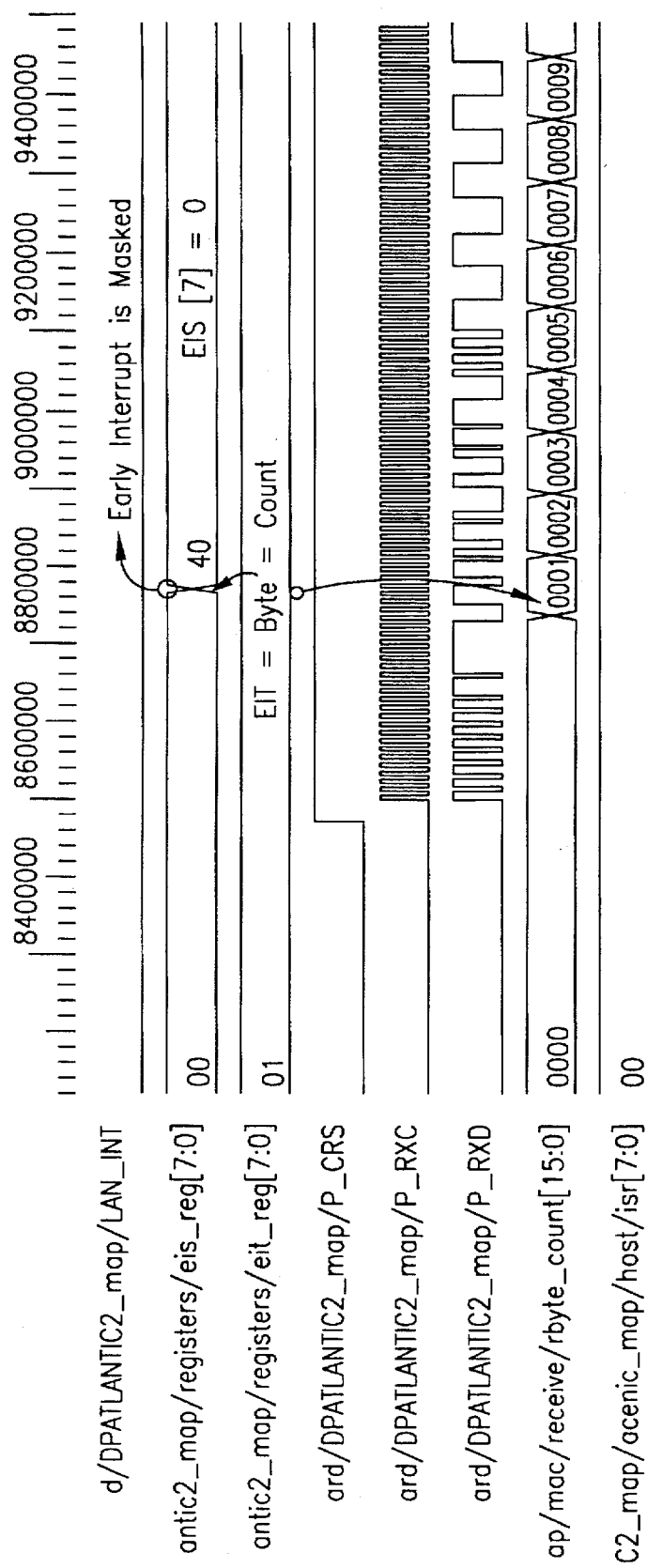
Figures 3, 4, 5, 6, 6D:
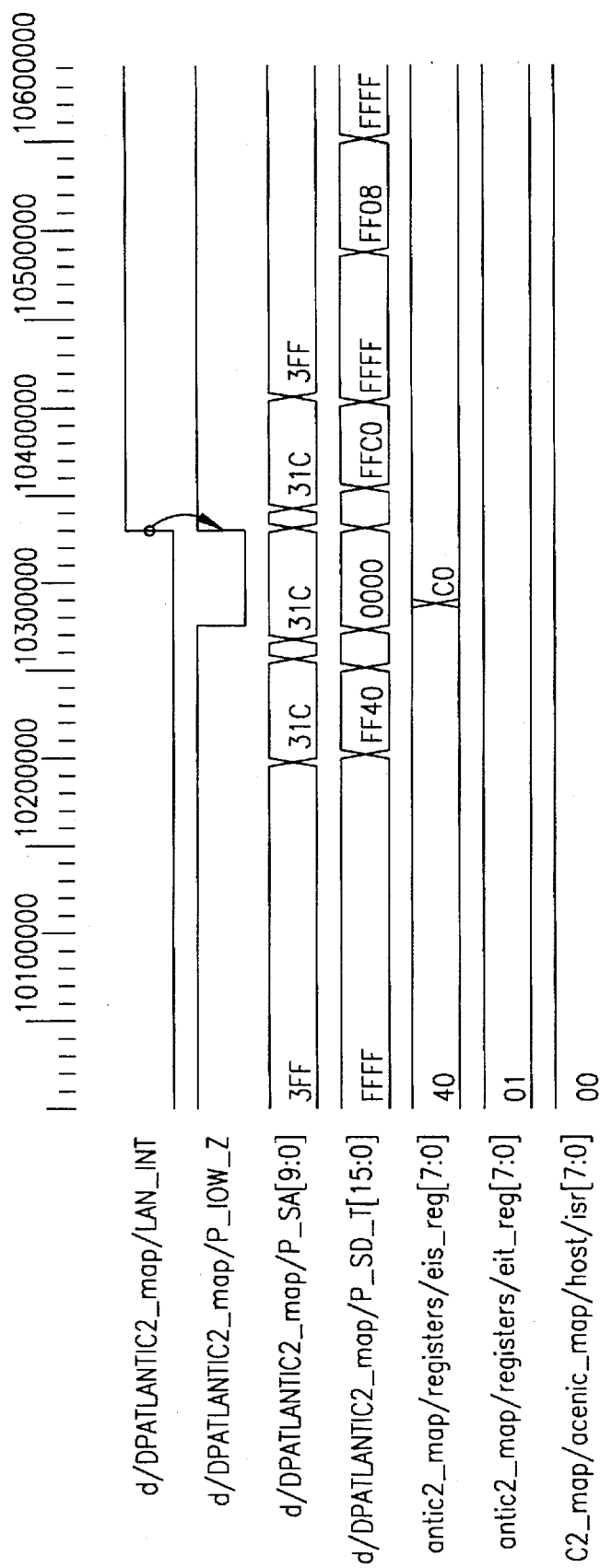
Figures 3, 4, 5, 6, 6E:
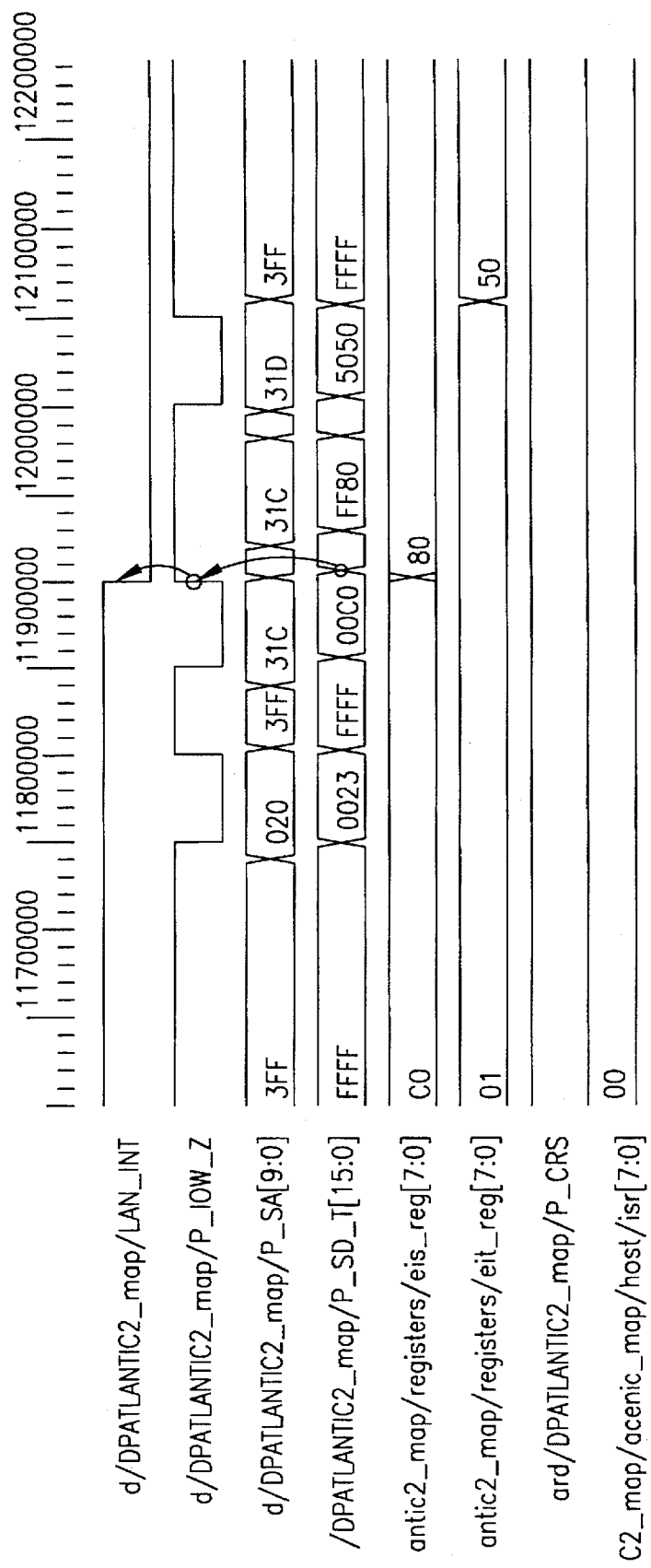
Figures 3, 4, 5, 6, 6F:
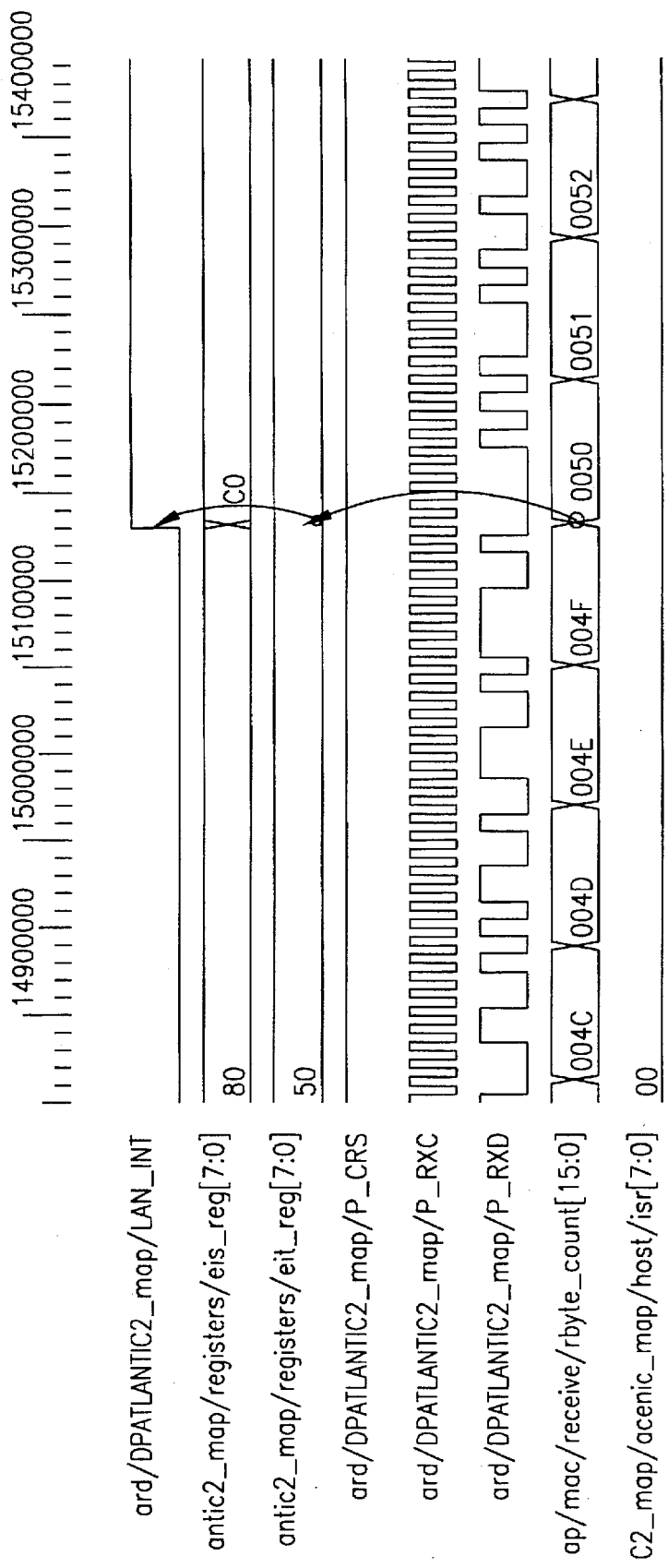
Figures 3, 4, 5, 6, 6H:
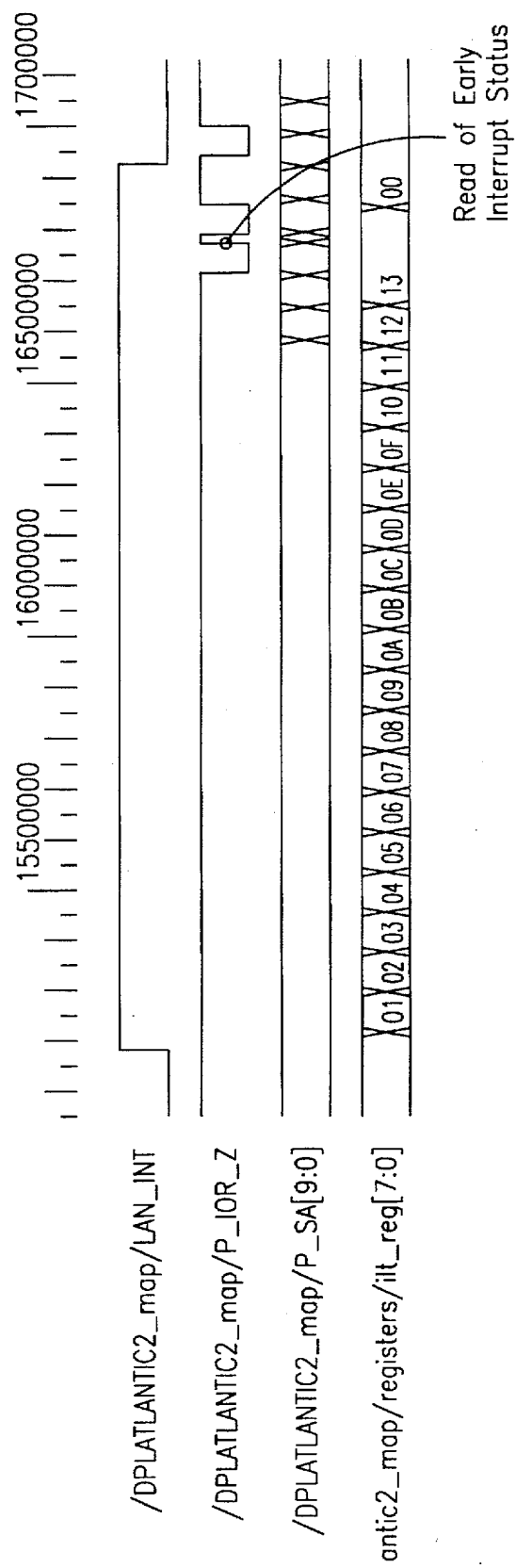
Figures 3, 61:
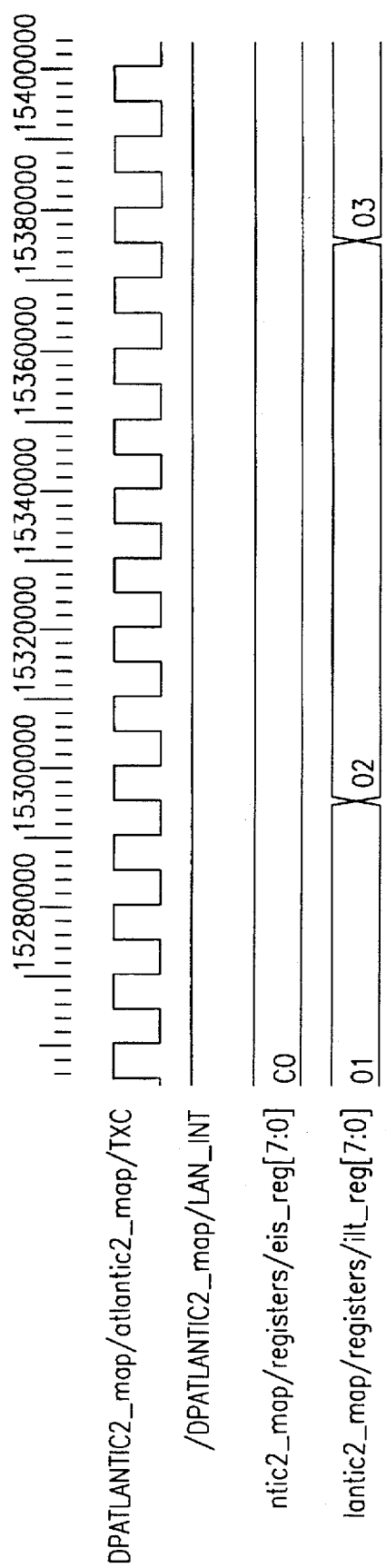
Figures 3, 4, 5, 6, 6J:
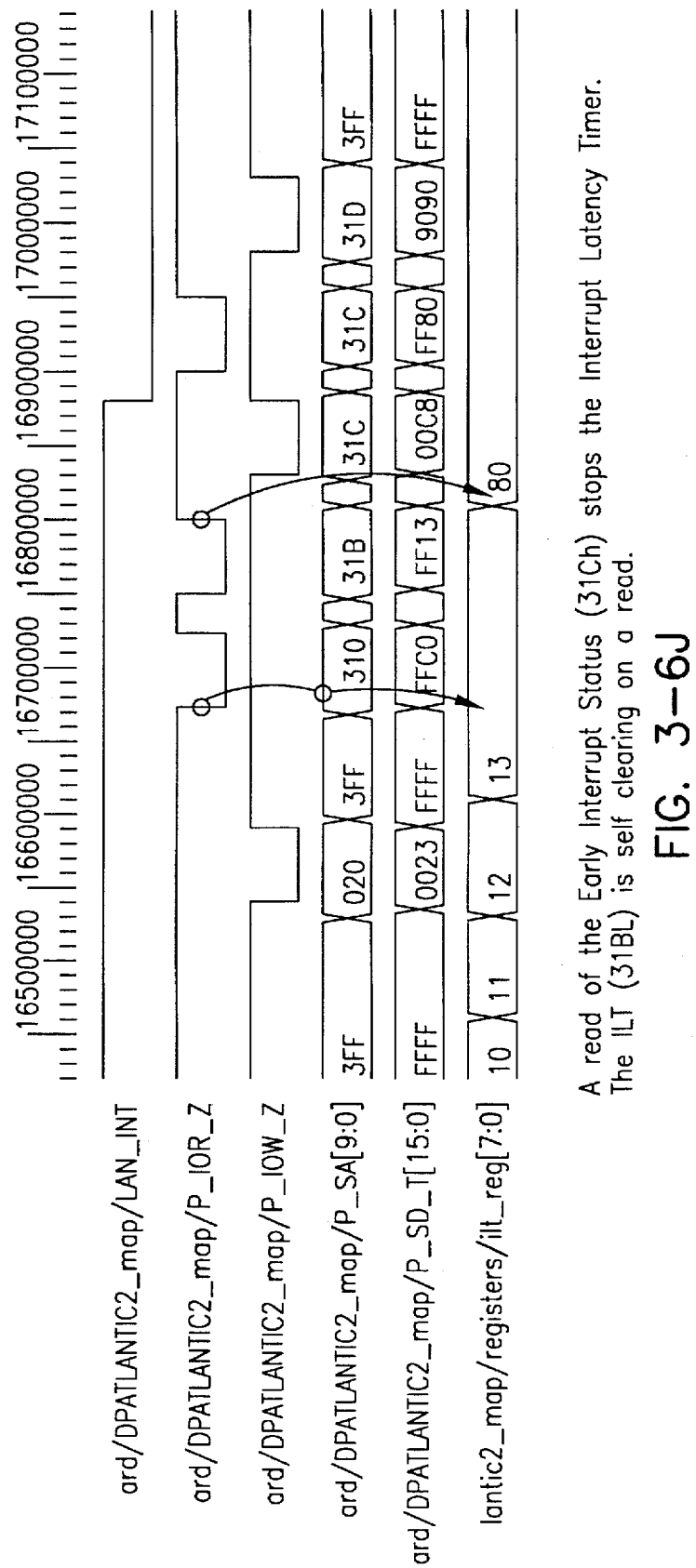
Figures 3, 4, 5, 6, 7:
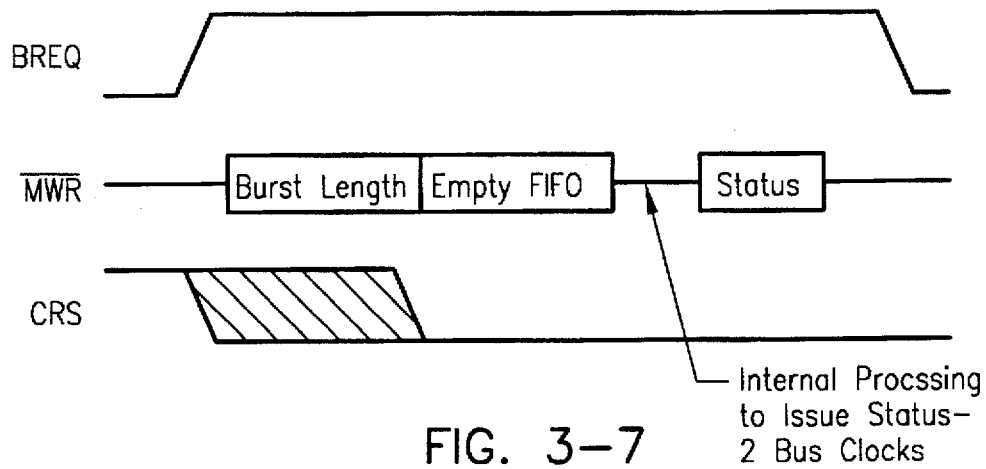
Figures 3, 4, 5, 6, 7, 8:
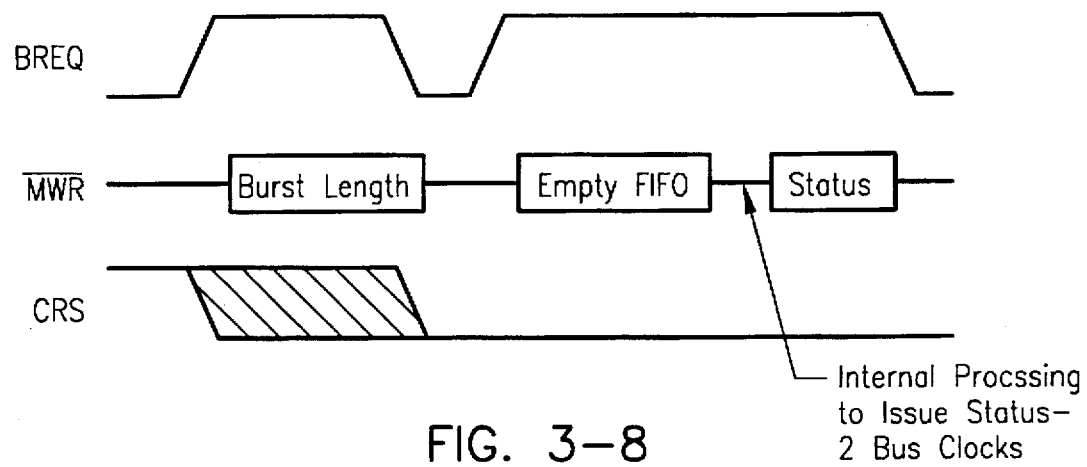
Figures 3, 4, 5, 6, 7, 8, 9:
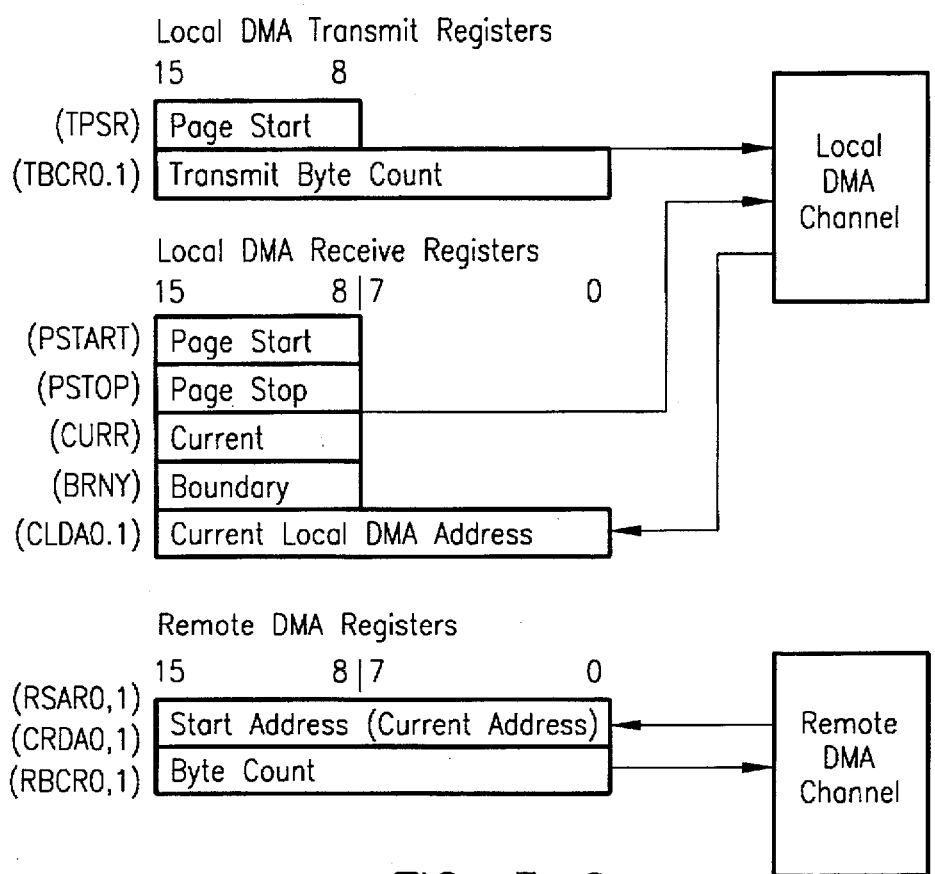

Note in FIG. 7-2, registers are shown as 8 or 16 bits wide. Although some registers are 16-bit internal registers, all registers are accessed as 8-bit registers. Thus the 16-bit Transmit Byte Count Register is broken into two 8-bit registers, TBCR0 and TBCR1. Also, TPSR, PSTART, PSTOP, CURR and BNDRY only check or control the upper 8 bits of address information on the bus. Thus they are shifted to positions 15-8 in the figure.

Section 3.7.11.1 Transmit DMA Registers

TABLE 3-7-11-1A

| TRANSMIT PAGE START REGISTER (TPSR04H Page 0 (Write); 04H Page 2 (Read)) Bit Assignment | | | | | | | |
|---|---|---|---|---|---|---|---|
| 7 | 6 | 5 | 4 | 3 | 2 | 1 | 0 |
| TPSR – | – | – | – | – | – | E/F | EXBst |
| (A7–A0) always to zero) | | | | | | | |

This register shown in TABLE 3-7-11-1A points to the assembled packet to be transmitted. Only the upper eight bits of the address can be specified, hence all transmit packets must be assembled on 256-byte page boundaries. The bit assignment is shown above. The values placed in bits D7–D0 will be used to initialize the higher order address (A8–A15) of the Local DMA for transmission. The lower order bits (A7–A0) are initialized to zero.

TABLE 3-7-11-1B

| TRANSMIT BYTE COUNT REGISTER (TBCR0,1) Page 0 (Write) | | | | | | | |
|---|---|---|---|---|---|---|---|
| 7 | 6 | 5 | 4 | 3 | 2 | 1 | 0 |
| TBCR1 06H L15 | L14 | L13 | L12 | L11 | L10 | L9 | L8 |
| 7 | 6 | 5 | 4 | 3 | 2 | 1 | 0 |
| TBCR0 05H L7 | L6 | L5 | L4 | L3 | L2 | L1 | L0 |

These two registers shown in TABLE 3-7-11-1B indicate the length of the packet to be transmitted in bytes. The count must include the number of bytes in the source, destination, length and data fields. The maximum number of transmit bytes allowed is 64k bytes. Ethernet controller module 6 will not truncate transmissions longer than 1500 bytes. The bit assignment is shown above.

3.7.11.2 Local DMA Receive Registers

TABLE 3-7-11-2A

FIG. 3-9 is a block diagram showing DMA Registers;
PAGE START, STOP REGISTERS (PSTART, PSTOP)
Page 0 (Write); Page 2 (Read)

| PSTART 01H | 7 | 6 | 5 | 4 | 3 | 2 | 1 | 0 |
|---|---|---|---|---|---|---|---|---|
| | A15 | A14 | A13 | A12 | A11 | A10 | A9 | A8 |

| PSTOP 02H | 7 | 6 | 5 | 4 | 3 | 2 | 1 | 0 |
|---|---|---|---|---|---|---|---|---|
| | A15 | A14 | A13 | A12 | A11 | A10 | A9 | A8 |

The Page Start and Page Stop Registers shown in TABLE 3-7-11-3A program the starting and stopping address of the Receive Buffer Ring. Since Ethernet controller module 6 uses fixed 256-byte buffers aligned on page boundaries, only the upper eight bits of the start and stop address are specified.

TABLE 3-7-11-2B

CURRENT PAGE REGISTER (CURR)
07H PAGE 1 (READ/WRITE)

| CURR | 7 | 6 | 5 | 4 | 3 | 2 | 1 | 0 |
|---|---|---|---|---|---|---|---|---|
| | A15 | A14 | A13 | A12 | A11 | A10 | A9 | A8 |

This register shown in TABLE 3-7-11-3B is used internally by the Buffer Management Logic as a backup register for reception. CURR contains the address of the first buffer to be used for a packet reception and is used to restore DMA pointers in the event of receive errors. This register is initialized to the same value as PSTART and should not be written to again unless the Controller is Reset.

TABLE 3-7-11-2C

BOUNDARY REGISTER (BNDRY)
03H Page 0 (Read/Write)

| BNDRY | 7 | 6 | 5 | 4 | 3 | 2 | 1 | 0 |
|---|---|---|---|---|---|---|---|---|
| | A15 | A14 | A13 | A12 | A11 | A10 | A9 | A8 |

This register shown in TABLE 3-7-11-2C is used to prevent overflow of the Receive Buffer Ring. Buffer management compares the contents of this register to the next buffer address when linking buffers together. If the contents of this register match the next buffer address, the Local DMA operation is aborted.

TABLE 3-7-11-2D

CURRENT LOCAL DMA REGISTER 0,1 (CLDA0,1)
Page 0 (Read); Page 2 (Write)

| | 7 | 6 | 5 | 4 | 3 | 2 | 1 | 0 |
|---|---|---|---|---|---|---|---|---|
| CLDA1 02H | A15 | A14 | A13 | A12 | A11 | A10 | A9 | A8 |

| | 7 | 6 | 5 | 4 | 3 | 2 | 1 | 0 |
|---|---|---|---|---|---|---|---|---|
| CLDA0 01H | A7 | A6 | A5 | A4 | A3 | A2 | A1 | A0 |

These two registers shown in TABLE 3-7-11-2D can be accessed to determine the current Local DMA Address.

Section 3.7.11.3 Remote DMA Registers

TABLE 3-7-11-2E

REMOTE START ADDRESS REGISTERS (RSAR0,1)
Page 0 (Write)

| | 7 | 6 | 5 | 4 | 3 | 2 | 1 | 0 |
|---|---|---|---|---|---|---|---|---|
| RSAR1 09H | A15 | A14 | A13 | A12 | A11 | A10 | A9 | A8 |

| | 7 | 6 | 5 | 4 | 3 | 2 | 1 | 0 |
|---|---|---|---|---|---|---|---|---|
| RSAR0 08H | A7 | A6 | 5 | A4 | A3 | A2 | A1 | A0 |

Remote DMA operations shown in TABLE 3-7-11-2E are programmed via the Remote Start Address (RSAR0,1) and Remote Byte Count (RBCR0,1) registers. The Remote Start Address is used to point to the start of the block of data to be transferred and the Remote Byte Count is used to indicate the length of the block (in bytes).

The bit assignment is shown above. Note that RSAR0 and CRDA0 are physically the same register. So are RSAR1 and CRDA1.

Section 3.7.12 PHYSICAL ADDRESS REGISTERS

00H–06H Page 1 (Read/Write)

The physical address registers are used to compare the destination address of incoming packets for rejecting or accepting packets. The bit assignment shown below relates the sequence in PAR0–PAR5 to the bit sequence of the receive packet.

TABLE 3-7-11-2F

REMOTE BYTE COUNT REGISTERS (RBCR0,1)
Page 0 (Write)

| | 7 | 6 | 5 | 4 | 3 | 2 | 1 | 0 |
|---|---|---|---|---|---|---|---|---|
| RBCR1 0BH | B15 | B14 | B13 | B12 | B11 | B10 | B9 | B8 |

| | 7 | 6 | 5 | 4 | 3 | 2 | 1 | 0 |
|---|---|---|---|---|---|---|---|---|
| RBCR0 0AH | B7 | B6 | B5 | B4 | B3 | B2 | B1 | B0 |

Note if RSAR0 programs the start address bits A0–A7. RSAR1 programs the start address bits A8–A15. The address is incremented by two for word transfers, and by one for byte transfers. Byte Count is decremented by two for word transfers, and by one for byte transfers. RBCR0 programs LSB byte count. RBCR1 programs MSB byte count.

TABLE 3-7-11-2G

CURRENT REMOTE DMA ADDRESS (CRDA0,1)
Page 0 (Read)

| | 7 | 6 | 5 | 4 | 3 | 2 | 1 | 0 |
|---|---|---|---|---|---|---|---|---|
| CRDA1 09H | A15 | A14 | A13 | A12 | A11 | A10 | A9 | A8 |

| | 7 | 6 | 5 | 4 | 3 | 2 | 1 | 0 |
|---|---|---|---|---|---|---|---|---|
| CRDA0 08H | A7 | A6 | A5 | A4 | A3 | A2 | A1 | A0 |

The Current Remote DMA Registers shown in TABLE 3-7-11-2G contain the current address of the Remote DMA.

TABLE 3-7-12

|      | D7   | D6   | D5   | D4   | D3   | D2   | D1   | D0   |
|------|------|------|------|------|------|------|------|------|
| PAR0 | DA7  | DA6  | DA5  | DA4  | DA3  | DA2  | DA1  | DA0  |
| PAR1 | DA15 | DA14 | DA13 | DA12 | DA11 | DA10 | DA9  | DA8  |
| PAR2 | DA23 | DA24 | DA25 | DA26 | DA27 | DA28 | DA29 | DA30 |
| PAR3 | DA31 | DA32 | DA33 | DA34 | DA35 | DA36 | DA37 | DA38 |
| PAR4 | DA39 | DA38 | DA37 | DA36 | DA35 | DA34 | DA33 | DA32 |
| PAR5 | DA47 | DA46 | DA45 | DA44 | DA43 | DA42 | DA41 | DA40 |

| | Destination Address | | | | | | | Source |
|---|---|---|---|---|---|---|---|---|
| P/S | DA0 | DA1 | DA2 | DA3 | ... | DA46 | DA47 | SA0 |

Note:
P/S = Preamble/Synch
DA0 = Physical/Multicast Bit

Section 3.7.13 Multicast Address Registers (MAR0–MAR7)

08H–0FH Page 1 (Read/Write)

The multicast address registers provide filtering of multicast addresses hashed by the CRC logic. All destination addresses are fed through the CRC logic and as the last bit of the destination address enters the CRC, the 6 most significant bits of the CRC generator are latched. These 6 bits are then decoded by a 1 of 64 decode to index a unique filter bit (FB0–63) in the multicast address registers. If the filter bit selected is set the multicast packet is accepted. The system designer would use a program to determine which filter bits to set in the multicast registers. All multicast filter bits that correspond to multicast addresses accepted by the node are then set to one. To accept all multicast packets all of the registers are set to all ones.

Note although the hashing algorithm does not guarantee perfect filtering of multicast addresses, it will perfectly filter up to 64 multicast addresses if these addresses are chosen to map into unique locations in the multicast filter.

Ethernet controller module 6 to accept any multicast packet with the address Y.

Section 3.7.14 Network Tally Counters

Referring to FIG. 3-10A, which is a block diagram of Network Tally Counters, three 8-bit counters are provided for monitoring the number of CRC errors, Frame Alignment Errors and Missed Packets. The maximum count reached by any counter is 192 (COH). These registers will be cleared when read by the CPU. The count is recorded in binary in CT0–CT7 of each Tally Register. These registers initialize to FEh. FIG. 3-10A is a block diagram of the

TABLE 3.7.13

|      | D7   | D6   | D5   | D4   | D3   | D2   | D1   | D0   |
|------|------|------|------|------|------|------|------|------|
| MAR0 | DA7  | DA6  | DA5  | DA4  | DA3  | DA2  | DA1  | DA0  |
| MAR1 | DA15 | DA14 | DA13 | DA12 | DA11 | DA10 | DA9  | DA8  |
| MAR2 | DA23 | DA24 | DA25 | DA26 | DA27 | DA28 | DA29 | DA30 |
| MAR3 | DA31 | DA32 | DA33 | DA34 | DA35 | DA36 | DA37 | DA38 |
| MAR4 | DA39 | DA38 | DA37 | DA36 | DA35 | DA34 | DA33 | DA32 |
| MAR5 | DA47 | DA46 | DA45 | DA44 | DA43 | DA42 | DA41 | DA40 |
| MAR6 | DA55 | DA54 | DA53 | DA52 | DA51 | DA50 | DA49 | DA48 |
| MAR7 | DA63 | DA62 | DA61 | DA60 | DA59 | DA58 | DA57 | DA56 |

If address Y is found to hash to the value of 32 (20H), then FB32 in MAR4 should be initialized to "1". This will cause

TABLE 3-7-14A

FRAME ALIGNMENT ERROR TALLY (CNTR0)
0DH Page 0 (Read)

| | 7 | 6 | 5 | 4 | 3 | 2 | 1 | 0 |
|---|---|---|---|---|---|---|---|---|
| CNTR0 | CT7 | CT6 | CT5 | CT4 | CT3 | CT2 | CT1 | CT0 |

As shown in TABLE 3-7-14A, this counter is incremented every time a packet is received with a Frame Alignment Error. The packet must have been recognized by the address recognition logic. The counter is cleared after it is read by the processor.

the FIFO will advance a pointer in the FIFO and allow reading of all 8 bytes.

Note that Reads of the FIFO register when the ACENIC is not in loopback will be ignored and the data bus shall remain in TRI-STATE.

TABLE 3-7-14B

CRC ERROR TALLY (CNTR1)
0EH Page 0 (Read)

| | 7 | 6 | 5 | 4 | 3 | 2 | 1 | 0 |
|---|---|---|---|---|---|---|---|---|
| CNTR1 | CT7 | CT6 | CT5 | CT4 | CT3 | CT2 | CT1 | CT0 |

As shown in TABLE 3-7-14B, this counter is incremented every time a packet is received with a CRC Error. The packet must first be recognized by the address recognition logic. The counter is cleared after it is read by the processor.

FRAMES LOST TALLY REGISTER (CNTR2)
0FH Page 0 (Read)

| | 7 | 6 | 5 | 4 | 3 | 2 | 1 | 0 |
|---|---|---|---|---|---|---|---|---|
| CNTR2 | CT7 | CT6 | CT5 | CT4 | CT3 | CT2 | CT1 | CT0 |

This counter is incremented if a packet cannot be received due to a lack of buffer resources. In monitor mode, this counter will count the number of packets that pass the address recognition logic.

Section 3.7.15 FIFO Register (FIFO)

TABLE 3-7-15

06H Page 0 (Read)

| | 7 | 6 | 5 | 4 | 3 | 2 | 1 | 0 |
|---|---|---|---|---|---|---|---|---|
| FIFO | DB7 | DB6 | DB5 | DB4 | DB3 | DB2 | DB1 | DB0 |

This is an eight bit register shown in TABLE 3-7-15 that allows the CPU to examine the contents of the FIFO after loopback. The FIFO will contain the last 8 data bytes transmitted in the loopback packet. Sequential reads from Section 3.7.16 Number of Collisions Register (NCR)

TABLE 3-7-16

05H Page 0 (Read)

| | 7 | 6 | 5 | 4 | 3 | 2 | 1 | 0 |
|---|---|---|---|---|---|---|---|---|
| NCR | – | – | – | – | NC3 | NC2 | NC1 | NC0 |

This register shown in table 3-7-16 contains the number of collisions a node experiences when attempting to transmit a packet. If no collisions are experienced during a transmission attempt, the COL bit of the TSR will not be set and the contents of NCR will be zero. If there are excessive collisions, the ABT bit in the TSR will be set and the contents of NCR will be zero. The NCR is cleared after the TXP bit in the CR is set.

Section 3.7.17 Revision ID Register

OAH Page 2 (Read)

This register shown in TABLE 3-7-17 identifies the type of Ethernet controller module and its revision level to the software. The value used for this register will be 01H. Software can read this register at anytime if the Ethernet Ready bit (EOR6) is asserted.

Section 3.8 Typical ISA Bus Cycles

Referring to FIG. 3-11, this is the type of cycle used to read from a register or, in 8 bit I/O mode, from a data transfer port. These accesses are entirely asynchronous, with Ethernet controller module 6 responding when the preferred embodiment decodes the correct address on SA0–10 and an $\overline{IOR}$ asserted. If AEN is high the cycle will be ignored. IOCHRDY is deasserted if the Ethernet controller module is not ready to respond and asserted when ready. If it is ready immediately IOCHRDY is not deasserted. The data will always appear on SD0–7.

Referring to FIG. 3-12, this is the type of cycle used to write to a register or, in 8 bit I/O mode, to a data transfer port. These accesses are entirely asynchronous, with the Ethernet controller module responding when THE PC87340 decodes the correct address on SA0–10 and an $\overline{IOW}$ the cycle will be ignored. IOCHRDY is deasserted if the Ethernet controller module is not ready to respond and asserted when ready. If it is ready immediately IOCHRDY is not deasserted. The data will always be taken from SD0–7.

Referring to FIG. 3-13, this is the type of cycle used to read from a data transfer port in 16 bit I/O mode. These accesses are entirely asynchronous, with the Ethernet controller module responding when it decodes the correct address on SA0–10 and an $\overline{IOR}$ is asserted. If AEN is high the cycle will be ignored. IOCHRDY is deasserted if Ethernet controller module 6 is not ready to respond and asserted when ready. If it is ready immediately IOCHRDY is not deasserted. $\overline{IOCS16}$ is generated, when an address within the Ethernet controller module's data transfer port is decoded, to indicate to the system that this is a 16 bit transfer. If the $\overline{IOCS16}$ bit in the EOR is low then it will be a straight decode of the SA0–10 lines. If that bit is high the $\overline{IOCS16}$ output will be generated after $\overline{IOR}$ goes active.

Referring to FIG. 3-14, this is the type of cycle used to write to a data transfer port in 16 bit I/O mode. These accesses are entirely asynchronous, with Ethernet controller module 6 responding when it decodes the correct address on SA0–10 and an $\overline{IOW}$ is asserted.

If AEN is high the cycle will be ignored. IOCHRDY is deasserted if the Ethernet controller module is not ready to respond and asserted when ready. If it is ready immediately IOCHRDY is not deasserted. $\overline{IOCS16}$ is generated, when an address within the Ethernet controller module's data transfer port is decoded, to indicate to the system that this is a 16 bit transfer. If the $\overline{IOCS16}$ bit in the EOR is low then it will be a straight decode of the SA0–10 lines. If that bit is high the IOCS goes active.

Referring to FIG. 3-15, some PC-AT core logic chip sets have timing requirements in 16-bit I/O cycles that cannot be achieved by the default ISA cycle, described on the previous page. When that cycle is executed with these chip sets the system does not recognize the IOCHRDY signal and does not insert wait states. The system executes a standard cycle and deasserts IOR or IOW even if IOCHRDY is still deasserted.

The fix is enabled by setting the IOCS16-bit of Configuration register B. In normal operation any time a valid address exists on A0–10 IOCS16 is generated. Delaying IOCS16 until after the IOR or IOW can cure the problem on non-compliant machines. The theory is that the system is fooled into thinking an 8-bit peripheral is responding, since IOCS16 is not generated for the valid address, and accepts 8-bit I/O cycle timings for IOCHRDY. It then rechecks IOCS16 after the IOR or IOW strobe and correctly determines it is a 16-bit peripheral. If a system did not recheck IOCS16 it would generate 2 8-bit cycles instead of 1 16-bit cycle. The preferred embodiment would interpret each 8-bit access as a 16-bit transfer and decrement it's DMA byte count by 2. Eventually the system would attempt to access the data transfer port when the preferred embodiment had finished transferring data and IOCHRDY would be deasserted indefinitely. To prevent misoperation, this fix should only be implemented on systems that require it.

Section 3.9 Media Access Controller Functions

Ethernet controller module 6 implements all media access control (MAC) layer functions for transmission and reception of packets in accordance with IEEE 802.3 CSMA/CD standard for Ethernet local area networks. It is compatible with the DP8390 Network Interface Controller (NIC).Direct host access is supported for initialization and status gathering and a dual DMA channel configuration allows efficient storage of received packets to local memory.

MAC Controller offers significant performance enhancements over the original NIC through both architectural changes and bus clock speed improvements.

Section 3.10 MAC Core (Network Interface Controller)

FIG. 3-16 provides an idealized illustration of the data and control structures inside the MAC core. The MAC Core logic contains the Serializer/Deserializer which is controlled by the Protocol section, DMA Control, FIFO, Address Comparator, Multicast Hashing Register. The core implements all of the IEEE 802.3 Media access control functions for Ethernet controller module 6, and interfaces to the internal ENDEC (on the left of the block diagram) and also interfaces to the Bus Interface and memory support bus via a number of address, data and control signal (and the right side of the block diagram). The following sections describe the functions of the core.

Section 3.10.1 Receive Deserializer

The Receive Deserializer is activated when the input signal Carrier Sense is asserted to allow incoming bits to be shifted into the shift register by the receive clock. The serial receive data is also routed to the CRC generator/checker. The Receive Deserializer includes a synch detector which detects the SFD (Start of Frame Delimiter) to establish where byte boundaries within the serial bit stream are located. After every eight receive clocks, the byte wide data is transferred to the 16-byte FIFO and the Receive Byte Count is incremented. The first six bytes after the SFD are checked for valid comparison by the Address Recognition Logic. If the Address Recognition Logic does not recognize the packet, the FIFO is cleared.

Section 3.10.2 CRC Generator/Checker

During transmission, the CRC logic generates a local CRC field for the transmitted bit sequence. The CRC encodes all fields after the synch byte. The CRC is shifted out MSB first following the last transmit byte. During reception the CRC logic generates a CRC field from the incoming packet. This local CRC is serially compared to the incoming CRC appended to the end of the packet by the transmitting node. If the local and received CRC match, a specific pattern will be generated and decoded to indicate no data errors. Transmission errors result in different pattern and are detected, resulting in rejection of a packet.

Section 3.10.3 Transmit Serializer

The Transmit Serializer reads parallel data from the FIFO and serializes it for transmission. The serializer is clocked by the transmit clock generated internally. The serial data is also shifted into the CRC generator/checker. At the beginning of each transmission, the Preamble and Synch Generator append 62 bits of 1,0 preamble and a 1,1 synch pattern. After the last data byte of the packet has been serialized the 32-bit FCS (Frame Check Sequence) field is shifted directly out of the CRC generator. In the event of a collision the Preamble and Synch generator is used to generate a 32-bit JAM pattern of all 1's.

Section 3.10.4 Comparator-Address Recognition Logic

The address recognition logic compares the Destination Address Field (first 6 bytes of the received packet) to the Physical address registers stored in the Address Register Array. If any one of the six bytes does not match the pre-programmed physical address, the Protocol Control Logic rejects the packet. All multicast destination addresses are filtered using a hashing technique. (See register description.) If the multicast address indexes a bit that has been set in the filter bit array of the Multicast Address Register Array the packet is accepted, otherwise it is rejected by the Protocol Control Logic. Each destination address is also checked for all 1's which is the reserved broadcast address.

Section 3.10.5 FIFO And Packet Data Operations

Section 3.10.5.1 Overview

To accommodate the different rates at which data comes from (or goes to) the network and goes to (or comes from) the packet buffer memory, Ethernet controller module 6 contains a 16-byte FIFO for buffering data between the media and the buffer RAM located on the memory support bus. The FIFO threshold is programmable, allowing filling (or emptying) the FIFO at different rates. When the FIFO has filled to its programmed threshold, the local DMA channel transfers these bytes (or words) into local memory. (via the memory bus) It is crucial that the local DMA is given access to the bus within a minimum bus latency time; otherwise a FIFO underrun (or overrun) occurs.

FIFO underruns or overruns are caused when a local DMA request is issued while an ISA bus access is current and the ISA cycle takes longer to complete than the local DMA's tolerable latency. This tolerable latency depends on the FIFO threshold. Note that this refers to standard ISA cycles NOT those where the CHRDY is deasserted extending the cycle.

Section 3.10.5.2 FIFO Threshold Detection

Ethernet controller module 6 issues a request to the buffer RAM when the programmed threshold is reached.

Section 3.10.5.3 FIFO Operation at the End of Receive: 8390D Compatible Mode When Carrier Sense goes low, Ethernet controller module 6 enters its end of packet processing sequence, emptying its FIFO and writing the status information at the beginning of the packet, as shown in FIG. 3-29. Ethernet controller module 6 holds onto the bus for the entire sequence. The longest time BREQ may be extended occurs when a packet ends just as Ethernet controller module 6 performs its last FIFO burst. Ethernet controller module 6, in this case, performs a programmed burst transfer followed by flushing the remaining bytes in the FIFO, and completes by writing the header information to memory. The following steps occur during this sequence:

1. Ethernet controller module issues BREQ because the FIFO threshold has been reached.
2. During the burst, packet ends, resulting in BREQ extended.
3. Ethernet controller module flushes remaining byte from the FIFO.
4. Ethernet controller module performs internal processing to prepare for writing the header.
5. Ethernet controller module writes 4-byte (2-word) header.
6. Ethernet controller module deasserts BREQ.

Section 3.10.5.4 Threshold Detection (Bus Latency)

The allowable bus latency is the maximum delay between BREQ and BACK at which no FIFO overruns or underruns occur. FIFO underruns occur during packet transmission when the ACENIC reads an empty FIFO. FIFO overruns occur during packet receptions when Ethernet controller module 6 writes to a full FIFO. The FIFO requests servicing from the local DMA whenever its programmable threshold is reached. During packet reception the threshold indication is given when the amount of data in the FIFO is equal to or exceeds the programmed threshold. During packet transmission, the threshold indication is given when the number of empty locations in the FIFO is equal to or exceeds the programmed threshold. Thus with a smaller programmed threshold, the FIFO will request servicing sooner, allowing for greater bus latencies.

Section 3.10.6 FIFO at the Beginning of Transmit

Ethernet controller module 6 will not DMA the first burst of transmit data until the TXE output goes high, indicating that Ethernet controller module 6 has begun transmission of the preamble. This allows Ethernet controller module 6 to respond to an incoming message any time prior to actual transmission across the physical media. The result of this implementation is that the initial memory latency requirement for Ethernet controller module 6 is 6 μs regardless of the FIFO threshold setting.

Before transmitting, Ethernet controller module 6 performs a prefetch from memory to load the FIFO. The number of bytes prefetched is the programmed FIFO threshold. The next request to the buffer RAM is not issued until after Ethernet controller module 6 actually begins transmitting data, i.e., after SFD.

If the FIFO is read during normal operation Ethernet controller module 6 will output invalid data to the ISA bus. The FIFO should only be read during loopback diagnostics, when it will operate normally.

Section 3.11 Protocol Circuitry

The protocol PLA is responsible for implementing the IEEE 802.3 protocol, including collision recovery with random backoff. The Protocol PLA also formats packets during transmission and strips preamble and synch during reception.

Section 3.12 DMA and Buffer Control Logic

The DMA and Buffer Control Logic is used to control the transfers into and out of buffer memory. During reception, the Local DMA stores packets in a receive buffer ring, located in buffer memory. During transmission the Local DMA uses a programmed pointer and length registers to transfer a packet from local buffer memory to the FIFO.

A second DMA channel is used when Ethernet controller module 6 is used in I/O Port mode. This DMA is used as a slave DMA to transfer data between the local buffer memory and Ethernet controller module 6s I/O port host system. The Local DMA and Remote DMA are internally arbitrated, with the Local DMA channel having highest priority. Both DMA channels use a common external bus clock to generate all required bus timing. External arbitration is performed with a standard bus request, bus acknowledge handshake protocol.

Section 3.13 TPI Modules

FIG. 3-17 is a block diagram of Twisted Pair Interface Module.

Section 3.13.1 Twisted Pair Interface Module;

The TPI consists of five main logical functions:

a) The Receiver/Smart Squelch, responsible for determining when valid data is present on the differential receive inputs (RXI±) and receiving the data.

b) The Collision function checks for simultaneous transmission and reception of data on the TXO± and RXI± pins.

c) The Link Detector/Generator checks the integrity of the cable connecting the two twisted pair MAUs.

d) The Jabber disables the transmitter if it attempts to transmit a longer than legal packet.

e) The TX Driver & Pre-emphasis transmits Manchester encoded data to the twisted pair network via the summing resistors and transformer/filter.

Section 3.13.2 Receiver and Smart Squelch

Ethernet controller module 6 implements an intelligent receive squelch on the RXI± differential inputs to ensure that impulse noise on the receive inputs will not be mistaken for a valid signal.

The squelch circuitry employs a combination of amplitude and timing measurements to determine the validity of data on the twisted pair inputs. There are two voltage level options for the smart squelch. One mode, 10BASE-T mode, uses levels that meet the 10 BASE-T specification. The second mode, reduced squelch mode, uses a lower squelch threshold level, and can be used in longer cable applications where a smaller signal levels may be applied. The squelch level mode can be selected in Ethernet controller module 6 configuration registers 2.

FIG. 3-18 is a diagram of a twisted pair squelch waveform.

The signal at the start of packet is checked by the smart squelch and any pulses not exceeding the squelch level (either positive or negative, depending upon polarity) will be rejected. Once this first squelch level is overcome correctly the opposite squelch level must then be exceeded within 150 ns later. Finally the signal must exceed the original squelch level within a further 150 ns to ensure that the input waveform will not be rejected. The checking procedure results in the loss of typically three bits at the beginning of each packet.

Only after all these conditions have been satisfied will a control signal be generated to indicate to the remainder of the circuitry that valid data is present. At this time the smart squelch circuitry is reset.

In the reduced squelch mode the operation is identical except that the lower squelch levels shown in FIG. 3-18 are used.

Valid data is considered to be present until either squelch level has not been generated for a time longer than 150 ns, indicating End of Packet. Once good data has been detected the squelch levels are reduced to minimize the effect of noise causing premature End of Packet detection.

Section 3.13.3 Collision

A collision is detected by the TPI module when the receive and transmit channels are active simultaneously. If the TPI is receiving when a collision is detected it is reported to the controller immediately. If, however, the TPI is transmitting when a collision is detected the collision is not reported until seven bits have been received while in the collision state. This prevents a collision being reported incorrectly due to noise on the network. The signal to the controller remains for the duration of the collision.

Approximately 1 μsec after the transmission of each packet a signal called the Signal Quality Error (SQE) consisting of typically 10 cycles of 10 MHz is generated. This 10 MHz signal, also called the Heartbeat, ensures the continued functioning of the collision circuitry.

Section 3.13.4 Link Detector/Generator

The link generator is a timer circuit that generates a link pulse as defined by the 10 Base-T specification that will be generated by the transmitter section. The pulse which is 100 ns wide is transmitted on the TXO+ output, every 16 ms, in the absence of transmit data.

The pulse is used to check the integrity of the connection to the remote MAU. The link detection circuit checks for valid pulses from the remote MAU and if valid link pulses are not received the link detector will disable the transmit, receive and collision detection functions.

The GDLNK output can directly drive a LED to show that there is a good twisted pair link. For normal conditions the LED will be on. The link integrity function can be disabled by setting the GDLNK bit of Ethernet Operation Register.

Section 3.13.5 Jabber

The jabber timer monitors the transmitter and disables the transmission if the transmitter is active for greater than 26 ms. The transmitter is then disabled for the whole time that the Endec module's internal transmit enable is asserted. This signal has to be deasserted for approximately 750 ms (the unjab time) before the Jabber re-enables the transmit outputs.

Section 3.13.6 Transmitter

The transmitter consists of four signals, the true and compliment Manchester encoded data (TXO±) and these signals delayed by 50 ns (TXOd±)

These four signals are resistively combined TXO+ with TXOd− and TXO− with TXOd+. This is known as digital pre-emphasis and is required to compensate for the twisted pair cable which acts like a low pass filter causing greater attenuation to the 10 MHz (50 ns) pulses of the Manchester encoded waveform than the 5 MHz (100 ns) pulses.

An example of how these signals are combined is shown in FIG. 3-19, which is a Typical Summed Transmit Waveform. The signal with pre-emphasis shown above is generated by resistively combining TXO+ and TXOd−. This signal along with its compliment is passed to the transmit filter.

Section 3.14 Status Information

Status information is provided by Ethernet controller module 6 on the GDLNK and TXLED outputs as described in the pin description table. These outputs are suitable for driving status LED's as shown in FIG. 3-21. All outputs are open drain.

Section 3.15 Encoder/Decoder (ENDEC) Module

The ENDEC consists of four main logical blocks:

a) The phase locked loop generates the 10 MHz transmit clock signal for system timing.

b) The Manchester encoder accepts NRZ data from the controller, encodes the data to Manchester, and transmits the data differentially to the transceiver, through the differential transmit driver.

c) The Manchester decoder receives Manchester data from the transceiver, converts it to NRZ data and clock pulses, and sends it to the controller.

d) The collision translator indicates to the controller the presence of a valid 10 MHz collision signal to the PLL. According to the IEEE 802.3 standard, the entire oscillator circuit (crystal and amplifier) must be accurate to 0.01%. When using a crystal, the X2 pin is not guaranteed to provide a TTL compatible logic output, and should not be used to drive external standard logic.

Section 3.15.1 Manchester Encoder And Differential Driver

The ENDEC units encoder begins operation when the MAC section begins sending the serial data stream. It converts NRZ data from the MAC section to Manchester data for the differential drivers (TX+/−). In Manchester encoding, the first half of the bit cell contains the complementary data and the second half contains the true data (FIG. 3-23). A transition always occurs at the middle of the bit cell. As long as the MAC continues sending data, the ENDEC section remains in operation. At the end of transmission, the last transition is always positive, occurring at the center of the bit cell if the last bit is a one, or at the end of the bit cell if the last bit is a zero. The diver provides full-step mode for compatibility with Ethernet and IEEE 802.3 so that Tx+ and Tx− are equal in the idle state.

The differential transmit pair, on the secondary of the employed transformer, drives up to 50 meters of twisted pair AUI cable. These outputs are source followers which require two 270Ω pull-down resistors to ground (see FIG. 3-24). In addition a Pulse transformer is required.

Transmit+ and Transmit− are equal in the idle state providing zero differential voltage to operate with transformer coupled loads. This allows Ethernet controller module 6 to be compatible with the IEEE 802.3 requirements

Section 3.15.2 Manchester Decoder

The decoder consists of a differential receiver and a PLL to separate a Manchester encoded data stream into internal clock signals and data. The differential input must be externally terminated with two 39Ω resistors connected in series if the standard 78Ω transceiver drop cable is used, in thin Ethernet applications, these resistors are optional. To prevent noise from falsely triggering the decoder, a squelch circuit at the input rejects signals with levels less than −175 mV. Data becomes valid typically within 6 bit times. Ethernet controller module 6 may tolerate bit jitter up to 20 ns in the received data. The decoder detects the end of a frame when no more mid-bit transitions are detected. Within one and a half bit times after the last bit, carrier sense is de-asserted. Receive clock stays active for five more bit times after CRS goes low to guarantee the receive timings of the controller. An example of AUI interface is shown in FIG. 3-24.

Section 3.15.3 Collision Translator

When in AUI Mode, the Ethernet transceiver (DP8392 CTI) detects a collision, it generates a 10 MHz signal to the differential collision inputs (CD±) of Ethernet controller module 6. When these inputs are detected active, Ethernet controller module 6 uses this signal to back off its current transmission and reschedule another one.

The collision differential inputs are terminated the same way as the differential receive inputs. The squelch circuitry is also similar, rejecting pulses levels less than −175 mV.

Section 3.15.4 PLLVCC Power Supply Consideration

The VDD6 pin is the +5V power supply for the phase lock loop (PLL) of the ENDEC unit. Since this is an analog circuit, excessive noise on the VDD6 pin can affect the performance of the PLL. This noise, if in the 10–400 KHz range, can reduce the jitter performance of the ENDEC, resulting in missing packets or CRC errors.

If the power supply noise is causing significant packet reception error, a low pass filter could be added to reduce the power supply noise and hence improve the jitter performance. Standard analog design techniques should be utilized when laying out the power supply traces on the board. If the digital power supply is used, it may be desirable to add a one pole RC filter (designed to have a cut-off frequency of 1 KHz) as shown in FIG. 4 to improve the jitter performance. The VDD6 pin only draws 3–4 mA so the voltage across the resister is less than 90 mV, which will not affect the PLL's operation.

Section 3.16 E802.3 Packet Format

Section 3.16.1 Transmit/Receive Packet

Encapsulation/Decapsulation

A standard IEEE 802.3 packet consists of the following fields: preamble, Start of Frame Delimiter (SFD), destination address, source address, length, data, and Frame Check Sequence (FCS). The typical format is shown in FIG. 3-26. The packets are Manchester encoded and decoded by the ENDEC and transferred serially to the using NRZ data with a clock. All fields are of fixed length except for the data field. The NIC generates and appends the preamble, SFD and FCS field during transmission. The Preamble and SFD fields are Stripped during reception (The CRC is passed through to buffer memory during reception.)

Section 3.16.2 Preamble and Start of Frame Delimiter (SFD)

The Manchester encoded alternating 1, 0 preamble field is used by the external serial network interface (SNI) to acquire bit synchronization with an incoming packet. When transmitted, each packet contains 62 bits of alternating 1, 0 preamble. Some of this preamble will be lost as the packet travels through the network. The preamble field is stripped by the NIC. Byte alignment is performed with the Start of Frame Delimiter (SFD) pattern which consists of two consecutive 1's. The NIC does not treat the SFD pattern as a byte, it detects only the two bit pattern. This allows any preceding preamble within the SFD to be used for phase locking.

Section 3.16.3 Destination Address

The destination address indicates the destination of the packet on the network and is used to filter unwanted packets from reaching a node. There are three types of address formats supported by the NIC: physical, multicast, and broadcast. The physical address is a unique address that corresponds only to a single node. All physical addresses have a LSB of "0". These addresses are compared to the internally stored physical address registers. Each bit in the destination address must match in order for the to accept the packet. Multicast addresses have an LSB of "1". The NIC filters multicast addresses using a standard hashing algorithm that maps all multicast addresses into a 6-bit value. This 6-bit value indexes a 64-bit array that filters the value. If the address consists of all 1's, it is a broadcast address, indicating that the packet is intended for all nodes. A promiscuous mode allows reception of all packets: the destination address is not required to match any filters. Physical, broadcast, multicast, and promiscuous address modes can be selected.

Section 3.16.4 Source Address

The source address is the physical address of the node that sent the packet. This field is simply passed to the on-chip buffer memory.

Section 3.16.5 Length Field

The 2-byte length field indicates the number of bytes that are contained in the data field of the packet. This field is not interpreted by the NIC.

Section 3.16.6 Data Field

The data field consists of anywhere from 46 to 1500 bytes. Messages longer that 1500 bytes need to be broken into multiple packets. Messages shorter than 46 bytes will require appending a pad to bring the data field to the minimum length of 46 bytes. If the data field is padded, the number of valid data bytes is indicated in the length. The NIC does not strip or append pad bytes for short packets, or check for oversize packets.

Section 3.16.7 PCS Field

The Frame Check Sequence (FCS) is a 32-bit CRC field calculated and appended to a packet during transmission to allow detection of errors when a packet is received. During reception, error free packets result in a specific pattern in the CRC generator. Packets with improper CRC will be rejected. The AUTODIN II ($X^{32}+X^{26}+X^{23}+X^{22}+X^{16}+X^{12}+X^{11}+X^{10}+X^8+X^7+X^5+X^4+X^2+X^1+1$) polynomial is used for the CRC calculations. FIG. 3-23 is a diagram showing data fields for transmit/receive operations in preferred embodiments.

Section 3.16.8 Direct Memory Access Control (DMA)

The DMA capabilities of the NICNIC greatly simplify use of the NIC in various system configurations. The local DMA channel transfers data between the FIFO and the on-chip memory. On transmission, the packet is DMA'd from memory to the FIFO in bursts. Should a collision occur (up to 15 times), the packet is retransmitted with no processor intervention. On reception, packets are DMA'd from the FIFO to the receive buffer ring (as explained below).

A remote DMA channel is provided on the NIC to accomplish transfers between on-chip memory and host accessible I/O port. Note the 32-bit DMA function of the DP8390 is not implemented.

Section 3.16.9 Dual DMA Configuration

An example configuration using both the local and remote DMA channels is shown below. Network activity is isolated on a local bus, where the NIC's local DMA channel performs burst transfers between the on-chip buffer memory and the NIC's FIFO. The Remote DMA transfers data between the buffer memory and the host memory via a bidirectional I/O port. Host side addressing must be provided by a host DMA or the CPU. The NIC allows Local and Remote DMA operations to be interleaved.

Section 3.16.10 Packet Reception

The Local DMA receive channel uses a Buffer Ring Structure comprised of a series of contiguous fixed length (256 byte 128 word) buffers for storage of received packets. The location of the Receive Buffer Ring is programmed in two registers, a Page Start and a Page Stop Register. Ethernet packets consist of a distribution of shorter link control packets and longer data packets. The 256 byte buffer length provides a good compromise between short packets and longer packets to most efficiently use memory. In addition, these buffers provide memory resources for storage of back-to-back packets in loaded networks. The assignment of buffers for storing packets is controlled by Buffer Management Logic in the NIC. The Buffer Management Logic provides three basic functions: linking receive buffers for long packets, recovery of buffers when a packet is rejected, and recirculation of buffer pages that have been read by the host. At initialization, a portion of the 64k byte (or 32k word) address space is reserved for the receive buffer ring. Two eight bit registers, the Page Start Address Register (PSTART) and the Page Stop Address Register (PSTOP) define the physical boundaries of where the buffers reside. The NIC treats the list of buffers as a logical ring; whenever the DMA address reaches the Page Stop Address, the DMA is reset to the Page Start Address.

Note Page Start should not be set equal to Page Stop since this will cause a ring buffer overflow on the first received packet.

Section 3.16.11 Initialization of the Buffer Ring

Referring to FIG. 3-27, which shows the buffer ring at initialization, two static registers and two working registers control the operation of the Buffer Ring. These are the Page Start Register, Page Stop Register (both described previously), the Current Page Register and the Boundary Pointer Register. The Current Page Register points to the first buffer used to store a packet and is used to restore the DMA for writing status to the Buffer Ring or for restoring the DMA address in the event of a Runt packet, or a CRC or Frame Alignment error. The Boundary Register points to the first packet in the Ring not yet read by the host. If the local DMA address ever reaches the Boundary, reception is aborted. The Boundary Pointer is also used to initialize the Remote DMA for removing a packet and is advanced when a packet is removed. A simple analogy to remember the function of these registers is that the Current Page Register acts as a Write Pointer and the Boundary Pointer acts as a Read Pointer.

Note at initialization, the Page Start Register value should be loaded into both the Current Page Register and the Boundary Pointer Register.

Section 3.16.12 BEGINNING OF RECEPTION

Referring to FIG. 3-28, which shows the buffer ring when the received packet enters the buffer ring, when the packet begins arriving the NIC begins storing the packet at the location pointed to by the Current Page Register. An initial offset of 4 bytes is used to allow room for storing receive status corresponding to this packet. Similarly, FIG. 3-29 is a diagram showing the ACENIC receive buffer ring.

Section 3.16.13 LINKING RECEIVE BUFFER PAGES

Referring to FIG. 3-30, which shows the buffer ring when received buffer pages are linked, if the length of the packet exhausts the first 256 byte buffer, the DMA performs a forward link to the next buffer to store the remainder of the packet. For a maximal length packet the buffer logic will link six buffers to store the entire packet. Buffers cannot be skipped when linking, a packet will always be stored in contiguous buffers. Before the next buffer can be linked, the Buffer Management Logic performs two comparisons. The first comparison tests for equality between the DMA address of the next buffer and the contents of the Page Stop Register. If the buffer address equals the Page Stop Register, the buffer management logic will restore the DMA to the first buffer in the Receive Buffer Ring value programmed in the Page Start Address Register. The second comparison tests for equality between the DMA address of the next buffer address and the contents of the Boundary Pointer Register. If the two values are equal the reception is aborted. The buffer linking and comparison processes do not take extra bus clock cycles. The Boundary Pointer Register can be used to protect against overwriting any area in the receiver buffer ring that has not yet been read. When linking buffers, buffer management will never cross this pointer, effectively avoiding any overwrites. If the buffer address does not match either the Boundary Pointer or Page Stop Address, the link to the next buffer is performed.

Section 3.16.14 Buffer Ring Overflow

If the Buffer Ring has been filled and the DMA reaches the Boundary Pointer Address, reception of the incoming packet will be aborted by the NIC. Thus, the packets previously received and still contained in the Ring will not be destroyed. In a heavily loaded network environment the local DMA may be disabled due to buffer ring overflow, preventing the NIC from buffering packets from the network. To recover from this situation, one or more packets should be unloaded from the buffer ring. Remote DMA is still functional while the OVW bit is set. After removing packets, restart the NIC by setting the STA bit to 1 and STP bit to 0.

Section 3.16.15 END OF PACKET OPERATIONS

At the end of the packet the NIC determines whether the received packet is to be accepted or rejected. It either branches to a routine to store the Buffer Header or to another routine that recovers the buffers used to store the packet. FIG. 3-31 is a diagram showing the received packet aborted if it hits boundary pointer.

Section 3.16.16 SUCCESSFUL RECEPTION

If the packet is successfully received, which shows the termination of received packet—if accepted, the DMA is restored to the first buffer used to store the packet (pointer to by the Current Page Register). The DMA then stores a four byte packet header consisting of the Receive Status Register, a pointer to where the next packet will be stored (Buffer 4) and the number of received bytes. Note that the remaining bytes in the last buffer are discarded and reception of the next packet begins on the next empty 256-byte buffer boundary. The Current Page Register is then set to the next available buffer in the Buffer Ring. The received CRC is always stored in buffer memory after the last byte of received data for the packet.

Section 3.16.17 BUFFER RECOVERY FOR REJECTED PACKETS

If the packet is a runt packet or contains CRC or Frame alignment errors, it is rejected. The buffer management logic resets the DMA back to the first buffer page used to store the packet (pointed to by CURR), recovering all buffers that had been used to store the rejected packet. This operation will not be performed if the NIC is programmed to accept either runt packets or packets with CRC or Frame Alignment errors.

Section 3.16.18 REMOVING PACKETS FROM THE RING

Packets are removed from the ring using Remote DMA. When using the Remote DMA the Send Packet command can be used. This programs the Remote DMA to automatically remove the received packet pointed to by the Boundary Pointer. At the end of the transfer, the NIC moves the Boundary Pointer, freeing additional buffers for reception. The Boundary Pointer can also be moved manually by programming the Boundary Register.

Section 3.16.19 STORAGE FORMAT FOR RECEIVED PACKETS

The following diagrams describe the format for how received packets are placed into memory by the local DMA channel. These modes are selected in the Data Configuration register.

Storage Format

The format used is this.

| AD15 AD8 | AD7 AD0 |
|---|---|
| Next Packet | Receive |
| Pointer | Status |
| Receive | Receive |
| Byte Count 1 | Byte Count 0 |
| Byte 2 | Byte 1 |

Section 3.16.20 Packet Transmission

The Local DMA is also used during transmission of a packet. Three registers control the DMA transfer during transmission: a Transmit Page Start Address Register (TPSR) and the Transmit Byte Count Registers (TBCR0, 1). When the NIC receives a command to transmit the packet pointed to by these registers, on-chip buffer memory data will be moved into the FIFO as required during transmission. The NIC will generate and append the preamble, synch and CRC fields.

Section 3.16.21 TRANSMIT PACKET ASSEMBLY

The NIC requires a contiguous assembled packet with the format shown. The transmit byte count includes the Destination Address, Source Address, Length Field and Data. It does not include preamble and CRC. When transmitting packets smaller than 64 bytes, the total packet size should be padded to a minimum size of 64 bytes. The programmer is responsible for adding and stripping pad bytes. This will keep packets within the minimum packet specification set in IEEE 802.3. The packets are placed in the buffer RAM by the system. In O/O Mode the system programs the NIC Core's Remote DMA to mode the data from the data port to the RAM handshaking with system transfers loading the I/O data port.

General Transmit Packet Format

Section 3.16.22 TRANSMISSION

Prior to transmission, the TPSR (Transmit Page Start Register) and TBCR0, TBCR1 (Transmit Byte Count Registers) must be initialized. To initiate transmission of the packet the TXP bit in the Command Register is set. The Transmit Status Register (TSR) is cleared and the NIC begins to pre-fetch transmit data from memory (unless the NIC is currently receiving). If the interframe gap has timed out, the NIC will begin transmission.

Section 3.16.23 Conditions Required to Begin Transmission

In order to transmit a packet, the following three conditions must be met:

1. The Interframe Gap Timer has timed out the first 9.6 µs of the Interframe Gap
2. At least one byte has entered the FIFO. (This indicates that the burst transfer has been started)
3. If the NIC had collided, the backoff timer has expired.

Note If carrier sense is asserted before preamble begins, the NIC will become a receiver.

Section 3.16.24 Collision Recovery

During transmission, the Buffer Management logic monitors the transmit status to determine if a collision has occurred. If a collision is detected, the Buffer Management logic will reset the FIFO and restore the Transmit DMA pointers for retransmission of the packet. The COL bit will be set in the TSR and the NCR (Number of Collisions Register) will be incremented. If more than 15 collisions are detected, the transmission will be aborted and the ABT bit in the TSR will be set.

Note NCR reads as zeros if excessive collisions are encountered.

Section 3.16.25 TRANSMIT PACKET ASSEMBLY FORMAT

The following diagrams describe the format for how packets must be assembled prior to transmission for different byte ordering schemes. The various formats are selected in the Data Configuration register.

This format used with Series 32000 and 808X type processors.

| D15 D8 | D7 D0 |
|---|---|
| DA1 | DA0 |
| DA3 | DA2 |
| DA5 | DA4 |
| SA1 | SA0 |
| SA3 | SA2 |
| SA5 | SA4 |
| T/L 1 | T/L 0 |
| DATA 1 | DATA 0 |

Note The example above will result in a transmission of a packet in order of DA0, DA1, DA2, DA3 . . . bits within each byte will be transmitted least significant bit first.

DA=Destination Address

SA=Source Address

T/L=Type/Length Field

The Remote DMA channel is used to both assemble packets for transmission, and to remove received packets from the Receive Buffer Ring. It may also be used as a general purpose slave DMA channel for moving blocks of data or commands between host memory and local buffer memory. There are three modes of operation: Remote Write, Remote Read or Send Packet.

Two register pairs are used to control the Remote DMA, a Remote Start Address (RSAR0, RSAR1) and a Remote Byte Count (RBCR0, RBCR1) register pair. The Start Address Register pair points to the beginning of the block to be moved. It also serves as the current address pointer when Remote DMA is in progress. The Byte Count Register pair is used to indicate the number of bytes to be transferred. Full handshake logic is provided to move data between local buffer memory and a bidirectional I/O port.

Section 3.16.26 REMOTE WRITE

The Remote Write transfer is used to move a block of data from the host into local buffer memory. The Remote DMA channel will read data from the I/O port and sequentially write it to local buffer memory beginning at the Remote Start Address. The DMA Address will be incremented and the Byte Counter will be decremented after each transfer. The DMA is terminated when the Remote Byte Count Register reaches a count of zero.

Section 3.16.27 REMOTE READ

A Remote Read transfer is used to move a block of data from local buffer memory to the host. The Remote DMA will sequentially read data from the local buffer memory, beginning at the Remote Start Address, and write data to the I/O port. The DMA Address will be incremented and the Byte Counter will be decremented after each transfer. The DMA is terminated when the Remote Byte Count Register reaches zero.

Section 3.16.28 SEND PACKET COMMAND

Referring to FIG. 3-32, which is a diagram showing the remote DMA autoinitialization from buffer ring, the Remote DMA channel can be automatically initialized to transfer a single packet from the Receive Buffer Ring. The CPU begins this transfer by issuing a "Send Packet" Command. The DMA will be initialized to the value of the Boundary Pointer Register and the Remote Byte Count Register pair (RBCR0, RBCR1) will be initialized to the value of the Receive Byte Count fields found in the Buffer Header of the packet pointed to by BNRY. After the data is transferred, the Boundary Pointer is advanced to allow the buffers to be used for new receive packets. The Remote Read will terminate when the Byte Count equals zero. The Remote DMA is then prepared to read the next packet from the Receive Buffer Ring. If the DMA pointer crosses the Page Stop Register, it is reset to the Page Start Address. This allows the Remote DMA to remove packets that have wrapped around to the top of the Receive Buffer Ring.

Section 3.16.29 End of Packet Operations

At the end of the packet Ethernet controller module 6 determines whether the received packet is to be accepted or rejected. It either branches to a routine to store the Buffer Header or to another routine that recovers the buffers used to store the packet.

Section 3.16.30 Successful Reception

If the packet is successfully received, the DMA is restored to the first buffer used to store the packet (pointed to by the Current Page Register). The DMA then stores the Receive Status, a Pointer to where the next packet will be stored (Buffer 4) and the number of received bytes. Note that the remaining bytes in the last buffer are discarded and reception of the next packet begins on the next empty 256-byte buffer boundary. The Current Page Register is then initialized to the next available buffer in the Buffer Ring. (The location of the next buffer had been previously calculated and temporarily stored in an internal scratchpad register.)

Section 3.16.31 Buffer Recovery for Rejected Packets

If the packet is a runt packet or contains CRC or Frame Alignment errors, it is rejected. The buffer management logic resets the DMA back to the first buffer page used to store the packet (pointed to by CURR), recovering all buffers that had been used to store the rejected packet. This operation will not be performed if Ethernet controller module 6 is programmed to accept either runt packets or packets with CRC or Frame Alignment errors. The received CRC is always stored in buffer memory after the last byte of received data for the packet.

Error Recovery

If the packet is rejected as shown, the DMA is restored by Ethernet controller module 6 by reprogramming the DMA starting address pointed to by the Current Page Register.

Section 3.16.32 Memory Arbitration and Bus operation;

Referring to FIGS. 3-35A, 3-35B and 3-35C, which shows the DP8390 Core Bus States, Ethernet controller module 6 will always operate as a slave device on it's peripheral interface to the ISA bus. Upon power-up Ethernet controller module 6 is in an indeterminate state. After receiving a hardware reset Ethernet controller module 6 is a bus slave in the Reset State, the receiver and transmitter are both disabled in this state. The reset state can be re-entered under four conditions, soft reset (Stop Command), register reset (reset port in I/O mode), hard reset (Reset input) or an error that shuts down the receiver of transmitter (FIFO underflow or overflow, receive buffer ring overflow). After initialization of registers, Ethernet controller module 6 is issued a Start command and Ethernet controller module 6 enters Idle state. Until the DMA is required Ethernet controller module 6 remains in idle state.

All Local DMA transfers are burst transfers, the DMA will transfer an exact burst of bytes programmed in the Data Configuration register (DCR) then relinquish the memory bus. If there are remaining bytes in the FIFO the next burst will not be initiated until the FIFO threshold is exceeded.

FIGS. 3-35A, 3-35B, and 3-35C explains the memory arbitration scheme, which makes the on-chip memory feasible, in more detail. In particular, network interface controllers generally require a data buffer memory of various forms (e.g. registers, FIFO, dedicated local RAM, system RAM, etc.) to hold data received from or transmitted to the network. The size of the data buffer (e.g. how many kilobytes of RAM) is a function of a large number of factors, (e.g., the speed disparity between the network and the host system, the protocol, the structure of the data on the network, the data throughput of the network interface controller, etc.). Moreover, since the compatibility of existing, predesigned software is a major issue, once the perceived size of the buffer is determined and programmed in the network driver software that operates the network interface hardware, it is not likely to be changed. In particular, a network interface adapter or the network port of a computer has to work with major network operating system and driver software, so a change in the buffer size without customizing the software will cause the network hardware to fail most of all network driver software.

With the accelerated speed of network interface controllers and CPUs, buffer size requirements has certainly changed and, thus, can be optimized. In addition, the possibility of integrating the buffer with the controller on a single semiconductor substrate (e.g., one piece of silicon), as promised by the sub-micron technology, allows greater flexibility in designing the buffer size and its configuration. As a result, in light of the potential to optimize and the need to ensure compatibility, preferred system embodiments use the memory mapping technique. This technique provides the freedom to change the buffer memory size in design yet to maintain the software compatibility with the industry standard architecture without sacrificing data throughput of the interface controller.

Referring to FIG. 3-35A, which shows the buffer structure 101 of a common network interface controller, such as National Semiconductor's DP8390 Ethernet controller module. This buffer 101 is divided into two dedicated areas: one transmit buffer 100 (or Tx buffer 100) and one receive buffer 102 (Rx buffer 102). Transmit buffer 100 is preferably a simple single-block buffer that is large enough to hold one data packet that is being assembled for sending to the network. The beginning of the Tx buffer 100 is defined by the Transmit Page Start Register 104. Receive buffer 102 is organized as a circulating buffer ring. The beginning of the ring is defined by the Page Start Register 106. The end of the ring is defined by the Page Stop Register 108. Data packets received from the network are stored into the buffer ring pointed to by the Current pointer 112 while the host system that processes the packets unloads the data from the buffer ring pointed to by the Boundary pointer 110.

Referring to FIG. 3-35A, in the receive buffer ring, Receive buffer 102 is organized in multiple 256-byte pages. Each incoming packet consumes one or more pages of memory (e.g., data packes 120, 122, 124, and 126). If a data packet (e.g., data packet 120, 122, and 124) does not fill to the end of a page, the remaining memory locations in that page will be discarded, as shown in the common buffer structure 103 that uses fixed sized buffer that leaves unused memory in between packets. The size of the in-use block 114 in receive buffer 102, at a given network data rate, is a function of the data throughput of the network interface controller when compared to the host system. In subsequent generations of Ethernet controller modules and host systems, it is foreseeable that the size of receive buffer ring 102. However, as discussed above, the network driver software that was developed for the industry standard architecture, cannot handle a smaller buffer ring.

Referring to FIG. 3-35B, preferred systems use the memory or physical buffer mapping technique creates a smaller buffer ring 130 in the physical memory 132. The memory mapping sub-system maps the original buffer ring 134 (logical buffer 134) into the physical buffer ring 132. Data packets (not shown) are stored and retrieved in the similar way as they are in the logical buffer 134. The actual location of the data is not important as long as the read and write pointers (Current Register and Boundary Register) point to the correct locations. The memory mapping sub-system maintains a set of physical address registers and pointers that control the data read and write operations to the physical buffer. A memory array 136, which provides an address translation table 135, is used to correlate the physical address to the logical address. Some important physical addresses such as the beginning location of a packet, the current packet pointer and the boundary pointer are stored into the table for later reference while storing the packet into the data buffer. When unloading the packet, the logical address is translated into physical address by reading the table and adding the offset. The address mapping function can be done automatically by hardware without user's intervention. Therefore, the user do not need to deal with any physical addressor pointers. The user is still looking at the same set of logical registers of the controller and the same logical buffer. This guarantees complete software compatibility.

Referring to FIG. 3-35C, in order to reduce the memory size requirements of physical buffer memory 13, the mapping technique makes a more effective use of the memory. Instead of organizing receive buffer 102 in 256-byte pages, the memory mapping sub-system allows variable size buffers. A data packet can be stored by an arbitrary physical address. As shown in FIG. 3-35C, a data packet is stored immediately after the previous packet, leaving no unused memory locations in between. Because network traffic often contains small size (much less than 256 bytes) packets in many network protocols, this technique reduces the physical memory requirement.

Because the data buffer is access sequentially in address, this memory mapping technique doesn't require real time address translation (read/write to the address translation table at each data buffer access cycle), translation can be done in some 'strategic' time instances. This eliminates the need of very high speed logic and memory array or the need to slow down the buffer access cycles. Preferred systems utilize a DP8390 compatible Ethernet controller module and is preferrably comprised of the following components: Physical Remote Address Register (Prar), Physical Current Local DMA Address Register (Pclda), Physical Current Address Register (Pcurr), Physical Boundary Register (Pbnry), Address Translation Table, Psar wrap around logic, Pclda wrap around logic, Physical buffer overflow logic. The Physical Remote Address Register (Prar) is the physical counterpart of the Rsar of the DS8390. It is used in the remote dma read from the buffer only. The Physical Current Local DMA Address Register (Pclda) is the physical counterpart of the Clda of the DP8390. It is used in the local DMA write to the buffer only. The Physical Current Address Register (Pcurr) is the physical counterpart of the Curr of the DP8390. It is used to point to the beginning of next available buffer in the physical address. The Physical Boundary Register (Pbnry) is the physical counterpart of the Bnry of the DP8390. It is used to point to the beginning of the buffer area not yet unloaded by the remote DMA. The Address translation table is a RAM array inside the memory mapper. it is not part of the buffer RAM. The table holds the physical address of a logical page that mapped to. The number of entries of the table equals to the number of logical pages (64 pages for 16K bytes logical buffer). The bit width of each entry equals to the bit width of the physical address (12 bits for a 6K bytes physical buffer). The Prar wrap around logic compares Prar with the physical page stop value. It will wrap back to physical page start when it hits physical page stop. Pclda wrap around logic compares Pclda with the physical page stop value. It will wrap back to physical page start when it hits physical page stop. Physical buffer overflow logic compares Pclda with the Pbnry register. It will generate a buffer overflow signal if they are equal. The overflow signal is combined with the logical buffer overflow signal so that the same status bit in the status register will be set if the physical buffer overflows.

The preferred operation of this memory mapping technique comprises the following steps. First, only the receive buffer is mapped to a smaller physical memory. The transmit buffer in the logical memory is mapped directly to the physical memory. If the transmit buffer is located at the upper end of the address space, it will be shifted to the end of the physical buffer. Therefore, memory mapping is done only in local DMA write or in remote DMA read. Second, when a packet is about to come in, the value of Pcurr is written into the translation table at the address pointer to by the Curr register. The value of Pcurr is also loaded into the Pclda register. The subsequent local DMA write address will come from the Pclda. Pclda is incremented during the local DMA operation. Third, when the local DMA writes across the logical page, the current Pclda value will be written in to the table so that every logical page has a corresponding physical address. Fourth, at the end of the packet receive, contents of Pcurr and Pclda will be swapped so that both of them will be updated. Fifth, when the user programs the Rsar for a remote DMA read, the upper byte of the Rsar is used as the address to read the translation table. The physical address read from the table is then added with the lower byte of the Rsar which is the offset within the packet. This translated address (physical address of beginning of packet+ offset) is stored into the Prar register. The subsequent remote DMA read address will come from the Prar. Prar is incremented during the remote DMA operation. Sixth, when the user update the Bnry register, the corresponding physical address is checked out from the table and unloaded into the Pbnry. It will be used during a packet receive to determine the physical buffer overflow situation.

Preferred hardware implementations are shown in FIG. 3-35D.

Section 3.16.33 I/O Mode Operation

Referring to FIG. 3-36, which is shows the I/O Operation for All Data Transfers and Arbitration is Controlled by the NIC Core, Ethernet controller module 6 transfers data to and from the packet buffer RAM by utilizing the Remote DMA logic which is programmed by the main system CPU to transfer data through Ethernet controller module 6's internal data port register.

Section 3.16.34 Interleaved Local/Remote Operation

The remote DMA is used to transfer data to/from the main system. If a remote DMA transfer is initiated or in progress when a packet is being received or transmitted, the Remote DMA transfers will be interrupted for higher priority Local DMA transfers. When the Local DMA transfer is completed the Remote DMA will rearbitrate for the bus and continue its transfers. If the FIFO requires service while a remote DMA is in progress the Local DMA burst is appended to the Remote Transfer. When switching from a local transfer to a remote transfer there is a break to allow the CPU to fairly contend for the bus.

Section 3.16.34.1 Remote DMA Bi-directional Port

Referring to FIG. 3-37, which shows the first Received Packet Removed by Remote DMA, the Remote DMA transfers data between the local buffer memory and the internal bidirectional port (memory to I/O transfer). This transfer is arbitrated on a transfer by transfer basis versus the burst transfer mode used for Local DMA transfers. This bidirectional port is integrated onto Ethernet controller module 6, and is read/written by the host. All transfers through this port are asynchronous. At any one time transfers are limited to one direction, either form the port to local buffer memory (Remote Write) or form local buffer memory to the port (Remote Read).

Section 3.16.34.2 I/O Mode Removing Packets from Ring

Network activity is isolated on a local bus, where Ethernet controller module 6's local DMA channel performs burst transfers between the buffer memory and Ethernet controller module 6's FIFO. The Remote DMA transfers data between the buffer memory and the host memory via the internal bidirectional I/O port. The Remote DMA provides local addressing capability and is used as a slave DMA by the host. The host system reads the I/O port to transfer data between the system and I/O port. Ethernet controller module 6 allows Local and Remote DMA operations to be interleaved.

Packets are removed from the ring using the Remote DMA. When using the Remote DMA the Send Packet command can be used. This programs the Remote DMA to automatically remove the received packet pointed to by the Boundary Pointer. At the end of the transfer, Ethernet controller module 6 moves the Boundary Pointer, freeing additional buffers for reception. The Boundary Pointer can also be moved manually by programming the Boundary Register. Care should be taken to keep the Boundary Pointer at least one buffer behind the Current Page Pointer. The following is a suggested method for maintaining the Receive Buffer Ring pointers or if remote read is used in I/O mode.

1. At initialization, set up a software variable (next_pkt) to indicate where the next packet will be read. At the beginning of each Remote Read DMA operation, the value of next_pkt will be loaded into RSAR0 and RSAR1.
2. when initializing Ethernet controller module 6 set:
BNDRY=PSTART
CURR=PSTART+1
next_pkt=PSTART+1
3. After a packet is DMAed from the Receive Buffer Ring, the Next Page Pointer (second byte in Ethernet controller module 6 buffer header is used to update BNDRY and next_pkt.
next_pkt=Next Page Pointer
BNDRY=Next Page Pointer–1
If BNDRY<PSTART then BNDRY=PSTOP–1

Note the size of the Receive Buffer Ring is reduced by one 256-byte buffer, this will not, however, impede the operation of Ethernet controller module 6. The advantage of this scheme is that it easily differentiates between buffer full and buffer empty: it is full if BNDRY=CURR; empty when BNDRY=CURR–1. Send packet is used to empty the buffer ring this scheme cannot be used. BNDRY must be initialized equal to CURR, or the first executed send packet will not return data from the received packet, which will be written at CURR. The Overwrite Warning bit of the Interrupt Status Register must be used in this mode to differentiate between buffer full and buffer empty.

Section 3.16.35 Remote DMA Commands;

Referring to FIG. 3-38, which shows the remote DMA autoinitialization from the buffer ring, the Remote DMA channel is used in the I/O Mode to both assemble packets for transmission, and to remove received packets from the Receive Buffer Ring. It may also be used for moving blocks of data or commands between host memory and local buffer memory. There are three modes of Remote DMA operation: Remote Write, Remote Read, or Send Packet.

Two register pairs are used to control the Remote DMA, a Remote Start Address (RSAR0, RSAR1) and a Remote Byte Count (RBCR0, RBCR1) register pair. The Start Address Register pair points to the beginning of the block to be moved while the Byte Count Register pair is used to indicate the number of bytes to be transferred. Full handshake logic is provided to move data between local buffer memory and a bidirectional I/O port.

Remote Write: A Remote Write transfer is used to move a block of data from the host into on-chip memory. The Remote DMA will read data from the I/O port and sequentially write it to local buffer memory beginning at the Remote Start Address. The DMA Address will be incremented and the Byte Counter will be decremented after each transfer. The DMA is terminated when the Remote Byte Count Register reaches a count of zero.

Remote Read: A Remote Read transfer is used to move a block of data from local buffer memory to the host. The Remote DMA will sequentially read data from the local buffer memory, beginning at the Remote Start Address, and write data to the I/O port. The DMA Address will be incremented and the Byte Counter will be decremented after each transfer. The DMA is terminated when the Remote Byte Count Register reaches zero.

Send Packet Command: The Remote DMA channel can be automatically initialized to transfer a single packet from the Receive Buffer Ring. The CPU begins this transfer by issuing a ÒSend PacketÓ Command. The DMA will be initialized to the value of the Boundary Pointer Register and the Remote Byte Count Register pair (RBCR0, RBCR1) will be initialized to the value of the Receive Byte Count fields found in the Buffer Header of each packet. After the data is transferred, the Boundary Pointer is advanced to allow the buffers to be used for new receive packets. The Remote Read will terminate when the Byte Count equals zero. The Remote DMA is then prepared to read the next packet from the Receive Buffer Ring. If the DMA pointer crosses the Page Stop Register, it is reset to the Page Start Address. This allows the Remote DMA to remove packets that have wrapped around to the top of the Receive Buffer Ring.

Note that in order for Ethernet controller module 6 to correctly execute the Send Packet Command, the upper Remote Byte Count Register (RBCR1) must first be loaded with a non-zero value.

Section 3.16.36 Read Timing

1) The DMA reads word from local buffer memory and writes the word into the internal latch, increments the DMA address and decrements the byte count (RBCR0, 1).
2) Internally a request line is asserted to enable the system to read the port. If the system reads this port before the data has been written, then the system is sent a wait signal to wait until the data has been written to the port. Once written the systems read is allowed to complete.
3) The system reads the port, the read strobe for the port is used as an acknowledge to the Remote DMA and it goes back to step 1.

Steps 1–3 are repeated until the remote DMA is complete. (i.e. the byte count has gone to zero.)

Note that in order for the Remote DMA to transfer a word from memory to the latch, it must arbitrate access to the local buffer RAM. After each word is transferred to the internal latch, access to the RAM is relinquished. If a Local DMA is in progress, the Remote DMA is held off until the local DMA is complete.

Section 3.16.37 Write Timing

Referring to FIG. 3-39, which shows the shared memory mode the ISA Bus direct access, the RAM remote write operation transfers data from the I/O port to the local buffer RAM. The write strobe is detected by Ethernet controller module 6 and the byte/word is transferred to local buffer memory. The Remote DMA holds off further transfers into the latch until the current byte/word has been transferred from the latch.

1) Ethernet controller module awaits data to be written by the system. System writes byte/word into latch.
2) Remote DMA reads contents of port and writes byte/word to local buffer memory, increments address and decrements byte count (RBCR0,1).
3) Go back to step 1.

Steps 1–3 are repeated until the remote DMA is complete.

Section 3.16.38 Initialization Procedures

Ethernet controller module 6 must be initialized prior to transmission or reception of packets from the network. Reset is applied to the PC87340 reset pin. This clears/sets the following bits shown in the following TABLE:

| Register | Clear Bits | Set Bits |
| --- | --- | --- |
| Command Register (CR) | PS1, PS0, RD1, RD0, TXP, STA | RD2, STP |
| Interrupt Status (ISR) Interrupt Mask (IMR) All Bits | | RST |
| Data Control (DCR) | | FT1, FT0 ARM |
| Transmit Config. (TCR)L | LB1, LB0 | |
| Compatibility Reg (CMSR) | All Bits | |

Ethernet controller module 6 remains in its offline state until a Start Command is issued. This guarantees that no packets are transmitted or received and that Ethernet controller module 6 remains a bus slave until all appropriate internal registers have been programmed. After initialization the STP bit of the command register is reset and the STA bit is set, and packets may be received and transmitted.

Section 3.16.39 INITIALIZATION SEQUENCE OPTIONAL

The following initialization procedure is traditional:
1. Program Command Register for Page 0 (Command Register=21H).
2. Initialize Data Configuration register (DCR).
3. Clear Remote Byte Count Registers (RBCR0, RBCR1).
4. Initialize Receive Configuration register (RCR)
5. Place Ethernet controller module 6 in LOOPBACK mode 1 or 2 (Transmit Configuration register=02H or 04H).
6. Initialize Receive Buffer Ring: Boundary Pointer (BNDRY), Page Start (PSTART), and Page Stop (PSTOP).
7. Clear Interrupt Status Register (ISR) by writing 0FFh to it.
8. Initialize Interrupt Mask Register (IMR).
9. Program Command Register for page 1 (Command Register=61H).
    a. Initialize Physical Address Registers (PAR0–5)
    b. Initialize Multicast Address Registers (MAR0–7)
    c. Initialize CURRent pointer.
10. Put Ethernet controller module in START mode (Command Register=22H). The local receive DMA is still not active since Ethernet controller module 6 is in LOOPBACK.
11. Initialize the Transmit Configuration for the intended value. Ethernet controller module 6 is now ready for transmission and reception.

Before receiving packets, the user must specify the location of the Receive Buffer Ring. This is programmed in the Page Start and Page Stop Registers. In addition, the Boundary and Current Page Registers must be initialized to the value of the Page Start Register. These registers will be modified during reception of packets.

Section 3.16.40 Loopback Diagnostics

Three forms of local loopback are provided on the PC87340 Ethernet controller module. The user has the ability to loopback through the deserializer on Ethernet controller module 6, through the ENDEC module, and through the transceiver to check the link. Because of the half duplex architecture of Ethernet controller module 6, loopback testing is a special mode of operation with the following restrictions:

Section 3.16.41 RESTRICTIONS DURING LOOPBACK

The FIFO is split into two halves, one used for transmission and the other for reception. Only 8-bit fields can be fetched from memory so two tests are required for 16-bit systems to verify integrity of the entire data path. During loopback the maximum latency from the assertion of BREQ to BACK is 2.0 μs. Systems that wish to use the loopback test yet do not meet this latency, can limit the loopback packet to 7 bytes without experiencing underflow. Only the last 8 bytes of the loopback packet are retained in the FIFO. The last 8 bytes can be read through the FIFO register, which will advance through the FIFO to allow reading the receive packet sequentially.

| DESTINATION ADDRESS | = (6 bytes) Station Physical Address |
|---|---|
| SOURCE ADDRESS | ! |
| LENGTH | 2 bytes |
| DATA | = 46 to 1500 bytes |
| CRC | Appended by Ethernet controller module if CRC = "0" in TCR |

The following format must be used for the loopback packet:

| MS BYTE (AD8–15) | LS BYTE (AD0–7) |
|---|---|
| DESTINATION | |
| SOURCE | |
| LENGTH | |
| DATA | |
| CRC | |

WTS = "1"
BOS = "1" (DCR BITS)

Note: When using loopback in word mode 2n bytes must be programmed in TBCR0,1 where n=actual number of bytes assembled in even or odd location. To initiate a loopback the user first assembles the loopback packet, then selects the type of loopback using the Transmit Configuration register bits LB0, LB1. The Transmit Configuration register must also be set to enable or disable CRC generation during transmission. The user then issues a normal transmit command to send the packet. During loopback the receiver checks for an address match and if the CRC bit in the TCR is set, the receiver will also check the CRC. The last 8 bytes of the loopback packet are buffered and can be read out of the FIFO using the FIFO read port.

Section 3.16.42 LOOPBACK MODES

MODE 1: Loopback Through the Controller (LB1=0, LB0=1). If the loopback is through Ethernet controller module 6, then the serializer is simply linked to the deserializer and the receive clock is derived from the transmit clock.

MODE 2: Loopback Through the ENDEC module (LB1=1, LB0=0). If the loopback is to be performed through the SNI, the ACENIC provides a control (LPBK) that forces the SNI to loopback all signals.

MODE 3: Loopback to external Coax or twisted pair module (LB1=1, LB0=1). Packets can be transmitted to the coax in loopback mode to check all of the transmit and receive paths and the cable itself.

Please note that in MODE 1, CRS and COL lines are not indicated in any status register, but the ACENIC will still defer if these lines are active. In MODE 2, COL is masked, and in MODE 3 CRS and COL are not masked.

Section 3.16.43 READING THE LOOPBACK PACKET

The last eight bytes of a received packet can be examined by 8 consecutive reads of the FIFO register. The FIFO pointer is incremented after the rising edge of the CPU's read strobe.

Please note the FIFO may only be read by the system during Loopback Mode. Reading the DIFO at any other time will cause the PC87340 to output spurious data during the FIFO read cycle.

Section 3.16.44 ALIGNMENT OF THE RECEIVED PACKET IN THE FIFO

Reception of the packet in the FIFO begins at location zero. When the FIFO pointer reaches the last location in the FIFO, the pointer wraps to the top of the FIFO, overwriting the previously received data. This process continues until the last byte is received. The ACENIC then appends the received count in the next two locations of the FIFO. The contents of the Upper Byte Count are also copied to the next FIFO location. The number of bytes used in the loopback packet determines the alignment of the packet in the FIFO since the read pointer remains at location 0. The alignment for a 64-byte packet is shown in the TABLE below:

| FIFO LOCATION | FIFO CONTENTS | |
|---|---|---|
| 0 | LOWER BYTE COUNT | → First Byte Read |
| 1 | UPPER BYTE COUNT | Second Byte Read |
| 2 | UPPER BYTE COUNT | ■ |
| 3 | LAST BYTE | ■ |
| 4 | CR1 | ■ |
| 5 | CR2 | ■ |
| 6 | CR3 | ■ |
| 7 | CR4 | → Last Byte Read |

For the following alignment in the FIFO the packet length should be (N×8)+5 bytes. Note that if the CRC bit in the TCR is set, CRC will not be appended by the transmitter. If the CRC is appended by the transmitter, the last four bytes, N-3 to N, correspond to the CRC, as shown in the TABLE below.

| FIFO LOCATION | FIFO CONTENTS | |
|---|---|---|
| 0 | BYTE N-4 | → First Byte Read |
| 1 | BYTE N-3 (CRC1) | Second Byte Read |
| 2 | BYTE N-2 (CRC2) | ■ |
| 3 | BYTE N-1 (CRC3) | ■ |
| 4 | BYTE N (CRC4) | ■ |
| 5 | LOWER BYTE COUNT | ■ |
| 6 | UPPER BYTE COUNT | ■ |
| 7 | UPPER BYTE COUNT | → Last Byte Read |

Loopback capabilities are provided to allow certain test to be performed to validate operation of the ACENIC prior to transmitting and receiving packets on a live network. Typically these test may be performed during power up of a node. The diagnostic provides support to verify the following:

1. Verify integrity of data path. Received data is checked against transmitted data.
2. Verify CRC logic's capability to generate good CRC on transmit. Verify CRC on receive (good or bad CRC).
3. Verify that the Address Recognition Logic can
   a. recognize address match packets
   b. reject packets that fail to match an address

Section 3.16.46 LOOPBACK OPERATION IN THE ACENIC

Loopback is a modified form of transmission using only half of the FIFO. This places certain restrictions on the use of loopback testing. When loopback mode is selected in the TCR, the FIFO is split. A packet should be assembled in memory, and the TPSR and TBCR0.TBCR1 registers should be programmed for packet transmission. When the transmit command is issued the following operations occur:

Section 3.16.46.1 Transmitter Actions

1. Data is transferred from memory by the DMA until the FIFO is filled. For each transfer, TBCR0 and TBCR1 are decremented. (Subsequent burst transfers are initiated when the number of bytes in the FIFO drops below the programmed threshold).
2. The ACENIC generates 62 bits of preamble followed by an 2-bit synch pattern.
3. Data transferred from FIFO to serializer.
4. If CRC=1 in the TCR, no CRC calculated by the ACENIC, the last byte transmitted is the last byte from the FIFO (allows software CRC to be appended). If CRC=0, the ACENIC calculates and appends four bytes of the CRC.
5. At end of Transmission PTX bit set in ISR.

Section 3.16.46.2 9.6.2 Receiver Actions

1. Wait for synch, all preamble stripped.
2. Store packet in FIFO, increment the receive byte count for each incoming byte.
3. If CRC=) in the TCR, the receiver checks the incoming packet for CRC errors. If CRC=1 in the TCR, the receiver does not check CRC errors.
4. At the end of receive, the receive byte count is written into the FIFO and the receive status register is updated.

Section 3.16.46.3 EXAMPLES

The following examples show what results can be expected from a properly operating Ethernet controller module during loopback. The restrictions and results of each type of loopback are listed for reference. The loopback tests are divided into two sets of tests. One verifies the data path, CRC generation and byte count through all three paths. The second set of tests uses internal loopback to verify the receiver's CRC checking and address recognition. For all of the tests the DCR was programmed to 40h, as shown in the TABLE below.

| PATH | TCR | RCR | TSR | RSR | ISR |
|---|---|---|---|---|---|
| Ethernet controller module | 02 | 00 | 53(1) | 02(2) | 02(3) |

Please note that since carrier sense and collision detect inputs are blocked during internal loopback, carrier and CD heartbeat are not seen and the CRS and CDH bits are set. In addition, CRC errors are always indicated by receiver if CRC is appended by the transmitter. Only the PTX bit in the ISR is set. The PRX bit is only set if status is written to memory. In loopback, this action does not occur and the PRX bit remains 0 for all loopback modes. All values are hex.

| PATH | TCR | RCR | TSR | RSR | ISR |
|---|---|---|---|---|---|
| Ethernet controller module | 04 | 00 | 43(1) | 02 | 02 |

Please note CDH is set. CRS is not set since it is generated by the ENDEC.

| PATH | TCR | RCR | TSR | RSR | ISR |
|---|---|---|---|---|---|
| Ethernet controller module | 06 | 00 | 03(1) | 02 | 02(2) |

Please note CDH and CRS should not be set. The TSR, however, could also contain 01h, 03h, 07h and a variety of other values, depending on whether collisions were encountered or the packet was deferred. Note will contain 08h if packet is not transmittable. During external loopback Ethernet controller module 6 is now exposed to network traffic. It is therefore possible for the contents of both the Receive portion of the FIFO and the RSR to be corrupted by any other packet on the network. Thus, in a live network the contents of the FIFO and RSR should not be depended upon. Ethernet controller module 6 will still abide by the standard CSMA/CD protocol in external loopback mode (i.e. the network will not be disturbed by the loopback packet). All values are hex.

Section 3.16.46.4 CRC AND ADDRESS RECOGNITION

The next three tests exercise the address recognition logic and CRC. These tests should be performed using internal loopback only so that Ethernet controller module 6 is isolated from interference from the network. These tests also require the capability to generate CRC in software. The CRC and FAE bits in the RSR are only set if the address of the packet matches the address filters. The following sequence of packets will test the address recognition logic. The DCR should be set to 40h and the TCR should be set to 03h with a software generated CRC.

| | Packet Contents | | Results |
|---|---|---|---|
| Test | Address | CRC | RSR |
| Test A | Matching | Good | 01(2) |
| Test B | Matching | Bad | 02(2) |
| Test C | Non-Matching | Bad | 01 |
| Test D | Non-Matching | Good | 01 |

Please note Status will read 21h if multicast address used. Status will read 22h if multicast address used. In test A, the RSR is set up. In test B, the address is found to match since the CRC is flagged as bad. Test C proves that the address recognition logic can distinguish a bad address and does not notify the RSR of the bad CRC. The receiving CRC is proven to work in test A and test B. All values are hex.

Section 3.16.46.5 NETWORK MANAGEMENT FUNCTIONS

Network management capabilities are required for maintenance and planning of a local area network. The ACENIC supports the minimum requirements for network management in hardware. The remaining requirements can be met with software counts. There are three events that software alone cannot track during reception of packets: CRC errors, Frame Alignment errors, and Missed Packets. Since errored packets can be rejected, the status associated with these packets is lost unless the CPU can access the Receive Status Register before the next packet arrives. In situations where another packet arrives very quickly, the CPU may have no opportunity to do this. The ACENIC counts the number of packets with CRC errors and Frame Alignment errors. 8-bit counters have been selected to reduce overhead. The counters will generate interrupts whenever their MSBs are set so that a software routine can accumulate the network statistics and reset the counters before overflow occurs. The counters are sticky so that when they reach a count of 192 (COH) counting is halted. An additional counter is provided to count the number of packets the ACENIC misses because of buffer overflow or being in the monitor state. See FIG. 3-40.

Additional information required for network management is available in the Receive Status and Transmit Status registers. Transmit status is available after each transmission for information regarding events during transmission. Typically, the following statistics might be gathered in software:

Traffic:
    Frames Sent OK
    Frames Received OK
    Multicast Frames Received
    Packets Lost due to Lack of Resources
    Retries/Packet
Errors:
    CRC Errors
    Alignment Errors
    Excessive Collisions
    Packet with Length Errors
    Heartbeat Failure be initiated until the FIFO threshold is exceeded.

Section 4.0 Floppy Disk Controller

Section 4.1 FDC 12 Register Description

Referring to FIG. 4-1, which is a functional block diagram of floppy disk controller, the floppy disk controller is suitable for all PC-AT, EISA, PS/2, and general purpose applications. The operational mode (PC-AT, PS/2, or Model 30) of the FDC 12 is determined by hardware strapping of the IDENT and MFM pins. DP8473 and N82077 software compatibility is provided. Key features include a 16-byte FIFO, PS/2 diagnostic register support, perpendicular recording mode, CMOS disk interface, and a high performance analog data separator.

The FDC 12 supports the standard PC data rates of 250/300 and 500 kb/s, as well as 1 Mb/s. The 1 Mb/s data rate is used in the high performance tape and floppy disk drives that are emerging in the PC world today. The FDC 12 also supports the perpendicular recording mode, a new format used with some high performance, high capacity disk drives at the 1 Mb/s data rate. The high performance internal analog data separator needs no external components. It improves on the window margin performance standards of the DP8473, and is compatible with the strict data separator requirements of floppy and floppy-tape drives.

Referring to FIG. 4-1, which shows the Functional Block Diagram for FDC 12, the internal 40mA totem-pole disk interface buffers are compatible with both CMOS drive inputs and 150Ω resistor terminated disk drive inputs.

The following FDC 12 registers are mapped into the addresses shown below, with the base address range being provided by the on-chip address decoder pin. For PC-AT or PS/2 applications, the diskette controller primary address range is 3F0 to 3F7 (hex), and the secondary address range is 370 to 377 (hex). The FDC 12 supports two different register modes: the PC-AT mode, and the Model 30 mode (Model 30). When applicable, the register definition for each mode of operation is given. If no special notes are made, then the register is valid for all three register modes. See TABLE 4-1.

TABLE 4-1

Register Description and Addresses

| A2 | A1 | A0 | IDENT | R/W | Register | |
|---|---|---|---|---|---|---|
| 0 | 0 | 0 | 0 | R | Status Register A | SRA |
| 0 | 0 | 1 | 0 | R | Status Register B | SRB |
| 0 | 1 | 0 | x | R/W | Digital Output Register | DOR |
| 0 | 1 | 1 | x | R/W | Tape Drive Register | TDR |
| 1 | 0 | 0 | x | R | Main Status Register | MSR |
| 1 | 0 | 0 | x | W | Data Rate Select Register | DSR |
| 1 | 0 | 1 | x | R/W | Data Register (FIFO) | FIFO |
| 1 | 1 | 0 | x | X | None (But TRI-STATE) | |
| 1 | 1 | 1 | x | R | Digital Input Register | DIR |
| 1 | 1 | 1 | x | W | CCR Configuration Control Register | |

Please note SRA and SRB are enabled by IDENT=0 during a chip reset only.

Section 4.2 STATUS REGISTER A (SRA) Read Only

This is a read-only diagnostic register that is part of the PS/2 floppy controller register set, and is enabled when in the Model 30 mode. This register monitors the state of the IRQ6 pin and some of the disk interface signals. The SRA can be read at any time when in PS/2 mode. In the PC-AT mode, D7–D0 are TRI-STATE during a μP read.

Section 4.2.1 SRA - Model 30 Mode

| | D7 | D6 | D5 | D4 | D3 | D2 | D1 | D0 |
|---|---|---|---|---|---|---|---|---|
| DESC | IRQ6 PEND | FDRQ | STEP | TRK0 | $\overline{\text{HDSEL}}$ | INDX | WP | $\overline{\text{DIR}}$ |
| RESET | 0 | 0 | 0 | N/A | 1 | N/A | N/A | 1 |

Bit 7 Interrupt Pending: This active high bit reflects that state of the IRQ6 pin.

Bit 6 DMA Request: Active high status of the FDRQ signal.

Bit 5 Step: Active high status of the latched STEP disk interface output. This bit is latched with the STEP output going active, and is cleared with a read from the DIR, or with a hardware or software reset.

Bit 4 Track 0: Active high status of TRK0 disk interface input.

Bit 3 Read Select: Active low status of the HDSEL disk interface output.

Bit 2 Index: Active high status of the INDEX disk interface input.

Bit 1 Write Protect: Active high status of the WP disk interface input.

a software reset bit. The contents of the DOR is set to 00 (hex) after a hardware reset, and is unaffected by a software reset. The DOR can be written to at any time.

| | DOR | | | | | | | |
|---|---|---|---|---|---|---|---|---|
| | D7 | D6 | D5 | D4 | D3 | D2 | D1 | D0 |
| DESC | MTR3 | MTR2 | MTR1 | MTR0 | DMAEN | RESET | DRIVE SEL 1 | DRIVE SEL 0 |
| RESET COND | 0 | 0 | 0 | 0 | 0 | 0 | 0 | 0 |

Bit 0 Direction: Active low status of the DIR disk interface output.

Section 4.3 STATUS REGISTER B (SRB) Read Only

This read-only diagnostic register is part of the PS/2 floppy controller register set, and is enabled when in the Model 30 mode. The SRB can be read at any time. In the PC-AT mode, D7–D0 are TRI-STATE during a μP read.

Section 4.3.1 SRB - Model 30 Mode

| | D7 | D6 | D5 | D4 | D3 | D2 | D1 | D0 |
|---|---|---|---|---|---|---|---|---|
| DESC | DRV2 | DR1 | DR0 | WDATA | RDATA | WGATE | DR3 | DR2 |
| RESET COND | N/A | 1 | 1 | 0 | 0 | 0 | 1 | 1 |

Bit 7 2nd Drive Installed: Active low status of the DRV2 disk interface input.

Bit 6 Drive Select 1 Active low status of the DR1 disk interface output.

Bit 5 Drive Select 0 Active low status of the DR0 disk interface output.

Bit 4 Write Data: Active high status of latched WDATA signal.

This bit is latched by the inactive going edge of WDATA and is cleared by a read from the DIR. This bit is not gated by WGATE.

Bit 3 Read Data: Active high status of latched RDATA signal.

It is latched by the inactive going edge of RDATA and is cleared by a read from the DIR.

Bit 2 Write Gate: Active high status of latched WGATE signal. This bit is latched by the active going edge of WGATE and is cleared by a read from the DIR.

Bit 1 Drive Select 3 Active low status of the DR3 disk interface output. (See Note 1.)

Bit 0 Drive Select 2 Active low status of the DR2 disk interface output. (See Note 1.)

Section 4.4 DIGITAL OUTPUT REGISTER (DOR) Read/Write

The DOR controls the drive select and motor enable disk interface outputs, enables the DMA logic, and contains Bit 7 Motor Enable 3: This bit controls the MTR3 disk interface output. A 1 in this bit causes the MTR3 pin to go active. (See bit 4 of FCR for further information.

Bit 6 Motor Enable 2: Same function as D7 except for MTR2. (See bit 4 of FCR for further information.

Bit 5 Motor Enable 1: Same function as D7 except for MTR1.

Bit 4 Motor Enable 0: Same function as D7 except for MTR0.

Bit 3 DMA Enable: This bit has two modes of operation. PC-AT mode or Model 30 mode: Writing a 1 to this bit enables the FDRQ, FDACK, TC, and IRQ6 pins. Writing a 0 to this bit disables the FDACK and TC pins and TRI-STATE the FDRQ and the IRQ6 pins. This bit is a 0 after a reset when in these modes. PS/2 mode: This bit is reserved, and the FDRQ, FDACK, TC, and IRQ6 pins are always enabled. During a reset, the FDRQ, FDACK, TC, and IRQ6 lines remain enabled, and D3 is 0.

Bit 2 Reset Controller: Writing a 0 to this bit resets the controller. It remains in the reset condition until a 1 is written to this bit. A software reset does not affect the DSR, CCR, and other bits of the DOR. A software reset affects the Configure and Mode command bits (See Section 4.12 FDC 12 Command Set Description). The minimum time that this bit must be low is 100 ns. Thus, toggling the Reset Controller bit during consecutive writes to the DOR is an acceptable method of issuing a software reset.

Bit 1,0 Drive Select: These two bits are binary encoded for the four drive selects DR0–DR3, so that only one drive select output is active at a time. (See bit 4 of FCR for further information.) (See Note 1.)

It is common programming practice to enable both the motor enable and drive select outputs for a particular drive. Table 4-2 below shows the DOR values to enable each of the four drives.

TABLE 4-2

| Drive Enable Values | |
|---|---|
| DRIVE | DOR VALUE |
| 0 | 1C (hex) |
| 1 | 2D |
| 2 | 4E |
| 3 | 8F |

Note the MTR3, MTR2, DRV3, DRV2 pins are only available in 4-drive mode (bit 4 of FER is 1) and require external logic.

Section 4.5 TAPE DRIVE REGISTER (TDR)
Read/Write

This register is used to assign a particular drive number to the tape drive support mode of the data separator. All other logical drives can be assigned as floppy drive support. Any future reference to the assigned tape drive invokes tape drive support. The TDR is unaffected by a software reset. This register holds the media sense information of the floppy disk drive.

| TDR | | | | | | | |
|---|---|---|---|---|---|---|---|
| D7 | D6 | D5 | D4 | D3 | D2 | D1 | D0 |
| DESC | ED | HD | Valid Data | x | x | x | TAPE SEL 1 | TAPE SEL 0 |
| RESET COND | X | X | X | N/A | N/A | N/A | 0 | 0 |

Bit 7 Extra Density: When bit 5 is 0, this media id bit is used with bit 6 to indicate the type of media currently in the active floppy drive. If bit 5 is 1, it is invalid. This bit holds MSEN1 pin value. See TABLE 4-3 for details regarding bits 5-7.

Bit 6 High Density: When bit 5 is 0, this media id bit is used with bit 7 to indicate the type of media currently in the active floppy drive. If bit 5 is 1, it is invalid. This bit holds MSEN0/DRATE0 pin value. See TABLE 4-3 for details regarding bits 5-7.

Bit 5 Valid Data: The state of bit 5 is determined by the state of the VLD0,1 pins during reset. If this bit is 0, there is valid media id sense data in bits 7 and 6 of this register. Bit 5 holds VLD0 when drive 0 is accessed, and media sense is configured. It holds VLD1 when drive 1 is accessed, and media sense is configured. Otherwise, it is set to 1 to indicate that media information is not available. See TABLE 4-3 for details regarding bits 5-7.

TABLE 4-3

| Media ID Bit Functions | | | |
|---|---|---|---|
| Bit 7 | Bit 6 | Bit 5 | Media Type |
| X | X | 1 | Invalid Data |
| 0 | 0 | 0 | 5.25" |
| 0 | 1 | 0 | 2.88M |
| 1 | 0 | 0 | 1.44M |
| 1 | 1 | 0 | 720K |

Bit 4-2 Reserved: These bits are ignored when written to, and are TRI-STATE when read.

Bit 1, 0 Tape Select 1,0: These bits assign a logical drive number to a tape drive. Drive 0 is not available as a tape drive and is reserved as the floppy disk boot drive. See TABLE 4-4 for the tape drive assignment values.

TABLE 4-4

| Tape Drive Assignment Values | | |
|---|---|---|
| TAPESEL1 | TAPESEL0 | DRIVE SELECTED |
| 0 | 0 | None |
| 0 | 1 | 1 |
| 1 | 0 | 2 |
| 1 | 1 | 3 |

Section 4.6 MAIN STATUS REGISTER (MSR)
Read only

The read-only Main Status Register indicates the current status of the disk controller. The Main Status Register is always available to be read. One of its functions is to control the flow of data to and from the Data Register (FIFO). The Main Status Register indicates when the disk controller is ready to send or receive data through the Data Register. It should be read before each byte is transferred to or from the Data Register except during a DMA transfer. No delay is required when reading this register after a data transfer.

After a hardware or software reset, or recovery from a power down state, the Main Status Register is immediately available to be read by the µP. It contains a value of 00 hex until the oscillator circuit has stabilized, and the internal registers have been initialized. When the FDC 12 is ready to receive a new command, it reports an 80 hex to the µP. The system software can poll the MSR until it is ready. The worst case time allowed for the MSR to report an 80 hex value (RQM set) is 2.5 µsec after reset or 8 ms power up.

| MSR | | | | | | | |
|---|---|---|---|---|---|---|---|
| D7 | D6 | D5 | D4 | D3 | D2 | D1 | D0 |
| DESC | RQM | DIO | NON DMA | CMD PROG | DRV3 BUSY | DRV2 BUSY | DRV1 BUSY | DRV0 BUSY0 |
| RESET COND | 0 | 0 | 0 | 0 | 0 | 0 | 0 | 0 |

Bit 7 Request for Master: Indicates that the controller is ready to send or receive data from the mP through the FIFO. This bit is cleared immediately after a byte transfer and is set again as soon as the disk controller is ready for the next byte. During a Non-DMA Execution phase, the RQM indicates the status of the interrupt pin.

Bit 6 Data I/O (Direction): Indicates whether the controller is expecting a byte to be written to (0) or read from (1) the Data Register.

Bit 5 Non-DMA Execution: Indicates that the controller is in the Execution Phase of a byte transfer operation in the Non-DMA mode. Used for multiple byte transfers by the µP in the Execution Phase through interrupts or software polling.

Bit 4 Command in Progress: This bit is set after the first byte of the Command Phase is written. This bit is cleared after the last byte of the Result Phase is read. If there is no Result Phase in a command, the bit is cleared after the last byte of the Command Phase is written.

Bit 3 Drive 3 Busy: Set after the last byte of the Command Phase of a Seek or Recalibrate command is issued for drive 3. Cleared after reading the first byte in the Result Phase of the Sense Interrupt Command for this drive.

Bit 2 Drive 2 Busy: Same as above for drive 2.

Bit 1 Drive 1 Busy: Same as above for drive 1.

Bit 0 Drive 0 Busy: Same as above for drive 0.

Section 4.7 DATA RATE SELECT REGISTER (DSR) Write Only

This write-only register is used to program the data rate, amount of write precompensation, power down mode, and software reset. The data rate is programmed via the CCR, not the DSR, for PC-AT and PS/2 Model 30 and Micro-Channel applications. Other applications can set the data rate in the DSR. The data rate of the floppy controller is determined by the most recent write to either the DSR or CCR. The DSR is unaffected by a software reset. A hardware reset sets the DSR to 02 (hex), which corresponds to the default precompensation setting and 250 kb/s.

| | | | DSR | | | | |
|---|---|---|---|---|---|---|---|
| D7 | D6 | D5 | D4 | D3 | D2 | D1 | D0 |
| DESC S/W RESET | LOW POWER | 0 | PRE-COMP2 | PRE-COMP1 | PRE-COMP0 | DRATE 1 | DRA |
| RESET COND 0 | 0 | 0 | 0 | 0 | 0 | 1 | 0 |

Bit 7 Software Reset: This bit has the same function as the DOR RESET (D2) except that this software reset is self-clearing.

Bit 6 Low Power: A 1 to this bit puts the controller into the Manual Low Power mode. The oscillator and data separator circuits are turned off. Manual Low Power can also be accessed via the Mode command. The chip comes out of low power after a software reset, or access to the Data Register or Main Status Register.

Bit 5 Undefined. Should be set to 0.

Bit 4-2 Precompensation Select: These three bits select the amount of write precompensation the floppy controller uses on the WDATA disk interface output. TABLE 4-5 shows the amount of precompensation used for each bit pattern. In most cases, the default values (TABLE 4-6) can be used; however, alternate values can be chosen for specific types of drives and media. Track 0 is the default starting track number for precompensation. The starting track number can be changed in the Configure command.

TABLE 4-5

Write Precompensation Delays

| PRECOMP 432 | PRECOMPENSATION DELAY |
|---|---|
| 111 | 0.0 ns |
| 001 | 41.7 ns |
| 010 | 83.3 ns |
| 011 | 125.0 ns |
| 100 | 166.7 ns |
| 101 | 208.3 ns |

TABLE 4-5-continued

Write Precompensation Delays

| PRECOMP 432 | PRECOMPENSATION DELAY |
|---|---|
| 110 | 250.0 ns |
| 000 | DEFAULT |

TABLE 4-6

Default Precompensation Delays

| DATE RATE | PRECOMPENSATION DELAY |
|---|---|
| 1 Mb/s | 41.7 ns |
| 500 kb/s | 125.0 ns |
| 300 kb/s | 125.0 ns |
| 250 kb/s | 125.0 ns |

Bit 1-0 Data Rate Select 1,0: These bits determine the data rate for the floppy controller. See TABLE 4-7 for the corresponding data rate for each value of Bit 1,0. The data rate select bits are unaffected by a software reset, and are set to 250 kb/s after a hardware reset.

TABLE 4-7

Data Rate Select Encoding

| DATA RATE SELECT | | DATA RATE | |
|---|---|---|---|
| 1 | 0 | MFM | FM |
| 1 | 1 | 1 Mb/s | Illegal |
| 0 | 0 | 500 kb/s | 250 kb/s |
| 0 | 1 | 300 kb/s | 150 kb/s |
| 1 | 0 | 250 kb/s | 125 kb/s |

Section 4.8 DATA REGISTER (FIFO) Read/Write

The FIFO (read/write) is used to transfer all commands, data, and status between the µP and the FDC 12. During the Command Phase, the µP writes the command bytes into the FIFO after polling the RQM and DIO bits in the MSR. During the Result Phase, the µP reads the result bytes from the FIFO after polling the RQM and DIO bits in the MSR.

Enabling the FIFO, and setting the FIFO threshold, is done via the Configure command. If the FIFO is enabled, only the Execution Phase byte transfers use the 16-byte FIFO. The FIFO is always disabled during the Command and Result Phases of a controller operation. If the FIFO is enabled, it is not disabled after a software reset if the LOCK bit is set in the Lock Command. After a hardware reset, the FIFO is disabled to maintain compatibility with PC-AT systems. The 16-byte FIFO can be used for DMA, Interrupt, or software polling type transfers during the execution of a read, write, format, or scan command. In addition, the FIFO can be put into a Burst or Non-Burst mode with the Mode command. In the Burst mode, FDRQ or IRQ6 remains active until all of the bytes have been transferred to or from the FIFO. In the Non-Burst mode, FDRQ or IRQ6 is deasserted for 350 ns to allow higher priority transfer requests to be serviced. The Mode command can also disable the FIFO for either reads or writes separately. The FIFO allows the system a larger latency without causing a disk overrun/ underrun error. Typical uses of the FIFO are at the 1 Mb/s data rate, or with multi-tasking operating systems. The default state of the FIFO is disabled, with a threshold of zero. The default state is entered after a hardware reset.

| Data Register (FIFO) | | | | | | | |
|---|---|---|---|---|---|---|---|
| D7 | D6 | D5 | D4 | D3 | D2 | D1 | D0 |
| DESC | | | Data [7:0] | | | | |
| RESET COND | | | Byte Mode | | | | |

During the Execution Phase of a command involving data transfer to/from the FIFO, the system must respond to a data transfer service request based on the following formula:

Maximum Allowable Data Transfer Service Time $$(THRESH+1) \times 8 \times t_{DRP} - (16 \times t_{ICP})$$

This formula is good for all data rates with the FIFO enabled or disabled. THRESH is a four bit value programmed in the Configure command, which sets the FIFO threshold. If the FIFO is disabled, THRESH is zero in the above formula. The last term of the formula, $(16 \times t_{ICP})$, is an inherent delay due to the microcode overhead required by the FDC 12. This delay is also data rate dependent. See Section 9-3 for the $t_{DRP}$ and $t_{ICP}$ times. The programmable FIFO threshold (THRESH) is useful in adjusting the floppy controller to the speed of the system. In other words, a slow system with a sluggish DMA transfer capability uses a high value of THRESH, giving the system more time to respond to a data transfer service request (FDRQ for DMA mode or IRQ6 for Interrupt mode). Conversely, a fast system with quick response to a data transfer service request uses a low value of THRESH.

Section 4.9 DIGITAL INPUT REGISTER (DIR)
Read Only

This diagnostic register is used to detect the state of the DSKCHG disk interface input and some diagnostic signals. The function of this register depends on the register mode of operation. When in the PC-AT mode, D6–D0 are TRI-STATE to avoid conflict with the fixed disk status register at the same address. DIR is unaffected by a software reset.

Section 4.9.1 DIR - PC-AT Mode

| | D7 | D6 | D5 | D4 | D3 | D2 | D1 | D0 |
|---|---|---|---|---|---|---|---|---|
| DESC | DSKCHG | X | X | X | X | X | X | X |
| RESET COND | N/A | N/A | N/A | N/A | N/A | N/A | N/A | N/A |

Bit 7 $\overline{\text{Disk Changed}}$: Active high status of DSKCHG disk interface input. During power down this bit is invalid, if it is read by the software.

Bit 6-0 Undefined: TRI-STATE.

Section 4.9.2 DIR - Model 30 Mode

| | D7 | D6 | D5 | D4 | D3 | D2 | D1 | D0 |
|---|---|---|---|---|---|---|---|---|
| DESC | $\overline{\text{DSKCHG}}$ | 0 | 0 | 0 | DMAEN | NOPRE | DRATE1 | DRATE0 |
| RESET COND | N/A | 0 | 0 | 0 | 0 | 0 | 1 | 0 |

Bit 7 Disk Changed: Active low status of DSKCHG disk interface input. During power down this bit is invalid, if it is read by the software.
Bit 6-4 Reserved: Always 0.
Bit 3 DMA Enable: Active high status of the DMAEN bit in the DOR.
Bit 2 No Precompensation: Active high status of the NOPRE bit in the CCR.
Bit 1-0 Data Rate Select 1,0: These bits indicate the status of the DRATE1-0 bits programmed through the DSR/CCR.

Section 4.10 CONFIG. CONTROL REGISTER (CCR)
Write Only This is the write-only data rate register commonly used in PC-AT applications. This register is not affected by a software reset, and the data rate is set to 250 kb/s after a hardware reset. The data rate of the floppy controller is determined by the last write to either the CCR or DSR.

Section 4.10.1 CCR—PC-AT and PS/2 Modes

| | D7 | D6 | D5 | D4 | D3 | D2 | D1 | D0 |
|---|---|---|---|---|---|---|---|---|
| DESC | 0 | 0 | 0 | 0 | 0 | 0 | DRATE1 | DRATE0 |
| RESET COND | N/A | N/A | N/A | N/A | N/A | N/A | 1 | 0 |

Bit 7-2 Reserved: Should be set to 0.
Bit 1-0 Data Rate Select 1,0: These bits determine the data rate of the floppy controller. See Table 4–7 for the appropriate values.

Section 4.10.2 CCR—Model 30 Mode

|  | D7 | D6 | D5 | D4 | D3 | D2 | D1 | D0 |
|---|---|---|---|---|---|---|---|---|
| DESC | 0 | 0 | 0 | 02 | 0 | NOPRE | DRATE1 | DRATE0 |
| RESET COND | N/A | N/A | N/A | N/A | N/A | N/A | 1 | 0 |

Bit 7-3 Reserved: Should be set to 0.

Bit 2 No Precompensation: This bit can be set by software, but it has no functionality. It can be read by bit D2 of the DIR when in the Model 30 register mode. Unaffected by a software reset.

Bit 1-0 Data Rate Select 1,0: These bits determine the data rate of the floppy controller. See TABLE 4–7 for the appropriate values.

Section 4.11 RESULT PHASE STATUS REGISTERS

The Result Phase of a command contains bytes that hold status information. The format of these bytes are described below. Do not confuse these status bytes with the Main Status Register, which is a read only register that is always valid. The Result Phase status registers are read from the Data Register (FIFO) only during the Result Phase of certain commands (See Section 4.13 COMMAND SET SUMMARY). The status of each register bit is indicated when the bit is 1.

Section 4.11.1 Status Register 0 (ST0)

|  | D7 | D6 | D5 | D4 | D3 | D2 | D1 | D0 |
|---|---|---|---|---|---|---|---|---|
| DESC | IC | IC | SE | EC | 0 | HDS | DS1 | DS0 |
| RESET COND | 0 | 0 | 0 | 0 | 0 | 0 | 0 | 0 |

Bit 7-6 Interrupt Code: 00=Normal Termination of Command. 01=Abnormal Termination of Command. Execution of command was started, but was not successfully completed. 10=Invalid Command issued. Command issued was not recognized as a valid command. 11=Internal drive ready status changed state during the drive polling mode. Only occurs after a hardware or software reset.

Bit 5 Seek End: Seek, Relative Seek, or Recalibrate command completed by the controller. (Used during a Sense Interrupt command).

Bit 4 Equipment Check: After a Recalibrate command, Track 0 signal failed to occur. (Used during Sense Interrupt command).

Bit 3 Not used. Always 0.

Bit 2 Head Select: Indicates the active high status of the HDSEL pin at the end of the Execution Phase.

Bit 1-0 Drive Select 1,0: These two binary encoded bits indicate the logical drive selected at the end of the Execution Phase. 00=Drive 0 selected. 01=Drive 1 selected. 10=Drive 2 selected. 11=Drive 3 selected.

Section 4.11.2 Status Register 1 (ST1)

|  | D7 | D6 | D5 | D4 | D3 | D2 | D1 | D0 |
|---|---|---|---|---|---|---|---|---|
| DESC | ET | 0 | CE | OR | 0 | ND | NW | MA |
| RESET COND | 0 | 0 | 0 | 0 | 0 | 0 | 0 | 0 |

Bit 7 End of Track: Controller transferred the last byte of the last sector without the TC pin becoming active. The last sector is the End of Track sector number programmed in the Command Phase.

Bit 6 Not used. Always 0.

Bit 5 CRC Error: If this bit is set and bit 5 of ST2 is clear, then there was a CRC error in the Address Field of the correct sector. If bit 5 of ST2 is also set, then there was a CRC error in the Data Field.

Bit 4 Overrun: Controller was not serviced by the mP soon enough during a data transfer in the Execution Phase. For read operations, indicates a data overrun. For write operations, indicates a data underrun.

Bit 3 Not used. Always 0.

Bit 2 No Data: Three possible problems: 1) Controller cannot find the sector specified in the Command Phase during the execution of a Read, Write, Scan, or Verify command. An address mark was found however, so it is not a blank disk. 2) Controller cannot read any Address Fields without a CRC error during a Read ID command. 3) Controller cannot find starting sector during execution of Read A Track command.

Bit 1 Not Writable: Write Protect pin is active when a Write or Format command is issued.

Bit 0 Missing Address Mark: If bit 0 of ST2 is clear then the controller cannot detect any Address Field Address Mark after two disk revolutions. If bit 0 of ST2 is set then the controller cannot detect the Data Field Address Mark after finding the correct Address Field.

Section 4.11.3 Status Register 2 (ST2)

|  | D7 | D6 | D5 | D4 | D3 | D2 | D1 | D0 |
|---|---|---|---|---|---|---|---|---|
| DESC | 0 | CM | CD | WT | SEH | SNS | BT | MD |
| RESET COND | 0 | 0 | 0 | 0 | 0 | 0 | 0 | 0 |

Bit 7 Not Used. Always 0.

Bit 6 Control Mark: Controller tried to read a sector which contained a deleted data address mark during execution of Read Data or Scan commands. Or, if a Read Deleted Data command was executed, a regular address mark was detected.

Bit 5 CRC Error in Data Field: Controller detected a CRC error in the Data Field. Bit 5 of ST1 is also set.

Bit 4 Wrong Track: Only set if desired sector is not found, and the track number recorded on any sector of the current track is different from the track address specified in the Command Phase.

Bit 3 Scan Equal Hit: "Equal" condition satisfied during any Scan command.

Bit 2 Scan Not Satisfied: Controller cannot find a sector on the track which meets the desired condition during any Scan command.

Bit 1 Bad Track: Only set if the desired sector is not found, the track number recorded on any sector on the track is FF (hex) indicating a hard error in IBM format, and is different from the track address specified in the Command Phase.

Bit 0 Missing Address Mark in Data Field: Controller cannot find the Data Field AM during a Read, Scan, or Verify command. Bit 0 of ST1 is also set.

Section 4.11.4 Status Register 3 (ST3)

| | D7 | D6 | D5 | D4 | D3 | D2 | D1 | D0 |
|---|---|---|---|---|---|---|---|---|
| | DESC | 0 | WP | 1 | TK0 | 1 | HDS | DS1 | DS0 |
| RESET COND | 0 | 0 | 1 | 0 | 1 | 0 | 0 | 0 |

Bit 7: Not used. Always 0.
Bit 6 Write Protect: Indicates active high status of the WP pin.
Bit 5 Not used. Always 1.
Bit 4 Track 0: Indicates active high status of the TRK0 pin.
Bit 3 Not used. Always 1.
Bit 2 Read Select: Indicates the active high status of the HD bit in the Command Phase.
Bit 1-0 Drive Select 1,0: These two binary encoded bits indicate the DS1–DS0 bits in the Command Phase.

Section 4.12 FDC 12 Command Set Description

The following is a table of the FDC command set 12. Each command contains a unique first command byte, the opcode byte, which identifies to the controller how many command bytes to expect. If an invalid command byte is issued to the controller, it immediately enters the Result Phase and the status is 80 (hex), signifying Invalid Command.

Section 4.13 COMMAND SET SUMMARY

CONFIGURE
Command Phase

| 0 | 0 | 0 | 1 | 0 | 0 | 1 | 1 |
|---|---|---|---|---|---|---|---|
| 0 | 0 | 0 | 0 | 0 | 0 | 0 | 0 |
| 0 | EIS | FIFO | POLL PRETRK | | THRESH | | |

| 0 | 0 | 0 | 0 | 1 | 1 | 1 | 0 |
|---|---|---|---|---|---|---|---|

Execution Phase: Internal registers read. Result Phase

| | | | | PTR Drive 0 | | | |
|---|---|---|---|---|---|---|---|
| | | | | PTR Drive 1 | | | |
| | | | | PTR Drive 2 | | | |
| | | | | PTR Drive 3 | | | |
| | Step Rate Time | | | | Motor Off Time | | |
| | | | Motor on Time | | | | DMA |
| | | | Sector per Track/End of Track | | | | |
| LOCK | 0 | DC3 | DC2 | DC1 | DC0 | GAP | WG |
| 0 | EIS | FIFO | POLL PRETRK | | | THRESH | |

Note Sectors per Track parameter returned if last command issued was Format. End of Track parameter returned if last command issued was Read or Write.

FORMAT TRACK
Command Phase

| 0 | MFM | 0 | 0 | 1 | 1 | 0 | 1 |
|---|---|---|---|---|---|---|---|
| X | X | X | X | X | HD | DR1 | DR0 |
| | | | Bytes per Sector | | | | |
| | | | Sectors per Track | | | | |
| | | | Format Gap | | | | |
| | | | Data Pattern | | | | |

Execution Phase: System transfers four ID bytes (track, head, sector, bytes/sector) per sector to the floppy controller via DMA or Non-DMA modes. The entire track is formatted. The data block in the Data Field of each sector is filled with the data pattern byte.
Result Phase

| Status Register 0 |
|---|
| Status Register 1 |
| Status Register 2 |
| Undefined |
| Undefined |
| Undefined |
| Undefined |

INVALID
Command Phase

| Invalid Op Codes |
|---|

Result Phase

| Statur Register 0 (80 hex) |
|---|

LOCK
Command Phase

| LOCK | 0 | 0 | 1 | 0 | 1 | 0 | 0 |
|---|---|---|---|---|---|---|---|

Execution Phase: Internal register is written. Result Phase

| 0 | 0 | 0 | LOCK | 0 | 0 | 0 | 0 |
|---|---|---|---|---|---|---|---|

MODE
Command Phase

| 0 | 0 | 0 | 0 | 0 | 0 | 0 | 1 |
|---|---|---|---|---|---|---|---|
| TMR | IAF | IPS | 0 | LOW PWR | | 1 | ETR |
| FWR | FRD | BST | R255 | 0 | 0 | 0 | 0 |
| DENSEL | | BFR | WLD | | | Head Settle | |
| 0 | 0 | 0 | 0 | 0 | RG | 0 | PU |

Execution Phase: Internal registers are written. No Result Phase

National
Command Phase

| 0 | 0 | 0 | 1 | 1 | 0 | 0 | 0 |
|---|---|---|---|---|---|---|---|

Result Phase

| 0 | 1 | 1 | 1 | 0 | 0 | 1 | 0 |
|---|---|---|---|---|---|---|---|

PERPENDICULAR MODE
Command Phase

| 0 | 0 | 0 | 1 | 0 | 0 | 1 | 0 |
|---|---|---|---|---|---|---|---|
| OW | 0 | DC3 | DC2 | DC1 | DC0 | GAP | WG |

Execution Phase: Internal registers are written.
No Result Phase

READ DATA
Command Phase

| MT | MFM | SK | 0 | 0 | 1 | 1 | 0 |
|---|---|---|---|---|---|---|---|
| IPS | X | X | X | X | HD | DR1 | DR0 |
| | | Track Number | | | | | |
| | | Drive Head Number | | | | | |
| | | Sector Number | | | | | |
| | | Bytes Per Sector | | | | | |
| | | End of Track Sector Number | | | | | |
| | | Intersector Gap Length | | | | | |
| | | Data Length | | | | | |

Execution Phase: Data read from disk drive is transferred to system via DMA or Non-DMA modes.
Result Phase

| Status Register 0 |
|---|
| Status Register 1 |
| Status Register 2 |
| Track Number |
| Head Number |
| Sector Number |
| Bytes per Sector |

READ DELETED DATA
Command Phase

| MT | MFM | SK | 0 | 1 | 1 | 0 | 0 |
|---|---|---|---|---|---|---|---|
| IPS | X | X | X | X | HD | DR1 | DR0 |
| | | Track Number | | | | | |
| | | Drive Head Number | | | | | |
| | | Sector Number | | | | | |
| | | Bytes Per Sector | | | | | |
| | | End of Track Sector Number | | | | | |
| | | Intersector Gap Length | | | | | |
| | | Data Length | | | | | |

Execution Phase: Data read from disk drive is transferred to system via DMA or Non-DMA modes.
Result Phase

| Status Register 0 |
|---|
| Status Register 1 |
| Status Register 2 |
| Track Number |
| Head Number |
| Sector Number |
| Bytes per Sector |

READ ID
Command Phase

| 0 | MFM | 0 | 0 | 1 | 0 | 1 | 0 |
|---|---|---|---|---|---|---|---|
| X | X | X | X | X | HD | DR1 | DR0 |

Execution Phase: Controller reads first ID Field header bytes it can find and reports these bytes to the system in the result bytes.
Result Phase

| Status Register 0 |
|---|
| Status Register 1 |
| Status Register 2 |
| Track Number |
| Head Number |
| Sector Number |
| Bytes per Sector |

READ A TRACK
Command Phase

| 0 | MFM | 0 | 0 | 0 | 0 | 1 | 0 |
|---|---|---|---|---|---|---|---|
| IPS | X | X | X | X | HD | DR1 | DR0 |
| | | Track Number | | | | | |
| | | Dirve Head Number | | | | | |
| | | Sector Number | | | | | |
| | | Bytes per Sector | | | | | |
| | | End of Track Sector Number | | | | | |
| | | Intersector Gap Length | | | | | |
| | | Data Length | | | | | |

Execution Phase: Data read from disk drive is transferred to system via DMA or non-DMA modes.
Result Phase

| Status Register 0 |
|---|
| Status Register 1 |
| Status Register 2 |
| Track Number |
| Head Number |
| Sector Number |
| Bytes per Sector |

RECALIBRATE
Command Phase

| 0 | 0 | 0 | 0 | 1 | 1 | 1 | 1 |
|---|---|---|---|---|---|---|---|
| 0 | 0 | 0 | 0 | 0 | 0 | DR1 | DR0 |

Execution Phase: Disk drive head is stepped out to Track 0.
No Result Phase

RELATIVE SEEK
Command Phase

| 1 | DIR | 0 | 0 | 1 | 1 | 1 | 1 |
|---|---|---|---|---|---|---|---|
| X | X | X | X | X | HD | DR1 | DR0 |

Execution Phase: Disk drive head stepped in or out a programmable number of tracks.
No Result Phase

SCAN EQUAL
Command Phase

| MT | MFM | SK | 1 | 0 | 0 | 0 | 1 |
|---|---|---|---|---|---|---|---|
| IPS | X | X | X | X | HD | DR1 | DR0 |
| | | Track Numer | | | | | |
| | | Drive Head Number | | | | | |
| | | Sector Number | | | | | |
| | | Bytes Per Sector | | | | | |
| | | End of Track Sector Number | | | | | |
| | | Intersector Gap Length | | | | | |
| | | Sector Step Size | | | | | |

Execution Phase: Data transferred from system to controller is compared to data read from disk.

Result Phase

| Status Register 0 |
|---|
| Status Register 1 |
| Status Register 2 |
| Track Number |
| Head Number |
| Sector Number |
| Bytes per Sector |

SCAN HIGH OR EQUAL
Command Phase

| MT | MFM | SK | 1 | 1 | 1 | 0 | 1 |
|---|---|---|---|---|---|---|---|
| IPS | X | X | X | X | HD | DR1 | DR0 |
| | | Track Number | | | | | |
| | | Drive Head Number | | | | | |
| | | Sector Number | | | | | |
| | | Bytes Per Sector | | | | | |
| | | End of Track Sector Number | | | | | |
| | | Intersector Gap Length | | | | | |
| | | Sector Step Size | | | | | |

Execution Phase: Data transferred from system to controller is compared to data read from disk.

Result Phase

| Status Register 0 |
|---|
| Status Register 1 |
| Status Register 2 |
| Track Number |
| Head Number |
| Sector Number |
| Bytes per Sector |

SCAN LOW OR EQUAL
Command Phase

| MT | MFM | SK | 1 | 1 | 0 | 0 | 1 |
|---|---|---|---|---|---|---|---|
| IPS | X | X | X | X | HD | DR1 | DR0 |
| | | Track Number | | | | | |
| | | Drive Head Number | | | | | |
| | | Sector Number | | | | | |
| | | Bytes Per Sector | | | | | |
| | | End of Track Sector Number | | | | | |
| | | Intersector Gap Length | | | | | |
| | | Sector Step Size | | | | | |

Execution Phase: Data transferred from system to controller is compared to data read from disk.

Result Phase

| Status Register 0 |
|---|
| Status Register 1 |
| Status Register 2 |
| Track Number |
| Head Number |
| Sector Number |
| Bytes per Sector |

SEEK
Command Phase

| 0 | 0 | 0 | 0 | 1 | 1 | 1 | 1 |
|---|---|---|---|---|---|---|---|
| X | X | X | X | X | HD | DR1 | DR0 |
| | | New Track Number | | | | | |
| MSN of Track Number | | | | 0 | 0 | 0 | 0 |

Note the Last Command Phase byte is required only if ETR is set in Mode Command. Execution Phase: Disk drive head is stepped in or out to a programmable track.

No Result Phase

SENSE DRIVE STATUS
Command Phase

| 0 | 0 | 0 | 0 | 0 | 1 | 0 | 0 |
|---|---|---|---|---|---|---|---|
| X | X | X | X | X | HD | DR1 | DR0 |

Execution Phase: Disk drive status information is detected and reported.

Result Phase

| Status Register 3 |
|---|

SENSE INTERRUPT
Command Phase

| 0 | 0 | 0 | 0 | 1 | 0 | 0 | 0 |
|---|---|---|---|---|---|---|---|

Execution Phase: Status of interrupt is reported.

Result Phase

| Status Register 0 |
|---|
| Present Track Number (PTR) |
| MSN of PTR  0  0  0  0 |

Note: Third Result Phase byte can only be read if ETR is set in the Mode Command.

SET TRACK
Command Phase

| 0 | WNR | 1 | 0 | 0 | 0 | 0 | 1 |
|---|---|---|---|---|---|---|---|
| 0 | 0 | 1 | 1 | 0 | MSB | DR1 | DR0 |
| | | New Track Number (PTR) | | | | | |

Execution Phase: Internal register is read or written.

Result Phase

| | | | | Value | | | |
|---|---|---|---|---|---|---|---|

SPECIFY
Command Phase

| 0 | 0 | 0 | 0 | 0 | 0 | 1 | 1 |
|---|---|---|---|---|---|---|---|
| | Step Rate Time | | | | Motor Off Time | | |
| | | Motor On Time | | | | | DMA |

Execution Phase: Internal registers are written.
No Result Phase
VERIFY
Command Phase

| MT | MFM | SK | 1 | 0 | 1 | 1 | 0 |
|---|---|---|---|---|---|---|---|
| EC | X | X | X | X | HD | DR1 | DR0 |
| | | | Track Number | | | | |
| | | | Drive Head Number | | | | |
| | | | Sector Number | | | | |
| | | | Bytes Per Sector | | | | |
| | | | End of Track Sector Number | | | | |
| | | | Intersector Gap Length | | | | |
| | | | Data Length/Sector Count | | | | |

Execution Phase: Data is read from disk but not transferred to the system.
Result Phase

| | | | | | | | |
|---|---|---|---|---|---|---|---|
| | | | Status Register 0 | | | | |
| | | | Status Register 1 | | | | |
| | | | Status Register 2 | | | | |
| | | | Track Number | | | | |
| | | | Head Number | | | | |
| | | | Sector Number | | | | |
| | | | Bytes per Sector | | | | |

VERSION
Command Phase

| 0 | 0 | 0 | 1 | 0 | 0 | 0 | 0 |
|---|---|---|---|---|---|---|---|

Result Phase

| 1 | 0 | 0 | 1 | 0 | 0 | 0 | 0 |
|---|---|---|---|---|---|---|---|

WRITE DATA
Command Phase

| MT | MFM | 0 | 0 | 0 | 1 | 0 | 1 |
|---|---|---|---|---|---|---|---|
| IPS | X | X | X | X | HD | DR1 | DR0 |
| | | | Track Number | | | | |
| | | | Drive Head Number | | | | |
| | | | Sector Number | | | | |
| | | | Bytes Per Sector | | | | |
| | | | End of Track Sector Number | | | | |
| | | | Intersector Gap Length | | | | |
| | | | Data Length | | | | |

Execution Phase: Data is transferred from the system to the controller via DMA or Non-DMA modes and written to the disk.

Result Phase

| | | | | | | | |
|---|---|---|---|---|---|---|---|
| | | | Status Register 0 | | | | |
| | | | Status Register 1 | | | | |
| | | | Status Register 2 | | | | |
| | | | Track Number | | | | |
| | | | Head Number | | | | |
| | | | Sector Number | | | | |
| | | | Bytes per Sector | | | | |

WRITE DELETED DATA
Command Phase

| MT | MFM | 0 | 0 | 1 | 0 | 0 | 1 |
|---|---|---|---|---|---|---|---|
| IPS | X | X | X | X | HD | DR1 | DR0 |
| | | | Track Number | | | | |
| | | | Drive Head Number | | | | |
| | | | Sector Number | | | | |
| | | | Bytes Per Sector | | | | |
| | | | End of Track Sector Number | | | | |
| | | | Intersector Gap Length | | | | |
| | | | Data Length | | | | |

Execution Phase: Data is transferred from the system to the controller via DMA or Non-DMA modes and written to the disk.

Result Phase

| | | | | | | | |
|---|---|---|---|---|---|---|---|
| | | | Status Register 0 | | | | |
| | | | Status Register 1 | | | | |
| | | | Status Register 2 | | | | |
| | | | Track Number | | | | |
| | | | Head Number | | | | |
| | | | Sector Number | | | | |
| | | | Bytes per Sector | | | | |

Section 4.14 COMMAND DESCRIPTION

Section 4.14.1 Configure Command

The Configure Command controls some operation modes of the controller. It should be issued during the initialization of the FDC 12 after power up. The function of the bits in the Configure registers are described below. These bits are set to their default values after a hardware reset. The value of each bit after a software reset is explained. The default value of each bit is denoted by a "bullet" to the left of the item.

EIS: Enable Implied Seeks. Default after a software reset. 0=Implied seeks disabled through Configure command. Implied seeks can still be enabled through the Mode command when EIS=0. (default) 1=Implied seeks enabled for a read, write, scan, or verify operation. A seek and sense interrupt operation is performed prior to the execution of the read, write, scan, or verify operation. The IPS bit does not need to be set.

FIFO: Enable FIFO for Execution Phase data transfers. Default after a software reset if the LOCK bit is 0. If the LOCK bit is 1, then the FIFO bit retains its previous value after a software reset. 0=FIFO enabled for both reads and writes. 1=FIFO disabled. (default)

POLL: Disable for Drive Polling Mode. Default after a software reset. 0=Enable polling mode. An interrupt is generated after a reset. (default) 1=Disable drive polling mode. If the Configure command is issued within 500 μs of a hardware or software reset, then an interrupt is not generated. In addition, the four Sense Interrupt commands to clear the "Ready Changed State" of the four logical drives is not required.

THRESH: The FIFO threshold in the Execution Phase of read and write data transfers. Programmable from 00 to 0F hex. Defaults to 00 after a software reset if the LOCK bit is 0. If the LOCK bit is 1, THRESH retains its value. A high value of THRESH is suited for slow response systems, and a low value of THRESH is better for fast response systems.

PRETRK: Starting track number for write precompensation. Programmable from track 0 ("00") to track 255 ("FF"). Defaults to track 0 ("00") after a software reset if the LOCK bit is 0. If the LOCK bit is 1, PRETRK retains its value.

Section 4.14.2 Dumpreg Command

The Dumpreg command is designed to support system run-time diagnostics and application software development and debug. This command has a one-byte command phase and a 10-byte result phase, which return the values of parameters set in other commands. That is, the PTR (Present Track Register) contains the least significant byte of the track the microcode has stored for each drive. The Step Rate Time, Motor Off and Motor On Times, and the DMA bit are all set in the Specify command.

The sixth byte of the result phase varies depending on what commands have been previously executed. If a format command has previously been issued, and no reads or writes have been issued since then, this byte contains the Sectors per track value. If a read or a write command has been executed more recently than a format command, this byte contains the End of Track value. The LOCK bit is set in the Lock command. The eighth result byte also contains the bits programmed in the Perpendicular Mode command. The last two bytes of the Dumpreg Result Phase are set in the Configure command. After a hardware or software reset, the parameters in the result bytes are set to their appropriate default values.

Note: Some of these parameters are unaffected by a software reset, depending on the state of the LOCK bit.

Section 4.14.3 Format Track Command

This command formats one track on the disk in IBM, ISO, or Perpendicular Format. After the index hole is detected, data patterns are written on the disk including all gaps, address marks, Address Fields, and Data Fields. The exact format is determined by the following parameters:

1. The MFM bit in the Opcode (first command) byte, which determines the format of the Address Marks and the encoding scheme.
2. The IAF bit in the Mode command, which selects between IBM and ISO format.
3. The WGATE and GAP bits in the Perpendicular Mode command, which select between the conventional and Toshiba Perpendicular format.
4. The Bytes per Sector code, which determines the sector size.
5. The Sector per Track parameter, which determines how many sectors are formatted on the track.
6. The Data Pattern byte, which is used as the filler byte in the Data Field of each sector.

To allow for flexible formatting, the µP must supply the four Address Field bytes (track, head, sector, bytes per sector code) for each sector formatted during the Execution Phase. This allows for non-sequential sector interleaving. This transfer of bytes from the mP to the controller can be done in the DMA or Non-DMA mode, with the FIFO enabled or disabled. The Format command terminates when the index hole is detected a second time, at which point an interrupt is generated. Only the first three status bytes in the Result Phase are significant. The Format Gap byte in the Command Phase is dependent on the data rate and type of disk drive, and controls the length of GAP3. Some typical values for the programmable GAP3 are given in TABLE 4.9 below. FIG. 4-2 shows the track format for the three types of formats supported by the floppy controller.

TABLE 4-9

Typical Format Gap Length Values

| MODE | SECTOR SIZE decimal | SECTOR CODE hex | EOT hex | SECTOR GAP hex | FORMAT GAP3 hex |
|---|---|---|---|---|---|
| 125 kb/s FM | 128 | 00 | 12 | 07 | 09 |
| | 128 | 00 | 10 | 10 | 19 |
| | 256 | 01 | 08 | 18 | 30 |
| | 512 | 02 | 04 | 46 | 87 |
| | 1024 | 03 | 02 | C8 | FF |
| | 2048 | 04 | 01 | C8 | FF |
| 250 kb/s MFM | 256 | 01 | 12 | 0A | 0C |
| | 256 | 01 | 10 | 20 | 32 |
| | 512 | 02 | 08 | 2A | 50 |
| | 512 | 02 | 09 | 2A | 50 |
| | 1024 | 03 | 04 | 80 | F0 |
| | 2048 | 04 | 02 | C8 | FF |
| | 4096 | 05 | 01 | C8 | FF |
| 250 kb/s FM | 128 | 00 | 1A | 07 | 1B |
| | 256 | 01 | 0F | 0E | 2A |
| | 512 | 02 | 08 | 1B | 3A |
| | 1024 | 03 | 04 | 47 | 8A |
| | 2048 | 04 | 02 | C8 | FF |
| | 4096 | 05 | 01 | C8 | FF |
| 500 kb/s MFM | 256 | 01 | 1A | 0E | 36 |
| | 512 | 02 | 0F | 1B | 54 |
| | 512 | 02 | 12 | 1B | 6C |
| | 1024 | 03 | 08 | 35 | 74 |
| | 2048 | 04 | 04 | 99 | FF |
| | 4096 | 05 | 02 | C8 | FF |
| | 8192 | 06 | 01 | C8 | FF |

TABLE 4-9

Typical Values for PC Compatible Diskette Media

| MEDIA TYPE | SECTOR SIZE decimal | SECTOR CODE hex | EOT | SECTOR GAP hex | FORMAT GAP3 hex |
|---|---|---|---|---|---|
| 360 K | 512 | 02 | 09 | 2A | 50 |
| 1.2 M | 512 | 02 | 0F | 1B | 54 |
| 720 K | 512 | 02 | 09 | 1B | 50 |
| 1.44 M | 512 | 02 | 12 | 1B | 6C |
| 2.88 M | 512 | 02 | 24 | 1B | 53 |

Notes:
1. Sector Gap refers to the Intersector Gap Length parameter specified in the Command Phase of the Read, Write, Scan, and Verify commands. Although this is the recommended value, the FDC 12 treats this byte as a don't care in the Read, Write, Scan, and Verify commands.
2. Format Gap is the suggested value to use in the Format Gap parameter of the Format command. This is the programmable GAP3 as shown in FIG. 4-8.
3. The 2.88 M diskette media is a Barium Ferrite media intended for use in Perpendicular Recording drives at the data rate of up to 1 Mb/s.

Section 4.14.4 Invalid Command

If an invalid command (illegal Opcode byte in the Command Phase) is received by the controller, the controller responds with ST0 in the Result Phase. The controller does not generate an interrupt during this condition. Bits 6 and 7 in the MSR are both set to a 1, indicating to the µP that the controller is in the Result Phase and the contents of ST0 must be read. The system reads an 80 (hex) value from ST0 indicating an invalid command was received.

Section 4.14.5 Lock Command

The Lock command allows the user full control of the FIFO parameters after a software reset. If the LOCK bit is set to 1, then the FIFO, THRESH, and PRETRK bits in the Configure command are not affected by a software reset. In addition, the FWR, FRD, and BST bits in the Mode command is unaffected by a software reset. If the LOCK is 0 (default after a hardware reset), then the above bits are set to their default values after a software reset. This command is useful if the system designer wishes to keep the FIFO enabled and retain the other FIFO parameter values (such as THRESH) after a software reset. After the command byte is written, the result byte must be read before continuing to the next command. The execution of the Lock command is not performed until the result byte is read by the μP. If the part is reset after the command byte is written but before the result byte is read, then the Lock command execution is not performed. This is done to prevent accidental execution of the Lock command.

Section 4.14.6 Mode Command

This command is used to select the special features of the controller. The bits for the Command Phase bytes are shown in Section 4.13 Command Set Summary, and their function is described below. These bits are set to their default values after a hardware reset. The default value of each bit is denoted by a "bullet" to the left of the item. The value of each parameter after a software reset is explained.

TMR: Motor Timer mode. Default after a software reset. 0=Timers for motor on and motor off are defined for Mode 1. (See Specify command). (default) 1=Timers for motor on and motor off are defined for Mode 2. (See Specify command).

IAF: Index Address Format. Default after a software reset. 0=The controller formats tracks with the Index Address Field included. (IBM and Perpendicular format). 1=The controller formats tracks without including the Index Address Field. (ISO format).

IPS: Implied Seek. Default after a software reset. 0=The implied seek bit in the command byte of a read, write, scan, or verify is ignored. Implied seeks could still be enabled by the EIS bit in the Configure command. 1=The IPS bit in the command byte of a read, write, scan, or verify is enabled so that if it is set, the controller performs seek and sense interrupt operations before the executing the command.

LOW PWR: Low Power mode. Default after a software reset. 00=Completely disable the low power mode. (default) 01=Automatic low power. Go into low power mode 512 ms after the head unload timer times out. (This assumes a 500 kb/s data rate) For 250 kb/s the time-out period is double to 1 us. 10=Manual low power. Go into low power mode now. 11=Not used.

ETR: Extended Track Range. Default after a software reset. 0=Track number is stored as a standard 8-bit value compatible with the IBM, ISO, and Perpendicular formats. This allows access of up to 256 tracks during a seek operation. 1=Track number is stored as a 12-bit value. The upper four bits of the track value are stored in the upper four bits of the head number in the sector Address Field. This allows access of up to 4096 tracks during a seek operation. With this bit set, an extra byte is required in the Seek Command Phase and Sense Interrupt Result Phase.

FWR: FIFO Write Disable for mP write transfers to controller. Default after a software reset if LOCK is 0. If LOCK is 1, FWR retains its value after a software reset. Note: This bit is only valid if the FIFO is enabled in the Configure command. If the FIFO is not enabled in the Configure command, then this bit is a don't care.

0=Enable FIFO. Execution Phase μP write transfers use the internal FIFO. (default) 1=Disable FIFO. All write data transfers take place without the FIFO.

FRD: FIFO Read Disable for mP read transfer from controller. Default after a software reset if LOCK is 0. If LOCK is 1, FRD retains its value after a software reset.
Note: This bit is only valid if the FIFO is enabled in the Configure command. If the FIFO is not enabled in the Configure command, then this bit is a don't care.

0=Enable FIFO. Execution Phase mP read transfer use the internal FIFO. (default) 1=Disable FIFO. All read data transfers take place without the FIFO.

BST: Burst Mode Disable. Default after a software reset if LOCK is 0. If LOCK is 1, BST retains its value after a software reset.
Note: This bit is only valid if the FIFO is enabled in the Configure command. If the FIFO is not enabled in the Configure command, then this bit is a don't care.

0=Burst mode enabled for FIFO Execution Phase data transfers. (default) 1=Non-Burst mode enabled. The FDRQ or IRQ6 pin is strobed once for each byte to be transferred while the FIFO is enabled.

R255: Recalibrate Step Pulses. The bit determines the maximum number of recalibrate step pulses the controller issues before terminating with an error. Default after a software reset. 0=85 maximum recalibrate step pulses. If ETR=1, controller issues 3925 recalibrate step pulses maximum. 1=255 maximum recalibrate step pulses. If ETR=1, controller issues 4095 maximum recalibrate step pulses.

DENSEL: Density Select Pin Configuration. This two-bit value configures the Density Select output to one of three possible modes. The default mode configures the DENSEL pin according to the state of the IDENT input pin after a data rate has been selected. That is, if IDENT is high, the DENSEL pin is active high for the 500 kb/s/1 Mbs data rates. If IDENT is low, the DENSEL pin is active low for the 500 kb/s/1 Mbs data rates. In addition to these modes, the DENSEL output can be set to always low or always high, as shown in TABLE 4–11.

This allows the user more flexibility with new drive types.

TABLE 4-10

| DENSEL Encoding | | |
|---|---|---|
| Bit1 | Bit0 | DENSEL Pin Definition |
| 0 | 0 | pin low |
| 0 | 1 | pin high |
| 1 | 0 | undefined |
| 1 | 1 | DEFAULT |

TABLE 4-11

| DENSEL Default Encoding | | |
|---|---|---|
| | DENSEL (default) | |
| Data Rate | IDENT = 1 | IDENT = 0 |
| 250 kb/s | low | high |
| 300 kb/s | low | high |
| 500 kb/s | high | low |
| 1 Mbs | high | low |

BFR: CMOS Disk Interface Buffer Enable. 0=Drive output signals configured as standard 4 mA push-pull outputs (actually 40 mA sink, 4 mA source). (default) 1=Drive output signals configured as 40 mA open-drain outputs.

WLD: Scan Wild Card. 0=An FF (hex) from either the μP or the disk during a Scan command is interpreted as a wildcard character that always matches true. (default) 1=The Scan commands do not recognize FF (hex) as a wildcard character.

Head Settle: Time allowed for read/write head to settle after a seek during an Implied Seek operation. This is controlled as shown below by loading a 4-bit value for N. (The default value for N is 8.)

| Date Rate kbits/s | Multiplier 4 bits | Head Settle Time (ms) |
|---|---|---|
| 250 | N × 8 | 0–120 |
| 300 | N × 6.666 | 0–100 |
| 500 | N × 4 | 0–60 |
| 1000 | N × 2 | 0–30 |

RG: Read Gate Diagnostic. 0=Enable DSKCHG disk interface input for normal operation. (default) 1=Enable DSKCHG to act as an external Read Gate input signal to the Data Separator. This is intended as a test mode to aid in evaluation of the Data Separator.

PU: PUMP Pulse Output Diagnostic. 0=Enable MFM output pin for normal operation. (default) 1=Enable the MFM output to act as the active low output of the Data Separator charge pump. This signal consists of a series of pulses indicating when the phase comparator is making a phase correction. This Pump output is active low for a pump up or pump down signal from the phase comparator, and is intended as a test mode to aid in the evaluation of the Data Separator.

Section 4.14.7 National Command

The National command can be used to distinguish between the FDC 12 versions and the 82077. The Result Phase byte uniquely identifies the floppy controller as a PC87340, which returns a value of 72 h. The 82077 and DP8473 return a value of 80 h signifying an invalid command. The lower four bits of this result byte are subject to change by National, and reflects the particular version of the floppy disk controller part.

Section 4.14.8 Perpendicular Mode Command

The Perpendicular Mode command is designed to support the unique Format and Write Data requirements of Perpendicular (Vertical) Recording disk drives (4 Mbytes unformatted capacity). The Perpendicular Mode command configures each of the four logical drives as a perpendicular or conventional disk drive. Configuration of the four logical disk drives is done via the D3–D0 bits, or with the GAP and WG control bits. This command should be issued during the initialization of the floppy controller.

Perpendicular Recording drives operate in "Extra High Density" mode at 1 Mb/s, and are downward compatible with 1.44 Mbyte and 720 kbyte drives at 500 kb/s (High Density) and 250 kb/s (Double Density) respectively. If perpendicular drives are present in the system, this command should be issued during initialization of the floppy controller, which configures each drive as perpendicular or conventional. Then, when a drive is accessed for a Format or Write Data command, the floppy controller adjusts the Format or Write Data parameters based on the data rate (see TABLE 4–12).

Looking at the second command byte, DC3–DC0 correspond to the four logical drives.

TABLE 4-12

Effect of Drive Mode and Data Rate on Format and Write Commands

| Date Rate | Drive Mode | GAP2 Length Written During Format | Portion of GAP2 Re-Written by Write Data Command |
|---|---|---|---|
| 250/300/500 kb/s | Conventional | 22 bytes | 0 bytes |
| | Perpendicular | 22 bytes | 19 bytes |
| 1 Mb/s | Conventional | 22 bytes | 0 bytes |
| | Perpendicular | 41 bytes | 38 bytes |

TABLE 4-13

Effect of GAP and WG on Format and Write Commands

| GAP | WG | Mode Description | GAP2 Length Written During Format | Portion of GAP2 Re-Written by Write Data Command |
|---|---|---|---|---|
| 0 | 0 | Conventional | 22 bytes | 0 bytes |
| 0 | 1 | Perpendicular (≦500 kb/s) | 22 bytes | 19 bytes |
| 1 | 0 | Reserved (Conventional) | 22 bytes | 0 bytes |
| 1 | 1 | Perpendicular (1 Mb/s) | 41 bytes | 38 bytes |

A 0 written to DCn sets drive n to conventional mode, and a 1 sets drive n to perpendicular mode. Also, the OW (Overwrite) bit offers additional control. When OW=1, changing the values of DC3–DC0 (drive configuration bits) is enabled. When OW=0, the internal values of DC3–DC0 are unaffected, regardless of what is written to DC3–DC0.

The function of the DCn bits must also be qualified by setting both WG and GAP to 0. If WG and GAP are used (i.e. not set to 00), they overrides whatever is programmed in the DCn bits. TABLE 4–13 above indicates the operation of the FDC 12 based on the values of GAP and WG. Note that when GAP and WG are both 0, the DCn bits are used to configure each logical drive as conventional or perpendicular. DC3–DC0 are unaffected by a software reset, but WG and GAP are both cleared to 0 after a software reset. A hardware reset resets all the bits to zero (conventional mode for all drives). The Perpendicular Mode command bits may be rewritten at any time. Note: When in the Perpendicular Mode for any drive at any data rate selected by the DC0-3 bits, write precompensation is set to zero.

Perpendicular Recording type disk drives have a Pre-Erase Head which leads the Read/Write Head by 200 μm, which translates to 38 bytes at the 1 Mb/s data transfer rate (19 bytes at 500 kb/s). The increased spacing between the two heads requires a larger GAP2 between the Address Field and Data Field of a sector at 1 Mb/s. (See Perpendicular Format in TABLE 4–12). This GAP2 length of 41 bytes (at 1 Mb/s) ensures that the Preamble in the Data Field is completely "pre-erased" by the Pre-Erase Head. Also, during Write Data operations to a perpendicular drive, a portion of GAP2 must be rewritten by the controller to guarantee that the Data Field Preamble has been pre-erased (see TABLE 4–12).

Section 4.14.9 Read Data Command

The Read Data command reads logical sectors containing a Normal Data AM from the selected drive and makes the data available to the host μP. After the last Command Phase byte is written, the controller simulates the Motor On time for the selected drive internally. The user must turn on the drive motor directly by enabling the appropriate drive and motor select disk interface outputs with the Digital Output Register (DOR). If Implied Seeks are enabled, the controller performs a Seek operation to the track number specified in the Command Phase. The controller also issues a Sense Interrupt for the seek and waits the Head Settle time specified in the Mode command. The correct ID information (track, head, sector, bytes per sector) for the desired sector must be specified in the command bytes. See TABLE 4–14 Sector Size Selection for details on the bytes per sector code. In addition, the End of Track Sector Number (EOT) should be specified, allowing the controller to read multiple sectors. The Data Length byte is a don't care and should be set to FF (hex).

TABLE 4-14

Sector Size Selection

| Bytes per Sector Code | Number of Bytes in Data Field |
|---|---|
| 0 | 128 |
| 1 | 256 |
| 2 | 512 |
| 3 | 1024 |
| 4 | 2048 |
| 5 | 4096 |
| 6 | 8192 |
| 7 | 16384 |

The controller then starts the Data Separator and waits for the Data Separator to find the next sector Address Field. The controller compares the Address Field ID information (track, head, sector, bytes per sector) with the desired ID specified in the Command Phase. If the sector ID bytes do not match, then the controller waits for the Data Separator to find the next sector Address Field. The ID comparison process repeats until the Data Separator finds a sector Address Field ID that matches that in the command bytes, or until an error occurs. Possible errors are:

1. The μP aborted the command by writing to the FIFO. If there is no disk in the drive, the controller hangs up. The μP must then take the controller out of this hung state by writing a byte to the FIFO. This puts the controller into the Result Phase.
2. Two index pulses were detected since the search began, and no valid ID has been found. If the track address ID differs, the WT bit or BT bit (if the track address is FF hex) is set in ST2. If the head, sector, or bytes per sector code did not match, the ND bit is set in ST1. If the Address Field AM was never found, the MA bit is set in ST1.
3. The Address Field was found with a CRC error. The CE bit is set in ST1.

Once the desired sector Address Field is found, the controller waits for the Data Separator to find the subsequent Data Field for that sector. If the Data Field (normal or deleted) is not found with the expected time, the controller terminates the operation and enters the Result Phase (MD is set in ST2). If a Deleted Data Mark is found and SK was set in the Opcode command byte, the controller skips this sector and searches for the next sector Address Field as described above. The effect of SK on the Read Data command is summarized in TABLE 4–15.

Having found the Data Field, the controller then transfers data bytes from the disk drive to the host (described in Section 4.15 Controller Phases) until the bytes per sector count has been reached, or the host terminates the operation (through TC, end of track, or implicitly through overrun). The controller then generates the CRC for the sector and compares this value with the CRC at the end of the Data Field. Having finished reading the sector, the controller continues reading the next logical sector unless one or more of the following termination conditions occurred:

1. The DMA controller asserted TC. The IC bits in ST0 are set to Normal Termination.
2. The last sector address (of side 1 if MT was set) was equal to EOT. The EOT bit in ST1 is set. The IC bits in ST0 are set to Abnormal Termination. This is the expected condition during Non-DMA transfers.
3. Overrun error. The OR bit in ST1 is set. The IC bits in ST0 are set to Abnormal Termination. If the mP cannot service a transfer request in time, the last correctly read byte is transferred.
4. CRC error. CE bit in ST1, and CD bit in ST2, are set. The IC bits in ST0 are set to Abnormal Termination.

If MT was set in the Opcode command byte, and the last sector of side 0 has been transferred, the controller then continues with side 1.

Upon terminating the Execution Phase of the Read Data command, the controller asserts IRQ6, indicating the beginning of the Result Phase. The μP must then read the result bytes from the FIFO. The values that are read back in the result bytes are shown in TABLE 4–16. If an error occurs, the result bytes indicate the sector read when the error occurred.

Section 4.14.10 Read Deleted Data Command

The Read Deleted Data command reads logical sectors containing a Deleted Data AM from the selected drive and makes the data available to the host μP. This command is identical to the Read Data command, except for the setting of the CM bit in ST2 and the skipping of sectors. The effect of SK on the Read Deleted Data command is summarized in TABLE 4–17. See TABLE 4–16 for the state of the result bytes for a Normal Termination of the command.

TABLE 4-15

SK Effect on Read Data Command

| SK | Data Type | Sector Read? | CM bit (ST2) | Description of Results |
|---|---|---|---|---|
| 0 | Normal | Y | 0 | Normal Termination |
| 0 | Deleted | Y | 1 | No Further Sectors Read |
| 1 | Normal | Y | 0 | Normal Termination |
| 1 | Deleted | N | 1 | Sector Skipped |

TABLE 4-16

Result Phase Termination Values with No Error

| | | Last | ID Infomation at Result Phase | | | |
|---|---|---|---|---|---|---|
| MT | HD | Sector | Track | Head | Sector | Bytes/Sector |
| 0 | 0 | < EOT | NC | NC | S = 1 | NC |
| 0 | 0 | = EOT | T + 1 | NC | 1 | NC |
| 0 | 1 | < EOT | NC | NC | S + 1 | NC |
| 0 | 1 | = EOT | T + 1 | NC | 1 | NC |
| 1 | 0 | < EOT | NC | NC | S + 1 | NC |
| 1 | 0 | = EOT | NC | 1 | 1 | NC |
| 1 | 1 | < EOT | NC | NC | S + 1 | NC |
| 1 | 1 | = EOT | T + 1 | 0 | 1 | NC |

EOT = End of Track Sector Number from Command Phase
S = Sector Number last operated on by controller
NC = No Change in Value
T = Track Number programmed in Command Phase

TABLE 4-17

SK Effect on Read Deleted Data Command

| SK | Data Type | Sector Read? | CM bit (ST2) | Description of Results |
|----|-----------|--------------|--------------|------------------------|
| 0  | Normal    | Y            | 1            | No Further Sectors Read |
| 0  | Deleted   | Y            | 0            | Normal Termination     |
| 1  | Normal    | N            | 1            | Sector Skipped         |
| 1  | Deleted   | Y            | 0            | Normal Termination     |

Section 4.14.11 Read ID Command

The Read ID command finds the next available Address Field and returns the ID bytes (track, head, sector, bytes per sector) to the mP in the Result Phase. There is no data transfer during the Execution Phase of this command. An interrupt is generated when the Execution Phase is completed. The controller first simulates the Motor On time for the selected drive internally. The user must turn on the drive motor directly by enabling the appropriate drive and motor select disk interface outputs with the Digital Output Register (DOR). The Read ID command does not perform an implied seek.

After waiting the Motor On time, the controller starts the Data Separator and waits for the Data Separator to find the next sector Address Field. If an error condition occurs, the IC bits in ST0 are set to Abnormal Termination, and the controller enters the Result Phase. Possible errors are:

1. The µP aborted the command by writing to the FIFO. If there is no disk in the drive, the controller hangs up. The µP must then take the controller out of this hung state by writing a byte to the FIFO. This puts the controller into the Result Phase.
2. Two index pulses were detected since the search began, and no AM has been found. If the Address Field AM was never found, the MA bit is set in ST1.

Section 4.14.12 Read A Track Command

The Read a Track command reads sectors in physical order from the selected drive and makes the data available to the host. This command is similar to the Read Data command except for the following differences:

1. The controller waits for the index pulse before searching for a sector Address Field. If the µP writes to the FIFO before the index pulse, the command enters the Result Phase with the IC bits in ST0 set to Abnormal Termination.
2. A comparison of the sector Address Field ID bytes is performed, except for the sector number. The internal sector address is set to 1, and then incremented for each successive sector read.
3. If the Address Field ID comparison fails, the controller sets ND in ST1, but continues to read the sector. If there is a CRC error in the Address Field, the controller sets CE in ST1, but continues to read the sector.
4. Multi-track and Skip operations are not allowed. SK and MT should be set to 0.
5. If there is a CRC error in the Data Field, the controller sets CE in ST1 and CD in ST2, but continues reading sectors.
6. The controller reads a maximum of EOT physical sectors. There is no support for multi-track reads.

Section 4.14.13 Recalibrate Command

The Recalibrate command is very similar to the Seek command. The controller sets the Present Track Register (PTR) of the selected drive to zero. It then steps the head of the selected drive out until the TRK0 disk interface input signal goes active, or until the maximum number of step pulses have been issued. See TABLE 4-18 for the maximum recalibrate step pulse values based on the R255 and ETR bits in the Mode command. If the number of tracks on the disk drive exceeds the maximum number of recalibrate step pulses, another Recalibrate command may need to be issued.

TABLE 4-18

Maximum Recalibrate Step Pulses Based on R255 and ETR

| R255 | ETR | Maximum Recalibrate Step Pulses |
|------|-----|-------------------------------|
| 0    | 0   | 85 (default                   |
| 1    | 0   | 255                           |
| 0    | 1   | 3925                          |
| 1    | 1   | 4095                          |

After the last command byte is issued, the DRx BUSY bit is set in the MSR for the selected drive. The controller simulates the Motor On time, and then enters the Idle Phase. The execution of the actual step pulses occur while the controller is in the Drive Polling Phase. An interrupt is generated after the TRK0 signal is asserted, or after the maximum number of recalibrate step pulses are issued. There is no Result Phase. Recalibrates on more than one drive at a time should not be issued for the same reason as explained in the Seek command. No other command except the Sense Interrupt command should be issued while a Recalibrate command is in progress.

Section 4.14.14 Relative Seek Command

The Relative Seek command steps the selected drive in or out a given number of steps. This command steps the read/write head an incremental number of tracks, as opposed to comparing against the internal present track register for that drive. The Relative Seek parameters are defined as follows: DIR: Read/Write Head Step Direction Control
0=Step Head Out
1=Step Head In
RTN: Relative Track Number. This value determines how many incremental tracks to step the head in or out from the current track number.

The controller issues RTN number of step pulses and update the Present Track Register for the selected drive. The one exception to this is if the TRK0 disk input goes active, which indicates that the drive read/write head is at the outermost track. In this case, the step pulses for the Relative Seek are terminated, and the PTR value is set according to the actual number of step pulses issued. The arithmetic is done modulo 255. The DRx BUSY bit in the MSR is set for the selected drive. The controller simulates the Motor On time before issuing the step pulses. After the Motor On time, the controller enters the Idle Phase. The execution of the actual step pulses occurs in the Idle Phase of the controller. After the step operation is complete, the controller generates an interrupt. There is no Result Phase. Relative Seeks on more than one drive at a time should not be issued for the same reason as explained in the Seek command. No other command except the Sense Interrupt command should be issued while a Relative Seek command is in progress.

Section 4.14.15 Scan Commands

The Scan command allow data read from the disk to be compared against data sent from the µP. There are three Scan command to choose from:

| | |
|---|---|
| Scan Equal | Disk Data = µP Data |
| Scan Low or Equal | Disk Data ≦ µP Data |
| Scan High or Equal | Disk Data ≧ µP Data |

Each sector is interpreted with the most significant bytes first. If the Wildcard mode is enabled in the Mode command, an FF (hex) from either the disk or the µP is used as a don't care byte that always matches equal. After each sector is read, if the desired condition has not been met, the next sector is read. The next sector is defined as the current sector number plus the Sector Step Size specified. The Scan command continues until the scan condition has been met, or the EOT has been reached, or if TC is asserted.

Read errors on the disk have the same error conditions as the Read Data command. If the SK bit is set, sectors with deleted data marks are ignored. If all sectors read are skipped, the command terminates with D3 of ST2 set (Scan Equal Hit). The Result Phase of the command is shown in TABLE 4–19).

TABLE 4-19

Scan Command Termination Values

| | Status Register | | |
|---|---|---|---|
| Command | D2 | D3 | Conditions |
| Scan Equal | 0 | 1 | Disk = µP |
| | 1 | 0 | Disk ≠ µP |
| Scan Low or Equal | 0 | 1 | Disk = µP |
| | 0 | 0 | Disk < µP |
| | 1 | 0 | Disk > µP |
| Scan High or Equal | 0 | 1 | Disk = µP |
| | 0 | 0 | Disk > µP |
| | 1 | 0 | Disk < µP |

Section 4.14.16 Seek Command

The Seek command issues step pulses to the selected drive in or out until the desired track number is reached. During the Execution Phase of the Seek command, the track number to seek to is compared with the present track number. The controller determines how many step pulses to issue and the DIR disk interface output indicates which direction the R/W head should move. The DRx BUSY bit is set in the MSR for the appropriate drive. The controller waits the Motor On time before issuing the first step pulse.

After the Motor On time, the controller enters the Idle Phase. The execution of the actual step pulses occurs in the Drive Polling phase of the controller. The step pulse rate is determined by the value programmed in the Specify command. An interrupt is generated one step pulse period after the last step pulse is issued. There is no Result Phase. A Sense Interrupt command should be issued to determine the cause of the interrupt. While the internal microengine is capable of multiple seek on 2 or more drives at the same time, software should ensure that only one drive is seeking or recalibrating at a time. This is because the drives are actually selected via the DOR, which can only select one drive at a time. No other command except a Sense Interrupt command should be issued while a Seek command is in progress.

If the extended track range mode is enabled with the ETR bit in the Mode command, a fourth command byte should be written in the Command Phase to indicate the four most significant bits of the desired track number. Otherwise, only three command bytes should be written.

Section 4.14.17 Sense Drive Status Command

The Sense Drive Status command returns the status of the selected disk drive in ST3. This command does not generate an interrupt.

Section 4.14.18 Sense Interrupt Command

The Sense Interrupt command is used to determine the cause of interrupt when the interrupt is a result of the change in status of any disk drive. Four possible causes of the interrupt are:
1. Upon entering the Result Phase of:
   a. Read Data command
   b. Read Deleted Data command
   c. Read a Track command
   d. Read ID command
   e. Write Data command
   f. Write Deleted Data command
   g. Format command
   h. Scan command
   i. Verify command
2. During data transfers in the Execution Phase while in the Non-DMA mode.
3. Ready Changed State during the polling mode for an internally selected drive. (Occurs only after a hardware or software reset).
4. Seek, Relative Seek, or Recalibrate termination.

An interrupt due to reasons 1 and 2 does not require the Sense Interrupt command and is cleared automatically. This interrupt occurs during normal command operations and is easily discernible by the µP via the MSR. This interrupt is cleared reading or writing information from/to the Data Register (FIFO). Interrupts caused by reason 3 and 4 are identified with the aid of the Sense Interrupt command. The interrupt is cleared after the first result byte has been read. Use bits 5, 6, and 7 of ST0 to identify the cause of the interrupt as shown in TABLE 4–20. Issuing a Sense Interrupt command without an interrupt pending is treated as an Invalid command. If the extended track range mode is enabled, a third byte should be read in the Result Phase, which indicate the four most significant bits of the present track number. Otherwise, only two result bytes should be read. TABLE 4–20. Status Register 0 Termination Codes

TABLE 4-20

Status Register 0 Termination Codes

| Status Register 0 | | | |
|---|---|---|---|
| Interrupt Code | | Seek End | |
| D7 | D6 | D5 | Cause |
| 1 | 1 | 0 | Internal Read Went True |
| 0 | 0 | 1 | Normal Seek Termination |
| 0 | 1 | 1 | Abnormal Seek Termination |

Section 4.14.19 Set Track Command

This command is used to inspect or change the value of the internal Present Track Register. This could be useful for recovery from disk mis-tracking errors, where the real current track could be read through the Read ID command, and then the Set Track command could be used to set the internal Present Track Register to the correct value.

If the WNR bit is a 0, a track register is to be read. In this case, the Result Phase byte contains the value in the internal register specified, and the third byte in the Command Phase is a dummy byte.

If the WNR bit is a 1, data is written to a track register. In this case the third byte of the Command Phase is written to the specified internal track register, and the Result Phase byte contains this new value.

The DS1 and DS0 bits select the Present Track Register for the particular drive. The internal register address depends on MSB, DS1, and DS0 as shown in TABLE 4–21. This command does not generate an interrupt

TABLE 4-21

Set Track Register Address

| DS1 | DS0 | MSB | Register Addressed |
|-----|-----|-----|--------------------|
| 0 | 0 | 0 | PTR0 (LSB) |
| 0 | 0 | 1 | PTR0 (MSB) |
| 0 | 1 | 0 | PTR1 (LSB) |
| 0 | 1 | 1 | PTR1 (MSB) |
| 1 | 0 | 0 | PTR2 (LSB) |
| 1 | 0 | 1 | PTR2 (MSB) |
| 1 | 1 | 0 | PTR3 (LSB) |
| 1 | 1 | 1 | PTR3 (MSB) |

Section 4.14.20 Specify Command

The Specify command sets the initial values for three internal timers. The function of these Specify parameters is described below. The parameters of this command are undefined after power up, and are unaffected by any reset. Thus, software should always issue a Specify command as part of an initialization routine. This command does not generate an interrupt.

The Motor Off and Motor On timers are artifacts of the µPD765. These timers determine the delay from selecting a drive motor until a read or write operation is started, and the delay of deselecting the drive motor after the command is completed. Since the FDC 12 enables the drive and motor select line directly through the DOR, these timers only provide some delay from the initiation of a command until it is actually started. Step Rate Time: These four bits define the time interval between successive step pulses during a seek, implied seek, recalibrate, or relative seek. The programming of this step rate is shown in TABLE 4–22.

TABLE 4-22

Step Rate Time (SRT) Values

| Date Rate | Value | Range | Units |
|-----------|-------|-------|-------|
| 1 Mb/s | (16 − SRT)/2 | 0.5–8 | ms |
| 500 kb/s | (16 − SRT) | 1–16 | ms |
| 300 kb/s | (16 − SRT) × 1.67 | 1.67–26.7 | ms |
| 250 kb/s | (16 − SRT) × 2 | 2–32 | ms |

Motor Off Time: These four bits determine the simulated Motor Off time as shown in TABLE 4–23. Motor On Time: These seven bits determine the simulated Motor On time as shown in Table 4–24. DMA: This bit selects the data transfer mode in the Execution Phase of a read, write, or scan operation.
 0=DMA mode is selected.
 1=Non-DMA mode is selected.

Section 4.14.21 Verify Command

The Verify command reads logical sectors containing a Normal Data AM from the selected drive without transferring the data to the host. This command is identical to the Read Data command, except that no data is transferred during the Execution Phase. The Verify command is designed for post-format or post-write verification. Data is read from the disk, as the controller checks for valid Address Marks in the Address and Data Fields. The CRC is computed and checked against the previously stored value on the disk. The EOT value should be set to the final sector to be checked on each side. If EOT is greater than the number of sectors per side, the command terminates with an error and no useful Address Mark or CRC data is given. The TC pin cannot be used to terminate this command since no data is transferred. The command can simulate a TC by setting the EC bit to a 1. In this case, the command terminates when SC (Sector Count) sectors have been read. (If SC=0 then 256 sectors is verified). If EC=0, then the command terminates when EOT is equal to the last sector to be checked. In this case, the Data Length parameter should be set to FF hex. Refer to TABLE 4–16 for the Result Phase values for a successful completion of the command. Also see Table 4–25 for further explanation of the result bytes with respect to the MT and EC bits.

Section 4.14.22 Version Command

The Version command can be used to determine the floppy controller being used. The Result Phase uniquely identifies the floppy controller version. The FDC 12 returns a value of 90 hex in order to be compatible with the 82077. The DP8473 and other NEC765 compatible controllers return a value of 80 hex (invalid command).

Section 4.14.23 Write Data Command

The Write Data command receives data from the host and writes logical sectors containing a Normal Data AM to the selected drive. The operation of this command is similar to the Read Data command except that the data is transferred from the µP to the controller instead of the other way around. The controller simulates the Motor On time before starting the operation. If implied seeks are enabled, the seek and sense interrupt functions are then performed. The controller then starts the Data Separator and waits for the Data Separator to find the next sector Address Field. The controller compares the Address ID (track, head, sector, bytes per sector) with the desired ID specified in the Command Phase. If there is no match, the controller waits to find the next sector Address Field. This process continues until the desired sector is found. If an error condition occurs, the IC bits in ST0 are set to Abnormal Termination, and the controller enters the Result Phase. Possible errors are:

1. The µP aborted the command by writing to the FIFO. If there is no disk in the drive, the controller hangs up. The µP must then take the controller out of this hung state by writing a byte to the FIFO. This puts the controller into the Result Phase.
2. Two index pulses were detected since the search began, and no valid ID has been found. If the track address ID differs, the WT bit or BT bit (if the track address is FF hex) is set in ST2. If the head, sector, or bytes per sector code did not match, the ND bit is set in ST1. If the Address Field AM was never found, the MA bit is set in ST1.
3. The Address Field was found with a CRC error. The CE bit is set in ST1.
4. If the controller detects the Write Protect disk interface input is asserted, bit 1 of ST1 is set.

If the correct Address Field is found, the controller waits for all (conventional mode) or part (perpendicular mode) of GAP2 to pass. The controller then writes the preamble field, address marks, and data bytes to the Data Field. The data bytes are transferred to the controller by the µP. Having finished writing the sector, the controller continues reading the next logical sector unless one or more of the following termination conditions occurred:

1. The DMA controller asserted TC. The IC bits in ST0 are set to Normal Termination.
2. The last sector address (of side 1 if MT was set) was equal to EOT. The EOT bit in ST1 is set. The IC bits in ST0 are set to Abnormal Termination. This is the expected condition during Non-DMA transfers.
3. Underrun error. The OR bit in ST1 is set. The IC bits in ST0 are set to Abnormal Termination. If the µP cannot service a transfer request in time, the last correctly written byte is written to the disk.

If MT was set in the Opcode command byte, and the last sector of side 0 has been transferred, the controller then continues with side 1. It starts with sector 1 and continues until the EOT sector number is reached or TC occurs. Result Phase termination values are listed in TABLE 4–16.

Section 4.14.24 Write Deleted Data

The Write Deleted Data command receives data from the host and writes logical sectors containing a Deleted Data AM to the selected drive. This command is identical to the Write Data command except that a Deleted Data AM is written to the Data Field instead of a Normal Data AM.

TABLE 4-23

Motor Off Time (MPT) Values

| Data Rate | Mode 1 (TMR = 0) | | Mode 2 (TMR = 1) | | Units |
|---|---|---|---|---|---|
| | Value | Range | Value | Range | |
| 1 Mb/s | MFT × 8 | 8–128 | MFT × 512 | 512–8192 | ms |
| 500 kb/s | MFT × 16 | 16–256 | MFT × 512 | 512–8192 | ms |
| 300 kb/s | MFT × 80/3 | 26.7–427 | MFT × 2560/3 | 853–13653 | ms |
| 250 kb/s | MFT × 32 | 32–512 | MFT × 1024 | 1024–16384 | ms |

Note: Motor Off Time = 0 is treated as MFT = 16.

TABLE 4-24

Motor On Time (MNT) Values

| Data Rate | Mode 1 (TMR = 0) | | Mode 2 (TMR = 1) | | Units |
|---|---|---|---|---|---|
| | Value | Range | Value | Range | |
| 1 Mb/s | MNT | 1–128 | MNT × 32 | 32–4096 | ms |
| 500 kb/s | MNT | 1–128 | MNT × 32 | 32–4096 | ms |
| 300 kb/s | MNT × 10/3 | 3.3–427 | MNT × 160/3 | 53–6827 | ms |
| 250 kb/s | MNT × 4 | 4–512 | MNT × 64 | 64–8192 | ms |

Note: Motor On Time = 0 is treated as MNT = 128

TABLE 4-25

Verify Command Result Phase TABLE

| MT | EC | SC/EOT Value | Termination Result |
|---|---|---|---|
| 0 | 0 | DTL used (should be FF hex)<br>EOT <= # Sectors per Side | No Errors |
| 0 | 0 | DTL used (should be FF hex) | Abnormal Termination |

TABLE 4-25-continued

Verify Command Result Phase TABLE

| MT | EC | SC/EOT Value | Termination Result |
|---|---|---|---|
| 0 | 1 | EOT > # Sectors per Side<br>SC <= # Sectors per Side<br>AND<br>SC > EOT | Abnormal Termination |
| 1 | 0 | DTL used (should be FF hex)<br>EOT <= # Sectors per Side | No Errors |
| 1 | 0 | DTL used (should be FF hex)<br>EOT > # Sectors per Side | Abnormal Termination |
| 1 | 1 | SC <= # Sectors per side<br>AND<br>SC <= EOT | No Errors |
| 1 | 1 | SC <= (EOT × 2)<br>AND<br>EOT <= # Sectors per Side | No Errors |
| 1 | 1 | SC > (EOT × 2) | Abnormal Termination |

Notes.
1. # Sectors per Side = number of formated sectors per each side of the disk.
2. # Sectors Remaining = number of formatted sectors left which can be read of the current track, which includes side 1 of the disk if the MT bit is set to 1.
3. If MT = 1 and the SC value is greater that the number of remaining formatted sectors on side 0, verifying continues for the current track on side 1 of the disk.

Section 4.15 FDC 12 Functional Description

Preferred system embodiments are software compatible with the DP8473 and 82077 floppy disk controllers. Upon a power on reset, the 16-byte FIFO will be disabled. Also, the disk interface outputs will be configured as active push-pull outputs, which are compatible with both CMOS inputs and open-collector resistor terminated disk drive inputs. The FIFO can be enabled with the Configure command. The FIFO can be very useful at the higher data rates, with systems that have a large amount of DMA bus latency, or with multi-tasking systems such as the EISA or MCA bus structures.

The FDC 12 will support all the DP8473 Mode command features as well as some additional features. These include control over the enabling of the FIFO for reads and writes, a Non-Burst mode for the FIFO, a bit that will configure the disk interface outputs as open-drain outputs, and programmability of the DENSEL output.

Section 4.15.1 MICROPROCESSOR INTERFACE

The FDC 12 interface to the microprocessor consists of the A9–A3, Ann, WRDlines, which access the chip for reads and writes; the data lines D7–D0; the address lines A2–A0, which select the appropriate register (see TABLE 4-1); the IRQ6 signal, and the DMA interface signals DRQ, DACK, and TC. It is through this microprocessor interface that the floppy controller receives commands, transfers data, and returns status information.

Section 4.15.2 NODES OF OPERATION

The FDC 12 has two modes of operation: PC-AT mode and Model 30 mode, which are determined by the state of the IDENT pin. The state of this pin is interrogated by the controller during a chip reset to determine the mode of operation. See Section 4.1 FDC 12 Register Description for more details on the register set used for each mode of operation. After chip reset, the state of IDENT can be changed to change the polarity of DENSEL (see Section 1.0 Pin Description). PC-AT mode—(IDENT tied high, MFM is a don't care): The PC-AT register set is enabled. The DMA enable bit in the Digital output Register becomes valid (IRQ6 and DRQ can be TRI-STATE). TC and DENSEL become active high signals (defaults to a 5.25" floppy drive).

Section 4.15.3 CONTROLLER PHASES

The FDC 12 has three separate phases of a command, the Command Phase, the Execution Phase, and the Result Phase. Each of these controller phases determine how data is transferred between the floppy controller and the host microprocessor. In addition, when no command is in progress, the controller is in the Idle Phase or Drive Polling Phase.

Section 4.15.3.1 Command Phase

During the Command Phase, the µP writes a series of bytes to the Data Register. The first command byte contains the opcode for the command, and the controller knows how many more bytes to expect based on this opcode byte. The remaining command bytes contain the particular parameters required for the command. The number of command bytes varies for each particular command. All the command bytes must be written in the order specified in the Command Description TABLE. The Execution Phase starts immediately after the last byte in the Command Phase is written. Prior to performing the Command Phase, the Digital Output Register should be set and the data rate should be set with the Data Rate Select Register or Configuration Control Register. The Main Status Register controls the flow of command bytes, and must be polled by the software before writing each Command Phase byte to the Data Register. Prior to writing a command byte, the RQM bit (D7) must be set and the DIO bit (D6) must be cleared in the MSR. After the first command byte is written to the Data Register, the CMD PROG bit (D4) is also set and remains set until the last Result Phase byte is read. If there is no Result Phase, the CMD PROG bit is cleared after the last command byte is written.

A new command may be initiated after reading all the result bytes from the previous command. If the next command requires selecting a different drive or changing the data rate, the DOR and DSR or CCR should be updated. If the command is the last command, the software should deselect the drive.

Note: As a general rule, the operation of the controller core is independent of how the µP updates the DOR, DSR, and CCR. The software must ensure that the manipulation of these registers is coordinated with the controller operation.

Section 4.15.3.2 Execution Phase

During the Execution Phase, the disk controller performs the desired command. Commands that involve data transfers (e.g., read, write, or format operation) require the µP to write or read data to or from the Data Register at this time. Some commands such as a Seek or Recalibrate control the read/write head movement on the disk drive during the Execution Phase via the disk interface signals. Execution of other commands does not involve any action by the µP or disk drive, and consists of an internal operation by the controller. If there is data to be transferred between the µP and the controller during the Execution, there are three methods that can be used, DMA mode, interrupt transfer mode, and software polling mode. The last two modes are called the Non-DMA modes. The DMA mode is used if the system has a DMA controller. This allows the µP to do other tasks while the data transfer takes place during the Execution Phase. If the Non-DMA mode is used, an interrupt is issued for each byte transferred during the Execution Phase. Also, instead of using the interrupt during Non-DMA mode, the Main Status Register can be polled by software to indicate when a byte transfer is required. All of these data transfer modes work with the FIFO enabled or disabled.

Section 4.15.3.3 DMA Mode—FIFO Disabled

The DMA mode is selected by writing a 0 to the DMA bit in the Specify command and by setting the DMA enabled bit (D3) in the DOR. With the FIFO is disabled, a DMA request (DRQ) is generated in the Execution Phase when each byte is ready to be transferred. The DMA controller should respond to the DRQ with a DMA acknowledge ($\overline{DACK}$) and a read or write strobe. The DRQ is cleared by the leading edge of the active low $\overline{DACK}$ input signal. After the last byte is transferred, an interrupt is generated, indicating the beginning of the Result Phase. During DMA operations the chip select input ($\overline{CS}$) must be held high. The $\overline{DACK}$ signal acts as the chip select for the FIFO in this case, and the state of the address lines A2–A0 is a don't care. The Terminal Count (TC) signal can be asserted by the DMA controller to terminate the data transfer at any time. Due to internal gating, TC is only recognized when DACK is low. PC-AT mode. When in the PC-AT interface mode with the FIFO disabled, the controller is in single byte transfer mode. That is, the system has one byte time to service a DMA request (DRQ) from the controller. DRQ is deasserted between each byte.

Section 4.15.4 DNA Mode—FIFO Enabled

Read Data Transfers

Whenever the number of bytes in the FIFO is greater than or equal to (16- THRESH), a DRQ is generated. This is the trigger condition for the FIFO read data transfers from the floppy controller to the µP. Burst Mode. DRQ remains active until enough bytes have been read from the controller to empty the FIFO. Non-Burst Mode. DRQ is deasserted after each read transfer. If the FIFO is not completely empty, DRQ is reasserted after a 350 ns delay. This allows other higher priority DMA transfers to take place between floppy transfers. In addition, this mode allows the controller to work correctly in systems where the DMA controller is put into a read verify mode, where only $\overline{DACK}$ signals are sent to the FDC 12, with no $\overline{RD}$ pulses. This read verify mode of the DMA controller is used in some PC software. The FIFO Non-Burst mode allows the $\overline{DACK}$ input from the DMA controller to be strobed, which correctly clocks data from the FIFO. For both the Burst and Non-Burst modes, when the last byte in the FIFO has been read, DRQ goes inactive. DRQ is reasserted when the FIFO trigger condition is satisfied. After the last byte of a sector has been read from the disk, DRQ is again generated even if the FIFO has not yet reached its threshold trigger condition. This guarantees that all the current sector bytes are read from the FIFO before the next sector byte transfer begins.

Write Data Transfers

Whenever the number of bytes in the FIFO is less than or equal to THRESH, a DRQ is generated. This is the trigger condition for the FIFO write data transfers from the µP to the floppy controller. Burst Mode. DRQ remains active until enough bytes have been written to the controller to completely fill the FIFO. Non-Burst Mode. DRQ is deasserted after each write transfer. If the FIFO is not full, DRQ is reasserted after a 350 ns delay. This deassertion of DRQ allows other higher priority DMA transfers to take place between floppy transfers. The FIFO has a byte counter which monitors the number of bytes being transferred to the FIFO during write operations for both Burst and Non-Burst modes. When the last byte of a sector is transferred to the FIFO, DRQ is deasserted even if the FIFO has not been completely filled. Thus, the FIFO is cleared after each sector is written. Only after the floppy controller has determined that another sector is to be written is DRQ asserted again. Also, since DRQ is deasserted immediately after the last byte of a sector is written to the FIFO, the system does not need to tolerate any DRQ deassertion delay and is free to do other work.

DRQ Deassertion

The $\overline{FDACK}$ input signal from the DMA controller may be strobed for each byte transferred during a read or write operation. If FDAC is held active during the entire burst, the leading edge of the IOR or IOW strobe is used to deassert FDRQ. If $\overline{FDACK}$ is strobed for each byte then the leading edge of $\overline{FDACK}$ deasserts FDRQ.

Overrun Errors

An overrun or underrun error terminates the execution of the command if the system does not transfer data within the allotted data transfer time (see Section 4.8), which will put the controller into the Result Phase. During a read overrun, the mP is required to read the remaining bytes of the sector before the controller asserts IRQ6, signifying the end of execution. During a write operation, an underrun error terminates the Execution Phase after the controller has written the remaining bytes of the sector with the last correctly written byte to the FIFO and generated the CRC bytes. Whether there is an error or not, an interrupt is generated at the end of the Execution Phase, and is cleared by reading the first Result Phase byte. $\overline{FDACK0}$ asserted alone without a $\overline{IOR}$ or $\overline{IOW}$ strobe is also counted as a transfer. If $\overline{IOR}$ or $\overline{IOW}$ are not being strobed for each byte, $\overline{FDACK}$ must be strobed for each byte so that the floppy controller can count the number of bytes correctly. A new command, the Verify command, has been added to allow easier verification of data written to the disk without the need of actually transferring the data on the data bus.

Section 4.15.5 Interrupt Mode—FIFO Disabled

If the Interrupt (Non-DMA) mode is selected, IRQ6 is asserted instead of DRQ when each byte is ready to be transferred. The Main Status Register should be read to verify that the interrupt is for a data transfer. The RQM and NON DMA bits (D7 and D5) in the MSR are set. The interrupt is cleared when the byte is transferred to or from the Data Register.

The μP should transfer the byte within the data transfer service time (see Section 4.8). If the byte is not transferred within the time allotted, an Overrun Error is indicated in the Result Phase when the command terminates at the end of the current sector.

An interrupt is also generated after the last byte is transferred. This indicates the beginning of the Result Phase. The RQM and DIO bits (D7 and D6) in the MSR is set, and the NON DMA bit (D5) is cleared. This interrupt is cleared by reading the first result byte.

Section 4.15.6 Interrupt Mode—FIFO Enabled

The Interrupt (Non-DMA) mode with the FIFO enabled is very similar to the Non-DMA mode with the FIFO disabled. In this case, IRQ6 is asserted instead of DRQ under the exact same FIFO threshold trigger conditions. The MSR should be read to verify that the interrupt is for a data transfer. The RQM and NON DMA bits (D7 and D5) in the MSR are set.

The Burst mode may be used to hold the IRQ6 pin active during a burst, or the Non-Burst mode may be used to toggle the IRQ6 pin for each byte of a burst. The Main Status Register is always valid from the mP point of view. For example, during a read command, after the last byte of data has been read from the disk and placed in the FIFO, the MSR still indicates that the Execution Phase is active, and that data needs to be read from the Data Register. Only after the last byte of data has been read by the μP from the FIFO does the Result Phase begin. The same overrun and underrun error procedures from the DMA mode apply to the Non-DMA mode. Also, whether there is an error or not, an interrupt is generated at the end of the Execution Phase, and is cleared by reading the first Result Phase byte.

Section 4.15.7 Software Polling

If the Non-DMA mode is selected and interrupts are not suitable, the μP can poll the MSR during the Execution Phase to determine when a byte is ready to be transferred. The RQM bit (D7) in the MSR reflects the state of the IRQ6 signal. Otherwise, the data transfer is similar to the Interrupt Mode described above. This is true for the FIFO enabled or disabled.

Section 4.15.8 Result Phase

During the Result Phase, the μP reads a series of bytes from the data register. These bytes indicate the status of the command. This status may indicate whether the command executed properly, or contain some control information (see the Command Description TABLE and Status Register Description). These Result Phase bytes are read in the order specified for that particular command. Some commands do not have a result phase. Also, the number of result bytes varies with each command. All of the result bytes must be read from the Data Register before the next command can be issued.

Like the Command Phase, the Main Status Register controls the flow of result bytes, and must be polled by the software before reading each Result Phase byte from the Data Register. The RQM bit (D7) and DIO bit (D6) must both be set before each result byte can be read. After the last result byte is read, the COM PROG bit (D4) in the MSR is cleared, and the controller is ready for the next command.

Section 4.15.9 Idle Phase

After a hardware or software reset, or after the chip has recovered from the power down mode, the controller enters the Idle Phase. Also, when there are no commands in progress the controller is in the Idle Phase. The controller waits for a command byte to be written to the Data Register. The RQM bit is set and the DIO bit is cleared in the MSR. After receiving the first command (opcode) byte, the controller enters the Command Phase. When the command is completed the controller again enters the Idle Phase. The Data Separator remains synchronized to the reference frequency while the controller is idle. While in the Idle Phase, the controller periodically enters the Drive Polling Phase (see below).

Section 4.15.10 Drive Polling Phase

While in the Idle Phase the controller enters a Drive Polling Phase every 1 ms (based on the 500 kb/s data rate).

While in the Drive Polling Phase, the controller interrogates the Ready Changed status for each of the four logical drives. The internal Ready Change Status for each drive is toggled only after a hardware or software reset, and an interrupt is generated for drive 0. At this point, the software must issue four Sense Interrupt commands to clear the Ready Changed State status for each drive. This requirement can be eliminated if drive polling is disabled via the POLL bit in the Configure command. The Configure command must be issued within 500 us (worst case) of the hardware or software reset for drive polling to be disabled. The controller uses the Drive Polling Phase to control the Automatic Low Power mode. Even if drive polling is disabled, drive stepping and automatic power-down can occur in the Drive Polling Phase. The controller checks the status of each drive and if necessary it issues a step pulse on the STEP output with the DIR signal at the appropriate logic level. When the Motor Off time has expired, the controller waits 512 ms based on the 500 kb/s and 1 Mb/s data rate before entering Automatic Low Power mode if this function is enabled via the Mode command.

Section 4.16 DATA SEPARATOR

The internal data separator consists of an analog PLL and its associated circuitry. The PLL synchronizes the raw data-signal read from the disk drive. The synchronized signal is used to separate the encoded clock and data pulses. The data pulses are deserialized into bytes and then sent to the µP by the controller.

The main PLL consists of five main components, a phase comparator, a charge pump, a filter, a voltage controlled oscillator (VCO), and a programmable divider. The phase comparator detects the difference between the phase of the divider's output and the phase of the raw data being read from the disk. This phase difference is converted to a current by the charge pump, which either charges or discharges one of three filters which is selected based on the data rate. The resulting voltage on the filter changes the frequency of the VCO and the divider output to reduce the phase difference between the input data and the divider's output. The PLL is "locked" when the frequency of the divider is exactly the same as the average frequency of the data read from the disk. A block diagram of the data separator is shown in FIG. 4-3.

To ensure optimal performance, the data separator incorporates several additional circuits. The quarter period delay line is used to determine the center of each bit cell, and to disable the phase comparator when the raw data signal is missing a clock or data pulse in the MFM or FM pattern. A secondary PLL is used to automatically calibrate the quarter period delay line. The secondary PLL also calibrates the center frequency of the VCO.

To eliminate the logic associated with controlling multiple data rates, the FDC 12 supports each of the four data rates (250, 300, 500 kb/s, and 1 Mb/s) with a separate, optimized internal filter. The appropriate filter for each data rate is automatically switched into the data separator circuit when the data rate is selected via the Data Rate Select or Configuration Control Register. These filters have been optimized through lab experimentation, and are designed into the controller to reduce the external component cost associated with the floppy controller.

The FDC 12 has a dynamic window margin and lock range performance capable of handling a wide range of floppy disk drives. Also, the data separator works well under a variety of conditions, including the high motor speed fluctuations of floppy compatible tape drives.

FIG. 4—4 shows the floppy disk controller dynamic window margin performance at the four different data rates. Dynamic window margin is the primary indicator of the quality and performance level of the data separator. This measurement indicates how much motor speed variation (MSV) of the drive spindle motor and bit jitter (or window margin) can be tolerated by the data separator. MSV is shown on the x-axis of the dynamic window margin graph. MSV is translated directly to the actual data rate of the data as it is read from the disk by the data separator. That is, a faster than nominal motor results in a higher frequency in the actual data rate.

The dynamic window margin performance curves also indicate how much bit jitter (or window margin) can be tolerated by the data separator. This parameter is shown on the y-axis of the graphs. Bit jitter is caused by the magnetic interaction of adjacent data pulses on the disk, which effectively shifts the bits away from their nominal positions in the middle of the bit window. Window margin is commonly measured as a percentage. This percentage indicates how far a data bit can be shifted early or late with respect to its nominal bit position, and still be read correctly by the data separator. If the data separator cannot correctly decode a shifted bit, then the data is misread and a CRC error results.

The dynamic window margin performance curves contain two pieces of information: 1) the maximum range of MSV (also called "lock range") that the data separator can handle with no read errors, and 2) the maximum percentage of window margin (or bit jitter) that the data separator can handle with no read errors. Thus, the area under the dynamic window margin curves in FIG. 4—4 is the range of MSV and bit jitter that the FDC 12 can handle with no read errors. The FDC 12 internal analog data separator has a much better performance than comparable digital data separator designs, and does not require any external components.

Note: The dynamic window margin curves were generated using a FlexStar FS-540 Floppy Disk Simulator and a proprietary dynamic window margin test program written by National Semiconductor. The controller takes best advantage of the internal analog data separator by implementing a sophisticated read algorithm. This ID search algorithm, shown in FIG. 4-5, enhances the PLL's lock characteristics by forcing the PLL to relock to the crystal reference frequency any time the data separator attempts to lock to a non-preamble pattern. This algorithm ensures that the PLL is not shifted to far from the lock range by write splices or bad data fields.

Section 4.17 PERPENDICULAR RECORDING MODE

The FDC 12 is fully compatible with perpendicular recording mode disk drives at all data rates. These perpendicular mode drives are also called 4 Mbyte (unformatted) or 2.88 Mbyte (formatted) drives, which refers to their maximum storage capacity. Perpendicular recording will orient the magnetic flux changes (which represent bits) vertically on the disk surface, allowing for a higher recording density than the conventional longitudinal recording methods. With this increase in recording density comes an increase in the data rate of up to 1 Mb/s, thus doubling the storage capacity. In addition, the perpendicular 2.88M drive is read/write compatible with 1.44M and 720K diskettes (500 kb/s and 250 kb/s respectively). The 2.88M drive has unique format and write data timing requirements due to its read/write head and pre-erase head design (see FIG. 4-6). Unlike conventional disk drives which have only a read/write head, the 2.88M drive has both a pre-erase head and read/write head. With conventional disk drives, the read/write head by itself is able to rewrite the disk without problems. For 2.88M drives, a pre-erase head is needed to erase the magnetic flux on the disk surface before the read/write can write to the disk surface. The pre-erase head is activated during disk write operations only, i.e. Format and Write Data commands. In 2.88M drives, the pre-erase head leads the read/write head by 200 µm, which translates to 38 bytes at 1 Mb/s (19 bytes at 500 kb/s). For both conventional and perpendicular drives, WGATE is asserted with respect to the position of the read/write head. With conventional drives, this means that WGATE is asserted when the read/write head is located at the beginning of the Data Field preamble. With the 2.88M drives, since the preamble must be pre-erased before it is rewritten, WGATE should be asserted when the pre-erase head is located at the beginning of the Data Field preamble. This means that WGATE should be asserted when the read/write head is at least 38 bytes (at 1 Mb/s) before the preamble. See TABLE 4-12 for a description of the WGATE timing for perpendicular drives at the various data rates. Because of the 38 byte spacing between the read/write head and the pre-erase head at 1 Mb/s, the GAP2 length of 22 bytes used in the standard IBM disk format is not long enough. There is a new format standard for 2.88M drives at 1 Mb/s called the Perpendicular Format, which increases the GAP2 length to 41 bytes (see FIG. 4-6). The Perpendicular Mode command will put the floppy controller into perpendicular recording mode, which allows it to read and write perpendicular media. Once this command is invoked, the read, write and format commands can be executed in the normal manner. The perpendicular mode of the floppy controller will work at all data rates, adjusting the format and write data parameters accordingly. See Section 4.14.8 for more details.

Section 4.18 DATA RATE SELECTION

The data rate can be chosen two different ways with the FDC 12. For PC compatible software, the Configuration Control Register at address 3F7 (hex) is used to program the data rate for the floppy controller. The lower bits D1 and D0 are used in the CCR to set the data rate. The other bits should be set to zero. See TABLE 4-7 for the data rate select encoding.

The data rate can also be set using the Data Rate Select Register at address 4. Again, the lower two bits of the register are used to set the data rate. The encoding of these bits is exactly the same as those in the CCR. The remainder of the bits in the DSR are used for other functions. Consult the Register Description (Section 4.10) for more details.

The data rate is determined by the last value that is written to either the CCR or the DSR. In other words, either the CCR or the DSR can override the data rate selection of the other register. When the data rate is selected, the microengine and data separator clocks are scaled appropriately. Also, the DRATE0 and DRATE1 output pins will reflect the state of the data select bits that were last written to either the CCR or the DSR.

Section 4.19 WRITE PRECOMPENSATION

Write precompensation is a way of preconditioning the WDATA output signal to adjust for the effects of bit shift on the data as it is written to the disk surface. Bit shift is caused by the magnetic interaction of data bits as they are written to the disk surface, and has the effect of shifting these data bits away from their nominal position in the serial MFM or FM data pattern. Data that is subject to bit shift is much harder to read by a data separator, and can cause soft read errors. Write precompensation predicts where bit shift could occur within a data pattern. It then shifts the individual data bits early, late, or not at all such that when they are written to the disk, the resultant shifted data bits will be back in their nominal position.

The FDC 12 supports software programmable write precompensation. Upon power up, the default write precomp values will be used (see TABLE 4-6). The programmer can chose a different value of write precomp with the DSR register if desired (see TABLE 4-7). Also on power up, the default starting track number for write precomp is track zero. This starting track number for write precomp can be changed with the Configure command.

Section 4.20 PDC 12 LOW POWER MODE LOGIC

The FDC 12 section of the PC87340 supports two low power modes described here in detail. Other low power modes of the PC87340 are described in Section 2.6. Details concerning entering and exiting low power mode via setting Data Rate Select Register bit 6 or by executing the FDC 12 Mode Command are covered below and in Section 4.10 and Section 4.14.6. The microcode is driven from the clock, so it will be disabled while the clock is off. The FDC 12 clock is always disabled upon entering this mode, however, the oscillator is only disabled when PTR1=1. Upon entering the power down state, the RQM (Request For Master) bit in the MSR will be cleared.

There are two modes of low power in the floppy controller: manual low power and automatic low power. Manual low power is enabled by writing a 1 to bit 6 of the DSR. The chip will go into low power immediately. This bit will be cleared to 0 after the chip is brought out of low power. Manual low power can also be accessed via the Mode command. The function of the manual low power mode is a logical OR function between the DSR low power bit and the Mode command manual low power bit setting. Automatic low power mode will switch the controller into low power 500 ms (at the 500 kb/s MFM data rate) after it has entered the idle state. Once the auto low power mode is set, it does not have to be set again, and the controller will automatically go into low power mode after it has entered the idle state. Automatic low power mode can only be set with the Mode command. NOTE: Automatic low power mode is not a recommended mode of operation, since it will stop the PC87340 crystal. This, stops the internal clock indiscriminately to all functions on the part. There are two ways the FDC 12 section can recover from the power down state. The part will power up after a software reset via the DOR or DSR. Since a software reset requires reinitialization of the controller, this method can be undesirable. The part will also power up after a read or write to either the Data Register or Main Status Register. This is the preferred method of power up since all internal register values are retained. It may take a few milliseconds for the oscillator to stabilize, and the µP will be prevented from issuing commands during this time through the normal Main Status Register protocol. That is, the RQM bit in the MSR will be a 0 until the oscillator has stabilized. When the controller has completely stabilized from power up, the RQM bit in the MSR is set to 1 and the controller can continue where it left off.

The Data Rate Select, Digital Output, and Configuration Control Registers are unaffected by the power down mode. They will remain active. It is up to the user to ensure that the Motor and Drive Select signals are turned off. Note: If the power to an external oscillator driving the PC87340 is to be independently removed during the FDC 12 low power mode, it must not be done until 2 ms after the FDC 12 low power command is issued.

Section 4.21 RESET OPERATION

The floppy controller can be reset by hardware or software. Hardware reset is enacted by pulsing the Master Reset input pin. A hardware reset will set all of the user addressable registers and internal registers to their default values. The Specify command values will be don't cares, so they must be reinitialized. The major default conditions are: FIFO disabled, FIFO threshold=0, Implied Seeks disabled, and Drive Polling enabled.

A software reset can be performed through the Digital Output Register or Data Rate Select Register. The DSR reset bit is self-clearing, while the DOR reset bit is not self-clearing. If the LOCK bit in the Lock command was set to a 1 prior to the software reset, the FIFO, THRESH, and PRETRK parameters in the Configure command will be retained. In addition, the FWR, FRD, and BST parameters in the Mode command will be retained if LOCK is set to 1. This function eliminates the need for total reinitialization of the controller after a software reset. After a hardware (assuming the FDC 12 is enabled in the FER) or software reset, the Main Status Register is immediately available for read access by the µP. It will return a 00 hex value until all the internal registers have been updated and the data separator is stabilized. When the controller is ready to receive a command byte, the MSR will return a value of 80 hex (Request for Master bit is set). The MSR is guaranteed to return the 80 hex value within 2.5 msec after a hardware or software reset. All other user addressable registers other than the Main Status Register and Data Register (FIFO) can be accessed at any time, even while the part is in reset.

Section 5.0 Serial Ports

Section 5.1 INTRODUCTION

Each of these serial ports function as a serial data input/output interface in a microcomputer system. The system software determines the functional configuration of the UARTs 8 and 10 via a 8-bit bidirectional data bus and their register sets. The first and second UART modules 8 and 10 are completely independent. They perform serial-to-parallel conversion on data characters received from a peripheral device or a MODEM, and parallel-to-serial conversion on data characters received from the CPU. The CPU can read the complete status of either the first and second UART module 8 and 10 at any time during the functional operation. Status information reported includes the type and condition of the transfer operations being performed by the UART 8, as well as any error conditions (parity, overrun, framing, or break interrupt).

The first and second UART modules 8 and 10 have programmable baud rate generators that are capable of dividing the internal reference clock by divisors of 1 to $(2^{16}-1)$, and producing a 16 x clock for driving the transmitter logic. Provisions are also included to use this 16 x clock to drive the receiver logic. The first and second UART modules 8 and 10 have complete MODEM-control capability and a prioritized interrupt system. Interrupts can be programmed to the user's requirements, minimizing the computing required to handle the communications link.

Section 5.2 PC67340 SERIAL PORTS

Section 5.2.1 Serial Port Registers

Two identical register sets, one for each channel, are in the PC87340. All register descriptions in this section apply to the register sets in both channels

TABLE 5-1

Preferred Embodiment UART 8 Register Addresses (AEN = 0)

| DLAB1 | A2 | A1 | A0 | Selected Register |
|---|---|---|---|---|
| 0 | 0 | 0 | 0 | Receiver Buffer (Read), Transmitter Holding (Write) |
| 0 | 0 | 0 | 1 | Interrupt Enable |
| 0 | 0 | 1 | 0 | Interrupt Identification (Read) FIFO Control (Write) - 16550 |
| x | 0 | 1 | 1 | Line Control |
| x | 1 | 0 | 0 | MODEM Control |
| x | 1 | 0 | 1 | Line Status |
| x | 1 | 1 | 0 | MODEM Status |
| x | 1 | 1 | 1 | Scratch |
| 1 | 0 | 0 | 0 | Divisor Latch (Least Significant Byte) |
| 1 | 0 | 0 | 1 | Divisor Latch (Most Significant Byte) |

Section 5.2.2 Line Control Register

The system programmer uses the Line Control Register (LCR) to specify the format of the asynchronous data communications exchange and set the Divisor Latch Access bit. This is a read and write register. TABLE 5-2 shows the contents of the LCR. Details on each bit follow: See FIG. 5-1 for the timing diagram of the preferred composit serial data.

FIG. 4-7. Preferred Embodiment Composite Serial Data

Bits 0,1 These two bits specify the number of data bits in each transmitted or received serial character. The encoding of bits 0 and 1 is as follows:

| Bit 1 | Bit 0 | Data Length |
|---|---|---|
| 0 | 0 | 5 Bits |
| 0 | 1 | 6 Bits |
| 1 | 0 | 7 Bits |
| 1 | 1 | 8 Bits |

Bit 2 This bit specifies the number of Stop bits transmitted with each serial character. If bit 2 is 0, one Stop bit is generated in the transmitted data. If bit 2 is 1, when a 5-bit data length is selected, one and a half Stop bits are generated. If bit 2 is 1, when either a 6-,7-, or 8-bit word length is selected, two Stop bits are generated. The receiver checks the first Stop bit only, regardless of the number of Stop bits selected.

Bit 3 This bit is the Parity Enable bit. When it is 1, a Parity bit is generated (transmit data) or checked (receive data) between the last data bit and Stop bit of the serial data. (The Parity bit is used to produce an even or odd number of 1s when the data bits and the Parity bit are summed.)

Bit 4 This bit is the Even Parity Select bit. When parity is enabled and bit 4 is 0, an odd number of logic 1s is transmitted or checked in the data word bits and Parity bit. When parity is enabled and bit 4 is a 1, an even number of logic 1s is transmitted or checked.

Bit 5 This bit is the Stick Parity bit. When parity is enabled it is used in conjunction with bit 4 to select Mark or Space Parity. When LCR bits 3, 4 and 5 are 1 the Parity bit is transmitted and checked as a 0 (Space Parity). If bits 3 and 5 are 1 and bit 4 is a 0, then the Parity bit is transmitted and checked as 1 (Mark Parity). If bit 5 is 0 Stick Parity is disabled.

Bit 6 This bit is the Break Control bit. It causes a break condition to be transmitted to the receiving UART 8. When it is set to 1, the serial output (SOUT) is forced to the Spacing state (0). The break is disabled by setting bit 6 to 0. The Break Control bit acts only on SOUT and has no effect on the transmitter logic.

Note: This feature enables the CPU to alert a terminal. If the following sequence is used, no erroneous characters will be transmitted because of the break.
1. Wait for the transmitter to be idle, (TEMT=1).
2. Set break for the appropriate amount of time. If the transmitter will be used to time the break duration(by loading characters into the transmitter) then check that TEMT=1 before clearing the Break Control bit.
3. Clear break when normal transmission has to be restored.

During the break, the Transmitter can be used as a character timer to accurately establish the break duration by sending characters and monitoring THRE and TEMT.

TABLE 5-2

PC87340 Register Summary for an Individual UART 8 Channel

Register Address

| Bit No. | ODLAB = 0 Receiver Buffer Register (Read Only) RBR | ODLAB = Trans- mitter Holding Register (Write Only) THR | 1DLAB = 0 Interrupt Enable Register IBR | 2 Interrupt Ident. Register (Read Only) IIR | 2 FIFO Control Register (Write Only) PCR | 3 Line Control Register LCR | 4 MODEM Control Register MCR | 5 Line Status Register LSR | 6 MODEM Status Register MSR | 7 Scratch Pad Register SCR | ODLAB = 1 (LS) DLL | 1DLAB = 1 (MS) DLM |
|---|---|---|---|---|---|---|---|---|---|---|---|---|
| 0 | Data Bit 0 (Note 1) | Data Bit 0 | Enable Received Data Available Interrupt | "0" if Interrupt Pending | FIFO Enable | Word Length Select Bit 0 | Data Terminal Ready (DTR) | Data Ready (DR) | Data Clear to Send | Bit 0 | Bit 0 | Bit 8 |
| 1 | Data Bit 1 | Data Bit 1 | Enable Trans- mitter Holding Register Interrupt Empty | Interrupt ID Bit | RCVR FIFO Read | Word Length Select Bit 1 | Request to Send (RTS) | Overrun Error (OB) | Data Data Set Ready | Bit 1 | Bit 1 | Bit 9 |
| 2 | Data Bit 2 | Data Bit 2 | Enable Receiver Line Status Interrupt | Interrupt ID Bit | XMIT FIFO Reset | Number of Stop Bits | Out 1 Bit (Note 3) | Parity Error (PB) | Trailing Edge Ring Indicator | Bit 2 | Bit 2 | Bit 10 |
| 3 | Data Bit 3 | Data Bit 3 | Enable MODEM Status Interrupt | Interrupt ID Bit (Note 2) | Reserved | Parity Enable | IRQ Enable (Note 3) | Framing Error (FB) | Data Data Carrier Detect | Bit 3 | Bit 3 | Bit 11 |
| 4 | Data Bit 4 | Data Bit 4 | 0 | 0 | Reserved | Even Parity Select | Loop | Break Interrupt (BI) | Clear to Send | Bit 4 | Bit 4 | Bit 12 |
| 5 | Data Bit 5 | Data Bit 5 | 0 | 0 | Reserved | Stick Parity | 0 | Transmitter Holding Register | Data Set Ready | Bit 5 | Bit 5 | Bit 13 |
| 6 | Data Bit 6 | Data Bit 6 | 0 | FIFOs Enabled (Note 2) | RCVR Trigger (MSB) | Set Break | 0 | Transmitter Empty (TBMPT) | Ring Indicator | Bit 6 | Bit 6 | Bit 14 |
| 7 | Data Bit 7 | Data Bit 7 | 0 | FIFOs Enabled (Note 2) | RCVR Trigger (MSB) | Divisor Latch Access Bit (DLAB) | 0 | Error in RCVR FIFO (Note 2) | Data Carrier Detect | Bit 7 | Bit 7 | Bit 15 |

Note 1: Bit 0 is the least significant bit. It is the first bit serially transmitted or received.
Note 2: These bits are always 0 in the NS16450 Mode.
Note 3: This bit no longer has a pin associated with it.

TABLE 5-3

PC87340 UART 8 Reset Configuration

| Register / Signal | Reset Control | Reset State |
|---|---|---|
| Interrupt Enable | Master Reset | 0000 0000 (Note 1) |
| Interrupt Identification | Master Reset | 0000 0001 |
| FIFO Control | Master Reset | 0000 0000 |
| Line Control | Master Reset | 0000 0000 |
| MODEM Control | Master Reset | 0000 0000 |
| Line Status | Master Reset | 0110 0000 |
| MODEM Status | Master Reset | XXXX 0000 (Note 2) |
| SOUT | Master Reset | High |
| INTR (RCVR Errs) | Read LSR / MR | Low /TRI-STATE |
| INTR (RCVR Data Ready) | Read RBR / MR | Low /TRI-STATE |
| INTR (THRE) | Read IRR / Write THR / MR | Low /TRI-STATE |
| Interrupt Enable Bit | Master Reset | Low |
| RTS | Master Reset | High |
| DTR | Master Reset | High |
| RCVR FIFO | MR/FCR1●FCR0/ΔFCR0 | All Bits Low |
| XMIT FIFO | MR/FCR2●FCR0/ΔFCR0 | All Bits Low |

Note 1: Boldface bits are permanently low.
Note 2: Bits 7–4 are driven by the input signals.

Bit 7 This bit is the Divisor Latch Access Bit (DLAB). It must be set high (logic 1) to access the Divisor Latches of the Baud rate Generator during a Read or Write operation or to have the BOUT signal appear on the BOUT pin. It must be set low (logic 0) to access any other register.

Section 5.2.3 Programmable Baud Rate Generator

Preferred system embodiments contain two independently programmable Baud rate Generators. The 24 MHz crystal oscillator frequency input is divided by 13, resulting in a frequency of 1.8462 MHz. This is sent to each Baud rate Generator and divided by the divisor of the associated UART 8 and 10. The output frequency of the Baud rate Generator (BOUT1,2) is 16x the baud rate.

divisor # =(frequency input) (baud rate x 16)

The output of each Baud rate Generator drives the transmitter and receiver sections of the associated serial channel. Two 8-bit latches per channel store the divisor in a 16-bit binary format. These Divisor Latches must be loaded during initialization to ensure proper operation of the Baud rate Generator. Upon loading either of the Divisor Latches, a 16-bit Baud Counter is loaded. TABLE 5-4 provides decimal divisors to use with crystal frequencies of 24 MHz. The oscillator input to the chip should always be 24 MHz to ensure that the Floppy Disk Controller timing is accurate and that the UART 8 and 10 divisors are compatible with existing software. Using a divisor of zero is not recommended.

TABLE 5-4

First and Second UART modules 8 and 10 Divisors, Baud Rates and Clock Frequencies
24 MHz Input Divided to 1.8461 MHz

| Baud Rate | Decimal Divisor for 16 × Clock | Percent Error |
|---|---|---|
| 50 | 2304 | 0.1 |
| 75 | 1536 | |
| 110 | 1047 | |
| 134.5 | 857 | 0.4 |
| 150 | 768 | |
| 300 | 384 | |
| 600 | 192 | |
| 1200 | 96 | |
| 1800 | 64 | |
| 2000 | 58 | 0.5 |
| 2400 | 48 | |
| 3600 | 32 | |
| 4800 | 24 | |
| 7200 | 16 | |
| 9600 | 12 | |
| 19200 | 6 | |
| 38400 | 3 | |
| 57600 | 2 | |
| 115200 | 1 | |

Note: The percent error for all baud rates, except where indicated otherwise, is 0.2%.

Section 5.2.4 Line Status Register

This 8-bit register provides status information to the CPU concerning the data transfer. TABLE 5-2 shows the contents of the Line Status Register. Details on each bit follow:

Bit 0 This bit is the receiver Data Ready (DR) indicator. bit 0 is set to 1 whenever a complete incoming character has been received and transferred into the Receiver Buffer Register or the FIFO. It is reset to 0 by reading the data in the Receiver Buffer Register or the FIFO.

Bit 1 This bit is the Overrun Error (OE) indicator. Bit 1 indicates that data in the Receiver Buffer Register was not read by the CPU before the next character was transferred into the Receiver Buffer Register, thereby destroying the previous character. The OE indicator is set to 1 upon detection of an overrun condition, and reset whenever the CPU reads the contents of the Line Status Register. If the FIFO mode data continues to fill the FIFO beyond the trigger level, an Overrun error will occur only after the FIFO is completely full and the next character has been received in the shift register. OE is indicated to the CPU as soon as it happens. The character in the shift register is overwritten, but it is not transferred to the FIFO.

Bit 2 This bit is the Parity Error (PE) indicator. Bit 2 indicates that the received data character does not have the correct parity, even or odd as selected by the even-parity select bit. The PE bit is set to 1 upon detection of a parity error and is reset to 0 whenever the CPU reads the contents of the Line Status Register. In the FIFO mode this error is associated with the particular character in the FIFO that it applies to. This error is revealed to the CPU when its associated character is at the top of the FIFO.

Bit 3 This bit is the Framing Error (FE) indicator. Bit 3 indicates that the received character did not have a valid Stop bit. It is set to 1 whenever the Stop bit following the last data bit or parity bit is a 0 (Spacing level). The FE indicator is reset whenever the CPU reads the contents of the Line Status Register. In the FIFO mode this error is associated with the particular character in the FIFO that it applies to. This error is revealed to the CPU when its associated character is at the top of the FIFO. The UART 8 and/or 10 will try to resynchronize after a framing error by assuming that the error was due to the next start bit. It samples this "start" bit twice and then takes in the bits following it as the rest of the frame.

Bit 4 This bit is the Break Interrupt (BI) indicator. Bit 4 is set to 1 whenever the received data input is held in the Spacing (0) state for longer than a full word transmission time (i.e., the total time of Start bit+data bits+Parity 30 Stop bits). The BI indicator is reset whenever the CPU reads the contents of the Line Status Register. In the FIFO mode this error is associated with the particular character in the FIFO that it applies to. This error is revealed to the CPU when its associated character is at the top of the FIFO. When break occurs only one character is loaded into the FIFO. To Restart after a break is received, the SIN pin must be 1 for at least ½ bit time. Note Bits 1 through 4 are the error conditions that produce a Receiver Line Status interrupt whenever any of the corresponding conditions are detected and that interrupt is enabled.

Bit 5 This bit is the Transmitter Holding Register Empty (THRE) indicator. Bit 5 indicates that the UART 8 and/or 10 is ready to accept a new character for transmission. In addition, it causes the UART 8 and 10 to issue an interrupt to the CPU when the Transmit Holding Register Empty Interrupt enable is set high. The THRE bit is set to 1 when a character is transferred from the Transmitter Holding Register into the Transmitter Shift Register. The bit is reset to 0 whenever the CPU loads the Transmitter Holding Register. In the FIFO mode it is set when the XMIT FIFO is empty; it is cleared when at least 1 byte is written to the XMIT FIFO.

Bit 6 This bit is the Transmitter Empty (TEMT) indicator. Bit 6 is set to 1 whenever the Transmitter Holding Register (THR) and the Transmitter Shift Register (TSR) are both empty. It is reset to 0 if either the THR or TSR contains a data character. In the FIFO mode this bit is set to 1 whenever the transmitter FIFO and the shift register are both empty.

Bit 7 In the NS16450 Mode this is 0. In the FIFO Mode LSR7 is set when there is at least one parity error, framing error or break indication in the FIFO. LSR7 is cleared when the CPU reads the LSR, if there are no subsequent errors in the FIFO. Note: The Line Status Register is intended for read operations only. Writing to this register is not recommended as this operation is only used for factory testing. In the FIFO mode the software must load a data byte in the Rx FIFO via the Loopback Mode in order to write to LSR2–LSR4. LSR0 and LSR7 can't be written to in FIFO Mode.

Section 5.2.5 FIFO Control Register

This is a write-only register at the same location as the IIR (the IIR is a read-only register). This register is used to enable the FIFOs, clear the FIFOs and to set the RCVR FIFO trigger level.

Bit 0 Writing a 1 to FCR0 enables both the XMIT and RCVR FIFOs. Resetting FCR0 clears all bytes in both FIFOs. When changing from FIFO Mode to NS16450 Mode and vice versa, data is automatically cleared from the FIFOs. This bit must already be 1 when other FCR bits are written to or they will not be programmed.

Bit 1 Writing 1 to FCR1 clears all bytes in the RCVR FIFO and resets its counter logic to 0. The shift register is not cleared. The 1 that is written to this bit position is self-clearing.

Bit 2 Writing 1 to FCR2 clears all bytes in the XMIT FIFO and resets its counter logic to 0. The shift register is not cleared. The 1 that is written to this bit position is self-clearing.

Bit 3 Writing to FCR3 does not change UART 8 and 10 operations.

Bits 4,5 FCR4 to FCR5 are reserved for future use.

Bits 6,7 FCR6 and FCR7 are used to designate the interrupt trigger level. When the number of bytes in the RCVR FIFO equals the designated interrupt trigger level, a Received Data Available Interrupt is activated. This interrupt must be enabled by setting IER0

| FCR Bits | | RCVR FIFO |
|---|---|---|
| 7 | 6 | Trigger Level (Bytes) |
| 0 | 0 | 01 |
| 0 | 1 | 04 |
| 1 | 0 | 08 |
| 1 | 1 | 14 |

Section 5.2.6 Interrupt Identification Register

In order to provide minimum software overhead during data character transfers, the UART 8 and/or 10 prioritizes interrupts into four levels and records these in the Interrupt Identification Register. The four levels of interrupt conditions in order of priority are Receiver Line Status; Received Data Ready (or TIMEOUT in 16550 mode); Transmitter Holding Register Empty; and MODEM Status. When the CPU accesses the IIR, the UART 8 and/or 10 freezes all interrupts and indicates the highest priority pending interrupt to the CPU. While this CPU access is occurring, the UART 8 and/or 10 records new interrupts, but does not change its current indication until the current access is complete. TABLE 5-2 shows the contents of the IIR. Details on each bit follow:

Bit 0 This bit can be used in an interrupt environment to indicate whether an interrupt condition is pending. When it is 0, an interrupt is pending and the IIR contents may be used as a pointer to the appropriate interrupt service routine. When it is 1, no interrupt is pending.

Bits 1,2 These two bits of the IIR are used to identify the highest priority interrupt pending as indicated in TABLE 5—5.

Bit 3 In the 16450 mode this bit is 0. In the FIFO mode it is set along with bit 2 when a time-out interrupt is pending.

Bits 4,5 These bits of the IIR are always 0.

Bits 6,7 These two bits are set when FCR0=1. (FIFO Mode enabled.)

Section 5.2.7 Interrupt Enable Register

This register enables the five types of UART 8 and/or 10 interrupts. Each interrupt can individually activate the appropriate interrupt (IRQ3 or IRQ4) output signal. It is possible to totally disable the interrupt system by resetting bits 0 through 3 of the Interrupt Enable Register (IER). Similarly, setting bits of this register to 1, enables the selected interrupt(s). Disabling an interrupt prevents it from being indicated as active in the IIR and from activating the interrupt output signal. All other system functions operate in their normal manner, including the setting of the Line Status and MODEM Status Registers. TABLE 5-2 shows the contents of the IER. Details on each bit follow. See MODEM Control Register bit 3 for more information on enabling the interrupt pin.

Bit 0 When set to 1 this bit enables the Received Data Available Interrupt and Timeout Interrupt (16550 Mode.

Bit 1 This bit enables the Transmitter Holding Register Empty Interrupt when set to 1.

Bit 2 This bit enables the Receiver Line Status Interrupt when set to logic 1.

Bit 3 This bit enables the MODEM Status Interrupt when set to logic 1.

Bits 4–7 These four bits are always logic 0.

Section 5.2.8 MODEM Control Register

This register controls the interface with the MODEM or data set (or a peripheral device emulating a MODEM). The contents of the MODEM Control Register (MCR) are indicated in TABLE 6-2 and are described below.

Bit 0 This bit controls the Data Terminal Ready ($\overline{DTR}$) output. When Bit 0 is set to logic 1, the DTR output is forced to a logic 0. When it is reset to logic 0, the DTA output is forced to logic 1. In Local Loopback Mode, this bit controls bit 5 of the MODEM Status Register. Note the $\overline{DTR}$ and $\overline{RTS}$ output of the UART 8 and/or 10 may be applied to an EIA inverting line driver (such as the DS1488) to obtain the proper polarity input at the MODEM or data set.

Bit 1 This bit controls the Request to Send ($\overline{RTS}$) output. Bit 1 affects the $\overline{RTS}$ output in a manner identical to that described above for bit 0. In Local Loopback Mode, this bit controls bit 4 of the MODEM Status Register.

Bit 2 This bit is the OUT1 bit. It does not have a pin associated with it. It can be written to and read by the CPU. In Local Loopback Mode, this bit controls bit 6 of the Modem Status Register.

Bit 3 This bit enables the interrupt when set. No external pin is associated with this bit other than IRQ 3, 4. In Local Loopback Mode, this bit controls bit 7 of the MODEM Status Register.

Bit 4 This bit provides a Local loopback feature for diagnostic testing of the UART 8 and/or 10. When bit 4 is set to 1, the following occur: the transmitter Serial Output (SOUT) is set to the Marking (1) state; the receiver Serial Input (SIN) is disconnected; the output of the Transmitter Shift Register is "looped back" (connected) to the Receiver Shift Register; the four Control inputs ($\overline{DSR}$, $\overline{CTS}$, $\overline{RI}$ and $\overline{DCD}$) are disconnected; and the DTR, RTS, OUT1, IRQ ENABLE bits in MCR are internally connected to DSR, CTS, R1 and DCD in MSR, respectively. The MODEM Control output pins are forced to their high (inactive) states. In the Loopback Mode, data that is transmitted is immediately received. This feature allows the processor to verify the transmit-and-received-data paths of the serial port. In the Loopback Mode, the receiver and transmitter interrupts are fully operational. The MODEM Status Interrupts are also operational, but the interrupts' sources are the lower four bits of MCR instead of the four MODEM control inputs. Writing a 1 to any of these 4 MCR bits will cause an interrupt. In Loopback Mode the interrupts are still controlled by the Interrupt Enable Register. The IRQ3 and IRQ4 pins will be TRI-STATE in the Loopback Mode.

Bits 5–7 These bits are permanently set to 0.

TABLE 5-5

Interrupt Control Functions of the Preferred Embodiment

| FIFO Mode | Interrupt Identification Register | | | | Interrupt Set and Reset Functions | | |
|---|---|---|---|---|---|---|---|
| Only Bit3 | Bit 2 | Bit 1 | Bit 0 | Priority Level | Interrupt Type | Interrupt Source | Interrupt Reset Control |
| 0 | 0 | 0 | 1 | — | None | None | — |
| 0 | 1 | 1 | 0 | Highest | Receiver Line Status | Overrun Error, Parity Error, Framing Error or Break Interrupt | Reading the Line Status Register |
| 0 | 1 | 0 | 0 | Second | Received Data Available | Receiver Data Available | Read Receiver Buffer |
| 1 | 1 | 0 | 0 | Second | Character Time-out Indication | No Characters Have Been Removed from or input to the RCVR FIFO During the Last 4 Char. Times and there is at least 1 Char. in it during this Time. | Reading the Receiver Buffer Register |
| 0 | 0 | 1 | 0 | Third | Transmitter Holding Register Empty | Transmitter Holding Register Empty | Reading the IIR Register if Source of Interrupt) or Writing the Transmitter Holding Register |
| 0 | 0 | 0 | 0 | Fourth | MODEM Status | Clear to Send or Data Set Ready or Ring Indicator or Data Carrier Detect | Reading the MODEM Status Register |

Section 5.2.9 MODEM Status Register

This register provides the current state of the control lines from the MODEM (or peripheral device) to the CPU. In addition to this current-state information, four bits of the MODEM Status Register provide change information. These bits are set to a logic 1 whenever a control input from the MODEM changes state. They are reset to logic 0 whenever the CPU reads the MODEM Status Register. TABLE 5-2 shows the contents of the MSR. Details on each bit follow.

Bit 0 This bit is the Delta Clear to Send (DCTS) indicator.
    Bit 0 indicates that the CTS input to the chip has changed state since the last time it was read by the CPU.

Bit 1 This bit is the Delta Data Set Ready (DDSR) indicator.
    Bit 1 indicates that the DSR input to the chip has changed state since the last time it was read by the CPU.

Bit 2 This bit is the Trailing Edge of Ring Indicator (TERI) detector. Bit 2 indicates that the RI input to the chip has changed from a low to a high state.

Bit 3 This bit is the Delta Data Carrier Detect (DDCD) indicator. Bit 3 indicates that the DCD input to the chip has changed state. Note: Whenever bit 0, 1, 2, or 3 is set to logic 1, a MODEM Status Interrupt is generated.

Bit 4 This bit is the complement of the Clear to Send (CTS) input. If bit 4 (loopback) of the MCR is set to a 1, this bit is equivalent to RTS in the MCR.

Bit 5 This bit is the complement of the Data Set Ready (DSR) input. If bit 4 of the MCR is set to a 1, this bit is equivalent to DTR in the MCR.

Bit 6 This bit is the complement of the Ring Indicator (RI) input. If bit 4 of the MCR is set to a 1, this bit is equivalent to OUT 1 in the MCR.

Bit 7 This bit is the complement of the Data Carrier Detect (DCD) input. If bit 4 of the MCR is set to a 1, this bit is equivalent to IRQ ENABLE in the MCR.

Section 5.2.10 Scratchpad Register

This 8-bit Read/Write Register does not control the UART 8 and/or 10 in any way. It is intended as a scratchpad register to be used by the programmer to hold data temporarily.

Section 6.0 Parallel Port

Section 6.1 INTRODUCTION

This parallel interface provides all signals and registers needed to communicate through a standard parallel printer port found in the ISA, PS/2 and Centronics systems. Specifically, this port can be configured to support Compatible Mode, Extended Mode, Enhanced Parallel Port Mode (EPP) 1.7, EPP 1.9, and IEEE 1284 including the Extended Capabilities Mode. The address decoding of the registers utilizing A0 and A1 is shown in TABLE 6-1. TABLE 6-2 shows the Reset states of Parallel port pin signals. After reset, the Parallel Port is in Compatible Mode when enabled (FER0 =1).

TABLE 6-1

Standard Parallel Interface Register Addresses

| A1 | A0 | Address | Register | Access |
|----|----|---------|----------|--------|
| 0 | 0 | 0 | Data | Read/Write |
| 0 | 1 | 1 | Status | Read |
| 1 | 0 | 2 | Control | Read/Write |
| 1 | 1 | 3 | TRI-STATE | — |

Special circuitry provides protection against damage that might be caused when the printer is powered but the PC87340 is not.

There are two Standard Parallel Port (SPP) modes of operation (Compatible and Extended) two Enhanced Parallel Port (EPP) modes of operation and one Extended Capabilities Port (ECP) mode to complete a full IEEE 1284 parallel port. In Compatible mode a write operation causes the data to be presented on pins PD0–7. A read operation in this mode causes the Data Register to present the last data written to it by the CPU.

TABLE 6-2

SPP Data Register Read and Write Modes

| PTR7 | PDIR | CTR5 | RD⁻ | ⁻WR | RESULT |
|------|------|------|-----|-----|--------|
| 0 | 0 | x | 1 | 0 | Data written to PD0–7 |
| 0 | 1 | x | 1 | 0 | Data written is latched |

TABLE 6-2-continued

SPP Data Register Read and Write Modes

| PTR7 | PDIR | CTR5 | RD⁻ | ⁻WR | RESULT |
|------|------|------|-----|-----|--------|
| 0 | 0 | x | 0 | 1 | Data read from the output latch |
| 0 | 1 | x | 0 | 1 | Data read from PD0–7 |
| 1 | x | 0 | 1 | 0 | Data written to PD0–7 |
| 1 | x | 1 | 1 | 0 | Data written is latched |
| 1 | x | 0 | 0 | 1 | Data read from the output latch |
| 1 | x | 1 | 0 | 1 | Data read from PD0–7 |

In the Extended mode a write operation to the data register causes the data to be latched. If the Data Port Direction bit (CTR5) is 0, the latched data is presented to the pins; if it is 1 the data is only latched. When Data Port Direction bit (CTR5) is 0, a read operation from this register allows the CPU to read the last data it wrote to the port. In the Extended Mode with the Data Port Direction bit set to 1 (read), a read from this register causes the port to present the data on pins PD0–7 to the CPU.

| Port Function | PTR7 |
|---------------|------|
| Compatible | 0 |
| Extended | 1 |

Section 6.2 DATA REGISTER (DTR)

Figures 1, 5:
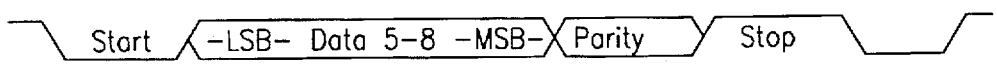
Figure 5A:
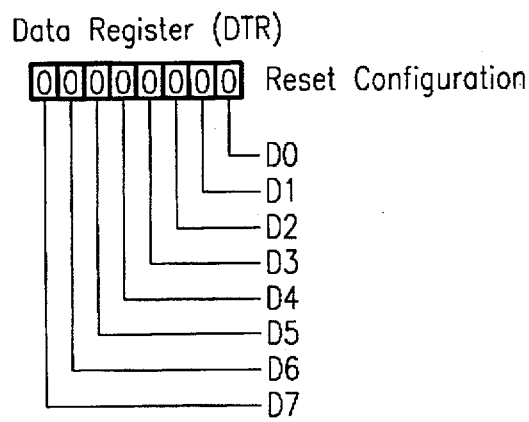
FIG. 5A is a diagram showing the data register (DTR)

Referring to FIG. 5A, this is a bidirectional data port that transfers 8-bit data. The direction is determined by the logic state of PDIR pin, the PTR7 and the CTR5 bits. When PTR7 is high, the CTR5 bit will determine the data direction in conjunction with the Read and Write strobes. When PTR7 bit is low, the PDIR pin will be sensed during reset and it will determine the port direction. See PTR7 bit, CTR5 bit, POE and PDIR pins for further information. The reset value of this register is 0.

Section 6.3 STATUS REGISTER (STR)

Figure 5B:
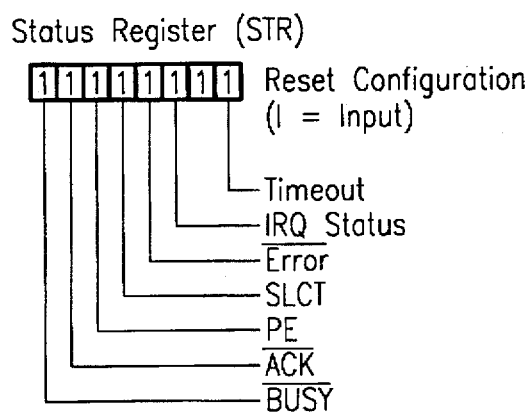
FIG. 5B is a diagram showing the status register (STR)

Referring to FIG. 5B, this register provides status for the signals listed below. It is a read only register. Writing to it is an invalid operation that has no effect.

Bit 0 When in EPP mode, this is the timeout status bit. When this bit is 0, no timeout. When this bit is 1, timeout occurred on EPP cycle (min. 10 μsec). It is cleared to 0 after STR is read, i.e., consecutive reads (after the first read) always return 0. It is also cleared to 0 when EPP is enabled (bit 0 of PCR is changed from 0 to 1). When not in EPP mode, this bit is 1.

Bit 1 Reserved, this bit is always 1.

Bit 2 In the compatible mode (PTR7 bit is 0), or in ECP and EPP with bit 4 of PCR=0, this bit is always one. In the Extended Mode (PTR7 bit is 1), or in ECP and EPP with bit 4 of PCR=1, this bit is the IRQ STATUS bit. In the Extended mode if CTR4=1, then this bit is latched low when the ACK signal makes a transition from low to high. Reading this bit sets it to a one.

Bit 3 This bit represents the current state of the printer error signal (ERROR). The printer sets this bit low when there is a printer error. This bit follows the state of the ERR pin.

Bit 4 This bit represents the current state of the printer select signal (SLCT). The printer sets this bit high when it is selected. This bit follows the state of the SLCT pin.

Bit 5 This bit represents the current state of the printer paper end signal (PE). The printer sets this bit high when it detects the end of the paper. This bit follows the state of the PE pin.

Bit 6 This bit represents the current state of the printer acknowledge signal (ACK). The printer pulses this signal low after it has received a character and is ready to receive another one. This bit follows the state of the ACK pin.

Bit 7 This bit (BUSY) represents the current state of the printer busy signal. The printer sets this bit low when it is busy and cannot accept another character. This bit is the inverse of the (BUSY/WAIT) pin.

Section 6.4 CONTROL REGISTER (CTR)

Figure 5C:
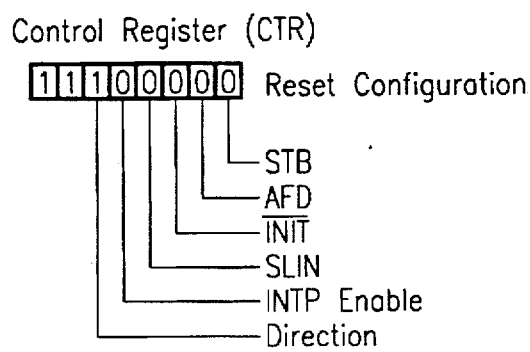
FIG. 5C is a diagram showing the control register (CTR)
Figures 1, 6:
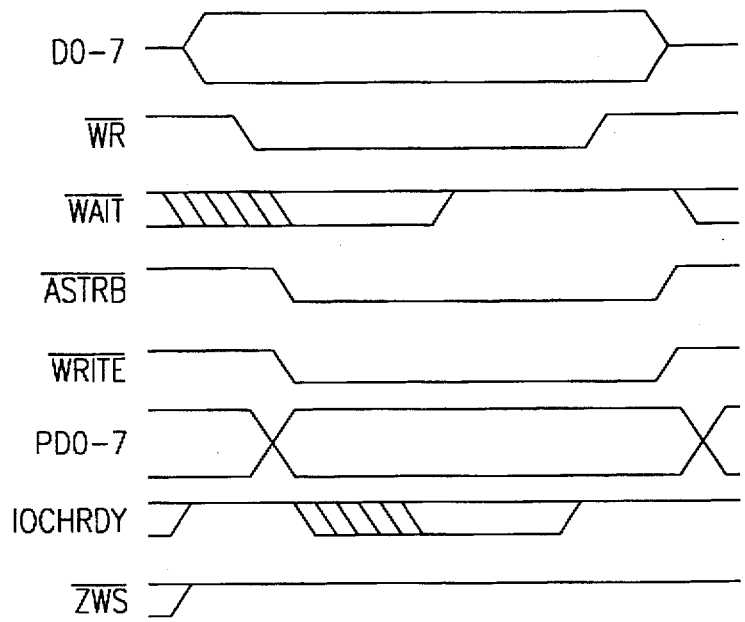
Figures 2, 6:
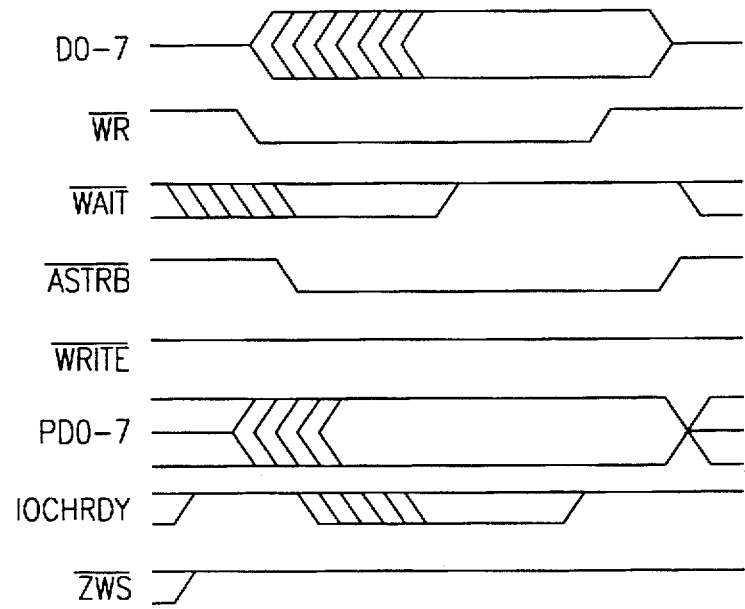
Figures 3, 6:
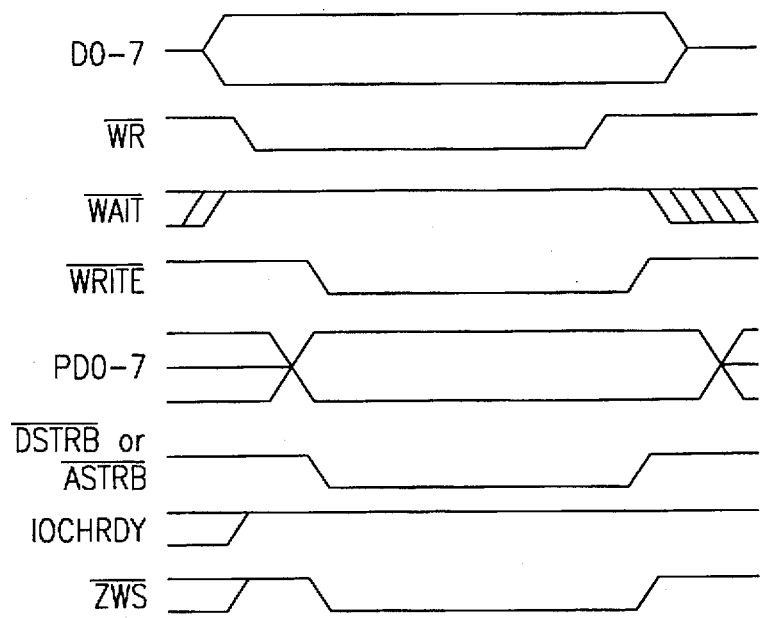
Figures 4, 6:
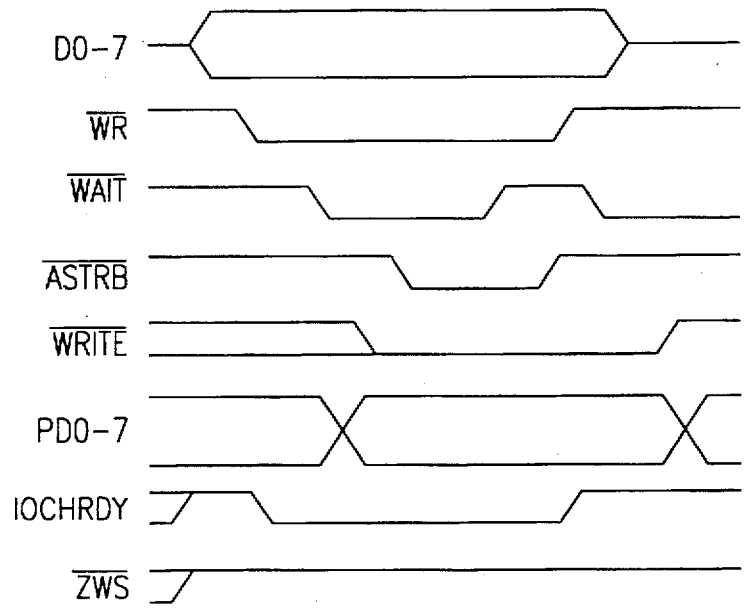
Figures 5, 6:
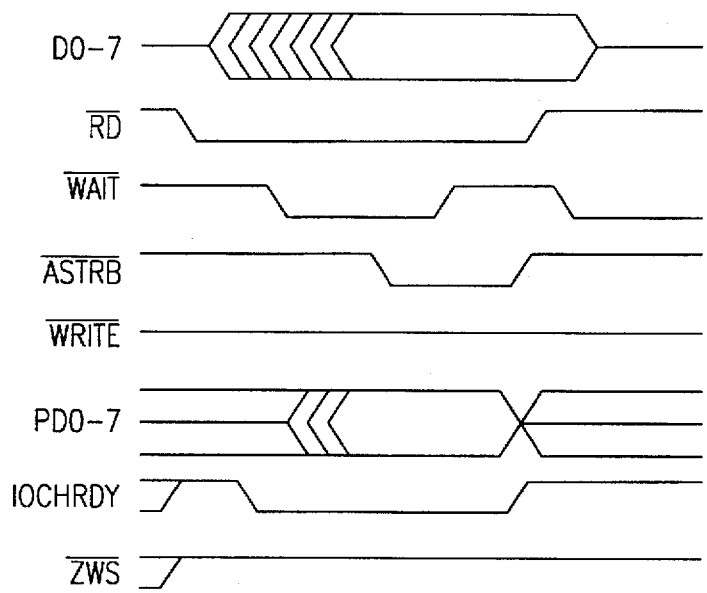
Figure 6:
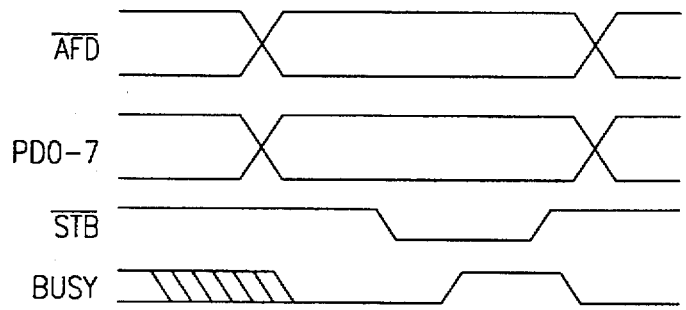
Figures 6, 7:
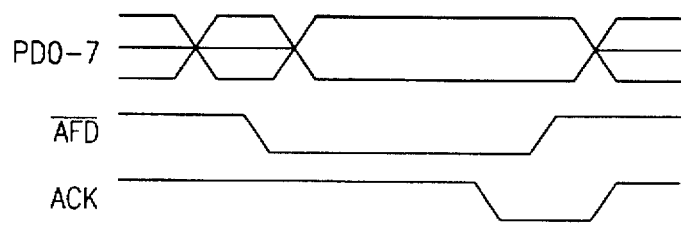

Referring to FIG. 5C, this register provides all output signals to control the printer. Except for bit 5, it is a read and write register.

Bit 0 This bit (STB) directly controls the data strobe signal to the printer via the STB pin. The STE pin is the inverse of this bit.

Bit 1 This bit (AFD) directly controls the automatic feed XT signal to the printer via the AFD pin. Setting this bit high causes the printer to automatically feed after each line is printed. The AFD pin is the inverse of this bit.

Bit 2 This bit (INIT) directly controls the signal to initialize the printer via the INIT pin. Setting this bit to low initializes the printer. The INIT pin follows this bit.

Bit 3 This bit (SLIN) directly controls the select in signal to the printer via the SLIN pin. Setting this bit high selects the printer. The SLIN pin is the inverse of this bit.

Bit 4 This bit enables the parallel port interrupt. Setting this bit low puts IRQ5,7 into TRI-STATE and clears any pending interrupts. In the AT Compatible Mode, or in either EPP or ECP modes when bit 4 of PCR is 0, when this bit is set high, the appropriate IRQ signal follows the ACK signal transitions (pulse interrupt). In the Extended Mode, or in either EPP or ECP modes when bit 4 of PCR is 1, when this bit is set high, the appropriate IRQ signal sets high on the 0 to 1 transition of the ACK signal (level interrupt).

Bit 5 This bit determines the parallel port direction when bit 7 of PTR is 1. The default condition results in the parallel port being in the output mode. This is a Read/Write bit in EPP mode. In SPP mode it is a write only bit; a read from it will return 1. See TABLE 6-1 (CTR 5) for further details.

Bits 6,7 Reserved. These bits are always 1.

TABLE 6

Parallel Port Pin Reset States

| Signal | Reset Control | State After Reset |
|--------|---------------|-------------------|
| SLIN   | MR            | TRI-STATE         |
| INIT   | MR            | Zero              |
| AFD    | MR            | TRI-STATE         |
| STB    | MR            | TRI-STATE         |
| IRQ5,7 | MR            | TRI-STATE         |

Normally when the Control Register is read, the bit values are provided by the internal output data latch. These bit values can be superseded by the logic level of the STB, AFD, INIT, and SLIN pins, if these pins are forced high or low by an external voltage. In order to force these pins high or low the corresponding bits should be set to their inactive state (e.g. AFD=STB=SLIN=0, INIT=1).

Section 6.5 Enhanced Parallel Port Operation

EPP mode provides for greater throughput, and more complexity, than Compatible or Extended modes by supporting faster transfer times and a mechanism that allows the host to address peripheral device registers directly. Faster transfers are achieved by automatically generating the address and data strobes. EPP is compatible with both Compatible and Extended mode parallel-port devices. It consists of eight (0–7) single-byte registers. (See TABLE 6-3).

The first three ports (0H–2H) are bit compatible with existing Extended Mode Interfaces. Five additional ports (03H–07H) are active. Port 03H is the Address Port. Writing to this port initiates a peripheral Device/Selection Operation. Ports 04H–07H constitute a 4 byte data buffer to the EPP. A double word (32-bit) read or write to port 04H initiates a series of 4 read or write operations to the currently selected device. Similarly, a single word read or write to this port initiates a series of 2 read or write operations.

An automatic address strobe is generated when data is read from or written to the address port. An automatic data strobe is generated when the data is read or written to the data port 04H–07H.

Support for two EPP modes is added to the existing parallel port. EPP rev 1.7 is supported when bit 0 of PCR is 1, and bit 1 of PCR is 0. EPP rev 1.9 (IEEE 1284) is supported when bit 0 of PCR is 1, and bit 1 of PCR is 1.

EPP is supported for a parallel port whose base address is 278 h or 378 h, but not for a parallel port whose base address is 3BCh (there are no EPP registers at 3BFh). There are four EPP transfer operations: address write, address read, data write and data read. An EPP transfer operation is composed of a host read or write cycle (from or to an EPP register) and an EPP read or write cycle (from a peripheral device to an EPP register, or from an EPP register to a peripheral device).

TABLE 6-4

EPP Registers

| Name | Offset | Mode | Type | Description |
|------|--------|------|------|-------------|
| SPP Data DTR | 0 | SPP/EPP | R/W | This is the Compatible/Extended data register. A write to it sets the state of the eight data pins on the 25-pin D-shell connector |
| SPP Status STR | 1 | SPP/EPP | R | This status port is read only. A read from it presents the system microprocessor with the real-time status of five pins on the 25-pin D-shell connector, and the IRQ. |
| SPP Control CTR | 2 | SPP/EPP | R/W | This control port is read/write. A write operation to it sets the state of four pins on the 25-pin D-shell connector, and controls both the parallel port interrupt enable and direction. |
| EPP Address | 3 | EPP | R/W | This port is read/write. A write operation to it initiates an EPP device/register selection operation. |
| EPP Data Port 0 | 4 | EPP | R/W | This is a read/write port. Accesses to it initiate device read or write operations with bits 0–7. |
| EPP Data | 5 | EPP | R/W | This is the second EPP data port. It is only |

TABLE 6-4-continued

EPP Registers

| Name | Offset | Mode | Type | Description |
|------|--------|------|------|-------------|
| Port 1 | | | | accessed to transfer bits 8 to 15 of a 16-bit read or write to data port 0. |
| EPP Data Port 2 | 6 | EPP | R/W | This is the third EPP data port. It is only accessed to transfer bits 16 to 23 of a 32-bit read or write to data port 0. |
| EPP Data Port 3 | 7 | EPP | R/W | This is the fourth EPP data port. It is only accessed to transfer bits 24 to 31 of a 32-bit read or write to data port 0. |

The software must write zero to bits 0, 1 and 3 of the CTR register, before accessing the EPP registers, since the pins controlled by these bits are controlled by hardware during EPP access. Once these bits are written with zero, the software may issue multiple EPP access cycles. The software must set bit 7 of the PTR register to 1, if bit 5 of CTR (and not the PDIR pin) is to control direction.

To meet the EPP 1.9 specifications, the software should change direction (bit 5 of CTR) only when bit 7 of STR is 1 (i.e., change direction at EPP Idle Phase, as defined in the IEEE 1284 document).

When bit 7 of PTR is 0, EPP cycles to the external device are generated by invoking read or write cycles to the EPP. When bit 7 of PTR is 1:

1. Reading an EPP register during forward direction (bit 5 of CTR is 0) is allowed only in EPP 1.7. It returns the register latched value (not the PDO-7 pins' value), and does not generate an EPP read cycle.
2. Writing to an EPP register during backward direction (bit 5 of CTR is 1) updates the register data, and does not generate an EPP write cycle.

EPP 1.7 Address Write

Referring to FIG. 6-1, the following procedure selects a peripheral device or register:

1. The host writes a byte to the EPP address register. $\overline{WR}$ goes low to latch D0-7 into the address register. The latch drives the address register onto PD0-7 and the EPP pulls $\overline{WRITE}$ low.
2. The EPP pulls ASTRB low to indicate that data has been sent.
3. If $\overline{WAIT}$ is low during the host write cycle, IOCHRDY goes low. When $\overline{WAIT}$ goes high, the EPP pulls IOCHRDY high.
4. When IOCHRDY goes high it causes $\overline{WR}$ go high. If $\overline{WAIT}$ is high during the host write cycle then the EPP does not pull IOCHRDY to low.
5. When $\overline{WR}$ goes high it causes the EPP to pull $\overline{WRITE}$ and $\overline{ASTRB}$ to high.

Only when WRITE and ASTRB are high can the EPP change PD0-7. EPP 1.7 Address Read:

Referring to FIG. 6-2, the following procedure reads from the address register:

1. The host reads a byte from the EPP address register. $\overline{RD}$ goes low to gate PDO-7 into DO-7.
2. The EPP pulls $\overline{ASTRB}$ low to signal the peripheral to start sending data.
3. If $\overline{WAIT}$ is low during the host read cycle, then the EPP pulls IOCHRDY low. When $\overline{WAIT}$ goes high, the EPP stops pulling IOCHRDY to low.
4. When IOCHRDY goes high it causes $\overline{RD}$ to go high If $\overline{WAIT}$ is high during the host read cycle then the EPP does not pull IOCHRDY to low.
5. When $\overline{RD}$ goes high, it causes the EPP to pull $\overline{ASTRB}$ high. Only when $\overline{ASTRB}$ is high can the EPP change PD0-7. After $\overline{ASTRB}$ goes high, the EPP TRI-STATEs D0-7.

EPP 1.7 Data Write and Data Read:

This procedure writes to the selected peripheral device or register.

An EPP 1.7 data write operation is similar to the EPP 1.7 address write operation, and an EPP 1.7 data read operation is similar to the EPP 1.7 address read operation, except that the data strobe ($\overline{DSTRB}$ signal and a data register, replace the address strobe ($\overline{ASTRB}$ signal) and the address register respectively.

EPP Zero Wait State (ZWS) Address Write Operation (both 1.7 and 1.9):

The following procedure performs a short write to the selected peripheral device or register. ZWS should be configured as follows: bit 5 of FCR is 1.

1. The host writes a byte to the EPP address register. $\overline{WR}$ goes low to latch D0-7 into the data register. The latch drives the data register onto PD0-7.
2. The EPP first pulls $\overline{WRITE}$ low, and then pulls $\overline{ASTRB}$ low to indicate that data has been sent.
3. If $\overline{WAIT}$ is high during the host write cycle, $\overline{ZWS}$ goes low and IOCHRDY goes high.
4. When the host pulls $\overline{WR}$ high, the EPP pulls $\overline{ASTRB}$, $\overline{ZWS}$ and $\overline{WRITE}$ to high. Only when $\overline{WRITE}$ and $\overline{ASTRB}$ are high can the EPP change PD0-7.
5. If the peripheral is fast enough to pull $\overline{WAIT}$ low before the host terminates the write cycle, the EPP pulls IOCHRDY to low, but does not pull $\overline{ZWS}$ to low, thus carrying out a normal (non-ZWS EPP 1.7) write operation.

EPP Zero Wait State (ZWS) Data Write Operation (both 1.7 and 1.9):

An EPP 1.7 and 1.9 Zero Wait State data write operation is similar to the EPP Zero Wait State address write operation with the exception that the data strobe ($\overline{DSTRB}$ signal), and a data register, replace the address strobe ($\overline{ASTRB}$ signal) and the address register, respectively EPP 1.9 Address Write:

The following procedure selects a peripheral or register.

1. Using $\overline{IOW}$ the host writes a byte to the EPP address register.
2. The EPP pulls IOCHRDY low, and waits for $\overline{WAIT}$ to go low.
3. When WAIT goes low the EPP pulls $\overline{WRITE}$ to low and drives the latched byte onto PD0-7. If $\overline{WAIT}$ was already low, steps 2 and 3 occur concurrently.
4. The EPP pulls $\overline{ASTRB}$ low and waits for $\overline{WAIT}$ to go high.
5. When $\overline{WAIT}$ goes high, the EPP stops pulling IOCHRDY low, pulls $\overline{ASTRB}$ high, and waits for $\overline{WAIT}$ to go low.
6. only if no EPP write is pending, when $\overline{WAIT}$ goes low, (or when bit 7 of PTR is 1, and the direction is changed to Backwards by setting bit 5 of CTR to 1), the EPP pulls $\overline{WRITE}$ to high. If an EPP write is pending $\overline{WRITE}$ remains low, and the EPP may change PD0-7. See FIG. 6-4.

EPP 1.9 Address Read:

The following procedure reads from the address register.

1. The host reads a byte from the EPP address register. When $\overline{RD}$ goes low, the EPP pulls IOCHRDY low, and waits for $\overline{WAIT}$ to go low.

2. When $\overline{\text{WAIT}}$ goes low, the EPP pulls $\overline{\text{ASTRB}}$ low and waits for $\overline{\text{WAIT}}$ to go high. If wait was already low, steps 2 and 3 occur concurrently.
3. When $\overline{\text{WAIT}}$ goes high, the EPP stops pulling IOCHRDY low, latches PD0-7, and pulls $\overline{\text{ASTRB}}$ high.
4. When RD goes high, the EPP TRI-STATEs D0-7.

EPP 1.9 Data Write and (Backward) Data Read:

This procedure writes to the selected peripheral drive or register.

EPP 1.9 data read and write operations are similar to EPP 1.9 address read and write operations, respectively, except that the data strobe ($\overline{\text{DSTRB}}$ signal) and a data register replace the address strobe ($\overline{\text{ASTRB}}$ signal) and the address register. See FIG. 6-5.

The following table shows the standard 25-pin, D-type connector definition for various parallel port operations.

TABLE 6-4

Parallel Port Pin Out

| Connector Pin No. | Chip Pin No. | SPP, ECP Mode | Pin Direction | EPP Mode | Pin Direction |
|---|---|---|---|---|---|
| 1 | 119 | $\overline{\text{STB}}$ | I/O | $\overline{\text{WRITE}}$ | I/O |
| 2 | 118 | PD0 | I/O | PD0 | I/O |
| 3 | 117 | PD1 | I/O | PD1 | I/O |
| 4 | 116 | PD2 | I/O | PD2 | I/O |
| 5 | 115 | PD3 | I/O | PD3 | I/O |
| 6 | 113 | PD4 | I/O | PD4 | I/O |
| 7 | 112 | PD5 | I/O | PD5 | I/O |
| 8 | 111 | PD6 | I/O | PD6 | I/O |
| 9 | 110 | PD7 | I/O | PD7 | I/O |
| 10 | 108 | $\overline{\text{ACK}}$ | I | $\overline{\text{ACK}}$ | I |
| 11 | 107 | BUSY | I | $\overline{\text{WAIT}}$ | I |
| 12 | 106 | PE | I | PE | I |
| 13 | 105 | SLCT | I | SLCT | I |
| 14 | 101 | $\overline{\text{AFD}}$ | I/O | $\overline{\text{DSTRB}}$ | I/O |
| 15 | 102 | $\overline{\text{ERR}}$ | I | $\overline{\text{ERR}}$ | I |
| 16 | 103 | $\overline{\text{INIT}}$ | I/O | $\overline{\text{INIT}}$ | I/O |
| 17 | 104 | $\overline{\text{SLIN}}$ | I/O | $\overline{\text{ASTRB}}$ | I/O |

Section 6.6 EXTENDED CAPABILITIES PARALLEL PORT (ECP)

Section 6.6.1 Introduction

The ECP support includes a 16-byte FIFO that can be configured for either direction, command/data FIFO tags (one per byte), a FIFO threshold interrupt for both directions, FIFO empty and full status bits, automatic generation of strobes (by hardware) to fill or empty the FIFO, transfer of commands and data, and a Run Length Encoding (RLE) expanding (decompression) as explained below.

The Extended Capabilities Port (ECP) is enabled when bit 2 of PCR is 1. Once enabled, its mode is controlled via the mode field bits 5,6,7 of ECR register. Shown in TABLE 6-5. The ECP has ten registers: The AFIFO, CFIFO, DFIFO and TFIFO registers access the same ECP FIFO. The FIFO is accessed at Base+000h, or Base+400h, depending on the mode field of ECR and the register. FIFO can be accessed by host DMA cycles, as well as host PIO cycles.

When DMA is configured and enabled (bit 3 of ECR is 1 and bit 2 of ECR is 0) the ECP automatically (by hardware) issues DMA requests to fill the FIFO (in the forward direction when bit 5 of DCR is 0) or to empty the FIFO (in the backward direction when bit 5 of DCR is 1). All DMA transfers are to or from these registers. The ECP does not assert DMA request for more than 32 consecutive DMA cycles. The ECP stops requesting DMA when TC is detected during an ECP DMA cycle.

Writing into a full FIFO, and reading from an empty FIFO, are ignored. The written data is lost, and the read data is undefined. The FIFO empty and full status bits are not affected by such access.

Some registers are not accessible in all modes of operation, or may be accessed in one direction only. Accessing a non accessible register has no effect: Data read is undefined, data written is ignored, the FIFO does not update. The PC87340 Parallel Port registers (DTR, STR and CTR) are not accessible when ECP is enabled.

To improve noise immunity in ECP cycles, the state machine does not examine the control handshake response lines until the data has had time to switch.

TABLE 6-5

ECP Registers

| Name | Address | I/O | Size | Mode # ECR (5-7) | Function |
|---|---|---|---|---|---|
| DATAR | Base + 000h | R/W | byte | 000,001 | Parallel Port Data Register |
| AFIFO | Base + 000h | W | byte | 011 | ECP Address FIFO |
| DSR | Base + 001h | R/W | byte | ALL | Status Register |
| DCR | Base + 002h | R/W | byte | ALL | Control Register |
| CFIFO | Base + 400h | W | byte | 010 | Parallel Port Data FIFO |
| DFIFO | Base + 400h | R/W | byte | 011 | ECP Data FIFO |
| TFIFO | Base + 400h | R/W | byte | 110 | Test FIFO |
| CNFGA | Base + 400h | R | byte | 111 | Configuration register A |
| CNFGB | Base + 401h | R | byte | 111 | Configuration register B |
| ECR | Base + 402h | R/W | byte | ALL | Extended Control Register |

Software operation is detailed in the document Extended Capabilities Port Protocol and ISA Interface Standard. To highlight the ECP usage some software operations are detailed below:

1. The software should enable ECP (bit 2 of PCR is 1) after bits 0-3 of the Parallel Port Control Register (CTR) are 0.
2. When ECP is enabled, and the software wishes to switch modes, it should switch only through modes 000 or 001.
3. When ECP is enabled, the software should change direction only in mode 001.
4. The software should switch from mode 010, or 011, to mode 000, or 001, only when the FIFO is empty.
5. The software should switch to mode 011 when bits 0 and 1 of DCR are 0.
6. The software should switch to mode 010 when bit 0 of DCR is 0.
7. The software should disable ECP (bit 2 of PCR is 0) only when in mode 000 or 001.

Software may switch from mode 011 backward direction to modes 000 or 001 when there is an on-going ECP read cycle. In this case the read cycle is aborted by deasserting $\overline{\text{AFD}}$. The FIFO is reset (empty) and a potential byte expansion (RLE) is automatically terminated since the new mode is 000 or 001.

The $\overline{\text{ZWS}}$ signal is asserted by the ECP when ECP is enabled, and an ECP register is accessed by host PIO instructions, thus using a host zero wait cycle.

The ECP uses the X1/OSC clock. This clock can be frozen (power-down mode). When this power-down mode occurs, the DMA is disabled, all interrupts (except $\overline{\text{ACK}}$) are masked, and the FIFO registers are not accessible (access is ignored). The other ECP registers are always accessible when the ECP is enabled. During this period the FIFO status and contents are not lost, although the host reads bit 2 of ECR as 0, bit 1 of ECR as 1 and bit 0 of ECR as 1, regardless of the actual values of these bits. When the clock starts toggling again these bits resume their original functions (values).

When the clock is frozen, an on-going ECP cycle may be corrupted but next ECP cycle will not start even if in forward direction the FIFO is not empty, and in backward direction the FIFO is not full. If the ECP clock starts or stops toggling during a host cycle that accesses the FIFO, the cycle may yield wrong data.

Notes:
1. The ECP outputs are inactive when the ECP is disabled.
2. Only the FIFO/DMA/RLE are not functional when the clock is frozen. All other registers are accessible and functional. The FIFO/DMA/RLE are affected by ECR modifications, i.e., they are reset even when exits from modes 010/011 are carried out while the clock is frozen.

Section 6.7 Register Definitions

DATAR: Same as DTR register, except that read always returns the values of the PDO-7 pins (not the register latched data).

AFIFO: ECP Address FIFO Register. Write Only. In the forward direction (bit 5 of DCR is 0) a byte written into this register is written into the FIFO and tagged as command. Reading this register has no effect and the data read is undefined. Writes to this register during backward direction (bit 5 of DCR is 1) have no effect and the data is ignored.

DSR: Read only. Same as the current STR register, except for bit 2, which is reserved. Writes to this register have no effect and the data is ignored. Note: The FDC 12 has a register of the same name (DSR).

DCR: Same as the current CTR register, with the following exceptions:

When bit 5 of the DCR is 0 the ECP is in forward direction, and when bit 5 is high (1) the ECP is in backward direction. The ECP drives the PDO-7 pins in the forward direction but does not drive them in the backward direction. The direction bit, bit 5, is readable and writable, except in modes 000 and 010. In modes 000 and 010 the direction bit is forced to 0, and data written into this bit is ignored. Bit 4 of the DCR enables the $\overline{ACK}$ deassertion interrupt event (1=enable, 0=mask). If a level interrupt is configured (bit 4 of PCR is 1) clearing this bit clears the ACK pending interrupt request. This bit does not float the IRQ pin. In modes 010 and 011 the $\overline{STB}$ is controlled by the ECP hardware, not software (bit 0 of this register). In mode 011 the $\overline{AFD}$ is controlled by the ECP hardware, not software (bit 1 of this register).

CFIFO: Parallel Port FIFO Register. Write only. A byte written, or DMAed, to this register is put into the FIFO and tagged as data. Reading this register has no effect and the data read is undefined.

DFIFO: ECP Data FIFO Register. In the forward direction (bit 5 of DCR is 0) a byte written, or DMAed, to this register is put into the FIFO and tagged as data. Reading this register has no effect and the data read is undefined. In the backward direction (bit 5 of DCR is 1) the ECP automatically issues ECP read cycles to fill the FIFO. Reading this register removes the next byte from the FIFO. Writing this register has no effect and the data written is ignored.

TFIFO: Test FIFO Register. A byte written into this register is put into the FIFO. A byte read from this register is removed from the FIFO. The ECP does not issue a ECP cycle to transfer the data to or from the peripheral device. The TFIFO is readable and writable in both directions. In the forward direction (bit 5 of DCR is 0) PDO-7 are driven, but the data is undefined. The FIFO does not stall when overwritten or underrun (access is ignored). Bytes are always read from the top of the FIFO, regardless of the direction bit (bit 5 of DCR). For example if 44 h, 33 h, 22 h, 11h is written into the FIFO, reading the FIFO returns 44 h, 33 h, 22h, 11h (in the same order it was written).

CNFGA: Configuration register A. Read only. Reading this register always returns 0001X000. Writing this register has no effect and the data is ignored.

CNFGB: configuration register B. Read only. Reading this register returns the configured parallel port interrupt line, and its state, as follows.

Bit 7 This bit is always 0.
Bit 6 holds the (non-inverted) value on the configured IRQ pin.
Bits 5, 4 These bits are 1 when IRQ5 is configured, and 0 when IRQ7 is configured.
Bit 3 This bit is always 1.
Bits 2, 1, 0 These bits are always 0. Writing this register has no effect and the data is ignored.

ECR: Extended Control Register. This register controls the ECP and parallel port functions. Upon reset this register is initialized to 00010101.

Bits 7, 6, 5 (Mode) Bit 7 is the MSB of the three bits value 000: Standard mode. Write cycles are performed under software control. Bit 5 of DCR is forced to 0 (forward direction) and PDO-7 are driven. The FIFO is reset (empty). 001: PS/2 mode. Read and write cycles are performed under software control. The FIFO is reset (empty). 010: Parallel Port FIFO mode. Write cycles are performed under hardware control ($\overline{STB}$ is controlled by hardware). Bit 5 of DCR is forced to 0 (forward direction) and PDO-7 are driven. 011: ECP FIFO mode. The FIFO direction is controlled by bit 5 of DCR. Read and write cycles to the device are performed under hardware control ($\overline{STB}$ and $\overline{AFD}$ are controlled by hardware). 100: Reserved. 101: Reserved. 110: FIFO test mode. The FIFO is accessible via the TFIFO register. The ECP does not issue ECP cycles to fill/empty the FIFO. 111: Configuration mode. The CNFGA and CNFGB registers are accessible in this mode.

Bit 4 ECP Interrupt Mask bit. When this bit is 0 an interrupt is generated on $\overline{ERR}$ assertion (the high-to-low edge of $\overline{ERR}$). An interrupt is also generated when ERR is asserted while this bit is changed from 1 to 0; this prevents the loss of an interrupt between ECR read and ECR write. When this bit is 1, no interrupt is generated.

Bit 3 ECP DMA Enable bit. When this bit is 0, DMA is disabled and the PDRQ pin is in TRI-STATE. When this bit is 1, DMA is enabled and DMA starts when bit 2 of ECR is 0. Note: $\overline{PDACK}$ is assumed inactive when this bit is 0.

Bit 2 ECP Service bit. When this bit is 0, and one of the following three interrupt events occur, an interrupt is generated and this bit is set to 1 by hardware.
1) Bit 3 of ECR is 1, and terminal count is reached during DMA
2) Bit 3 of ECR is 0 and bit 5 of DCR is 0, and there are eight or more bytes free in the FIFO.
3) Bit 3 of ECR is 0 and bit 5 of DCR is 1, and there are eight or more bytes to be read from the FIFO. When this bit is 1, DMA and the above three interrupts are disabled. Writing 1 to this bit does not cause an interrupt. When the ECP clock is frozen this bit is read as 0, regardless of its actual value (even though the bit may be modified by software when the ECP clock is frozen).

Bit 1 FIFO Full bit. Read only. This bit is 0 when the FIFO has at least one free byte. This bit is 1 when the FIFO is full. This bit continuously reflects the FIFO state, and therefore can only be read. Data written to this bit is ignored. When the ECP clock is frozen this bit is read as 1, regardless of the actual FIFO state.

Bit 0 FIFO Empty bit. Read only. This bit is 0 when the FIFO has at least one byte of data. This bit is 1 when the FIFO is empty. This bit continuously reflects the FIFO state, and therefore can only be read. Data written to this bit is ignored. When the ECP clock is frozen this bit is read as 1, regardless of the actual FIFO state.

Section 6.8 Software Controlled Data Transfer (modes 000 and 001)

Software controlled data transfer is supported in modes 000 and 001. The software generates peripheral-device cycles by modifying the DATAR and DCR registers and reading the DSR, DCR and DATAR registers. The negotiation phase and nibble mode transfer, as defined in the IEEE 1284 standard, are performed in these modes.

In these modes the FIFO is reset (empty) and is not functional, the DMA and RLE are idle.

Mode 000 is for the forward direction only; the direction bit is forced to 0 and PDO-7 are driven. Mode 001 is for both the forward and backward directions. The direction bit controls whether PDO-7 are driven.

Section 6.9 Automatic Data Transfer (modes 010 and 011)

Automatic data transfer (ECP cycles generated by hardware) is supported only in modes 010 and 011. Automatic DMA access to fill or empty the FIFO is supported in modes 010, 011 and 110. Mode 010 is for the forward direction only; the direction bit is forced to 0 and PDO-7 are driven. Mode 011 is for both the forward and backward directions. The direction bit controls whether PDO-7 are driven.

Automatic Run Length Expanding (RLE) is supported in the backward direction.

Section 6.9.1 Forward Direction (bit 5 of DCR=0):

When the ECP is in forward direction and the FIFO is not full (bit 1 of ECR is 0) the FIFO can be filled by software writes to the FIFO registers (AFIFO and DFIFO in mode 011, and CFIFO in mode 010).

When DMA is enabled (bit 3 of ECR is 1 and bit 2 of ECR is 0) the ECP automatically issues DMA requests to fill the FIFO with normal data byte.

When the ECP is in forward direction and the FIFO is not empty (bit 0 of ECR is 0) the ECP reads the next byte from the FIFO and issues write cycle to the peripheral device. The ECP drives $\overline{AFD}$ according to the operation mode (ECR bits 5-7) and according to the tag of this data byte as follows: In Parallel Port FIFO mode (mode 010) $\overline{AFD}$ is controlled by bit 1 of DCR. In ECP mode (mode 011) $\overline{AFD}$ is controlled by the tag of the byte most recently read. $\overline{AFD}$ is driven high for normal data byte and driven low for command byte.

Section 6.9.2 ECP (Forward) Write Cycle:

An ECP write cycle starts when the ECP drives the next FIFO byte tag onto $\overline{AFD}$ and the next FIFO byte onto PDO-7. When BUSY is low the ECP asserts $\overline{STB}$ and waits for BUSY to be high. When BUSY is high the ECP deasserts $\overline{STB}$. In 010 mode, the ECP may change $\overline{AFD}$ and PDO-7 state in preparation for next cycle. In 011 mode, the ECP changes $\overline{AFD}$ and PDO-7 only after BUSY is low. See FIG. 6-6.

Section 6.9.3 Backward Direction (bit 5 of DCR is 1):

When the ECP is in the backward direction, and the FIFO is not full (bit 1 of ECR is 0), the ECP issues a read cycle from the peripheral device and monitors the BUSY signal. If BUSY is high the byte is a data byte and it is written into the FIFO. If BUSY is low the byte is a command byte. The ECP checks bit 7 of the command byte, if it is high the byte is ignored, if it is low the byte is tagged as an RLC byte (not written into the FIFO but used as a Run Length Count to expand the next byte read). Following an RLC read the ECP issues a read cycle from the peripheral device to read the data byte to be expanded. This byte is considered a data byte, regardless of its BUSY state (even if it is low). This byte is written into the FIFO (RLC+1) times (i.e., RLC=0: write the byte once, RLC=127: write the byte 128 times).

When the ECP is in the backward direction, and the FIFO is not empty (bit 0 of ECR is 0), the FIFO can be emptied by software reads from the FIFO register (only DFIFO in mode 011, no AFIFO and CFIFO read).

When DMA is enabled (bit 3 of ECR is 1 and bit 2 of ECR is 0) the ECP automatically issues DMA requests to empty the FIFO (only in mode 011).

Section 6.9.4 ECP (Backward) Read Cycle

An ECP read cycle starts when the ECP drives AFD low. The peripheral device drives BUSY high for a normal data read cycle, or drives BUSY low for a command read cycle, and drives the byte to be read onto PDO-7.

When $\overline{ACK}$ is asserted the ECP reads the PDO-7 byte and drives $\overline{AFD}$ high. When $\overline{AFD}$ is high the peripheral device deasserts $\overline{ACK}$ and may change BUSY and PDO-7 states in preparation for the next cycle. See FIG. 6-7.

Notes:
1. FIFO-full condition is checked before every expanded byte is written.
2. A pending DMA request is removed, and a pending RLE expansion is aborted, when you switch from modes 010 or 011 to other modes.
3. The two FIFO ports are neither synchronized nor linked together, except via the empty and full FIFO status bits. The FIFO shall not delay the write and read operations, even when they are performed concurrently. Care must be taken not to corrupt PDO-7 or DO-7 while the other FIFO port is accessed.
4. In the forward direction, the empty bit is updated when the ECP cycle is completed, not right after the last byte is removed from the FIFO (valid cleared on cycle end).
5. $\overline{ZWS}$ is not asserted for DMA cycles.
6. The one-bit command/data tag is used only in forward direction.

Section 6.10 FIFO Test Access (mode 110)

Mode 110 is for testing the FIFO in PIO and DMA cycles. Both FIFO read and write operations are supported, regardless of the direction bit.

In the forward direction PDO-7 are driven, but the data is undefined. This mode can be used to measure the host-ECP cycle throughput, usually with DMA cycles. This mode can also be used to check the FIFO depth and its interrupt threshold, usually with PIO cycles.

Section 6.11 Configuration registers 2 Access (mode 111) The two configuration registers 2, CNFGA and CNFGB, are accessible only in this mode.

Section 6.12 Interrupt

Interrupt is generated when any of the following events occurs:
1. TC Interrupt: When bit 2 of ECR is 0, bit 3 of ECR is 1 and TC is asserted during ECP DMA cycle.
2. FIFO 1/2 Full (forward): When bit 2 of ECR is 0, bit 3 of ECR is 0, bit 5 of DCR is 0 and there are eight or more bytes free in the FIFO. It includes the case when bit 2 of ECR is cleared to 0 and there are already eight or more bytes free in the FIFO (modes 010, 011 and 110 only).
3. FIFO 1/2 Full (backward): When bit 2 of ECR is 0, bit 3 of ECR is 0, bit 5 of DCR is 1 and there are eight or more bytes to be read from the FIFO. It includes the case when bit 2 of ECR is cleared to 0 and there are already eight or more bytes to be read from the FIFO (modes 011 and 110 only).
4. $\overline{ERR}$ Interrupt: When bit 4 of ECR is 0 and $\overline{ERR}$ is asserted (high to low edge) or ERR is asserted when bit 4 of ECR is modified from 1 to 0.
5. $\overline{ACE}$ Complete: When bit 4 of DCR is 1 and $\overline{ACK}$ is deasserted (low-to-high edge).

The interrupt is generated according to bits 4, 5 and 6 of PCR.

Notes:
1. When bit 4 of PCR is 0 an interrupt pulse should be generated. Interrupt events #2, #3 and #4 are level events, thus they should be shaped to generate an interrupt pulse. These interrupts are masked (inactive) when the ECP clock is frozen. Interrupt event #1 is a pulse event. The last interrupt event behaves as in the Compatible SPP mode: the IRQ signal follows the $\overline{ACK}$ signal transition (when bit 5 of PCR is 0 and bit 6 of PCR is 0). Note that interrupt event #4 may be lost when the ECP clock is frozen.
2. When bit 4 of PCR is 1 the interrupt is level interrupt. Interrupt request is held active (after the interrupt event occurred) as follows:

Interrupt event #1: As long as bit 3 of ECR is 1.

Interrupt event #2: As long as bit 3 of ECR is 0, and bit 5 of DCR is 0, and there are eight or more bytes in the FIFO.

Interrupt event #3: As long as bit 3 of ECR is 0, and bit 5 of DCR is 1 and the FIFO has not been read.

Interrupt event #4: As long as bit 4 of ECR is 0 and $\overline{ERR}$ is 0.

Interrupt event #5: As in Extended SPP mode: the interrupt is released when DSR is read or when bit 4 of DCR is 0.

Section 7.0 Integrated Device Electronics Interface (IDE)

Section 7.1 INTRODUCTION

Another key interface design facilitated through the use of the PC87340 is the IDE (Intelligent Drive Electronics) Hard Disk interface. Only three buffer chips are required to construct the IDE Hard Disk Interface circuit (see FIG. 10-1). The IDE interface is essentially the ISA bus ported to the hard drive. The hard disk controller resides on the hard drive itself. So the IDE interface circuit must provide the ISA bus signals, including data bits D15–D0, address lines A3–A0, as well as the common control signals.

Section 7.2 IDE SIGNALS

Looking at the IDE interface circuit in more detail, the 'LS244 provides buffering of the control and address lines. There are four control signals, $\overline{IDEHI}$, $\overline{IDEL0}$, $\overline{HCS0}$ $\overline{HCS1}$, one status signal, $\overline{IOCS16}$, and one data signal, IDED7, required by the IDE interface. The PC87340 provides all of these signals. They are summarized below.

$\overline{IDEHI}$ enables the 'LS245 octal bus transceiver for the upper data lines (D15–D8) during 16-bit read and write operations at addresses 1F0–1F7. $\overline{IDERI}$ will activate the 'LS245 only if the $\overline{IOCS16}$ output from the hard drive is active. IDEL0 enables the other 'LS245 octal bus transceiver for the lower data lines (D7–D0) during all (1F0H–1F7H, 17OH–177H, 3F6H and 3F7H) reads and writes.

The IDED7 signal insures that the D7 data bus signal line is disabled for address 3F7 (this bit is used for the Disk Changed register on the floppy disk controller at that address). The two 'LS245 chips are used to enable or TRI-STATE the data bus signals.

In the PC-AT mode the PC87340 provides the two hard disk chip selects ($\overline{HCS0,HCS1}$) for the IDE interface. The $\overline{HCS0}$ output is active low when the 1F0–1F7 (hex) I/O address space is chosen and corresponds to the IFX signal on the IDE header. The $\overline{HCS1}$ output is active low when the 3F6 or 3F7 I/O addresses are chosen, and corresponds to 3FX on the IDE header. These are the two address blocks used in the PC-AT hard disk controller. The table below summarizes the addresses used by the PC-AT hard disk controller. IDE DMA support: When bit 1 of FCR is 1, the PC87340's IDE responds to DMA acknowledge on the $\overline{IDEACK}$ input pin as follows:

a. IDEL0 and IDERI are also asserted when $\overline{IDEACK}$ is asserted, and either $\overline{RD}$ or $\overline{WR}$ is asserted.
b. IDED7 is also functional (i.e., read: IDED7 to D7, write: D7 to IDED7) when $\overline{IDEACK}$ is asserted, and either $\overline{RD}$ or $\overline{WR}$ is asserted.

TABLE 7-1

IDE Registers and Their ISA Addresses

| Address | Read Function | Write Function |
|---|---|---|
| 1F0 | Data | Data |
| 1F1 | Error | Features (Write Precomp) |
| 1F2 | Sector Count | Sector Count |
| 1F3 | Sector Number | Sector Number |
| 1F4 | Cylinder Low | Cylinder Low |
| 1F5 | Cylinder High | Cylinder High |
| 1F6 | Drive/Head | Drive/Head |
| 1F7 | Status | Command |
| 3F6 | Alternate Status | Device Control |
| 3F7 | Drive Address (Note) | Not Used Data Bus TRI-STATE |

Note: Data bus bit D7 is dedicated to the floppy disk controller at this address. When reading this address the floppy disk controller disk change status will be provided by bit D7. There is no write function at this address in the IDE associated with this bit.

Figures 3, 4, 5, 6, 7, 8, 9, 10:
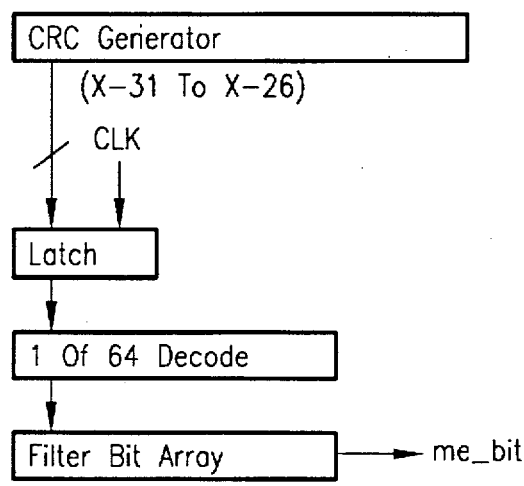
Figures 3, 4, 5, 6, 7, 8, 9, 10, 11, 12, 13, 14:
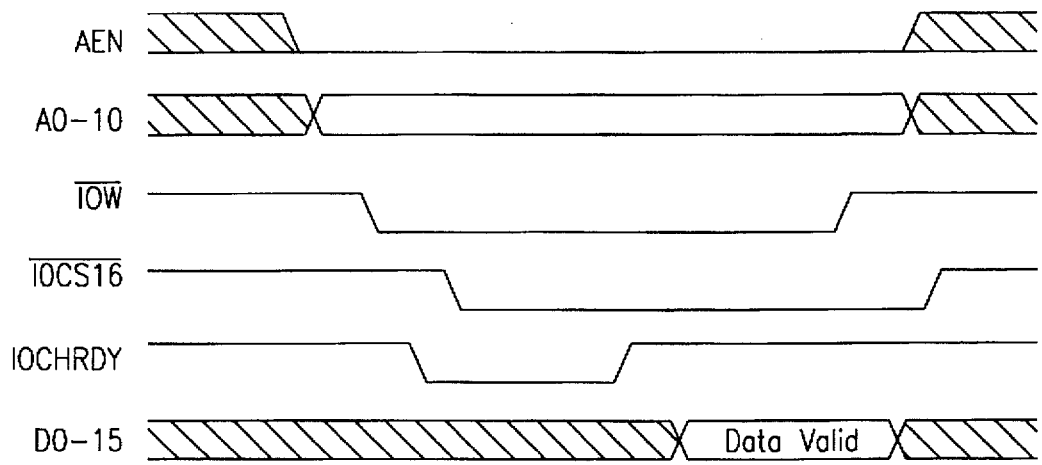
Figures 3, 4, 5, 6, 7, 8, 9, 10, 11, 12, 13, 14, 15:
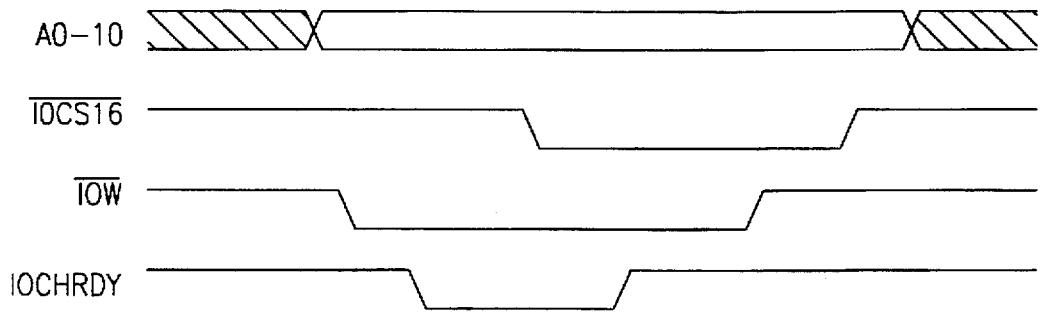
Figures 3, 4, 5, 6, 7, 8, 9, 10, 11, 12, 13, 14, 15, 16:
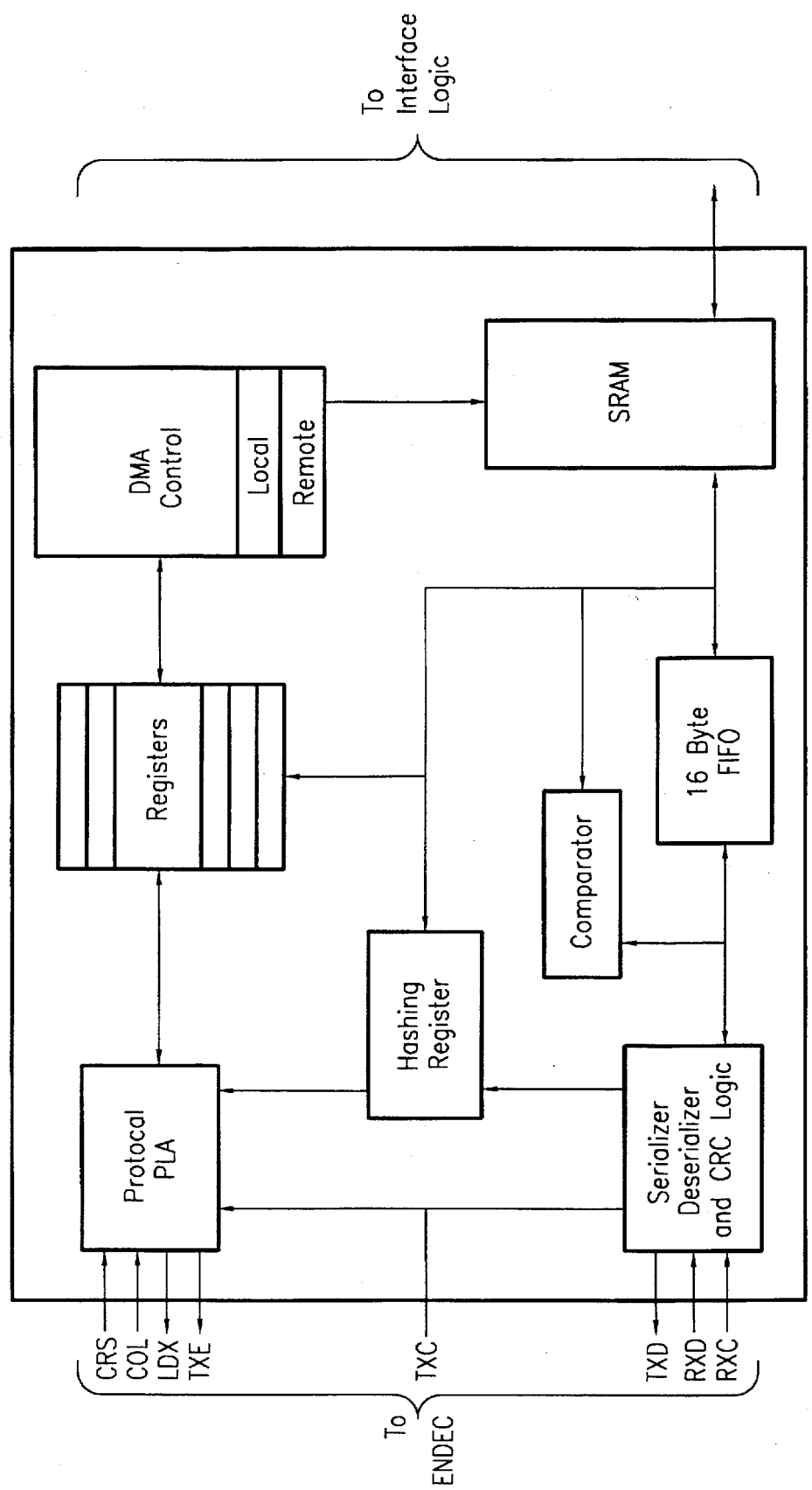
Figures 3, 4, 5, 6, 7, 8, 9, 10, 11, 12, 13, 14, 15, 16, 17:
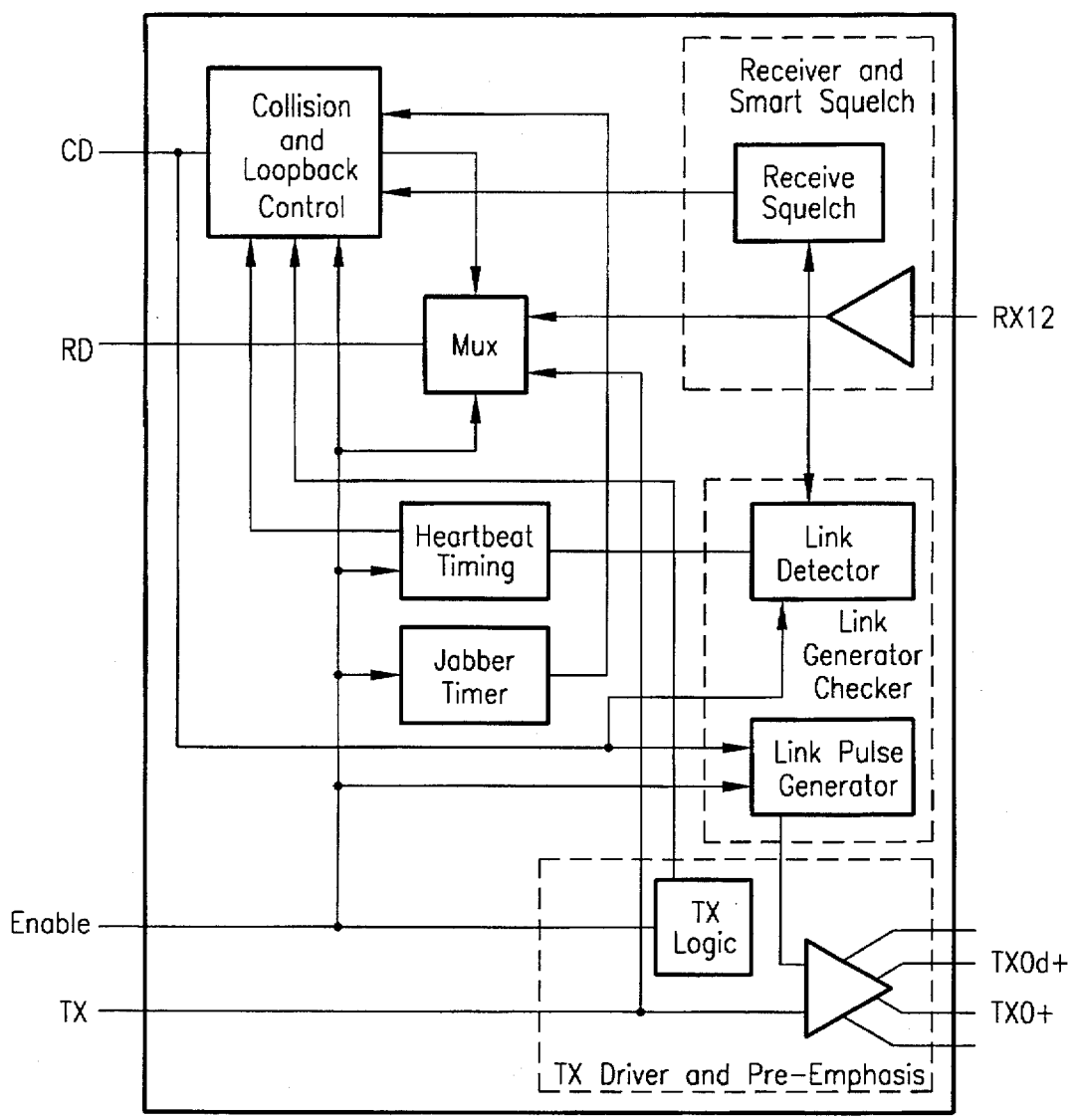
Figures 3, 4, 5, 6, 7, 8, 9, 10, 11, 12, 13, 14, 15, 16, 17, 18:
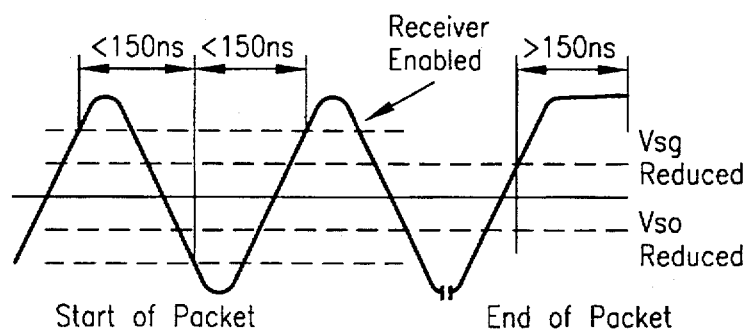
Figures 3, 4, 5, 6, 7, 8, 9, 10, 11, 12, 13, 14, 15, 16, 17, 18, 19:
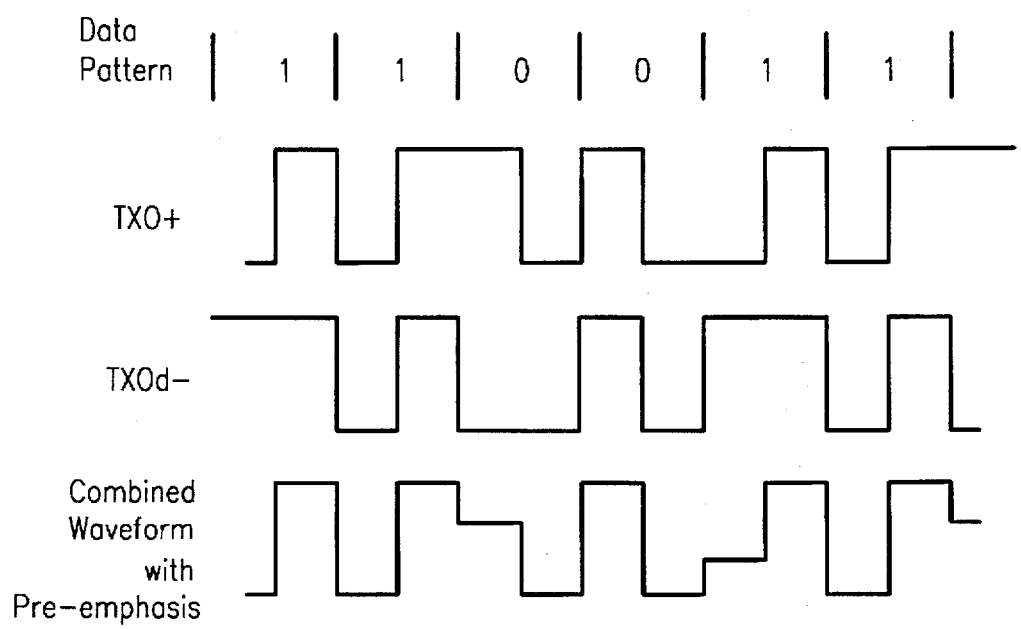
Figures 3, 4, 5, 6, 7, 8, 9, 10, 11, 12, 13, 14, 15, 16, 17, 18, 19, 20:
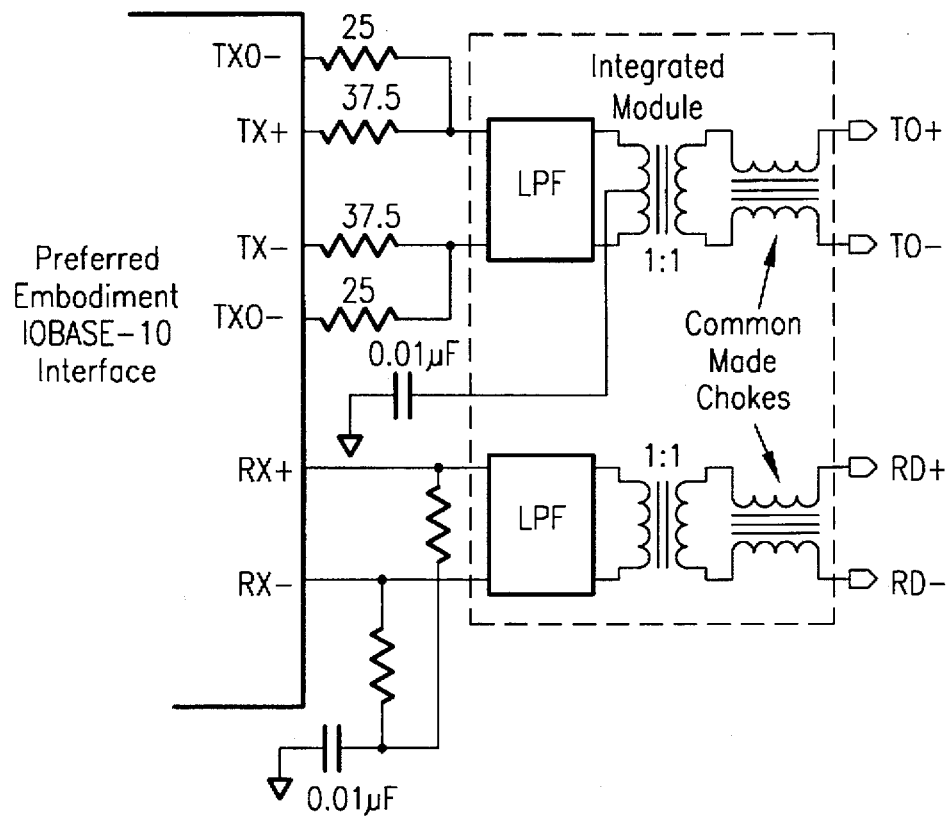
Figures 3, 4, 5, 6, 7, 8, 9, 10, 11, 12, 13, 14, 15, 16, 17, 18, 19, 20, 21:
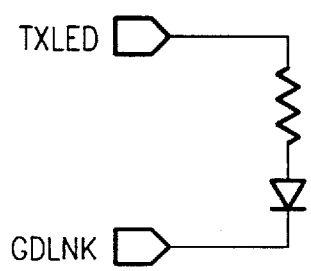
Figures 3, 4, 5, 6, 7, 8, 9, 10, 11, 12, 13, 14, 15, 16, 17, 18, 19, 20, 21, 22:
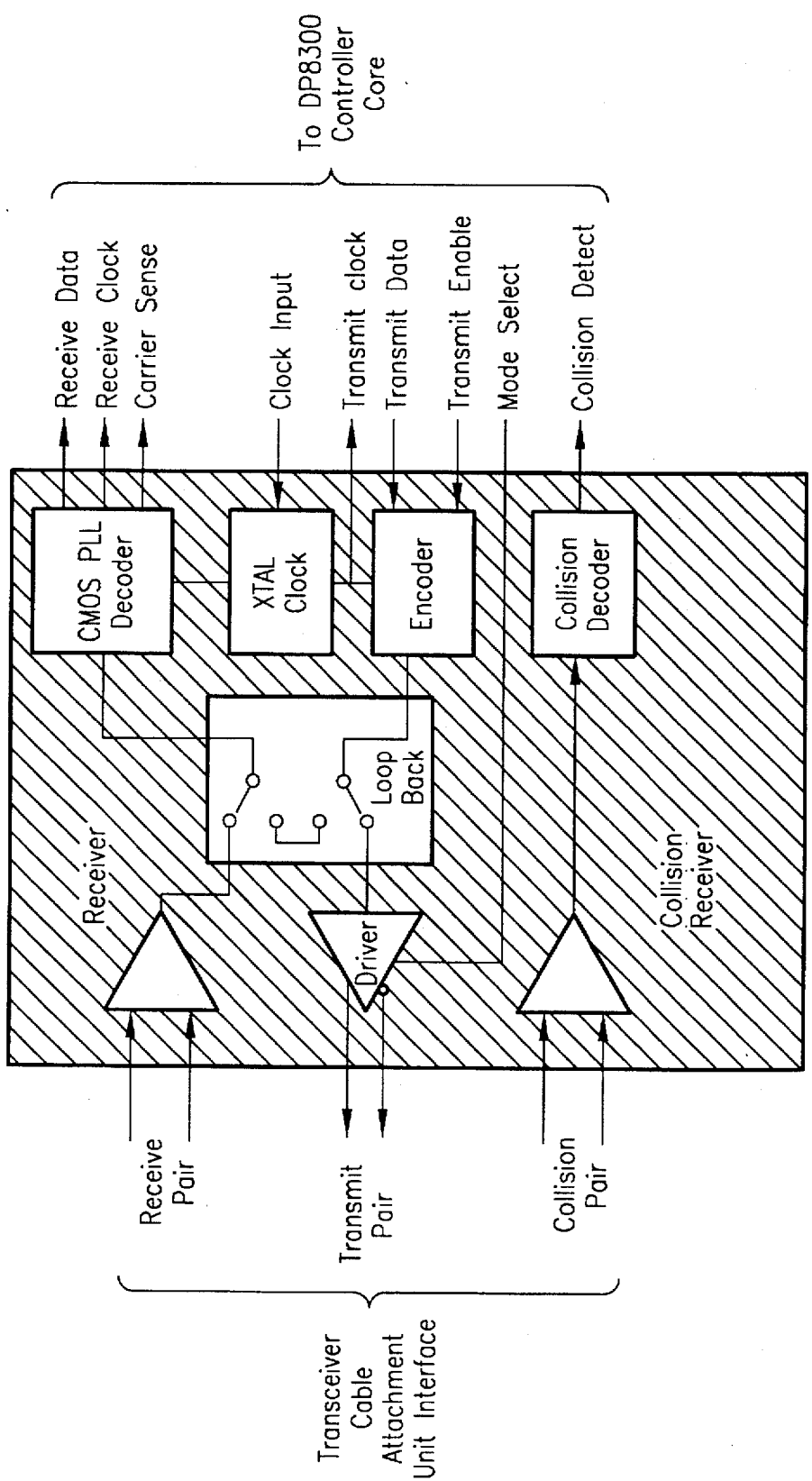
Figures 3, 4, 5, 6, 7, 8, 9, 10, 11, 12, 13, 14, 15, 16, 17, 18, 19, 20, 21, 22, 23:
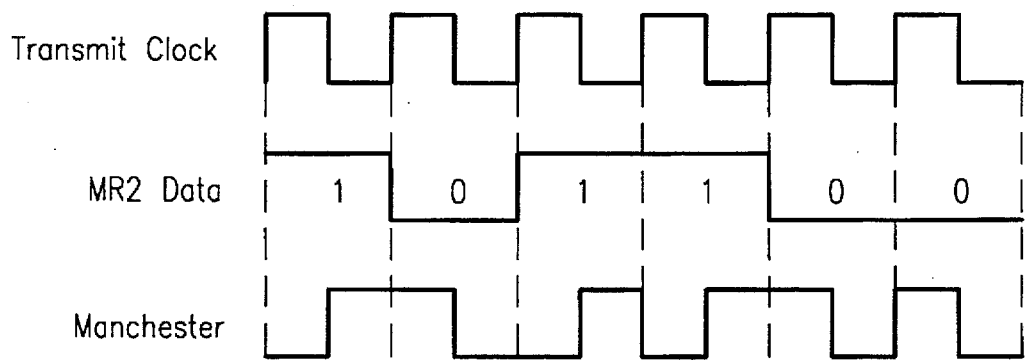
Figures 3, 4, 5, 6, 7, 8, 9, 10, 11, 12, 13, 14, 15, 16, 17, 18, 19, 20, 21, 22, 23, 24, 25:
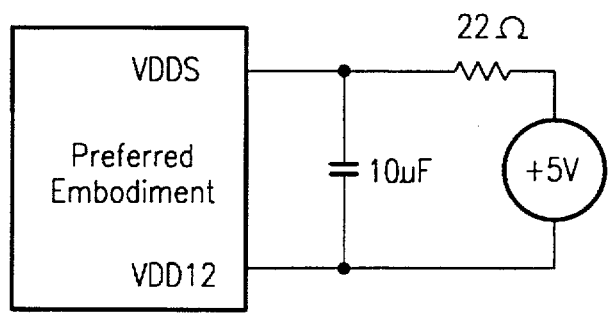
Figures 3, 4, 5, 6, 7, 8, 9, 10, 11, 12, 13, 14, 15, 16, 17, 18, 19, 20, 21, 22, 23, 24:
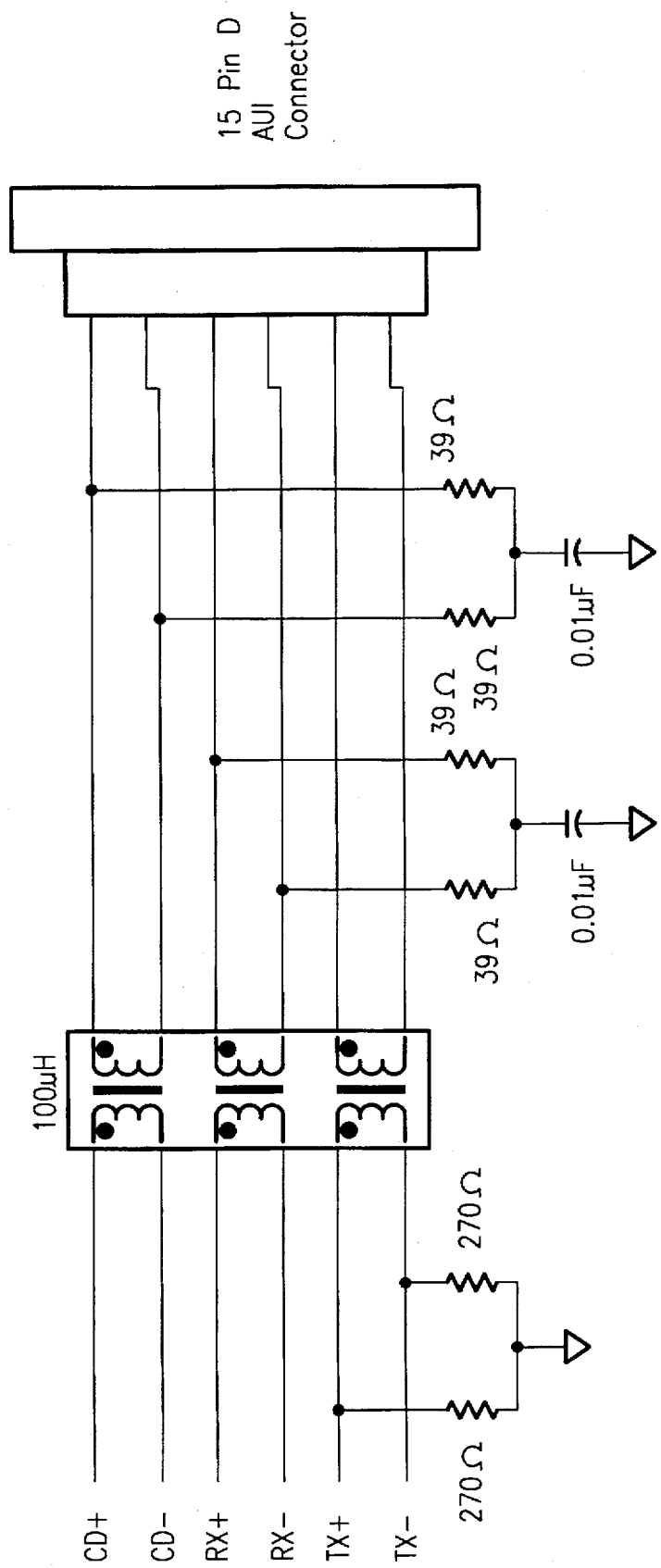
Figures 3, 4, 5, 6, 7, 8, 9, 10, 11, 12, 13, 14, 15, 16, 17, 18, 19, 20, 21, 22, 23, 24, 25, 26:
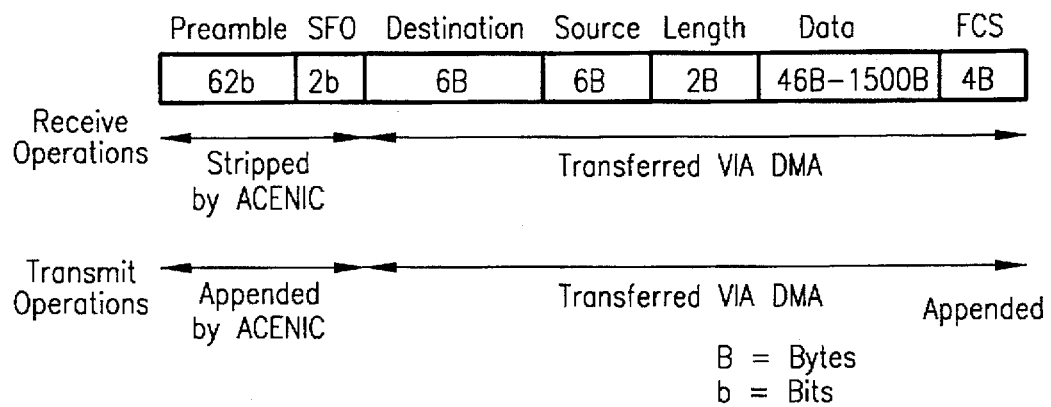
Figures 3, 4, 5, 6, 7, 8, 9, 10, 11, 12, 13, 14, 15, 16, 17, 18, 19, 20, 21, 22, 23, 24, 25, 26, 27:
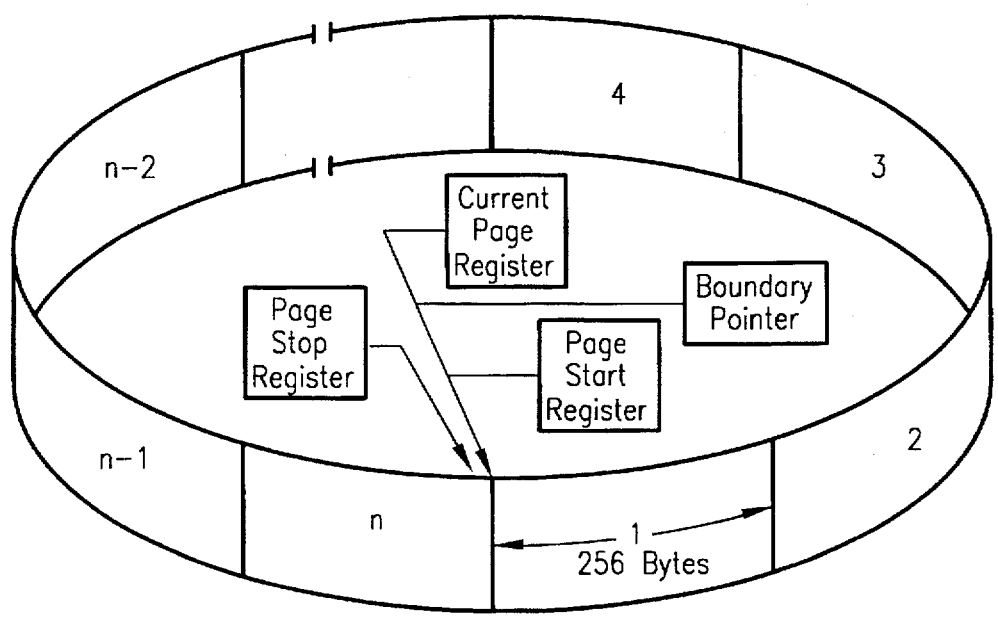
Figures 3, 4, 5, 6, 7, 8, 9, 10, 11, 12, 13, 14, 15, 16, 17, 18, 19, 20, 21, 22, 23, 24, 25, 26, 27, 28:
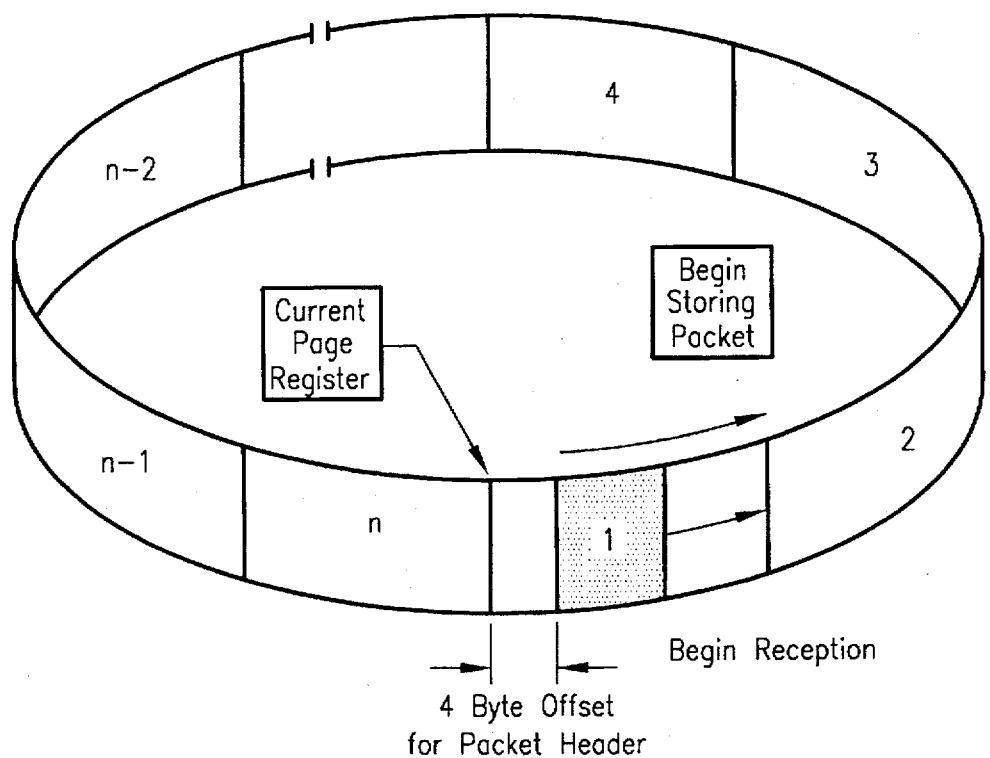
Figures 3, 4, 5, 6, 7, 8, 9, 10, 11, 12, 13, 14, 15, 16, 17, 18, 19, 20, 21, 22, 23, 24, 25, 26, 27, 28, 29:
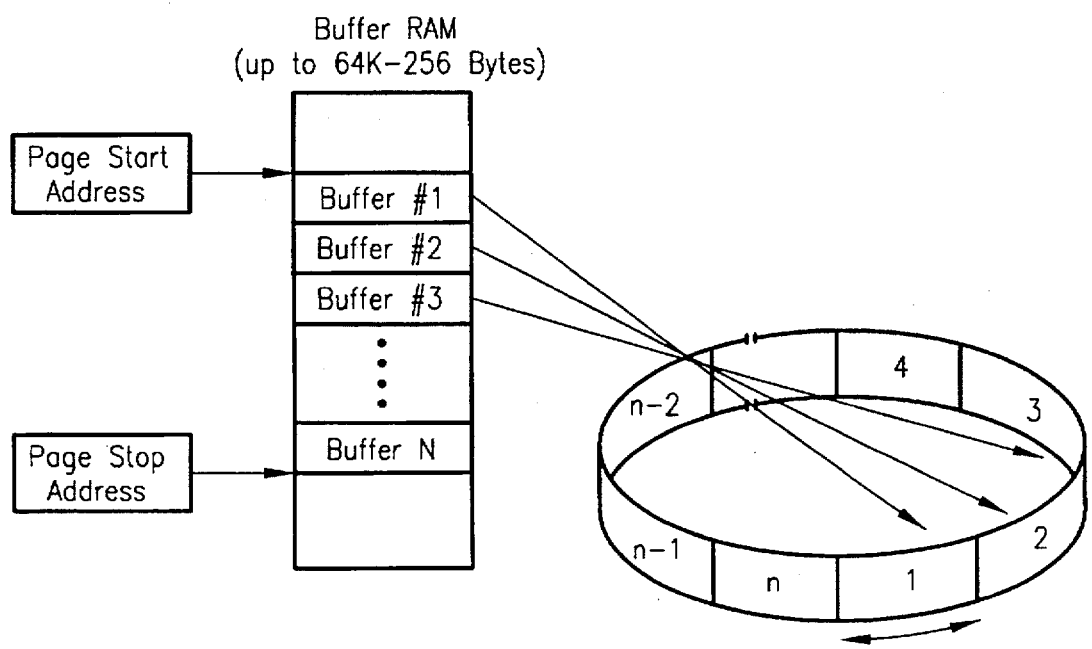
Figures 3, 4, 5, 6, 7, 8, 9, 10, 11, 12, 13, 14, 15, 16, 17, 18, 19, 20, 21, 22, 23, 24, 25, 26, 27, 28, 29, 30:
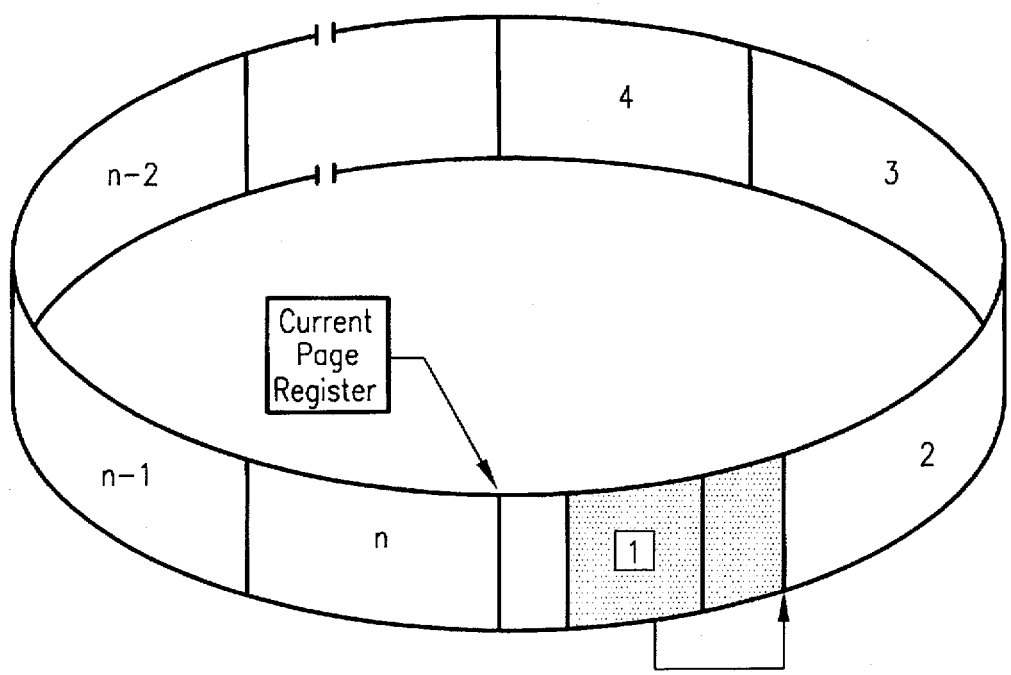
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31:
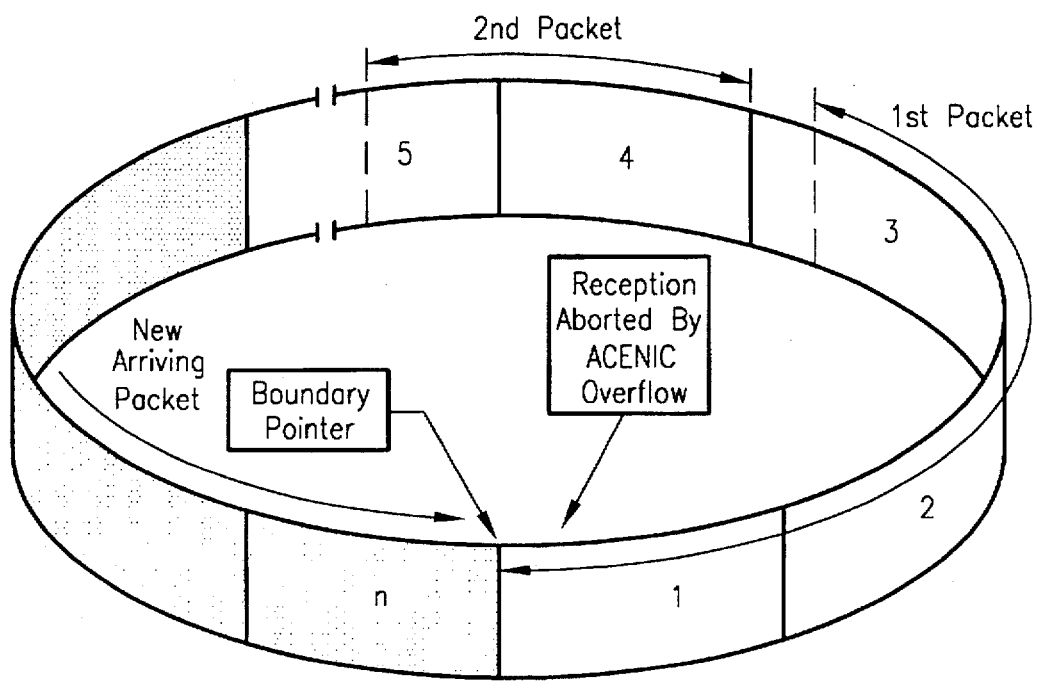
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
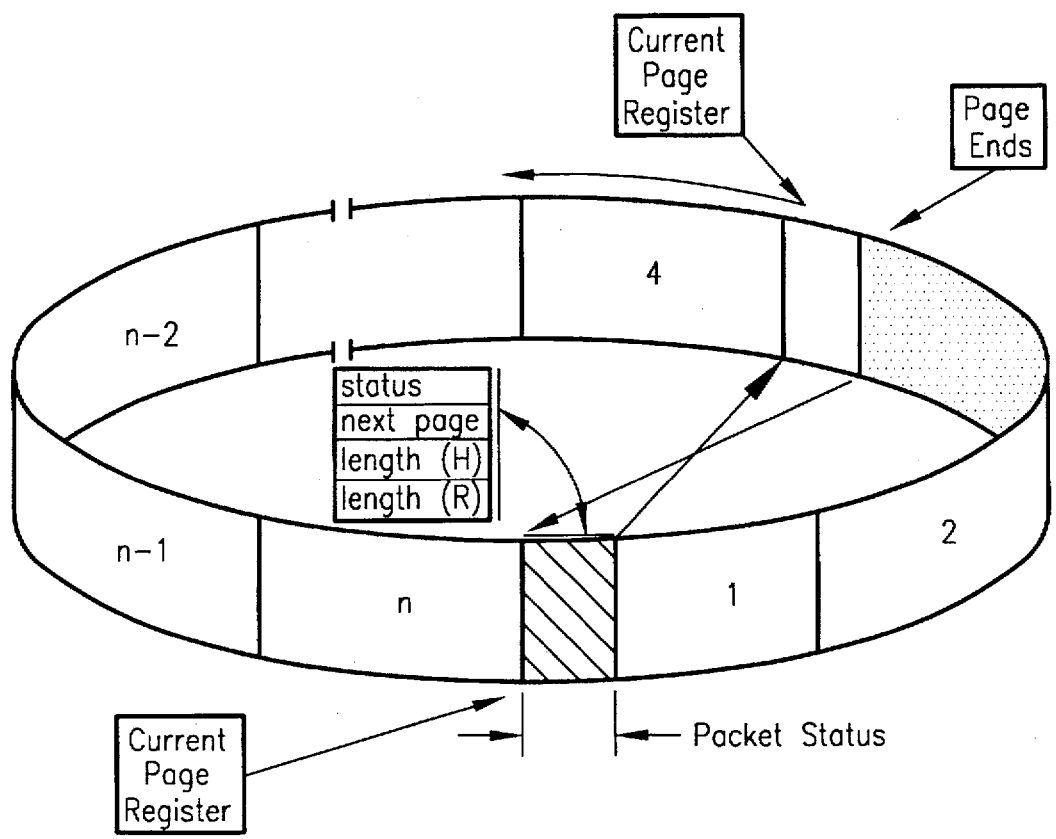
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
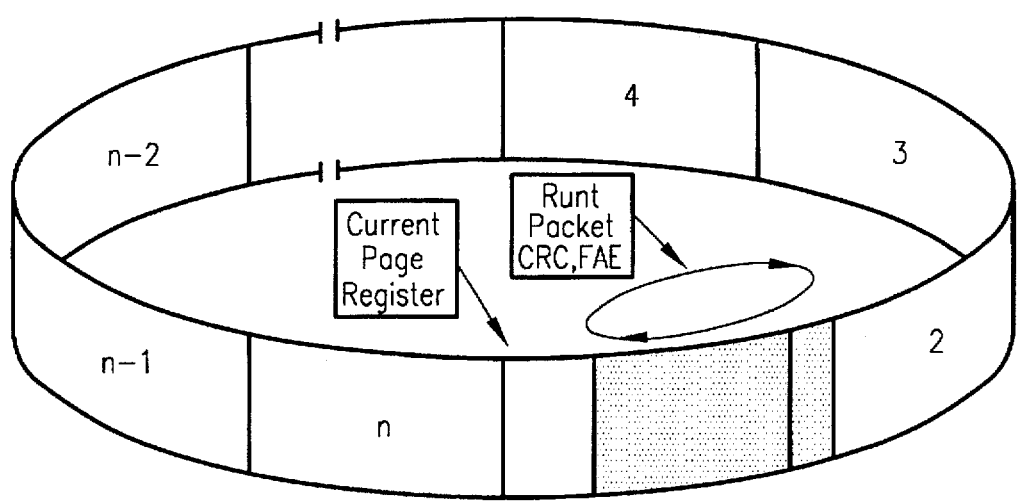
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
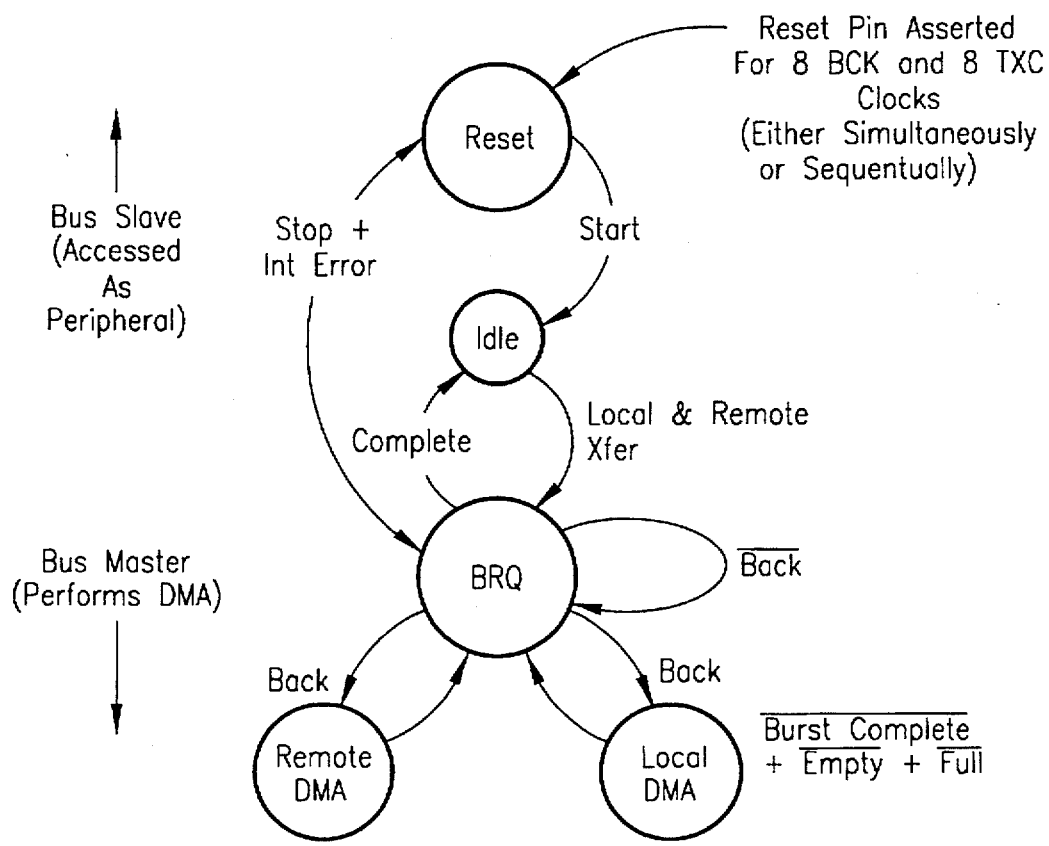
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 35A:
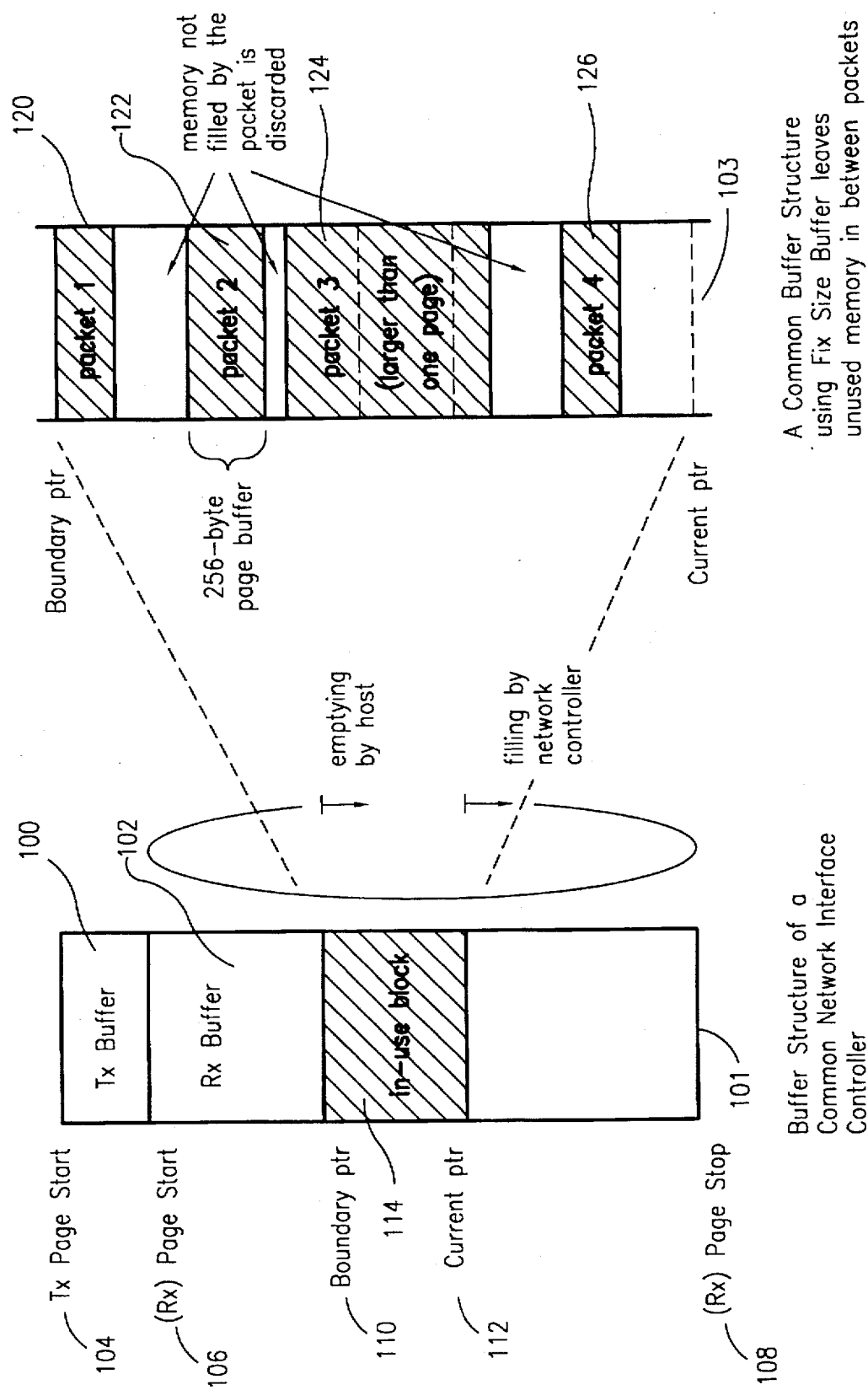
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 35B:
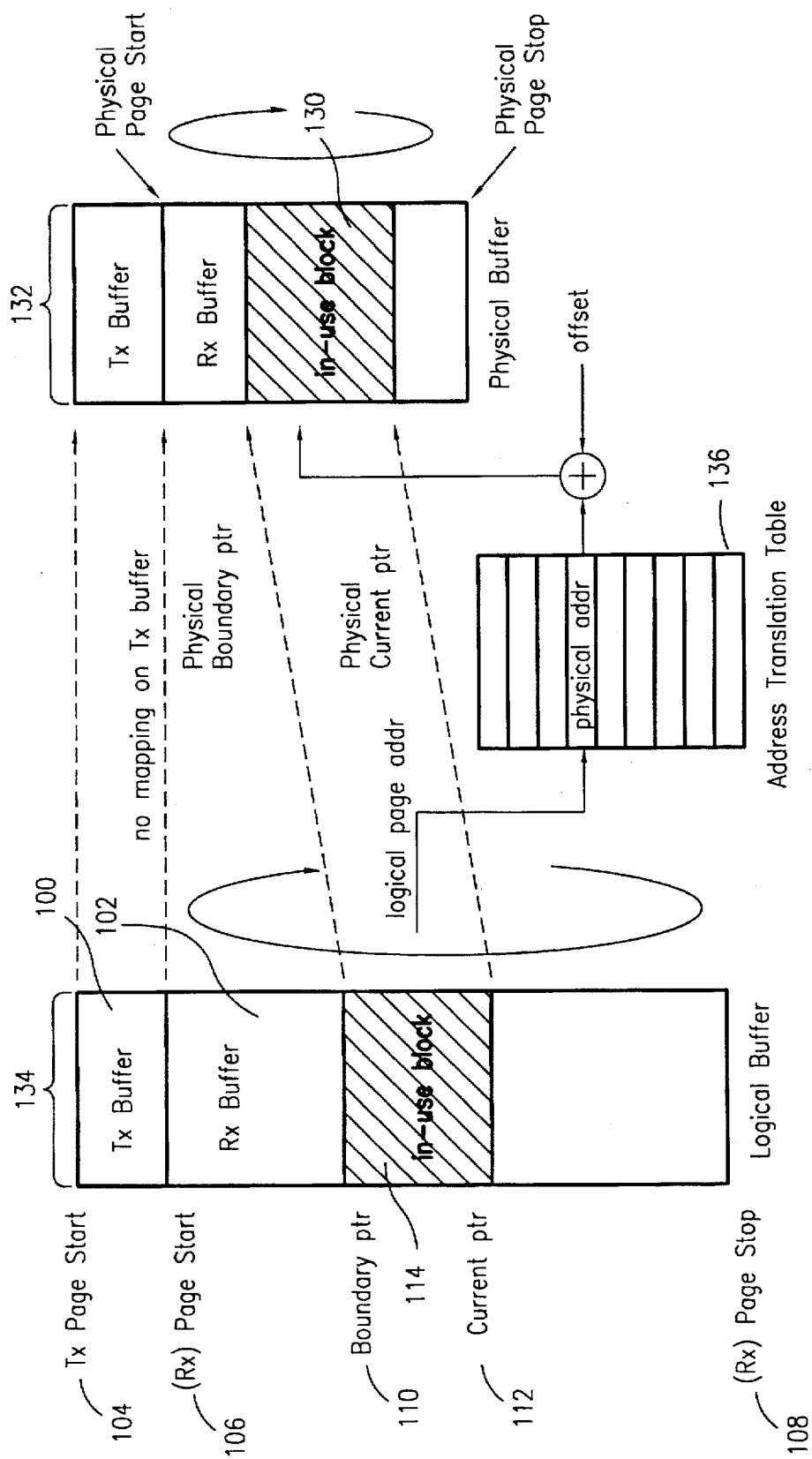
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 35C:
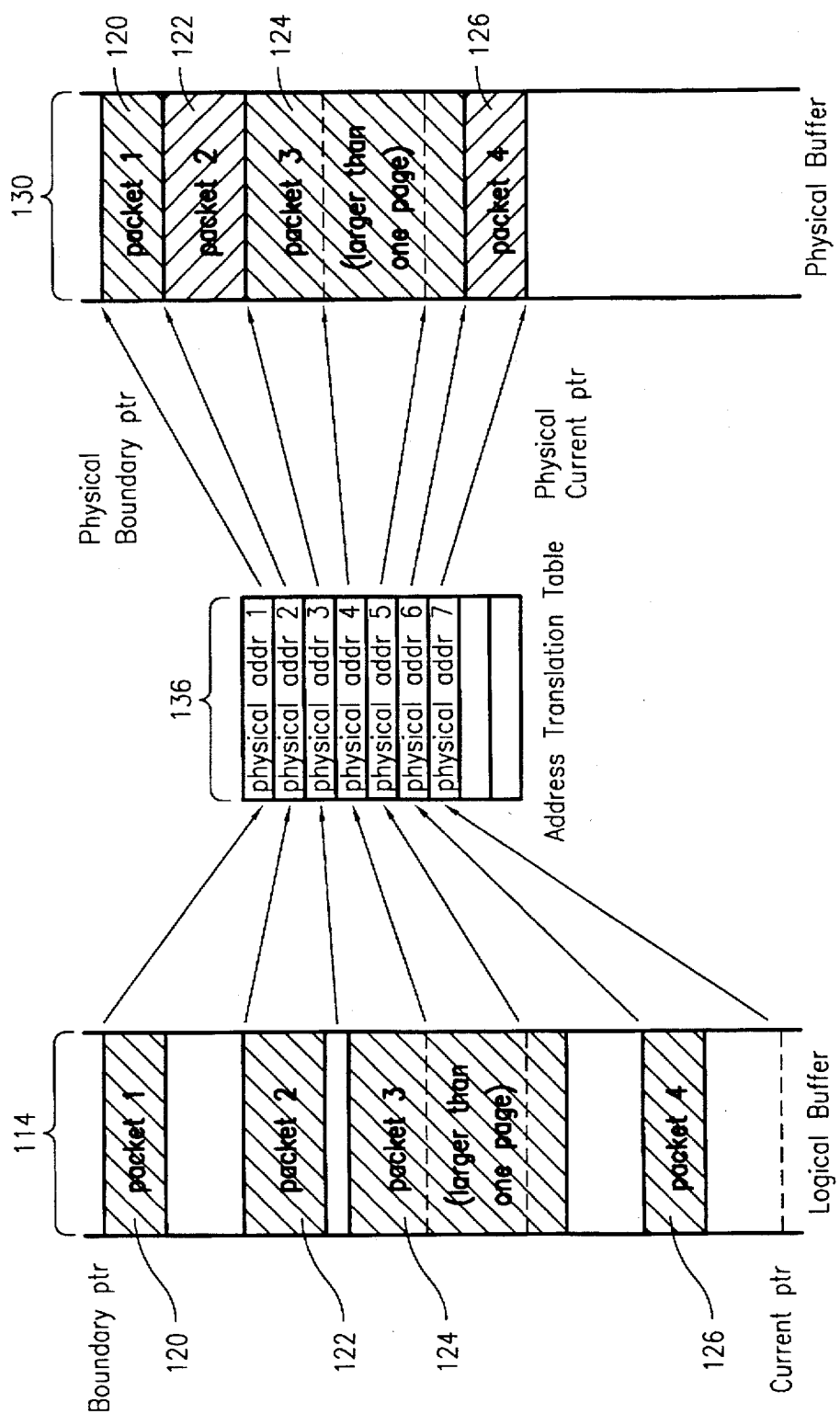
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 35E:
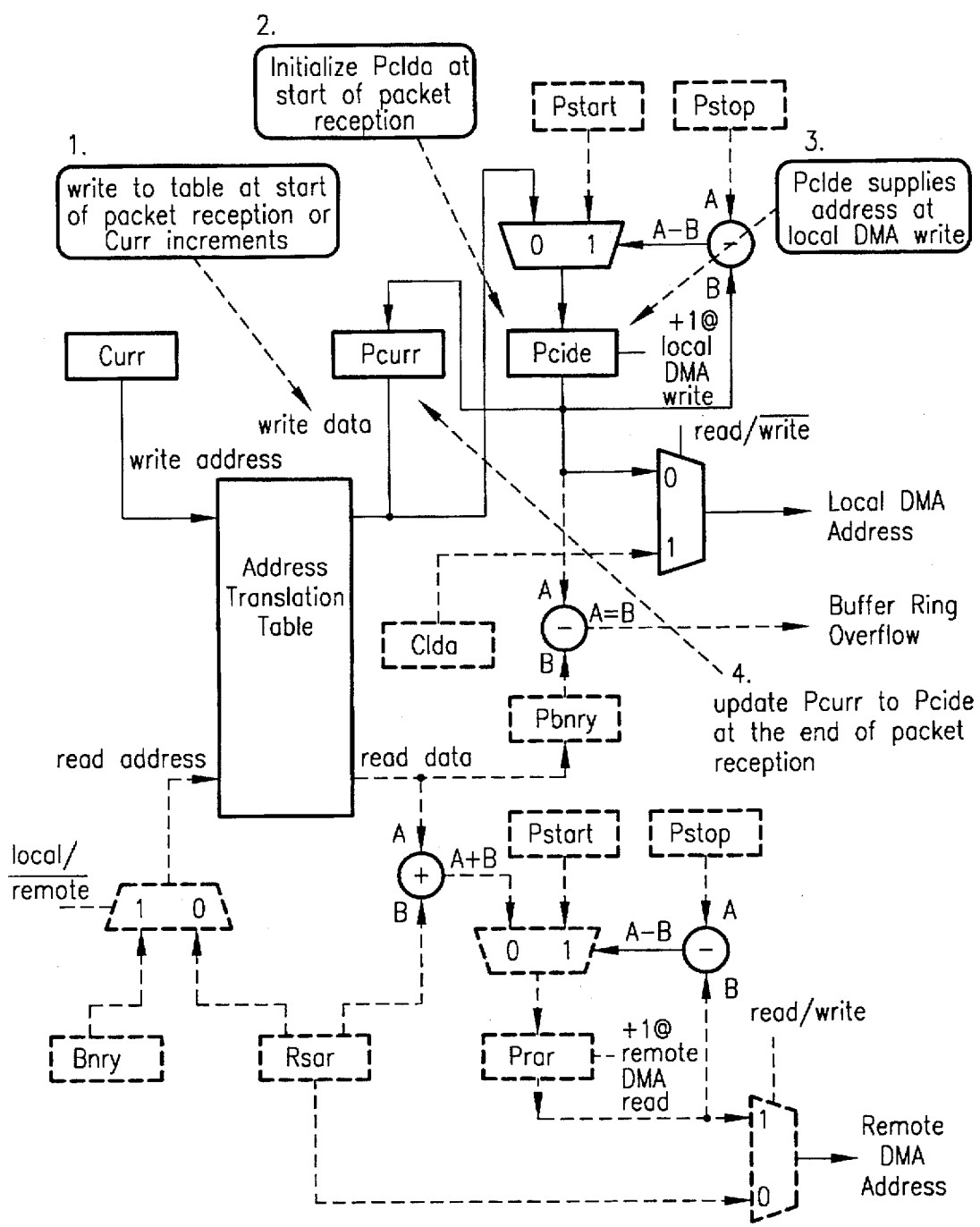
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 35F:
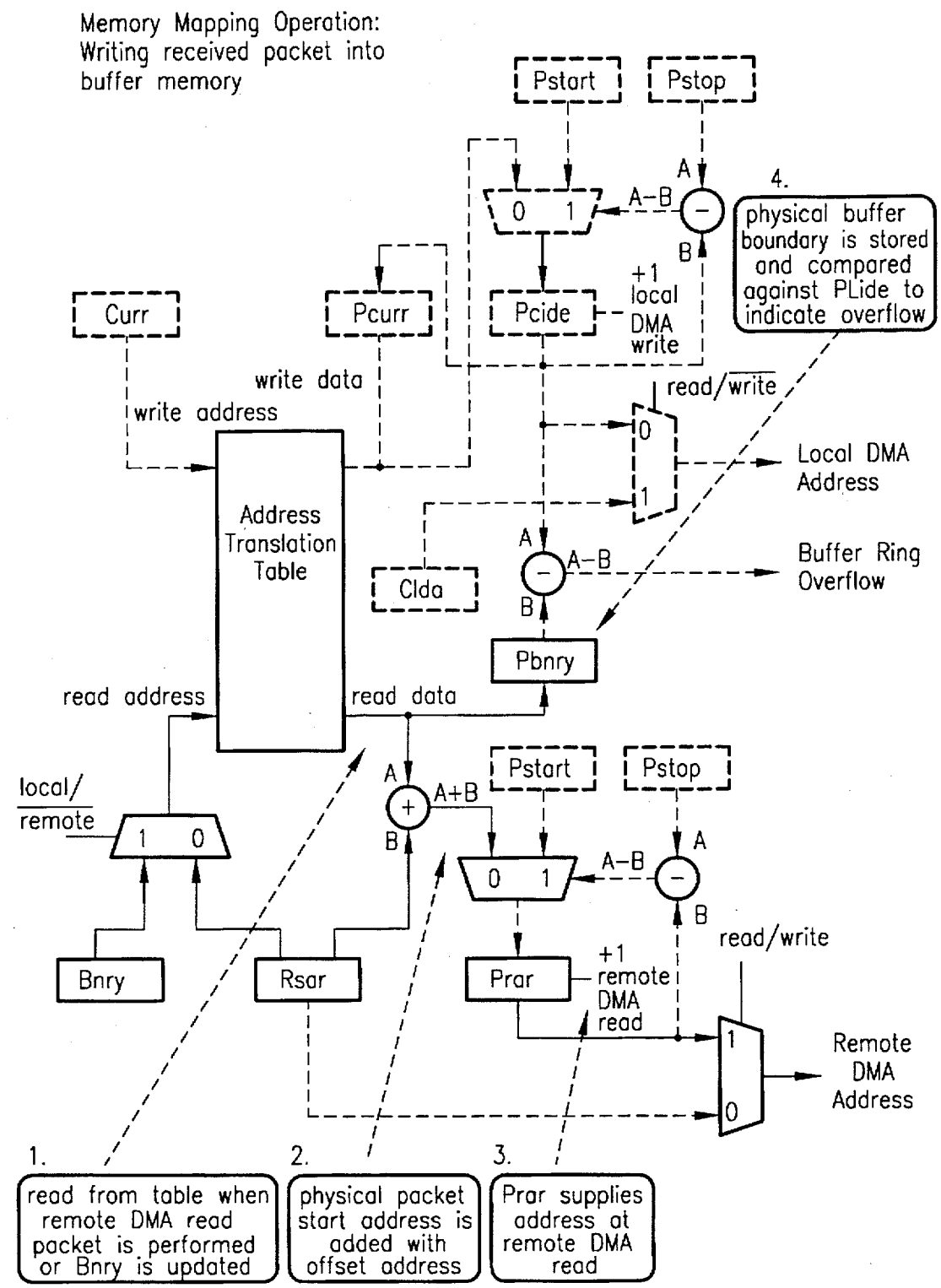
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
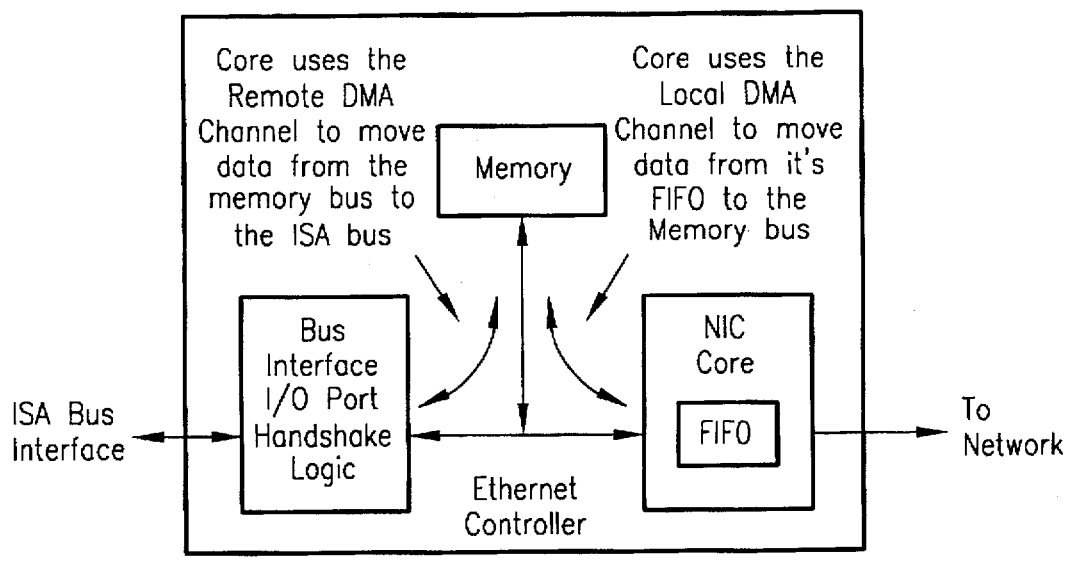
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
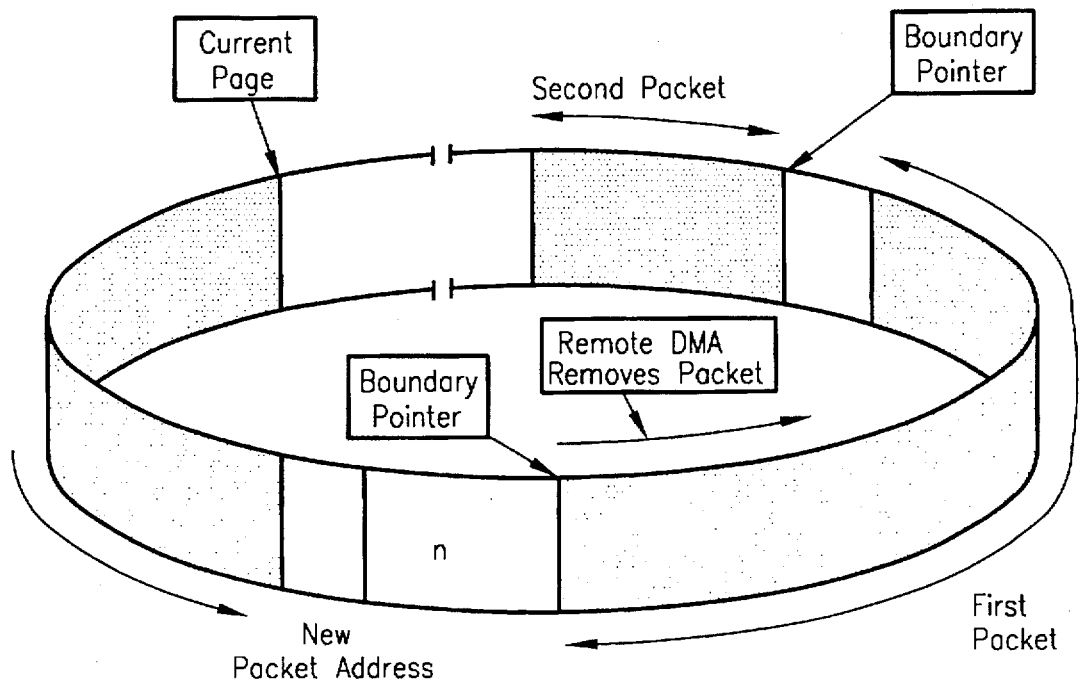
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
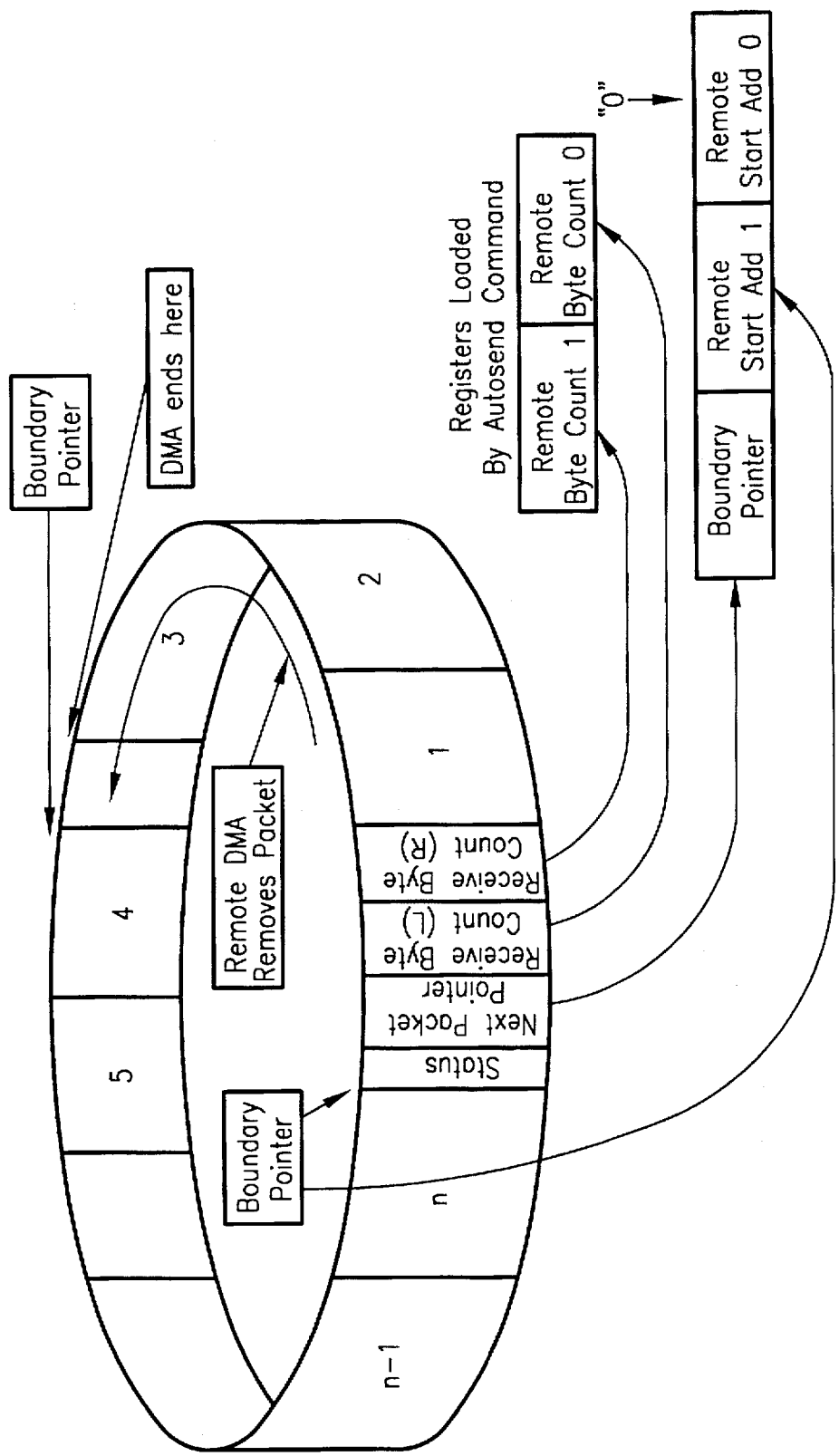
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
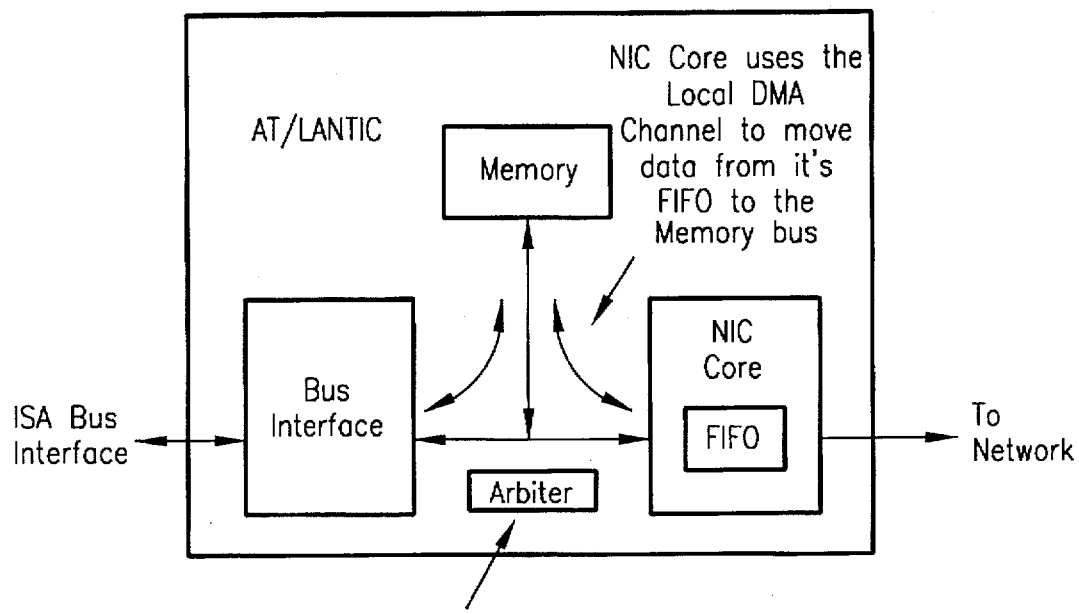
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
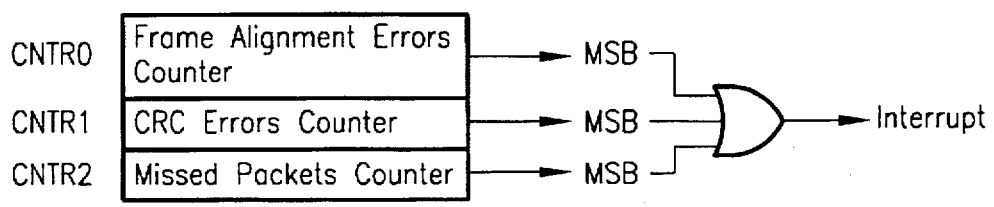
Figures 1, 4:
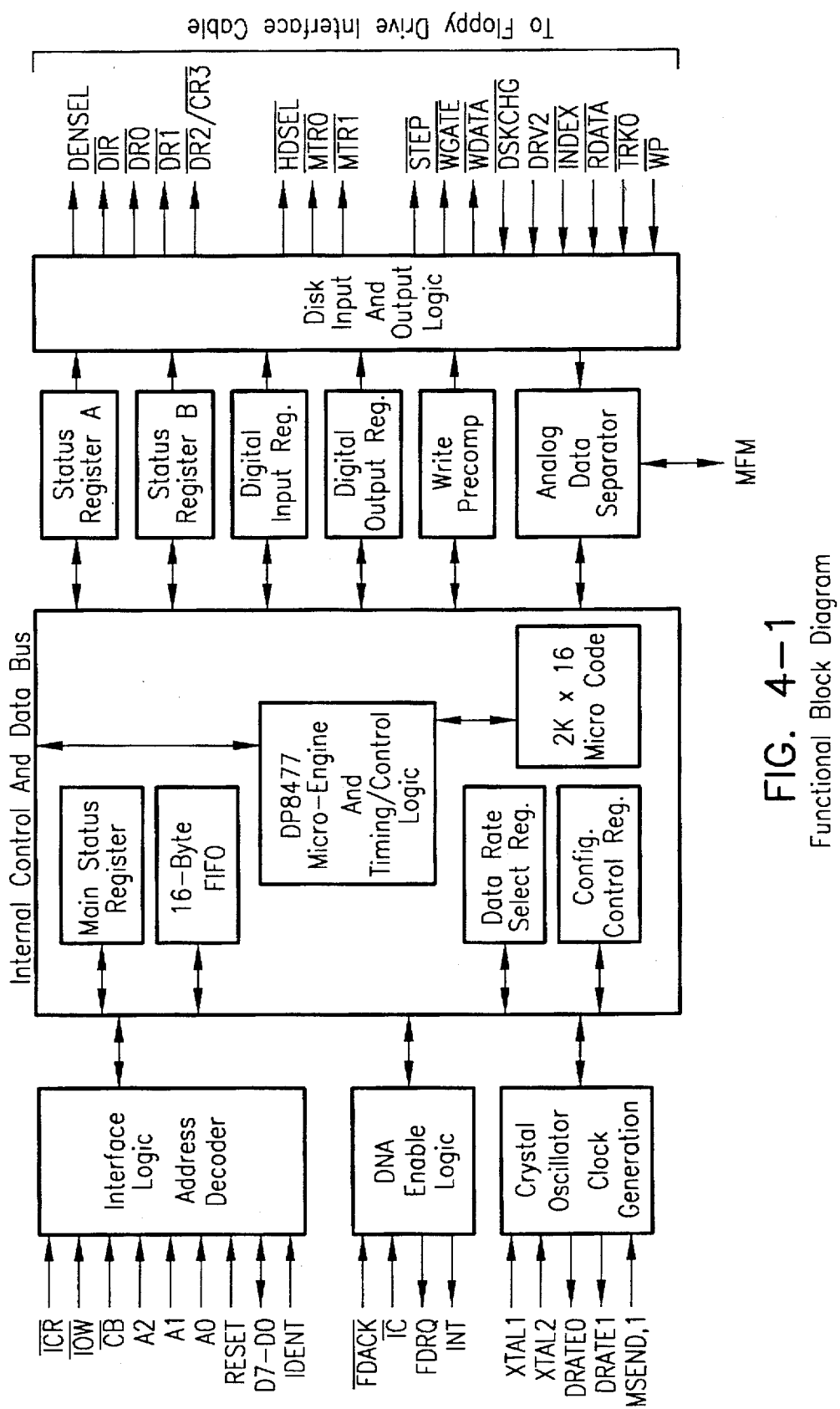
Figures 3, 4:
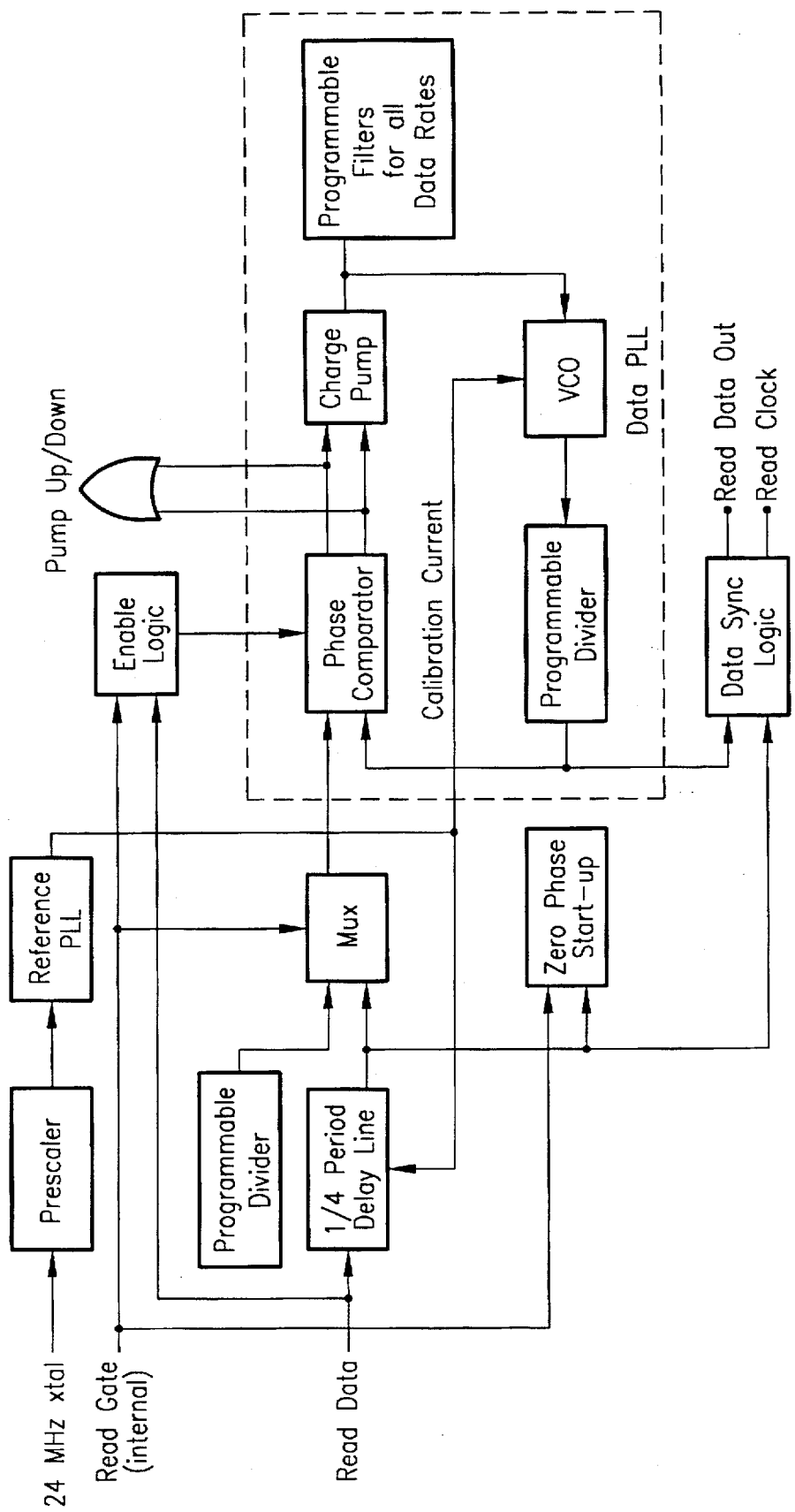
Figures 4, 4A:
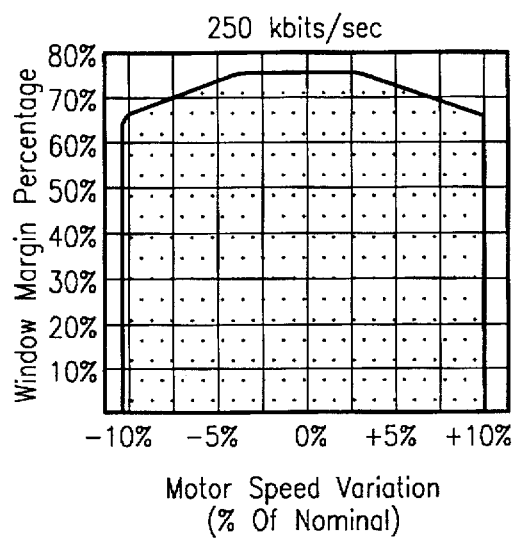
Figures 4, 4B:
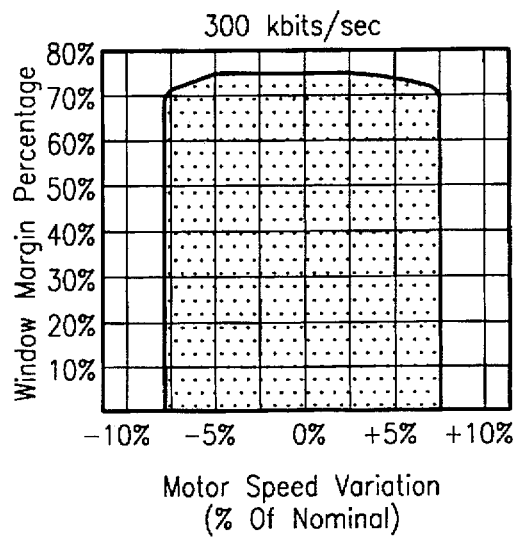
Figures 4, 4C:
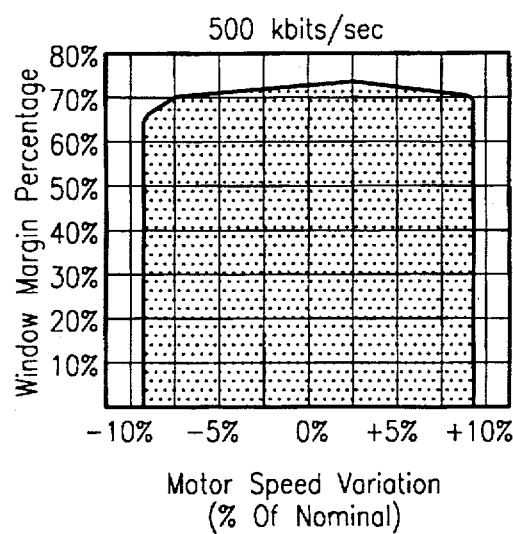
Figures 4, 4D:
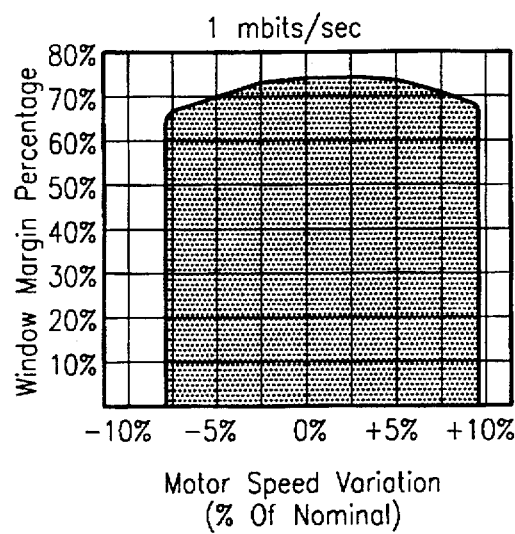
Figures 4, 5:
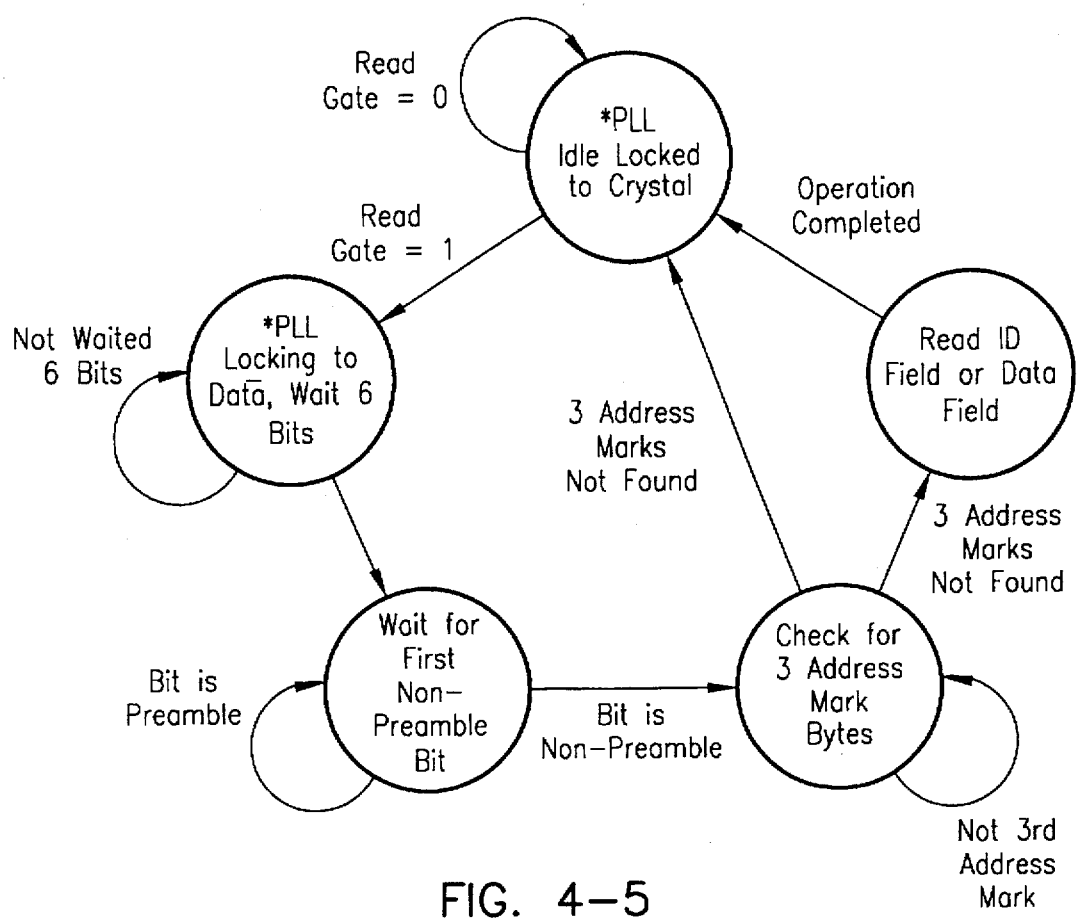
Figures 4, 5, 6:
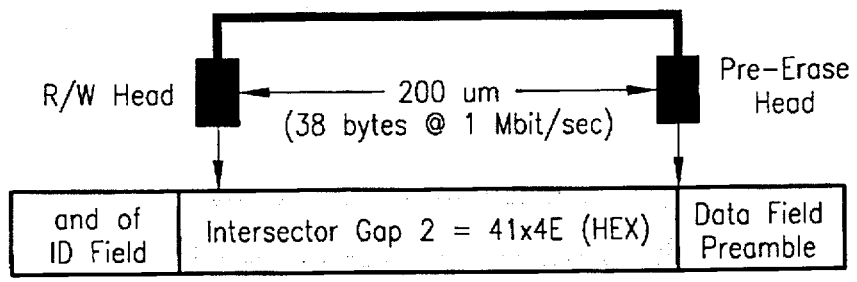

The equations shown in FIG. 10-2 (in Appendix A) define the signals of the PC87340 IDE pins.

Appendices D, E, F, and G contain related figures and diagrams to DC Electrical Characteristics, AC Timing Conditions, Reference symbols, and physical dimensions, respectively.

FURTHER MODIFICATIONS AND VARIATIONS

Although the invention has been described with reference to a specific embodiment, this description is not meant to be construed in a limiting sense. As described above, various modifications of the disclosed embodiment as well as alternate embodiments of the invention will become apparent to persons skilled in the art upon reference to the description of the invention. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

We claim:

1. An integrated circuit, comprising
   (a) at least one data bus to electrically couple said integrated circuit with a first host system, sad at least one data bus transfers data packaged in at least one data packet to and from said integrated circuit;
   (b) local area network circuitry electrically coupled to said at least one data bus and selectively to a network, said local area network circuitry to electrically couple said integrated circuit and, in turn, said first host system to said network and thereby to at least one second host system via said at least one data bus, said network transfers data packaged in said at least one data packet to and from said local area network circuitry;
   (c) input and output circuitry electrically coupled to said at least one data bus, said input and output circuitry to electrically couple said integrated circuit and, in turn, said first host system to at least one input/output channel, said input/output channel selectively electrically coupled to at least one external electrical module, said at least one input/output channel transfers said data packaged in said at least one data packet to and from said input and output circuitry wherein said at least one input/output channel is selected from a group consisting of a first serial port interface, a second serial port interface, a parallel port interface, a hard drive, a floppy drive, and any combination thereof,
   (d) first memory electrically coupled to said local area network circuitry and to said input and output circuitry and to said at least one data bus, said first memory to store data received and transmitted by said local area network circuitry and sad input and output circuitry via said at least one data bus and said network and said at least one input/output channel, said first memory is configurable and has sufficient memory capacity to store more than one data packet of said at least one data packet; and
   (e) a memory mapping system electrically coupled to said first memory said receive buffer is positioned In said first memory, said first memory having a size, said size reduced by said memory mapping system, said memory mapping system electrically coupled to said first memory and incorporated in said integrated circuits wherein said local area network circuitry comprises interface controller circuitry to transmit and receive data packaged in said at least one data packet, each data packet of said at least one data packet approximately 1518 bytes, said interface controller circuitry electrically coupled to said first memory and to said at least one data bus, said interface controller circuitry comprises
   a transmit buffer configured in said first memory to hold said at least one data packet transmitted to said second host system; and
   a receive buffer configured in said first memory to hold said at least one data packet received from said at least one second host system.

2. The integrated circuit of claim 1, wherein said first host system is a personal computer.

3. The integrated circuit of claim 2, wherein said personal computer is based on microprocessors selected from a group consisting of Intel™ 286, Intel™ 386, Intel™ 486, and Intel™ Pentium™.

4. The integrated circuit of claim 1, wherein said at least one second host system is a personal computer.

5. The integrated circuit of claim 4, wherein said personal computer is based on microprocessors selected from a group consisting of Intel™ 286, Intel™ 386, Intel™ 486, and Intel™ Pentium™.

6. The integrated circuit of claim 1, wherein said local area network circuitry further comprises
   (b3) network controller circuitry electrically coupled to said at least one data bus to coordinate and control communication of data between said first host system and said network, said network controller circuitry electrically coupled to said first memory to access said first memory;
   (b4) encoder/decoder circuitry electrically coupled to said network controller circuitry to encode and decode communication between said first host system and said network; and
   (b5) driver circuitry and receiver circuitry electrically coupled to said encoder/decoder circuitry to drive communication encoded and decoded by said encoder/decoder circuitry.

7. The integrated circuit of claim 6, wherein said encoder/decoder circuitry conforms to Manchester encoding and decoding protocol.

8. The integrated circuit of claim 1, wherein said local area network circuitry further comprises
   (b3) bus interface circuitry to interface with said first host system, said bus interface circuitry electrically coupled to said at least one data bus.

9. The integrated circuit of claim 1, wherein at least one external electrical module can interface with said at least one data bus via said said input and output circuitry.

10. The integrated circuit of claim 1, wherein said at least one external electrical module are electrically erasable, programmable, read only memory.

11. The integrated circuit of claim 1, wherein said first memory further comprises configuration registers to house data packaged in said at least one data packets and said configuration registers to set and to control communication of data packaged in said at least one data packet to and from said local area network circuitry and to control communication of data packaged in said at least one data packet to and from said input and output circuitry.

12. The integrated circuit of claim 1, wherein said network is an Ethernet.

13. The integrated circuit of claim 1, wherein said first memory is random access, non-volatile memory.

14. The integrated circuit of claim 1, wherein said first memory is sufficiently large enough to store data necessary to accommodate a difference between a rate of reception and transmission of data to and from said network.

15. The integrated circuit of claim 1, wherein said at least one data bus is selected from a group consisting of ISA and EISA.

16. The integrated circuit of claim 1, wherein said at least one data bus are at least 8 bits wide.

17. The integrated circuit of claim 1, wherein said local area network circuitry operates at a first dock speed and said input and output circuitry operates at a second dock speed, said local area network further comprising
   (b3) an oscillator that oscillates at a predictable speed to create at least one oscillation; and
   (b4) oscillator control circuitry to adjust said at least one oscillation to selectively equal said first clock speed or said second clock speed.

18. The integrated circuit of claim 1, further comprising
(f) power control circuitry to control power to said local area network circuitry and said input and output circuitry, said power control circuitry electrically coupled to said local area network circuitry and to said input and output circuitry.

19. The integrated circuit of claim 1, wherein said transmit buffer is a single block buffer that holds a data packet while said data packet is assembled.

20. The Integrated circuit of claim 1, wherein a beginning of said transmit buffer is defined by a Transmit Page Start Register and an end is defined by a Page Stop Register.

21. The integrated circuit of claim 1, wherein said receive buffer is a circulating buffer ring.

22. The integrated circuit of claim 1, wherein said circulating buffer ring has a beginning and an end, said beginning defined by a Page Start Register and said end defined by a Page Stop Register.

23. The integrated circuit of claim 1, wherein said at least one data packet received from said network is stored into a buffer ring, said at least one data packet is pointed to by a first pointer and said at least one data packet transmitted to said second host system are pointed to by a second pointer.

24. The integrated circuit of claim 23, wherein said first pointer points to a current position and said second pointer points to a boundary position.

25. The integrated circuit of claim 1, wherein said receive buffer is organized in a plurality of pages, each page of said plurality of pages are 256 bytes in length.

26. The integrated circuit of claim 1, such that each data packet of said at least one data packet received by said receive buffer fills up one or more of said 256-byte pages.

27. The integrated circuit of claim 1, wherein said receive buffer has an in-use block of memory, said in-use block having a size that corresponds to an amount of data transmitted or received by said interface controller circuitry.

28. The integrated circuit of claim 1, wherein said memory mapping system maps said receive buffer into a buffer ring.

29. The integrated circuit of claim 1, wherein said memory mapping system has a set of physical address registers and pointers, said pointers controlling data read and data write operations to a buffer ring.

30. The integrated circuit of claim 1, wherein said memory mapping system comprises a memory array storing an to correlate a physical address to an address in said receive buffer.

31. The integrated circuit of claim 30, wherein said physical address is selected from the group consisting of beginning location of said at least one data packet, current packet pointer, and boundary packet pointer.

32. The integrated circuit of claim 1, wherein said memory mapping system is embedded in circuitry.

33. The integrated circuit of claim 1, wherein said memory mapping system operates automatically when said receive buffer is utilized.

34. The integrated circuit of claim 1, wherein said receive and transmit buffers have a variable size.

35. The integrated circuit of claim 1, wherein said at least one data packet is stored in said receive buffer Immediately after one another.

36. The integrated circuit of claim 1, wherein said memory mapping system translates at least one address referencing data in said first memory to at least one address in a logical memory.

37. The integrated circuit of claim 1, wherein said interface controller conforms to a Ethernet standard.

38. The integrated circuit of claim 1, wherein said local area network circuitry, comprises (b3) a controller electrically coupled to said first memory having access to said first memory; said controller controlling access to said first memory by said local area network circuitry;

(b4) encoder/decoder electrically coupled to said controller, said encoder/decoder electrically encodes and decodes data transferred to and from said local area network circuitry;

(b5) a driver electrically coupled to said encoder/decoder, said driver to drive signals carrying said data to and from said local area network circuitry; and (b6) a receiver electrically coupled to said encoder/decoder to receive signals carrying said data to and from said local area network circuitry.

39. The integrated circuit of claim 1, wherein said first memory is random access, non-volatile memory and functions as a data buffer.

40. The integrated circuit of claim 1, comprising an (e) early interrupt system for said local area network circuitry to selectively interrupt said local area network circuitry, said early interrupt system electrically coupled to said local area network circuitry, said early interrupt system comprising:

(e1) receiving circuitry to receive data packaged in said at least one data packet from said network, said at least one data packet having a plurality of data bits, said receiving circuitry electrically coupled to said local area network circuitry; and (e2) interrupt logic circuitry to receive an interrupt signal from said network to interrupt a transmission of said at least one data packet at a specific bit position, said interrupt logic circuitry electrically coupled to said local area network circuitry;

(e3) said receiving circuitry transfers a portion of said plurality of data bits of said data packet of said at least one data packet already received up to said bit position to be processed and continues to receive said plurality of data bits to at least one said data packet.

41. The integrated circuit of claim 40, wherein said specific bit position is programmable.

42. The integrated circuit of claim 40, wherein said bit position is calculated by subtracting latency interrupt time from a specified number of bytes.

43. The integrated circuit of claim 40, wherein said network is an Ethernet and said network driver is a Ethernet driver.

44. The integrated circuit of claim 40, wherein said interrupt system is enabled via a bit in an network control register, said network control register electrically coupled to said local area network circuitry.

45. The integrated circuit of claim 40, wherein said receiving circuitry initiates a counter, said counter increments fixed time period is eight transmit at least one clock cycle, said counter electrically coupled to said receiving circuitry.

46. The integrated circuit of claim 45, wherein said each clock cycle of said at least one clock cycle equals 100 nano-seconds.

47. The integrated circuit of claim 40, wherein said interrupt signal is transmitted to said receiving circuitry via at least one system data bus, said at least one system data bus electrically coupled to said receiving circuitry.

48. The integrated circuit of claim 40, wherein said specific bit position can be programmed by changing a specified number of bytes with software tools.

49. The integrated circuit of claim 40, wherein said specific bit position can be reprogrammed while said early interrupt system is operating.

50. The integrated circuit of claim 40, wherein said data packet is exactly 1518 bytes in length.

51. The Integrated circuit of claim 1, further comprising (f) an interrupt system electrically coupled to said local area network circuitry to selectively interrupt said local area network circuitry, said interrupt system comprising (f1) receiving circuitry to receive an interrupt signal generated by interrupt logic circuitry, said interrupt signal corresponding to an interrupt operation, said receiving circuitry electrically coupled to said local area network circuitry; and (f2) timing circuitry that starts incrementing when said interrupt signal is received by said receiving circuitry to determine when said interrupt operation is complete, said timing circuitry electrically coupled to said receiving circuitry.

52. The integrated circuit of claim 51, wherein said timing circuitry stops incrementing when a register is read by a network driver, said timing circuitry is reset after said register is read by said network driver, said network driver electrically coupled to said network.

53. The integrated circuit of claim 51, wherein said interrupt system is enabled via a bit in an network control register.

54. An integrated circuit, comprising (a) at least one data bus to electrically couple said integrated circuit with a first host system, said at least one data bus transfers data packaged in at least one data package to and from said integrated circuit, (b) local area network circuitry electrically coupled to said at least one data bus and selectively to a network, said local area network circuitry to electrically couple said integrated circuit and, in turn, said first host system to said network and thereby to at least one second host system via said at least one data bus, said network transfers data packaged in said it least one data packet to and from said local area network circuitry;

(c) input and output circuitry electrically coupled to said at least one data bus, said input and output circuit to electrically couple said integrated circuit and, in turn, said first host system to at least one input/output channel, said input/output channel, selectively electrically coupled to at least one external electrical module, said at least one input/output channel, transfers said data packaged in said at least one data packet to and from said input and output circuitry, wherein said local area network circuitry and said input and output circuitry operate at a first oscillation frequency and at a second oscillation frequency respectively, and further wherein said at least one input/output channel are selected from a group consist of a first serial port interface, a second serial port interface, a parallel port interface, a hard drive, a floppy drive, and any combination thereof:

(d) first memory electrically coupled to said local area network circuitry and to said input and output circuitry and to said at least one data bus, said first memory to store data received and transmitted by said local area network circuitry and said input and output circuitry via said at least one data bus and said network and said at least one input/output channel, said first memory is configurable and has sufficient memory capacity to store more than one data packet of said at least one data packet; and (e) a clock that oscillates naturally at a clock oscillation and clock generating circuitry to generate the first oscillation frequency and said second oscillation frequency, said clock generating circuitry electrically coupled to said clock and said clock generating circuitry electrically coupled to the local area network circuitry and to the input and output circuitry, wherein said clock generating circuitry comprises phase lock loop circuitry to generate a first clock frequency and a second clock frequency said phase lock loop circuitry having an input electrically coupled to said clock and an output electrically coupled to said local area network circuitry and to said input and output circuitry, further wherein said phase lock loop circuitry having an output comprises (e1) a phase detector electrically coupled to said clock, said phase detector detects a phase difference associated with said clock oscillation and said output of said phase lock loop circuitry;

(e2) a charge pump electrically coupled to said phase detector, said charge pump adjusts a corresponding voltage associated with said phase difference; and (e3) a filter electrically coupled to said charge pump to to produce a voltage proportional to said phase difference: and (e4) a voltage controlled oscillator electrically coupled to said filter to frequency proportional to said voltage, said frequency can be selectively converted into said first clock frequency and into said second clock frequency.

55. The integrated circuit of claim 54, wherein said filter operates in a linear fashion over a wide range of input values.

56. The integrated circuit of claim 54, wherein said phase lock loop circuitry generates oscillations that operate at very high speeds.

57. The integrated circuit of claim 54, wherein said clock generating circuitry comprises a feedback loop to correct errors and to adjust said first clock frequency and said second dock frequency generated by said clock generating circuitry.

58. The integrated circuit of claim 54, wherein said phase detector comprises:

(a) a first D-flip flop having a clock input, a D input, a Q output, and a clear input, said clock input electrically coupled to a first clock signal generated by said clock, said D input is electrically coupled to a first voltage state, said Q output is electrical coupled to said charge pump;

(b) a second D-flip flop having a clock input, a D input, a Q output, and a clear input, said clock input electrically coupled to a second clock signal generated by said voltage controlled oscillator, said D input electrically coupled to said first voltage state;

(c) a NAND gate having first and second inputs and an output, said first and second inputs electrically coupled to said Q outputs of said first and second D-flip flops respectively, said output of said NAND gate is electrically coupled to said clear inputs of said first and second D-flip flops;

(d) a multiplexor having first and second inputs, an output, an S input, said second input electrically coupled to said first reference voltage, said first input electrically coupled to said output of said NAND gate, said output coupled to said clear inputs of said first and second D-flip flops, said S input electrically coupled to said output of said NAND gate; and (e) a delay line is electrically coupled between said output of said NAND gate and said first input of said multiplexor.

* * * * *